US012528874B2

(12) United States Patent
Limb et al.

(10) Patent No.: US 12,528,874 B2
(45) Date of Patent: Jan. 20, 2026

(54) METHODS AND COMPOSITIONS FOR TREATING SYSTEMIC LUPUS ERYTHEMATOSUS (SLE) WITH MOSUNETUZUMAB

(71) Applicant: Genentech, Inc., South San Francisco, CA (US)

(72) Inventors: Susan Lee Limb, South San Francisco, CA (US); Matthew Dominic Cascino, Millbrae, CA (US); Monique Nicoll, South San Francisco, CA (US); Jay Prakash Garg, Menlo Park, CA (US); Michael Zecong Liao, Bellevue, WA (US)

(73) Assignee: Genentech, Inc., South San Francisco, CA (US)

(*) Notice: Subject to any disclaimer, the term of this patent is extended or adjusted under 35 U.S.C. 154(b) by 346 days.

(21) Appl. No.: 18/055,522

(22) Filed: Nov. 15, 2022

(65) Prior Publication Data

US 2023/0287133 A1 Sep. 14, 2023

Related U.S. Application Data

(60) Provisional application No. 63/378,353, filed on Oct. 19, 2022, provisional application No. 63/264,139, filed on Nov. 16, 2021.

(51) Int. Cl.
*C07K 16/28* (2006.01)
*A61K 31/573* (2006.01)
*A61P 37/06* (2006.01)

(52) U.S. Cl.
CPC ........ *C07K 16/2887* (2013.01); *A61K 31/573* (2013.01); *A61P 37/06* (2018.01)

(58) Field of Classification Search
CPC ............ C07K 16/2887; C07K 2317/31; C07K 16/2809; A61K 31/573; A61K 2039/505; A61K 2039/545; A61P 37/06
See application file for complete search history.

(56) References Cited

U.S. PATENT DOCUMENTS

| | | | |
|---|---|---|---|
| 4,120,649 A | 10/1978 | Schechter et al. |
| 4,665,007 A | 5/1987 | Cservak et al. |
| 4,676,980 A | 6/1987 | Segal et al. |
| 4,737,456 A | 4/1988 | Weng et al. |
| 4,808,614 A | 2/1989 | Hertel et al. |
| 4,816,567 A | 3/1989 | Cabilly et al. |
| 5,114,721 A | 5/1992 | Cohen et al. |
| 5,208,020 A | 5/1993 | Chari et al. |
| 5,416,064 A | 5/1995 | Chari et al. |
| 5,464,826 A | 11/1995 | Grindey et al. |
| 5,500,362 A | 3/1996 | Robinson et al. |
| 5,545,806 A | 8/1996 | Lonberg et al. |
| 5,545,807 A | 8/1996 | Surani et al. |
| 5,569,825 A | 10/1996 | Lonberg et al. |
| 5,571,894 A | 11/1996 | Wels et al. |
| 5,587,458 A | 12/1996 | King et al. |
| 5,591,828 A | 1/1997 | Bosslet et al. |
| 5,624,821 A | 4/1997 | Winter et al. |
| 5,625,126 A | 4/1997 | Lonberg et al. |
| 5,633,425 A | 5/1997 | Lonberg et al. |
| 5,635,483 A | 6/1997 | Pettit et al. |
| 5,641,870 A | 6/1997 | Rinderknecht et al. |
| 5,648,237 A | 7/1997 | Carter et al. |
| 5,648,260 A | 7/1997 | Winter et al. |
| 5,661,016 A | 8/1997 | Lonberg et al. |
| 5,677,180 A | 10/1997 | Robinson et al. |
| 5,712,374 A | 1/1998 | Kuntsmann et al. |
| 5,714,586 A | 2/1998 | Kunstmann et al. |
| 5,721,108 A | 2/1998 | Robinson et al. |
| 5,731,168 A | 3/1998 | Carter et al. |
| 5,736,137 A | 4/1998 | Anderson et al. |
| 5,739,116 A | 4/1998 | Hamann et al. |
| 5,750,373 A | 5/1998 | Garrard et al. |
| 5,767,285 A | 6/1998 | Hamann et al. |
| 5,770,429 A | 6/1998 | Lonberg et al. |
| 5,770,701 A | 6/1998 | McGahren et al. |
| 5,770,710 A | 6/1998 | McGahren et al. |
| 5,773,001 A | 6/1998 | Hamann et al. |
| 5,776,456 A | 7/1998 | Anderson et al. |
| 5,780,588 A | 7/1998 | Pettit et al. |
| 5,789,199 A | 8/1998 | Joly et al. |
| 5,821,337 A | 10/1998 | Carter et al. |
| 5,840,523 A | 11/1998 | Simmons et al. |
| 5,843,439 A | 12/1998 | Anderson et al. |
| 5,869,046 A | 2/1999 | Presta et al. |
| 5,877,296 A | 3/1999 | Hamann et al. |
| 5,959,177 A | 9/1999 | Hein et al. |

(Continued)

FOREIGN PATENT DOCUMENTS

| | | |
|---|---|---|
| BR | 112014029403 A2 | 10/2018 |
| CN | 1993142 A | 7/2007 |

(Continued)

OTHER PUBLICATIONS

NCI Thesaurus, Mosunetuzumab, 2024 (Year: 2024).*
Reddy et al., "Obinutuzumab induces superior B-cell cytotoxicity to rituximab in rheumatoid arthritis and systemic lupus erythematosus patient samples", Rheumatology, 2017 (Year: 2017).*
Aigner, A. et al., "Cellular Delivery In Vivo of Sirna-Based Therapeutics" Curr. Pharm. Des. 14(34):3603-3619 (2008).
Akinc, A. et al., "Development of Lipidoid-siRNA Formulations for Systemic Delivery to the Liver" Mol. Ther. 17(5):872-879 (May 11, 2010).
Akinc, A. et al., "Targeted Delivery of RNAi Therapeutics With Endogenous and Exogenous Ligand-Based Mechanisms" Mol. Ther. 18(7):1357-1364 (2010).
Aktas, E. et al., "Relationship Between CD107a Expression and Cytotoxic Activity" Cell Immunol. 254(2):149-154 (2008).

(Continued)

*Primary Examiner* — Chun W Dahle
*Assistant Examiner* — Nada Ahmed Mahmou Elmansy
(74) *Attorney, Agent, or Firm* — Gregory M. Zinkl

(57) ABSTRACT

Disclosed herein are compositions and methods for the treatment of systemic lupus erythematosus using anti-CD20/anti-CD3 bispecific antibodies, such as mosunetuzumab.

12 Claims, 14 Drawing Sheets

Specification includes a Sequence Listing.

(56) References Cited

U.S. PATENT DOCUMENTS

| | | |
|---|---|---|
| 6,040,498 A | 3/2000 | Stomp et al. |
| 6,075,181 A | 6/2000 | Kucherlapati et al. |
| 6,120,767 A | 9/2000 | Robinson et al. |
| 6,127,526 A | 10/2000 | Blank et al. |
| 6,150,584 A | 11/2000 | Kucherlapati et al. |
| 6,171,586 B1 | 1/2001 | Lam et al. |
| 6,194,551 B1 | 2/2001 | Idusogie et al. |
| 6,248,516 B1 | 6/2001 | Winter et al. |
| 6,267,958 B1 | 7/2001 | Andya et al. |
| 6,333,398 B1 | 12/2001 | Blank et al. |
| 6,399,061 B1 | 6/2002 | Anderson et al. |
| 6,417,335 B1 | 7/2002 | Basey et al. |
| 6,417,429 B1 | 7/2002 | Hein et al. |
| 6,420,548 B1 | 7/2002 | Vezina et al. |
| 6,455,043 B1 | 9/2002 | Grillo-Lopez et al. |
| 6,489,447 B1 | 12/2002 | Basey et al. |
| 6,602,684 B1 | 8/2003 | Umana et al. |
| 6,630,579 B2 | 10/2003 | Chari et al. |
| 6,652,852 B1 | 11/2003 | Robinson et al. |
| 6,682,734 B1 | 1/2004 | Anderson et al. |
| 6,737,056 B1 | 5/2004 | Presta et al. |
| 6,797,814 B2 | 9/2004 | Blank et al. |
| 6,846,476 B2 | 1/2005 | White et al. |
| 6,893,625 B1 | 5/2005 | Robinson et al. |
| 6,896,885 B2 | 5/2005 | Hanna et al. |
| 6,982,321 B2 | 1/2006 | Winter et al. |
| 6,991,790 B1 | 1/2006 | Lam et al. |
| 7,041,870 B2 | 5/2006 | Tomizuka et al. |
| 7,087,409 B2 | 8/2006 | Barbas et al. |
| 7,125,978 B1 | 10/2006 | Vezina et al. |
| 7,189,826 B2 | 3/2007 | Rodman et al. |
| 7,332,581 B2 | 2/2008 | Presta et al. |
| 7,371,826 B2 | 5/2008 | Presta et al. |
| 7,381,560 B2 | 6/2008 | Anderson et al. |
| 7,422,739 B2 | 9/2008 | Anderson et al. |
| 7,498,298 B2 | 3/2009 | Doronina et al. |
| 7,504,256 B1 | 3/2009 | Ogawa et al. |
| 7,517,670 B2 | 4/2009 | Umana et al. |
| 7,521,541 B2 | 4/2009 | Eigenbrot et al. |
| 7,527,791 B2 | 5/2009 | Adams et al. |
| 7,531,645 B2 | 5/2009 | Basey et al. |
| 7,601,335 B2 | 10/2009 | McCutcheon et al. |
| 7,682,612 B1 | 3/2010 | White et al. |
| 7,708,994 B2 | 5/2010 | Benyunes et al. |
| 7,744,877 B2 | 6/2010 | Anderson et al. |
| 7,820,161 B1 | 10/2010 | Curd et al. |
| 7,906,329 B2 | 3/2011 | Umana et al. |
| 7,976,838 B2 | 7/2011 | Benyunes et al. |
| 8,883,980 B2 | 11/2014 | Umana et al. |
| 9,296,820 B2 | 3/2016 | Umana et al. |
| 10,561,737 B2 | 2/2020 | Brinkmann et al. |
| 10,806,795 B2 | 10/2020 | Brinkmann et al. |
| 2001/0018041 A1 | 8/2001 | Hanna et al. |
| 2002/0006404 A1 | 1/2002 | Hanna et al. |
| 2002/0009444 A1 | 1/2002 | Grillo-Lopez et al. |
| 2002/0012665 A1 | 1/2002 | Hanna et al. |
| 2002/0028178 A1 | 3/2002 | Hanna et al. |
| 2002/0032317 A1 | 3/2002 | Blank et al. |
| 2002/0039557 A1 | 4/2002 | White et al. |
| 2002/0058029 A1 | 5/2002 | Hanna et al. |
| 2002/0128448 A1 | 9/2002 | Reff et al. |
| 2002/0159996 A1 | 10/2002 | Hariharan et al. |
| 2002/0164328 A1 | 11/2002 | Shinkawa et al. |
| 2002/0197256 A1 | 12/2002 | Grewal et al. |
| 2003/0003097 A1 | 1/2003 | Reff et al. |
| 2003/0026804 A1 | 2/2003 | Grillo-Lopez et al. |
| 2003/0103971 A1 | 6/2003 | Hariharan et al. |
| 2003/0115614 A1 | 6/2003 | Kanda et al. |
| 2003/0129185 A1 | 7/2003 | Ono et al. |
| 2003/0157108 A1 | 8/2003 | Presta et al. |
| 2003/0161832 A1 | 8/2003 | Bande et al. |
| 2003/0180290 A1 | 9/2003 | Hariharan et al. |
| 2003/0180292 A1 | 9/2003 | Hanna et al. |
| 2003/0206903 A1 | 11/2003 | Grillo-Lopez et al. |
| 2003/0211107 A1 | 11/2003 | Hariharan et al. |
| 2004/0072290 A1 | 4/2004 | Umana et al. |
| 2004/0093621 A1 | 5/2004 | Shitara et al. |
| 2004/0109865 A1 | 6/2004 | Niwa et al. |
| 2004/0110282 A1 | 6/2004 | Kanda et al. |
| 2004/0110704 A1 | 6/2004 | Yamane et al. |
| 2004/0132140 A1 | 7/2004 | Satoh et al. |
| 2004/0191256 A1 | 9/2004 | Raju et al. |
| 2004/0202655 A1 | 10/2004 | Morton et al. |
| 2004/0202658 A1 | 10/2004 | Benyunes et al. |
| 2004/0213784 A1 | 10/2004 | Grillo-Lopez et al. |
| 2004/0229310 A1 | 11/2004 | Simmons et al. |
| 2005/0014934 A1 | 1/2005 | Hinton et al. |
| 2005/0031613 A1 | 2/2005 | Nakamura et al. |
| 2005/0032130 A1 | 2/2005 | Beresini et al. |
| 2005/0042664 A1 | 2/2005 | Wu et al. |
| 2005/0053602 A1 | 3/2005 | Brunetta et al. |
| 2005/0058649 A1 | 3/2005 | Landes et al. |
| 2005/0074843 A1 | 4/2005 | Umana et al. |
| 2005/0079574 A1 | 4/2005 | Bond et al. |
| 2005/0079605 A1 | 4/2005 | Umana et al. |
| 2005/0095243 A1 | 5/2005 | Chan et al. |
| 2005/0112060 A1 | 5/2005 | White et al. |
| 2005/0119455 A1 | 6/2005 | Fuh et al. |
| 2005/0123540 A1 | 6/2005 | Hanna et al. |
| 2005/0123546 A1 | 6/2005 | Umana et al. |
| 2005/0158316 A1 | 7/2005 | Lam et al. |
| 2005/0163775 A1 | 7/2005 | Chan et al. |
| 2005/0180975 A1 | 8/2005 | Hanna et al. |
| 2005/0186206 A1 | 8/2005 | Brunetta et al. |
| 2005/0191297 A1 | 9/2005 | Brunetta et al. |
| 2005/0255527 A1 | 11/2005 | Yang et al. |
| 2005/0260186 A1 | 11/2005 | Bookbinder et al. |
| 2005/0266000 A1 | 12/2005 | Bond et al. |
| 2005/0271658 A1 | 12/2005 | Brunetta et al. |
| 2005/0272128 A1 | 12/2005 | Umana et al. |
| 2005/0276803 A1 | 12/2005 | Chan et al. |
| 2005/0276805 A1 | 12/2005 | Hanai et al. |
| 2006/0002930 A1 | 1/2006 | Brunetta et al. |
| 2006/0024295 A1 | 2/2006 | Brunetta et al. |
| 2006/0024300 A1 | 2/2006 | Adams et al. |
| 2006/0025576 A1 | 2/2006 | Miller et al. |
| 2006/0034835 A1 | 2/2006 | Adams et al. |
| 2006/0051345 A1 | 3/2006 | Frohna et al. |
| 2006/0057149 A1 | 3/2006 | Johnson et al. |
| 2006/0062787 A1 | 3/2006 | Hitraya et al. |
| 2006/0067930 A1 | 3/2006 | Adams et al. |
| 2006/0073148 A1 | 4/2006 | Tchistiakova et al. |
| 2006/0099662 A1 | 5/2006 | Chuntharapai et al. |
| 2006/0104968 A1 | 5/2006 | Bookbinder et al. |
| 2006/0110387 A1 | 5/2006 | Brunetta et al. |
| 2006/0121028 A1 | 6/2006 | Reff et al. |
| 2006/0134111 A1 | 6/2006 | Agarwal et al. |
| 2006/0135430 A1 | 6/2006 | Chan et al. |
| 2006/0171950 A1 | 8/2006 | Hariharan et al. |
| 2006/0172385 A1 | 8/2006 | Ernst et al. |
| 2006/0179501 A1 | 8/2006 | Chan et al. |
| 2006/0182739 A1 | 8/2006 | Basey et al. |
| 2006/0188495 A1 | 8/2006 | Barron et al. |
| 2006/0218655 A1 | 9/2006 | Chan et al. |
| 2006/0233797 A1 | 10/2006 | Gujrathi et al. |
| 2006/0240007 A1 | 10/2006 | Sanders et al. |
| 2006/0246004 A1 | 11/2006 | Adams et al. |
| 2006/0263349 A1 | 11/2006 | Mccutcheon et al. |
| 2006/0263355 A1 | 11/2006 | Quan et al. |
| 2006/0275284 A1 | 12/2006 | Hanna et al. |
| 2006/0286100 A1 | 12/2006 | Hariharan et al. |
| 2006/0286101 A1 | 12/2006 | Hariharan et al. |
| 2007/0003544 A1 | 1/2007 | Hanna et al. |
| 2007/0009518 A1 | 1/2007 | Novobrantseva et al. |
| 2007/0009519 A1 | 1/2007 | Hariharan et al. |
| 2007/0020260 A1 | 1/2007 | Presta et al. |
| 2007/0025987 A1 | 2/2007 | Brunetta et al. |
| 2007/0031331 A1 | 2/2007 | Brunetta et al. |
| 2007/0061900 A1 | 3/2007 | Murphy et al. |
| 2007/0071745 A1 | 3/2007 | Umana et al. |
| 2007/0117126 A1 | 5/2007 | Sidhu et al. |
| 2007/0134759 A1 | 6/2007 | Nishiya et al. |
| 2007/0160598 A1 | 7/2007 | Dennis et al. |
| 2007/0212733 A1 | 9/2007 | Martin et al. |

(56) References Cited

U.S. PATENT DOCUMENTS

| | | |
|---|---|---|
| 2007/0231324 A1 | 10/2007 | Ashkenazi et al. |
| 2007/0237764 A1 | 10/2007 | Birtalan et al. |
| 2007/0292936 A1 | 12/2007 | Barthelemy et al. |
| 2008/0008719 A1 | 1/2008 | Bowdish et al. |
| 2008/0038261 A1 | 2/2008 | Grillo-Lopez et al. |
| 2008/0044421 A1 | 2/2008 | Ashkenazi et al. |
| 2008/0069820 A1 | 3/2008 | Fuh et al. |
| 2008/0075719 A1 | 3/2008 | Chan et al. |
| 2008/0095771 A1 | 4/2008 | Barron et al. |
| 2008/0176257 A9 | 7/2008 | Chuntharapai et al. |
| 2008/0213280 A1 | 9/2008 | Benyunes et al. |
| 2008/0241884 A1 | 10/2008 | Shitara et al. |
| 2008/0280322 A9 | 11/2008 | Umana et al. |
| 2009/0002360 A1 | 1/2009 | Chen et al. |
| 2009/0004189 A1 | 1/2009 | Behrens et al. |
| 2009/0010921 A1 | 1/2009 | Umana et al. |
| 2009/0053786 A1 | 2/2009 | Kao et al. |
| 2009/0060913 A1 | 3/2009 | Friess et al. |
| 2009/0098118 A1 | 4/2009 | Friess et al. |
| 2009/0110688 A1 | 4/2009 | Fertig et al. |
| 2009/0148435 A1 | 6/2009 | Lebreton et al. |
| 2009/0155257 A1 | 6/2009 | Adams et al. |
| 2009/0162352 A1 | 6/2009 | Adler et al. |
| 2009/0169550 A1 | 7/2009 | Dummer et al. |
| 2009/0175854 A1 | 7/2009 | Ashkenazi et al. |
| 2009/0214561 A1 | 8/2009 | Close et al. |
| 2009/0246197 A1 | 10/2009 | Dumontet et al. |
| 2009/0269339 A1 | 10/2009 | Kelman et al. |
| 2009/0304690 A1 | 12/2009 | Umana et al. |
| 2009/0311255 A1 | 12/2009 | Brunetta et al. |
| 2009/0317384 A1 | 12/2009 | Ashkenazi et al. |
| 2010/0092997 A1 | 4/2010 | Nakamura et al. |
| 2010/0158903 A1 | 6/2010 | Smith et al. |
| 2010/0247484 A1 | 9/2010 | Barchet et al. |
| 2010/0255013 A1 | 10/2010 | Presta et al. |
| 2010/0291549 A1 | 11/2010 | Ramakrishnan et al. |
| 2010/0310581 A1 | 12/2010 | Dumontet et al. |
| 2011/0008250 A1 | 1/2011 | Curd et al. |
| 2011/0008337 A1 | 1/2011 | Curd et al. |
| 2011/0008338 A1 | 1/2011 | Curd et al. |
| 2011/0052488 A1 | 3/2011 | Dennis, Jr. et al. |
| 2011/0076273 A1 | 3/2011 | Adler et al. |
| 2011/0086050 A1 | 4/2011 | Presta et al. |
| 2011/0165151 A1 | 7/2011 | Herting et al. |
| 2011/0165152 A1 | 7/2011 | Dreyling et al. |
| 2011/0177067 A1 | 7/2011 | Dumontet et al. |
| 2011/0243931 A1 | 10/2011 | Friess et al. |
| 2012/0251531 A1 | 10/2012 | Baehner et al. |
| 2012/0251534 A1 | 10/2012 | Grillo-Lopez et al. |
| 2013/0040831 A1 | 2/2013 | Liu et al. |
| 2014/0212425 A1* | 7/2014 | Chang ............... C07K 16/2851 530/387.9 |
| 2014/0248262 A1 | 9/2014 | Sampath et al. |
| 2015/0158846 A1 | 6/2015 | Crawford et al. |
| 2015/0166661 A1 | 6/2015 | Chen et al. |
| 2016/0075793 A1 | 3/2016 | Umaña et al. |
| 2016/0075794 A1 | 3/2016 | Umaña et al. |
| 2016/0076009 A1 | 3/2016 | Umaña et al. |
| 2016/0324984 A1 | 11/2016 | Brinkmann et al. |
| 2016/0346387 A1 | 12/2016 | Brunetta et al. |
| 2017/0029520 A1 | 2/2017 | Brunetta et al. |
| 2019/0365888 A1 | 12/2019 | Brunetta et al. |
| 2020/0002437 A1 | 1/2020 | Brinkmann et al. |
| 2022/0259321 A1 | 8/2022 | Cascino et al. |
| 2023/0039927 A1 | 2/2023 | Cascino et al. |

FOREIGN PATENT DOCUMENTS

| | | |
|---|---|---|
| CN | 102470171 A | 5/2012 |
| CN | 103282054 A | 9/2013 |
| EA | 201000091 A1 | 6/2010 |
| EA | 018708 B1 | 10/2013 |
| EP | 0 404 097 B1 | 12/1990 |
| EP | 0 669 836 B1 | 3/1996 |
| EP | 0 425 235 B1 | 9/1996 |
| EP | 0 340 109 B1 | 5/1997 |
| EP | 0 752 248 B1 | 9/2000 |
| EP | 1 798 240 B1 | 4/2001 |
| EP | 0 999 853 B1 | 1/2003 |
| EP | 2004/060052 A2 | 7/2004 |
| EP | 1870459 A1 | 12/2007 |
| EP | 1 005 870 B1 | 1/2009 |
| EP | 2 000 149 B1 | 5/2009 |
| EP | 1131096 B1 | 1/2010 |
| EP | 2 197 918 A1 | 6/2010 |
| EP | 2 319 529 A1 | 5/2011 |
| EP | 2 691 417 A1 | 2/2014 |
| EP | 234 600 B1 | 8/2014 |
| JP | 2008-501706 A | 1/2008 |
| JP | 2009-505650 A | 2/2009 |
| JP | 2010-538024 A | 12/2010 |
| JP | 2017-522295 A | 8/2017 |
| RU | 2396084 C1 | 8/2010 |
| RU | 2509558 C2 | 3/2014 |
| WO | 1988/04936 A1 | 7/1988 |
| WO | 90/08187 A1 | 7/1990 |
| WO | 90/11294 A1 | 10/1990 |
| WO | 91/01333 A1 | 2/1991 |
| WO | 91/10741 A1 | 7/1991 |
| WO | 93/01161 A1 | 1/1993 |
| WO | 93/08829 A1 | 5/1993 |
| WO | 93/16185 A2 | 8/1993 |
| WO | 93/16185 A3 | 8/1993 |
| WO | 94/11026 A2 | 5/1994 |
| WO | 94/11026 A3 | 5/1994 |
| WO | 94/29351 A2 | 12/1994 |
| WO | 94/29351 A3 | 12/1994 |
| WO | 96/27011 A1 | 9/1996 |
| WO | 96/33735 A1 | 10/1996 |
| WO | 96/34096 A1 | 10/1996 |
| WO | 97/17446 A2 | 5/1997 |
| WO | 97/17446 A3 | 5/1997 |
| WO | 97/30087 A1 | 8/1997 |
| WO | 98/24893 A2 | 6/1998 |
| WO | 98/24893 A3 | 6/1998 |
| WO | 1998/23645 A1 | 6/1998 |
| WO | 98/050431 A2 | 11/1998 |
| WO | 98/050431 A3 | 11/1998 |
| WO | 98/56418 A1 | 12/1998 |
| WO | 98/58964 A1 | 12/1998 |
| WO | 99/22764 A1 | 5/1999 |
| WO | 99/51642 A1 | 10/1999 |
| WO | 99/54342 A1 | 10/1999 |
| WO | 99/57134 A1 | 11/1999 |
| WO | 00/09160 A1 | 2/2000 |
| WO | 00/27428 A1 | 5/2000 |
| WO | 00/27433 A1 | 5/2000 |
| WO | 00/50088 A2 | 8/2000 |
| WO | 00/61739 A1 | 10/2000 |
| WO | 00/67796 A1 | 11/2000 |
| WO | 01/03734 A1 | 1/2001 |
| WO | 01/10460 A1 | 2/2001 |
| WO | 01/29246 A1 | 4/2001 |
| WO | 01/34194 A1 | 5/2001 |
| WO | 01/34651 A1 | 5/2001 |
| WO | 01/74388 A1 | 10/2001 |
| WO | 01/80884 A1 | 11/2001 |
| WO | 01/97858 A2 | 12/2001 |
| WO | 02/04021 A1 | 1/2002 |
| WO | 02/22212 A2 | 3/2002 |
| WO | 02/22212 A3 | 3/2002 |
| WO | 02/31140 A1 | 4/2002 |
| WO | 02/031140 A1 | 4/2002 |
| WO | 02/34790 A1 | 5/2002 |
| WO | 02/078766 A2 | 10/2002 |
| WO | 03/011878 A2 | 2/2003 |
| WO | 03/024388 A2 | 3/2003 |
| WO | 03/035835 A2 | 5/2003 |
| WO | 03/035835 A3 | 5/2003 |
| WO | 03/084570 A1 | 10/2003 |
| WO | 03/085107 A1 | 10/2003 |
| WO | 03/085119 A1 | 10/2003 |
| WO | 2004/035607 A2 | 4/2004 |

(56) References Cited

FOREIGN PATENT DOCUMENTS

| | | |
|---|---|---|
| WO | 2004/056312 A2 | 7/2004 |
| WO | 2004/056312 A3 | 7/2004 |
| WO | 2004/060053 A2 | 7/2004 |
| WO | 2004/065540 A2 | 8/2004 |
| WO | 2004/065569 A2 | 8/2004 |
| WO | 2004/091657 A2 | 10/2004 |
| WO | 2004/092219 A2 | 10/2004 |
| WO | 2004/092219 A3 | 10/2004 |
| WO | 2005/000351 A2 | 1/2005 |
| WO | 2005/005462 A2 | 1/2005 |
| WO | 2005/017529 A1 | 2/2005 |
| WO | 2005/023302 A2 | 3/2005 |
| WO | 2005/035586 A1 | 4/2005 |
| WO | 2005/035778 A1 | 4/2005 |
| WO | 2005/044859 A2 | 5/2005 |
| WO | 2005/044859 A3 | 5/2005 |
| WO | 2005/053742 A1 | 6/2005 |
| WO | 2005/060999 A2 | 7/2005 |
| WO | 2005/061542 A2 | 7/2005 |
| WO | 2005/062955 A2 | 7/2005 |
| WO | 2005/062955 A3 | 7/2005 |
| WO | 2005/079479 A2 | 7/2005 |
| WO | 2005/079479 A3 | 7/2005 |
| WO | 2005/100402 A1 | 10/2005 |
| WO | 2005/103081 A2 | 11/2005 |
| WO | 2005/108989 A2 | 11/2005 |
| WO | 2005/113003 A2 | 12/2005 |
| WO | 2005/114218 A2 | 12/2005 |
| WO | 2005/115453 A2 | 12/2005 |
| WO | 2005/117972 A2 | 12/2005 |
| WO | 2005/117978 A2 | 12/2005 |
| WO | 2005/120437 A2 | 12/2005 |
| WO | 2006/012508 A2 | 2/2006 |
| WO | 2006/029224 A2 | 3/2006 |
| WO | 2006/029275 A2 | 3/2006 |
| WO | 2006/029879 A2 | 3/2006 |
| WO | 2006/029879 A3 | 3/2006 |
| WO | 2006/031370 A2 | 3/2006 |
| WO | 2006/034488 A2 | 3/2006 |
| WO | 2006/034488 A3 | 3/2006 |
| WO | 2006/041680 A2 | 4/2006 |
| WO | 2006/044908 A2 | 4/2006 |
| WO | 2006/044908 A3 | 4/2006 |
| WO | 2006/066086 A1 | 6/2006 |
| WO | 2006/066089 A1 | 6/2006 |
| WO | 2006/068867 A1 | 6/2006 |
| WO | 2006/069403 A2 | 6/2006 |
| WO | 2006/076651 A2 | 7/2006 |
| WO | 2006/084264 A2 | 8/2006 |
| WO | 2006/093923 A2 | 9/2006 |
| WO | 2006/113308 A1 | 10/2006 |
| WO | 2006/116369 A2 | 11/2006 |
| WO | 2006/125140 A2 | 11/2006 |
| WO | 2006/127517 A2 | 11/2006 |
| WO | 2006/133148 A2 | 12/2006 |
| WO | 2007/031875 A2 | 3/2007 |
| WO | 2007/059188 A1 | 5/2007 |
| WO | 2007/062090 A2 | 5/2007 |
| WO | 2007/064911 A1 | 6/2007 |
| WO | 2007/110205 A2 | 10/2007 |
| WO | 2007/140371 A2 | 12/2007 |
| WO | 2007/147901 A1 | 12/2007 |
| WO | 2008/002064 A1 | 1/2008 |
| WO | 2008/077546 A1 | 7/2008 |
| WO | 2008/122007 A1 | 10/2008 |
| WO | 2008/157282 A1 | 12/2008 |
| WO | 2009/007750 A1 | 1/2009 |
| WO | 2009/009523 A1 | 1/2009 |
| WO | 2009/030368 A1 | 3/2009 |
| WO | 2009/040268 A1 | 4/2009 |
| WO | 2009/049841 A1 | 4/2009 |
| WO | 2009/053038 A2 | 4/2009 |
| WO | 2009/058812 A1 | 4/2009 |
| WO | 2009/062080 A1 | 5/2009 |
| WO | 2009/080251 A1 | 7/2009 |
| WO | 2009/080252 A1 | 7/2009 |
| WO | 2009/080253 A1 | 7/2009 |
| WO | 2009/080254 A1 | 7/2009 |
| WO | 2009/080541 A1 | 7/2009 |
| WO | 2009/085765 A1 | 7/2009 |
| WO | 2009/086072 A2 | 7/2009 |
| WO | 2009/089004 A1 | 7/2009 |
| WO | 2009/092011 A1 | 9/2009 |
| WO | 2009/118142 A1 | 10/2009 |
| WO | 2009/118324 A1 | 10/2009 |
| WO | 2009/134738 | 11/2009 |
| WO | 2010/033587 A2 | 3/2010 |
| WO | 2010/056893 A1 | 5/2010 |
| WO | 2010/057107 A1 | 5/2010 |
| WO | 2010/057109 A1 | 5/2010 |
| WO | 2010/112193 A1 | 10/2010 |
| WO | 2010/115554 A1 | 10/2010 |
| WO | 2010/115589 A1 | 10/2010 |
| WO | 2010/129304 A2 | 11/2010 |
| WO | 2010/129304 A3 | 11/2010 |
| WO | 2010/136172 A1 | 12/2010 |
| WO | 2010/145792 A1 | 12/2010 |
| WO | 2010/145793 A1 | 12/2010 |
| WO | 2011/003557 A1 | 1/2011 |
| WO | 2011/003557 A8 | 1/2011 |
| WO | 2011/003780 A1 | 1/2011 |
| WO | 2004/042072 | 5/2011 |
| WO | 2011/090754 A1 | 7/2011 |
| WO | 2011/090762 A1 | 7/2011 |
| WO | 2011/131749 A1 | 10/2011 |
| WO | 2011/143545 A1 | 11/2011 |
| WO | 2012/011875 A1 | 1/2012 |
| WO | 2012/018771 A1 | 2/2012 |
| WO | 2012/022747 A1 | 2/2012 |
| WO | 2012/058768 A1 | 5/2012 |
| WO | 2012/058768 A8 | 5/2012 |
| WO | 2012/093068 A1 | 7/2012 |
| WO | 2012/130831 A1 | 10/2012 |
| WO | 2013/090478 A1 | 6/2013 |
| WO | 2013/096291 A2 | 6/2013 |
| WO | 2013/096291 A3 | 6/2013 |
| WO | 2013/157953 A1 | 10/2013 |
| WO | 2013/157954 A1 | 10/2013 |
| WO | 2013/177062 A2 | 11/2013 |
| WO | 2013/177062 A3 | 11/2013 |
| WO | 2014/006124 A1 | 1/2014 |
| WO | 2014/039855 A1 | 3/2014 |
| WO | 2014/177617 A1 | 11/2014 |
| WO | 2015/101586 A1 | 7/2015 |
| WO | 2015/197736 A1 | 12/2015 |
| WO | 2016/183104 A1 | 11/2016 |
| WO | 2017/004091 A1 | 1/2017 |
| WO | WO-2018045058 A1 * | 3/2018 ........... A61K 31/415 |
| WO | 2021/000530 A1 | 1/2021 |
| WO | 2021/050645 A1 | 3/2021 |
| WO | 2022/198192 A1 | 9/2022 |

OTHER PUBLICATIONS

Aletaha, D. et al., "2010 Rheumatoid Arthritis Classification Criteria: an American College of Rheumatology/European League Against Rheumatism Collaborative Initiative" Ann Rheum Dis 69(9):1580-1588 (Sep. 2010).

Almagro and Fransson, "Humanization of antibodies" Front Biosci 13:1619-1633 (Jan. 1, 2008).

Alter, G. et al., "CD 107a as a Functional Marker for the Identification of Natural Killer Cell Activity" J Immunol Methods (e-pub. Sep. 25, 1994), 294:15-22 (Nov. 2004).

Aringer, M. et al., "The Role of Tumor Necrosis Factor-Alpha in Systemic Lupus Erythematosus" Arthritis Res. Ther. 10:1-8 (Jan. 23, 2008).

Arons, E. et al., "VH4-34 hairy cell leukemia, a new variant with poor prognosis despite standard therapy" Blood 114(21):4687-4695 (2009).

Asherson et al., "The 'Primary' Antiphospholipid Syndrome: Major Clinical and Serological Features" Medicine 68(6):366-374 (1989).

(56) References Cited

OTHER PUBLICATIONS

Assouline, S. et al., "Pharmacokinetics, safety, and efficacy of subcutaneous versus intravenous rituximab plus chemotherapy as treatment for chronic lymphocytic leukaemia (SAWYER): a phase 1b, open-label, randomised controlled non-inferiority trial" Lancet Haematol 3(3):e128-e138 (Mar. 1, 2016).

Assouline, S., et al., "Mosunetuzumab Shows Promising Efficacy in Patients with Multiply Relapsed Follicular Lymphoma: Updated Clinical Experience from a Phase I Dose-Escalation Trial" Blood 136(1):42-44 (Nov. 5, 2020).

Atwell, S., et al., "Stable Heterodimers from Remodeling the Domain Interface of a Homodimer using a Phage Display Library" J Mol Biol 270(1):26-35 (Jul. 4, 1997).

Ausubel, F.M. et al. Short Protocols in Molecular Biology John Wiley & Sons, Inc., (1995).

AvantGen, Inc., "AvantGen's Antibody Humanization and Discovery Technologies-GermlinerTM Antibodies: An Effective and Proprietary Technology for Humanizing Antibodies Based on Epitope-Guided Selection":4 pages (Jul. 27, 2009).

Baca, M., et al., "Antibody humanization using monovalent phage display" J Biol Chem 272(16):10678-10684 (Apr. 18, 1997).

Bagci, H. et al., "Monoclonal Anti-Biotin Antibodies Simulate Avidin in the Recognition of Biotin" FEBS Letter 322(1):47-50 (1993).

Bai, S. et al., "A guide to rational dosing of monoclonal antibodies" Clin Pharmacokinetics 51:119-135 (2012).

Barbas, C. F., et al., "In Vitro Evolution of a Neutralizing Human Antibody to Human Immunodeficiency Virus Type 1 to Enhance Affinity and Broaden Strain Cross-Reactivity" PNAS USA 91(9):3809-3813 (Apr. 26, 1994).

Baselga, J. et al., "The EGFR as a target for anticancer therapy—focus on cetuximab" Eur. J. Cancer 37:S16-S22 (2001).

Beck, A. et al., "Strategies and Challenges for the Next Generation of Therapeutic Antibodies" Nat. Rev. Immunol. 10(5):345-352 (May 2010).

Becker, Y. et al., "The Emerging Role of Rituximab in Organ Transplantation" Transplant International 19(8):621-628 (2006).

Beers, S. et al., "Type II (tositumomab) Anti-CD20 Monoclonal Antibody Out Performs Type I (Rituximab-Like) Reagents in B-Cell Depletion Regardless of Complement Activation" Blood 112(10):4170-4177 (Nov. 15, 2008).

Bera, T. et al., "Comparison of Recombinant Immunotoxins against LeY Antigen Expressing Tumor Cells: Influence of Affinity, Size, and Stability" Bioconjugate Chem. 9:736-743 (1998).

Berger, M. et al., "Production of Antibodies that Bind Biotin and Inhibit Biotin Containing Enzymes" Biochemistry 14(11):2338-2342 (1975).

Bhattarai, S. et al., "Enhanced Gene and siRNA Delivery by Polycation-Modified Mesoporous Silica Nanoparticles Loaded With Chloroquine" Pharm. Res. 27(12):2556-2568 (Dec. 2010).

Bichile, T. et al., "Prevention and Management of Co-Morbidities in SLE" Press Med. 43:e187-e195 (May 20, 2014).

Boerner, P., et al., "Production of antigen-specific human monoclonal antibodies from in vitro-primed human splenocytes" J Immunol 147(1):86-95 (Jul. 1, 1991).

Bologna, L. et al., "Mechanism of Action of Type II, Glycoengineered, Anti-CD20 Monoclonal Antibody GA101 in B-Chronic Lymphocytic Leukemia Whole Blood Assays in Comparison with Rituximab and Alemtuzumab" J Immunol 186(6):3762-3769 (2011).

Boune, S. et al., "Principles of N-Linked Glycosylation Variations of IgG-Based Therapeutics: Pharmacokinetic and Functional Considerations" Antibodies 9(22):1-20 (2020).

Bowles J. et al., "Anti-CD20 Monoclonal Antibody with Enhanced Affinity for CD16 Activates NK Cells at Lower Concentrations and More Effectively than Rituximab" Blood 108(8):2648-2654 (Oct. 15, 2006).

Brennan, M., et al., "Preparation of Bispecific Antibodies by Chemical Recombination of Monoclonal Immunoglobulin G1 Fragments" Science 229:81-83 (Jul. 5, 1985).

Brinkmann, U. et al., "B3(Fv)-PE38KDEL, A Single-Chain Immunotoxin That Causes Complete Regression of a Human Carcinoma in Mice" PNAS 89:8616-8620 (Oct. 1991).

Brodeur, B. et al., "Mouse-human myeloma partners for the production of heterohybridomas" Monoclonal Antibody Production Techniques and Applications (New York: Marcel Dekker, Inc.),:51-63 (1987).

Brüggemann, M. et al., "Comparison of the Effector Functions of Human Immunoglobulins Using a Matched set of Chimeric Antibodies" J Exp Med (.), 166(5):1351-61 (1987).

Brüggemann, M. et al., "Designer Mice: the Production of Human Antibody Repertoires in Transgenic Animals" Year in Immuno. 7:33-40, (1993).

Burness, CB et al., "Belimumab: in systemic lupus erythematosus" Drugs 71(18):2435-2444 (Dec. 1, 2011).

Burris, T. et al., "A Novel Method for Analysis of Nuclear Receptor Function at Natural Promoters: Peroxisome Proliferator-Activated Receptor γ Agonist Actions on aP2 Gene Expression Detected Using Branched DNA Messenger RNA Quantitation" Mol. Endocrinol. 13(3):410-417 (Mar. 1999).

Cameron, J. et al., "Lupus Nephritis" J. Am. Soc. Nephrol. 10:413-424 (1999).

Cao, Y. et al., "Development of Bispecific Monoclonal Antibody as a Universal Immunoprobe for Detecting Biotinylated Macromolecules" Journal of Immunological Methods 220:85-91 (1998).

Capel, P., et al., "Heterogeneity of human IgG Fc receptors" Immunomethods 4(1):25-34 (Feb. 1, 1994).

Carson, K. et al., "Progressive multifocal leukoencephalopathy after rituximab therapy in HIV-negative patients: a report of 57 cases from the Research on Adverse Drug Events and Reports project" Blood 113(20):4834-4840 (May 14, 2009).

Carter, P., et al., "Humanization of an anti-p185HER2 antibody for human cancer therapy" PNAS USA 89(10):4285-4289 (May 15, 1992).

Cartron, G. et al., "Obinutuzumab: what is there to learn from clinical trials?" Blood 130(5):581-589 (Aug. 31, 2017).

Chan, D. et al., "Click Conjugated Polymeric Immuno-Nanoparticles for Targeted siRNA and Antisense Oligonucleotide Delivery" Biomaterials 34:8408-8415 (2013).

Chari, R. V.J. et al., "Immunoconjugates containing novel maytansinoids: Promising anticancer drugs" Cancer Res 52:127-131 (1992).

Charlton, K.A., "Expression and isolation of recombinant antibody fragments in E. coli" Methods Mol Biol 248:245-254 (2003).

Chen, F. et al., "Measuring IL-6 and sIL-6R in serum from patients treated with tocilizumab and/or siltuximab following CAR T cell therapy" J Immunol 434(1):1-8 (Jul. 1, 2016).

Chen, Y. et al., "Selection and analysis of an optimized anti-VEGF antibody: crystal structure of an affinity-matured Fab in complex with antigen" J Mol Biol 293(4):865-881 (Nov. 5, 1999).

Chen, Y. et al., "Value of a Complete or Partial Remission in Severe Lupus Nephritis" Clin. J. Am. Soc. Nephrol. 3:46-53 (2008).

Chitnis, M. et al., "The Type 1Insulin-Like Growth Factor Receptor Pathway" Clin Cancer Res 14(20):6364-6370 (2008).

Chothia, C., et al., "Canonical structures for the hypervariable regions of immunoglobulins" J Mol Biol 196(4):901-917 (Aug. 20, 1987).

Chowdhury, P., "Engineering hot spots for affinity enhancement of antibodies" Methods Mol Biol 207:179-196 (2003).

Chowdhury, P.S., "Targeting Random Mutations to Hotspots in Antibody Variable Domains for Affinity Improvement" Methods in Molecular Biology 178:269-285 (2001).

Chung, C. et al., "Managing Predications and the Risk for Reactions to Infusional Monoclonal Antibody Therapy" The Oncologist 13(6):725-732 (Jun. 1, 2008).

Clackson, T., et al., "Making antibody fragments using phage display libraries" Nature 352(6336):624-628 (Aug. 15, 1991).

clinicaltrials.gov (Jan. 8, 2021). NCT04702256—"Inductions Therapy for Lupus Nephritis with no Added Oral Steroids: A Trial Comparing Oral Corticosteroids Plus Mycophenolate Mofetil (MMF) Versus Obinutuzumab and Mmf (Obilup)," 13 pages.

(56) References Cited

OTHER PUBLICATIONS clinicaltrials.gov (Jan. 9, 2020). NCT04221477—"A Study to Evaluate the Efficacy and Safety of Obinutuzumab in Patients with ISR/RPS 2003 Class III or IV Lupus Nephritis (Regency)," 10 pages.

clinicaltrials.gov (Sep. 15, 2015). NCT02550625 "A Study to Evaluate the Safety and Efficacy of Obinutuzumab Compared with Placebo in Participants with Lupus Nepritis (LN)," (v33), Retrieved online: https://clinicaltrials.gov/ct2/history/NCT02550652?A=33&B=33&C=merged#StudyPage%20Top%3E ; last visited Jan. 11, 2023, 12 pages.

Clynes, R., et al., "Fc receptors are required in passive and active immunity to melanoma" PNAS USA 95(2):652-656 (Jan. 1, 1998).

Cole et al. Monoclonal Antibodies and Cancer Therapy "The EBV-hybridoma technique and its application to human lung cancer" New York: Alan R. Liss, Inc.,:77-96 (1985).

Coligan, J.E. et al. Current Protocols in Immunology "3.12" John Wiley & Sons, Inc., vol. 1 (1991).

Collins, M. et al., "A Branched DNA Signal Amplification Assay for Quantification of Nucleic Acid Targets Below 100 Molecules/ml" Nucleic Acids Res. 25(15):2979-2984 (Aug. 1, 1997).

Condon, M. et al., "Prospective Observational Single-Centre Cohort Study to Evaluate the Effectiveness of Treating Lupus Nephritis with Rituzimab and Mycophenolate Mofetil but No Oral Steroids" Ann Rheum Dis 72:1280-1286 (2013).

Cook, R., et al., "Prediction of short term mortality in systemic lupus erythematosus with time dependent measures of disease activity" J Rheumatol 27(8):1892-1895 (Aug. 1, 2000).

Cragg, M., et al., "Antibody Specificity Controls in Vivo Effector Mechanisms of Anti-CD20 Regents" Blood 103(7):2738-2743 (Apr. 1, 2004).

Cragg, M., et al., "Complement-mediated lysis by anti-CD20 mAb correlates with segregation into lipid rafts" Blood 101(3):1045-1052 (Feb. 1, 2003).

Cravedi, P. et al., "Efficacy and Safety of Rituximab Second-Line Therapy for Membranous Nephropathy: A Prospective, Matched-Cohort Study" Am. J. Nephrol. 33:461-468 (2011).

Cumming, D.A. et al., "Glycosylation of recombinant protein therapeutics: control and functional implications" Glycobiology 1(2):115-30 (Mar. 1991).

Cunningham, B., et al., "High-resolution epitope mapping of hGH-receptor interactions by alanine-scanning mutagenesis" Science 244(4908):1081-1085 (Jun. 2, 1989).

Daëron, M. et al., "Fc receptor biology" Annu Rev Immunol 15:203-234 (1997).

Dakshinamurti, K. et al., "Production and Characterization of a Monoclonal Antibody to Biotin" Biochemical Journal 237:477-482 (1986).

Dall'era, M. et al., "Identification of Biomarkers that Predict Response to Treatment of Lupus Nephritis with Mycophenolate Mofetil or Pulse Cyclophosphamide" Arthritis Care Res. 63(3):351-357 (Mar. 2011).

Dall'acqua, W., et al., "Antibody humanization by framework shuffling" Methods 36(1):43-60 (Jan. 17, 2005).

Davila, M., et al., "Efficacy and Toxicity Management of 19-28z CAR T Cell Therapy in B Cell Acute Lymphoblastic Leukemia" Sci Transl Med 6(224):224ra25 (1-10) (Feb. 19, 2014).

De Haas, M., et al., "Fcγ receptors of phagocytes" J Lab Clin Med 126(4):330-341 (Oct. 1, 1995).

De Pascalis, R.R. et al., "Grafting of 'Abbreviated' Complementarity-Determining Regions Containing Specificity-Determining Residues Essential for Ligand Contact to Engineer a Less Immunogenic Humanized Monoclonal Antibody" J Immunol 169:3076-3084 (2002).

Dhote, R. et al., "Reactive Hemophagocytic Syndrome in Adult Systemic Disease: Report of Twenty-Six Cases and Literature Review" Arthritis Rheum. 49:633-639 (Oct. 15, 2003).

Doessegger, L. et al., "Clinical development methodology for infusion-related reactions with monoclonal antibodies" Cli Transl Immunol 4(7):E39 (Jul. 17, 2015).

Dubowchik, G., et al., "Doxorubicin Immunoconjugates Containing Bivalent, Lysosomally-Cleavable Dipeptide Linkages" Bioorg Med Chem Lett 12(11):1529-1532 (Jun. 3, 2002).

Duncan, A., et al., "The Binding Site for C1q on IgG" Nature 332(6166):738-740 (Apr. 21, 1988).

Edelman, G. M., et al., "The Covalent Structure of an Entire γ G Immunoglobulin Molecule" Biochemistry, PNAS 63(1):78-85 (May 1, 1969).

Egbuniwe, I., et al., "Revisiting the role of B cells in skin immune surveillance" Trends Immunol 36(2):102-111 (Feb. 1, 2015).

Einfeld, D.A. et al., "Molecular Cloning of the Human B Cell CD20 Receptor Predicts a Hydrophobic Protein with Multiple Transmembrane Domains" EMBO J 7(3):711-717 (Mar. 1, 1988).

Eisenberg, R. et al., "SLE—Rituximab in lupus" Arthritis Res Ther 5(4):157-159 (2003).

Ekkehard, M. et al., "Increasing The Efficacy of CD20 Antibody Therapy Through the Engineering of a New Type II Anti-CD20 Antibody With Enhanced Direct and Immune Effector Cell-Mediated B-Cell Cytotoxicity" Blood 115(22)::4393-4402 (2010).

El-Ouahabi, A et al., "Intracellular Visualization of BrdU-labeled Plasmid DNA/Cationic Liposome Complexes" J. Histochem. Cytochem. 47(9):1159-1166 (1999).

EMA. Anonymous: "May 22, 2014 EMA/CHMP/231450/2014 Committee for Medicinal Products for Human Use (CHMP)", XP055809249, URL:https://www.ema.europa.eu/en/documents/assessment-report/gazyvaro-epar-public-assessment- report_en.pdf, pp. 1-123 (May 22, 2014).

European Patent Application No. 13734999.9, Response to Article 94(3) EPC Communication Apr. 12, 2016 showing determination of the binding murine M33 (muM33) and humanized antibody (huM33) binding site to biotinylated payload, pp. 1-12.

European Patent Application No. 13734999.9, communication of May 17, 2022, "Determination of the binding murine M33 (muM33) and humanized antibody (huM33) binding site to biotinylated payload.", pp. 1-4.

Fadet, L. et al., "Development and Validation of the HScore, a Score for the Diagnosis of Reactive Hemophagocytic Syndrome" Arthritis & Rheumatology 66(9):2613-2620 (Sep. 9, 2014).

FDA (Dec. 2015). "Obinutuzumab (Gazyva)," Natl. Drug Monographs. Retrieved from the internet, <https://www.pbm.va.gov/PBM/clinicalguidance/drugmonographs/Obinutuzumab GAZYVA Drug Monograph.pdf>, last visited Dec. 16, 2020, 11 pages.

Fellouse, F., et al., "Synthetic antibodies from a four-amino-acid code: A dominant role for tyrosine in antigen recognition" PNAS USA 101(34):12467-12472 (Aug. 24, 2004).

Feng, J,-M. et al. Drug Delivery to the Central Nervous System, Neuromethods "Receptor-Mediated Transport of Drugs Across the BBB" Jain, K.K., Clifton, NJ, US:Humana Press, vol. 45:15-34 (2010).

Fishwild, D.M. et al., "High-avidity human IgGK monoclonal antibodies from a novel strain of minilocus transgenic mice" Nat Biotechnol 14(7):845-851 (Jul. 1996).

Flatman, S., et al., "Process analytics for purification of monoclonal antibodies" J Chromatogr 848(1):79-87 (Mar. 15, 2007).

Focosi, D., et al., "Immunosuppressive monoclonal antibodies: current and next generation" Clin Microbiol Infect 17(12):1759-1768 (Dec. 1, 2011).

Freeman, C. et al., "Role of CD20 Expression and Other Pre-Treatment Risk Factors in the Development of Infusion-Related Reactions in Patients with CLL treated with Obinutuzumab" Leukemia 30:1763-1766 (2016).

Freeman, C.et al., "Cytokine release in patients with CLL treated with obinutuzumab and possible relationship with infusion-related reactions" Blood 126(24):2646-2649, (2015).

Freshney, R.I. et al.; Animal Cell Culture: A Practical Approach, IRL Press, 1992, 9 pages.

Fujieda, Y. et al., "Immunocompetent Cell Targeted Therapy" New Medicine Methods (with English Translation; The Medical Frontline, vol. 68, March Special Issue, 2013, pp. 681-689), 68(682):223-233 (Mar. 2013).

Fukaya, S. et al., "Clinical features of haemophagocytic syndrome in patients with systemic autoimmune diseases: analysis of 30 cases" Rheumatology 47(11):1686-1691 (Nov. 1, 2008).

(56) References Cited

OTHER PUBLICATIONS

Furie, R. et al., "B cell-depletion and response in a randomized, controlled trial of obinutuzumab for proliferative lupus nephritis [abstract]" Lupus Sci Med 7:035 (2020).
Furie, R. et al., "A Phase II Randomized, Double-Blind, Placebo-Controlled Study to Evaluate the Efficacy and Safety of Obinutuzumab or Placebo in Combination with Mycophenolate Mofetil in Patients with Active Class III or IV Lupus Nephritis" 2019 ACR/ARP Annual Meeting; Abstract No. 939, pp. 3 (Nov. 10, 2019).
Furie, R. et al., "Novel Evidence-Based Systemic Lupus Erythematosus Responder Index" Arthritis Rheum. 61(9):1143-1151 (Sep. 15, 2009).
Furie, RA et al., "B-cell depletion with obinutuzumab for the treatment of proliferative lupus nephritis: a randomised, doubleblind, placebo-controlled trial" Ann Rheum Dis 81(1):100-107 (Oct. 6, 2021).
Gazzano-Santoro, H., et al., "A non-radioactive complement-dependent cytotoxicity assay for anti-CD20 monoclonal antibody" J Immunol Methods 202(2):163-171 (Mar. 28, 1997).
Gerngross, T., "Advances in the Production of Human Therapeutic Proteins in Yeasts and Filamentous Fungi" Nat Biotechnol 22(11):1409-1414 (Nov. 22, 2004).
Ghetie, V. et al., "FcRn: the MHC class I-related receptor that is more than an IgG transporter" Immunol Today 18(12):592-598 (Dec. 1997).
Ghetie, V. et al., "Increasing the serum persistence of an IgG fragment by random mutagenesis" Nat Biotechnol 15(7):637-640 (Jul. 1997).
Gladman, D., et al., "Systemic Lupus Erythematosus Disease Activity Index 2000" J Rheumatol 29(2):288-191 (Feb. 1, 2002).
Goel, M., et al., "Plasticity within the Antigen-Combining Site May Manifest as Molecular Mimicry in the Humoral Immune Response" J Immunol 173(12):7358-7367 (Dec. 15, 2004).
Golay, J. et al., "Glycoengineered CD20 antibody obinutuzumab activates neutrophils and mediates phagocytosis through CD16B more efficiently than rituximab" Blood 122(20):3482-3491 (Oct. 8, 2013).
Goldsmith, S., et al., "Resolution of secondary hemophagocytic lymphohistiocytosis after treatment with the JAK1/2 inhibitor ruxolitinib" Blood Adv 3(23):4131-4135 (Dec. 10, 2019).
Gomez-Mendez, L., et al., "Peripheral Blood B Cell Depletion after Rituximab and Complete Response in Lupus Nephritis" Cli J Am Soc Nephrol 13(10):1502-1509 (Oct. 8, 2018).
Gonzales, N. et al., "Minimizing the Immunogenicity of Antibodies for Clinical Application" Tumour Biol. 26(1):31-43 (2005).
Graham, F., et al., "Characteristics of a Human Cell Line Transformed by DNA from Human Adenovirus Type 5" J Gen Virol 36(1):59-74 (Feb. 1, 1977).
Gratzner, H. et al., "Monoclonal Antibody to 5-Bromo-and 5-Idodeoxyuridine: A New Reagent for Detection of DNA Replication" Science 218(471):474-475 (Oct. 29, 1982).
Greenman J. et al., "Characterization of a new monoclonal anti-FcγRII antibody, AT10, and its incorporation into a bispecific f(ab')₂ derivative for recruitment of cytotoxic effectors" Mol Immunol 28:1243-1254 (1991).
Griffiths, A., et al., "Human anti-self antibodies with high specificity from phage display libraries" EMBO J 12(2):725-734 (Feb. 1, 1993).
Grote, M. et al., "Bispecific Antibody Derivatives Based on Full-Length IgG Formats" Methods Mol. Biol. 901:247-263 (2012).
Gruber, M. et al., "Efficient tumor cell lysis mediated by a bispecific single chain antibody expressed in *Escherichia coli*" J Immunol 152(11):5368-5374 (Jun. 1, 1994).
Grupp, S., et al., "Chimeric Antigen Receptor-Modified T Cells for Acute Lymphoid Leukemia" New Engl J Med 368(16):1509-1518 (Apr. 18, 2013).
Grzywacz, B. et al., "CD56dimCD16+ NK Cells Downregulate CD16 Following Target Cell Induced Activation of Matrix Metalloproteinases" Leukemia 21(2):356-359 (2007).

Guyer, R., et al., "Immunoglobulin binding by mouse intestinal epithelial cell receptors" J Immunol 117(2):587-593 (Aug. 1, 1976).
Haas, A. et al., "Chapter 17: Generation of Fluorescent IgG Fusion Proteins in Mammalian Cells" Methods Mol. Biol. 901:265-276 (2012).
Hahn, B. et al., "American College of Rheumatology Guidelines for Screening, Treatment, and Management of Lupus Nephritis" Arthritis Care Res. 64(6):797-808 (2012).
Hamers-Casterman, C. et al., "Naturally occurring antibodies devoid of light chains" Nature 363:446-448 (Jun. 3, 1993).
Hammerling, G. et al. Monoclonal Antibodies and T-Cell Hybridomas "12" New York:Elsevier,:563-587 (1981).
Hanes, J. et al., "Ribosome display efficiently selects and evolves high-affinity antibodies in vitro from immune libraries" Proc. Natl. Acad. Sci. USA 95:14130-14135 (1998).
Hansen, R. et al., "Intravenous Immunoglobulin Mediates an Increase in Anti-Platelet Antibody Clearance via the FcRn Receptor" Thromb. Haemost. 88:898-899 (2002).
Harris, W. et al., "Production of humanized monoclonal antibodies for in vivo imaging and therapy" Biochem Soc T 23(4):1035-1038 (Nov. 1995).
Hashemi-Sadraei, N et al., "Epstein-Barr Virus-Related Hemophagocytic Lymphohistiocytosis: Hematologic Emergency in the Critical Care Setting" Case Rep Hematol 491567:1-6 (2015).
Hawkins, R. et al., "Selection of phage antibodies by binding affinity mimicking affinity maturation" J Mol Biol 226:889-896 (1992).
Hejblum, G et al., "A Web-Based Delphi Study for Eliciting Helpful Criteria in the Positive Diagnosis of Hemophagocytic Syndrome in Adult Patients" PLOS One 9(e94024):1-6 (2014).
Hellstrom, I. et al., "Antitumor effects of L6, an IgG2a antibody that reacts with most human carcinomas" PNAS 83(18):7059-7063 (1986).
Hellström, I. et al., "Strong antitumor activities of IgG3 antibodies to a human melanoma-associated ganglioside" PNAS 82(5):1499-1502 (1985).
Henter, J., et al., "HLH-2004: diagnostic and therapeutic guidelines for hemophagocytic lymphohistiocytosis" Pediatr Blood Cancer 48(2):124-131 (Feb. 1, 2007).
Herter, S et al., "Preclinical Activity of the Type II CD20 Antibody GA101 (Obinutuzumab) Compared with Rituximab and Ofatumumab In Vitro and in Xenograft Models" Mol Cancer Ther 12(10):2031-2042 (2013).
Herters, S. et al., "Abstract 2460: Dissecting the in vitro and in vivo Mechanism of Action of Obinutuzumab (GA101) in Preclinical Models Using an Immune Effector-Dead Version of Obinutuzumab" Cancer Res. (Abstract Only), 75(15 Suppl 2460):4.
Hessell, A. et al., "Fc receptor but not complement binding is important in antibody protection against HIV" Nature 446:101-105 (2007).
Hijazi, Y et al., "Blinatumomab exposure and pharmacodynamic response in patients with non-Hodgkin lymphoma (NHL) [abstract]" J Cli Oncol 31:abstract 3051 (2013).
Hinman, L., et al., "Preparation and characterization of monoclonal antibody conjugates of the calicheamicins: A novel and potent family of antitumor antibiotics" Cancer Res 53(14):3336-3342 (Jul. 15, 1993).
Hinton, P. et al., "Engineered human IgG antibodies with longer serum half-lives in primates" J Biol Chem 279(8):6213-6216 (Feb. 20, 2004).
Hoffmann, E. et al., "PK modulation of haptenylated peptides via non-covalent antibody complexation" Journal of Controlled Release 171:48-56 (2013).
Hoffmann-La Roche: "A Study to Evaluate the Safety, Tolerability, Pharmacokinetics, and Pharmacodynamics of Subcutaneously Administered Mosunetuzumab to Participants With Systemic Lupus Erythematosus"; ClinicalTrials.gov: NCT05155345, First Posted: Dec. 13, 2021, Last Update Posted: Feb. 15, 2023 https://clinicaltrials.gov/ct2/show/study/NCT05155345 [retrieved on Feb. 16, 2023], pp. 1-8.
Holliger, P., et al., "Engineered antibody fragments and the rise of single domains" Nat Biotechnol 23(9):1126-1136 (Sep. 1, 2005).

(56) References Cited

OTHER PUBLICATIONS

Hollinger, P., et al., "Diabodies: Small Bivalent and Bispecific Antibody Fragments" PNAS 90(14):6444-6448 (Jul. 15, 1993).

Hongo et al., "Development and Characterization of Murine Monoclonal Antibodies to the Latency-Associated Peptide of Transforming Growth Factor β1" Hybridoma 14(3):253-260 (1995).

Hoogenboom and Winter, "By-passing immunisation. Human antibodies from synthetic repertoires of germline VH gene segments rearranged in vitro" J Mol Biol 227(2):381-388 (Sep. 20, 1992).

Hoogenboom, H., et al., "Overview of antibody phage-display technology and its applications" Methods Mol Biol 178:1-37 (Jan. 1, 2002).

Hudson, P., et al., "Engineered antibodies" Nat Med 9(1):129-134 (Jan. 1, 2003).

Hurle, M. et al., "Protein engineering techniques for antibody humanization" Curr Opin Biotechnol 5:428-433 (1994).

Hwang et al., "Use of Human Germline Genes in a CDR Homology-based Approach to Antibody Humanization" Methods 36(1):35-42 (2005).

Idusogie, E.E., et al., "Mapping of the C1q Binding Site on Rituxan, a Chimeric Antibody with a Human IgG1 Fc" J Immunol 164(8):4178-4184 (Apr. 15, 2000).

International Nonproprietary Names for Pharmaceutical Substances (INN), WHO Drug Information, vol. 26, No. 4, 2012, p. 453, 71 pages.

International Nonproprietary Names for Pharmaceutical Substances (INN), WHO Drug Information, vol. 23, No. 2, 2009, p. 176, 64 pages.

International Nonproprietary Names for Pharmaceutical Substances (INN), WHO Drug Information, vol. 22, No. 2, 2008, p. 124, 99 pages.

International Preliminary Report on Patentability, issued Dec. 27, 2016, for PCT Application No. PCT/EP2015/064322, filed Jun. 25, 2015, 7 pages.

International Preliminary Report on Patentability, issued on Jan. 2, 2018. For PCT Application No. PCT/US2016/039905, filed on Jun. 28, 2016, 7 pages.

International Preliminary Report on Patentability, mailed on Nov. 14, 2017. For PCT Application No. PCT/US2016/031683, filed on May 10, 2016, 10 pages.

International Search Report and Written Opinion, mailed Jan. 27, 2021, for PCT Application No. PCT/US2020/050072, filed Sep. 10, 2020, 27 pages.

International Search Report issued in International Application No. PCT/EP2015/064322, mailed Oct. 13, 2015, in 5 pages.

International Search Report mailed on Sep. 21, 2016, for PCT Application No. PCT/US2016/031683, filed on May 10, 2016, 8 pages.

International Search Report mailed on Sep. 27, 2016, for PCT Application No. PCT/US2016/039905, filed on Jun. 28, 2016, 7 pages.

International Search Report with Written Opinion for PCT Application No. PCT/US2022/079787 mailed Feb. 20, 2023, pp. 1-22.

International Search Report, mailed Aug. 9, 2022, for PCT Application No. PCT/US2022/071133, filed Mar. 14, 2022, 24 pages.

Isenberg, DA et al., "Correlation of 9G4 idiotope with disease activity in patients with systemic lupus erythematosus" Ann Rheum Dis 57:566-570 (1998).

Jackson, J. et al., "In vitro antibody maturation. Improvement of a high affinity, neutralizing antibody against IL-1 beta" J Immunol 154(7):3310-3319 (Apr. 1, 1995).

Jakobovits, A. et al., "Analysis of homozygous mutant chimeric mice: Deletion of the immunoglobulin heavy-chain joining region blocks B-cell development and antibody production" P Natl Acad Sci USA 90:2551-2555 (Mar. 1993).

Jakobovits, A., et al., "Germ-line Transmission and Expression of a Human-Derived Yeast Artificial Chromosome" Nature 362(6417):255-258 (Mar. 18, 1993).

James, P. et al., "2014 Evidence-Based Guideline for the Management of High Blood Pressure in Adults Report from the Panel Members Appointed to the Eighth Joint National Committee (JNC 8)" JAMA 311:507-520 (2014).

Janeway, C.A. et al., "Structural Variation in Immunoglobulin Constant Regions: Immunobiology: The Immune System in Health and Disease" Current Biology Ltd./Garland Publishing Inc. :1-4 (1994).

Jefferis, R. et al., "IgG-Fc-mediated Effector Functions: Molecular Definition of Interaction Sites for Effector Ligands and the Role of Glycosylation" Immunol Rev 163(1):59-76 (Jun. 1, 1998).

Jeffrey, S., et al., "Dipeptide-based highly potent doxorubicin antibody conjugates" Bioorg Med Chem Lett 16(2):358-362 (Jan. 15, 2006).

Jenkins, N. et al., "Getting the glycosylation right: Implications for the biotechnology industry" Nature Biotechnol 14:975-981 (Aug. 1996).

Jérôme, V. et al., "Exhaustive in vivo labelling of plasmid DNA with BrdU for intracellular detection in non-viral transfection of mammalian cells" Biotechnology Journal 4(10):1479-1487 (2009).

Jhaveri, A. et al., "Multifunctional Polymeric Micelles for Delivery of Drugs and siRNA" Front Pharmacol. 5(77):1-26 (2014).

Jog, N., et al., "Epstein Barr Virus and Autoimmune Responses in Systemic Lupus Erythematosus" Front Immunol. 11:Article 623944 (1-11) (Feb. 3, 2021).

Johnson et al., "The Kabat Database and a Bioinformatics Example" Methods Mol. Biol. 248:11-25 (2004).

Jones, P.T., et al., "Replacing the Complementarity-Determining Regions in a Human Antibody with Those From a Mouse" Nature 321(6069):522-525 (May 29, 1986).

Jordan, M., et al., "How I treat hemophagocytic lymphohistiocytosis" Blood 118(15):4041-4052 (Oct. 13, 2011).

Jung, S. et al., "Design of Interchain Disulfide Bonds in the Framework Region of the Fv Fragment of the Monoclonal Antibody B3" Proteins 19(1):35-47 (1994).

Kabat, EA et al. Sequences of Proteins of Immunological Interest (Table of Contents, Introduction and Constant Region Sequences sections), 5th edition, Bethesda, MD:NIH, vol. 1:647-723 (1991).

Kam, N., et al., "Carbon nanotubes as multifunctional biological transporters and near-infrared agents for selective cancer cell destruction" PNAS 102(33):11600-11605 (Aug. 16, 2005).

Kanda, Y. et al., "Comparison of Cell Lines for Stable Production of Fucose-Negative Antibodies with Enhanced ADCC" Biotechnol Bioeng 94(4):680-688 (Jul. 1, 2006).

Kashmiri, S., et al., "SDR grafting—a new approach to antibody humanization" Methods 36:25-34 (Jan. 1, 2005).

Kasper, IR et al., "Empowering Regulatory T Cells in Autoimmunity" Trends Mol Med 22:784-797 (Sep. 2016).

Katsuyama, T et al., "Aberrant T Cell Signaling and Subsets in Systemic Lupus Erythematosus" Front Immunol 9(Article 1088):1-15 (May 18, 2018).

Khan et al., "Adjustable Locks and Flexible Keys: Plasticity of Epitope-Paratope Interactions in Germline Antibodies" J Immunol 192:5398-5405 (2014).

Kies, M. et al., "Cetuximab (Imclone/Merck/Bristol-Myers Squibb)" Curr. Opin. Investig. Drugs 3(7):1092-1100 (2002).

Kim, J., et al., "Localization of the site of the murine IgG1 molecule that is involved in binding to the murine intestinal Fc receptor" Eur J Immunol 24(10):2429-2434 (Oct. 1, 1994).

Kim, J., et al., "Reactive Hemophagocytic Syndrome in Adult Korean Patients with Systemic Lupus Erythematosus: A Case-Control Study and Literature Review" J Rheumatol 39(1):86-93 (2012).

Kindt et al. Antigens and Antibodies "4" (14 pages), Kuby Immunology 6th edition, N.Y.:W.H. Freeman and Co, :p. 91 (2007).

King, H.D., et al., "Monoclonal antibody conjugates of doxorubicin prepared with branched peptide linkers: Inhibition of aggregation by methoxytriethyleneglycol chains" J Med Chem 45(19):4336-4343 (Sep. 12, 2002).

Klimka, A. et al., "Human anti-CD30 recombinant antibodies by guided phage antibody selection using cell panning" Brit J Cancer 83(2):252-260 (Jun. 15, 2000).

(56) References Cited

OTHER PUBLICATIONS

Klinger, M et al., "Immunopharmacologic response of patients with B-lineage acute lymphoblastic leukemia to continuous infusion of T cell-engaging CD19/CD3-bispecific BiTE antibody blinatumomab" Blood 119(26):6226-6233 (Jun. 28, 2012).
Kochenderfer, JN et al., "B-cell depletion and remissions of malignancy along with cytokine-associated toxicity in a clinical trial of anti-CD19 chimeric-antigen-receptor-transduced T cells" Blood 119(12):2709-2720 (Mar. 22, 2012).
Kochenderfer, JN et al., "Chemotherapy-Refractory Diffuse Large B-Cell Lymphoma and Indolent B-Cell Malignancies Can Be Effectively Treated With Autologous T Cells Expressing an Anti-CD19 Chimeric Antigen Receptor" J Clin Oncol 33(6):540-549 (Feb. 20, 2015).
Kohen, F. et al., "Preparation and Properties of Anti-Biotin Antibodies" Methods in Enzymology 279:451-463 (1997).
Kohler, G., et al., "Continuous cultures of fused cells secreting antibody of predefined specificity" Nature 256(5517):495-497 (Aug. 1, 1975).
Koren, E et al., "Recommendations on risk-based strategies for detection and characterization of antibodies against biotechnology products" J Immunol Methods 333:1-9 (2008).
Kostelny, S., et al., "Formation of a bispecific antibody by the use of leucine zippers" J Immunol 148(5):1547-1553 (Mar. 1, 1992).
Kozbor, D., et al., "A Human Hybrid Myeloma for Production of Human Monoclonal Antibodies" J Immunol 133(6):3001-3005 (Dec. 1, 1984).
Kratz, F., et al., "Prodrugs of anthracyclines in cancer chemotherapy" Curr Med Chem 13(5):477-523 (Mar. 1, 2006).
Kunik, V. et al., "Structural Consensus among Antibodies Defines the Antigen Binding Site" PLOS Computational Biology 8(2):1-12 (2012).
La Rosee, P et al., "Recommendations for the management of hemophagocytic lymphohistiocytosis in adults" Blood 133(23):2465-2477 (Jun. 6, 2019).
La Rosee, P et al., "Treatment of hemophagocytic lymphohistiocytosis in adults" Am Soc Hematol Educ Program 2015:190-196 (Dec. 5, 2015).
Leandro, M. et al., "An open study of B lymphocyte depletion in systemic lupus erythematosus" Arthritis Rheum 46(10):2673-2677 (Oct. 1, 2002).
Lee, C. et al., "Bivalent antibody phage display mimics natural immunoglobulin" J Immunol Methods 284:119-132 (2004).
Lee, C. et al., "High-affinity human antibodies from phage-displayed synthetic Fab libraries with a single framework scaffold" J Mol Biol 340(5):1073-1093 (2004).
Lee, DW et al., "ASTCT Consensus Grading for Cytokine Release Syndrome and Neurologic Toxicity Associated with Immune Effector Cells" Biol Blood Marrow Transplant 25:625-638 (2019).
Lee, DW et al., "Current concepts in the diagnosis and management of cytokine release syndrome" Blood 124(2):188-195 (Jul. 10, 2014).
Lee, S. et al., "Cell-Specific siRNA Delivery by Peptides and Antibodies" Meth. Enzymol. 502:91-122 (2012).
Léger, O. et al., "Antibody Drug Discovery Chapter 1: Humanization of Antibodies" Molecular Medicine and Medicinal Chemistry:1-23 (Jan. 1, 2011).
Leucuta, S. et al., "Systemic and Biophase Bioavailability and Pharmacokinetics of Nanoparticulate Drug Delivery Systems" Curr. Drug.Deliv. 10(2):208-240 (Apr. 2013).
Leus, N. et al., "Effective siRNA Delivery to Inflamed Primary Vascular Endothelial Cells by Anti-E-Selectin and Anti-VCAM-1 PEGylated SAINT-Based Lipoplexes" Int. J. Pharm. 459:40-50 (2014).
Levey, AS et al., "A New Equation to Estimate Glomerular Filtration Rate" Ann Intern Med 150(9):604-612 (May 5, 2009).
Li, H., et al., "Optimization of humanized IgGs in glycoengineered *Pichia pastoris*" Nat Biotechnol 24(2):210-215 (Feb. 1, 2006).
Li, J., et al., "Human antibodies for immunotherapy development generated via a human B cell hybridoma technology" PNAS USA 103(10):3557-3562 (Mar. 7, 2006).
Li, Y. et al., "Drugs for Treatment of Lupus Nephritis as New Target" Nephrology Quick Check People's Military Medical Publishing House (English Translation).),:57-58 (Jan. 2010).
Liboska, R. et al., "Most Anti-BrdU Antibodies React with 2'-Deoxy-5-Ethynyluridine—The Method for the Effective Suppression of This Cross-Reactivity" PLOS One 7(12):e51679 (2012).
Lifely, M. et al., "Glycosylation and Biological Activity of CAMPATH-1H Expressed in Different Cell Lines and Grown Under Different Culture Conditions." Glycobiology 5(8):813-822 (Dec. 1995).
Liu, L et al., "MGD011, Humanized CD19×CD3 Dart® Protein with Enhanced Pharmacokinetic Properties, Demonstrates Potent T-Cell Mediated Anti-Tumor Activity in Preclinical Models and Durable B-Cell Depletion in Cynomolgus Monkeys Following Once-a-Week Dosing" Presented at the 2014 annual meeting of the American Society of Hematology, San Francisco 124 (Dec. 6-9, 2014).
Lode, H., et al., "Targeted Therapy with a Novel Enediyene Antibiotic Calicheamicin θ11 Effectively Suppresses Growth and Dissemination of Liver Metastases in a Syngeneic Model of Murine Neuroblastoma" Cancer Res 58:2925-2928 (Jul. 15, 1998).
Lonberg, N. et al., "Human antibodies from transgenic mice" Int Rev Immunol 13(1):65-93 (1995).
Lonberg, N. et al., "Antigen-specific human antibodies from mice comprising four distinct genetic modifications" Nature 368(6474):856-859 (Apr. 28, 1994).
Lonberg, N., et al., "Fully human antibodies from transgenic mouse and phage display platforms" Curr Opin Immunol 20(4):450-459 (Aug. 1, 2008).
Lonberg, N.,, "Human antibodies from transgenic animals" Nat Biotechnol 23(9):1117-1125 (Sep. 7, 2005).
Lopez, R., et al., "Lupus disease activity and the risk of subsequent organ damage and mortality in a large lupus cohort" Rheumatology 51:491-498 (Nov. 21, 2012).
Maccallum, R., et al., "Antibody-antigen Interactions: Contact Analysis and Binding Site Topography" J Mol Biol 262:732-745 (Oct. 11, 1996).
Magaud, J., et al., "Double Immunocytochemical Labeling of Cell and Tissue Samples With Monoclonal Antibromodeoyurdine" J. Histochem. Cytochem. 37(10):1517-1527 (Oct. 1989).
Malhotra, M., et al., "Development and Characterization of Chitosan-PEG-TAT Nanoparticles for the Intracellular Delivery of siRNA" Int. J. Nanomedicine 8:2041-2052 (2013).
Manich, G., et al., "Study of the transcytosis of an anti-transferrin receptor antibody with a Fab' cargo across the blood-brain barrier in mice" European Journal of Pharmaceutical Sciences 49:556-564 (2013).
Mansfield, E., et al., "Recombinant RFB4 immunotoxins exhibit potent cytotoxic activity for CD22-bearing cells and tumors" Blood 90(5):2020-2026 (Sep. 1, 1997).
Markowitz, G., et al., "The ISN/RPS 2003 Classification of Lupus Nephritis: An Assessment at 3 Years" Kidney Int. 71:491-495 (Jan. 31, 2007).
Marks, J. et al., "By-passing immunization: Building high affinity human antibodies by chain shuffling" Bio/Technology 10:779-783 (Jul. 1992).
Marks, J. et al., "By-Passing Immunization: Human Antibodies From V-gene Libraries Displayed on Phage" J Mol Biol 222(3):581-597 (Dec. 5, 1991).
Marks, J. et al., "Selection of human antibodies from phage display libraries" Methods Mol Biol. 248:161-76 (2004).
Matasar, M., et al., "Subcutaneous mosunetuzumab in relapsed or refractory B-cell lymphoma: promising safety and encouraging efficacy in dose escalation cohorts [abstract] Presented at the 2020 American Society of Hematology Annual Meeting Dec. 6, 2020:session 626".
Mather, J., et al., "Establishment and Characterization of Two Distinct Mouse Testicular Epithelial Cell Lines" Biol Reprod 23:243-252 (1980).

(56) References Cited

OTHER PUBLICATIONS

Mather, J., et al., "Culture of Testicular Cells in Hormone-Supplemented Serum-Free Medium" Ann NY Acad Sci 383:44-68 (Jan. 1, 1982).
Maude, S., et al., "Chimeric Antigen Receptor T Cells for Sustained Remissions in Leukemia" New Engl J Med 371(16):1507-1517 (Oct. 16, 2014).
McCafferty, J., et al., "Phage Antibodies: Filamentous Phage Displaying Antibody Variable Domains" Nature 348(6301):552-554 (Dec. 6, 1990).
McNeilage L.et al., "Autoantibodies Reactive with Small Ribonucleoprotein Antigens: A convergence of Molecular Biology and Clinical " J. Clin. Lab. Immunol. 15:1-17 (1984).
Md Yusof, MY., et al., "Predicting and managing primary and secondary non-response to rituximab using B-cell biomarkers in systemic lupus erythematosus" Ann Rheum Dis 76:1829-(2017).
Mendez, L., et al., "Peripheral Blood B Cell Depletion After Rituximab and Complete Response in Lupus Nephritis" Clin. J. Am. Soc. Nephrol. 13:1502-1509 (Oct. 13, 2019).
Merad, M., et al., "Pathological inflammation in patients with COVID-19: a key role for monocytes and macrophages" Nat Rev Immunol 20:355-362 (2020).
Merchant, A., et al., "An efficient route to human bispecific IgG" Nat Biotechnol 16(7):677-681 (Jul. 1, 1998).
Metz et al., "Bispecific digoxigenin-binding antibodies for targeted payload delivery" PNAS 108(20):8194-8199 (2011).
Miele, E., et al., "Nanoparticle-Based Delivery of Small Interfering RNA: Challenges for Cancer Therapy" Int. J. Nanomedicine 7:3637-3657 (2012).
Milstein, C., et al., "Hybrid hybridomas and their use in immunohistochemistry" Nature 305(5934):537-540 (Oct. 6, 1983).
Mitrovic, Z., et al., "FCγRIIIA and FCγRIIA Polymorphisms are not Associated with Response to Rituximab and CHOP in Patients with Diffuse Large B-Cell Lymphoma" The Hematology Journal 92(7):998-999 (Jul. 1, 2007).
Molina, M.A., et al., "Trastuzumab (Herceptin), a Humanized Anti-HER2 Receptor Monoclonal Antibody, Inhibits Basal and Activated HER2 Ectodomain Cleavage in Breast Cancer Cells" Cancer Res 61(12):4744-4749 (Jun. 15, 2001).
Morris, G., et al. Methods in Molec Biol "Epitope Mapping Protocols" Totowa, NJ: Humana Press, vol. 66 (1996).
Morrison, S., et al., "Success in specification" Nature 368(6474):812-813 (Apr. 28, 1994).
Morrison, S., et al., "Chimeric human antibody molecules: Mouse antigen-binding domains with human constant region domains" PNAS USA 81(21):6851-6855 (Nov. 1, 1984).
Mossner, E., et al., "Increasing the efficacy of CD20 antibody therapy through the engineering of a new type II anti-CD20 antibody with enhanced direct and immune effector cell-mediated B-cell cytotoxicity" Blood 115(22):4393-4402 (Jun. 3, 2010).
Muller, SN., et al., "Tissue-resident T cells: dynamic players in skin immunity" Immunol Article 332:1-6 (Jul. 16, 2014).
Mysler, E., et al., "Efficacy and Safety of Ocrelizumab in Active Proliferative Lupus Nephritis: Results from a Randomized, Double-Blind, Phase III Study" Arthritis Rheum. 65(9):2368-2379 (Aug. 2013).
Nagelkerke, S., et al., "Immunomodulation by IVIg and the Role of Fc-Gamma Receptors: Classic Mechanisms of Action After All?" Front. Immunol. 5(674):1-19 (Jan. 21, 2015).
Nagy, A., et al., "Stability of cytotoxic luteinizing hormone-releasing hormone conjugate (AN-152) containing doxorubicin 14-O-hemiglutarate in mouse and human serum in vitro: implications for the design of preclinical studies" PNAS USA 97(2):829-834 (Jan. 18, 2000).
Narayanan, K., et al., "Correlation between Systemic Lupus Erythematosus Disease Activity Index, C3, C4 and Anti-dsDNA Antibodies" Med J Armed Forces India 66(2):102-107 (2010).
Neelapu, SS et al., "Chimeric antigen receptor T-cell therapy—assessment and management of toxicities" Nat Rev Clin Oncol. 15(1):47-62 (2018).
Neshat, M. et al., "Mapping the B Cell Superantigen Binding Site for HIV-1 gp120 on VH3 Ig" Int. Immunol. 12(3):305-312 (Mar. 2000).
Neuberger, M. et al., "Generating high-avidity human Mabs in mice" Nat Biotechnol 14(7):826 (Jul. 1996).
Neuberger, M. et al., "Expression and regulation of immunoglobulin heavy chain gene transfected into lymphoid cells" EMBO J 2(8):1373-1378 (1983).
Ni, J. et al., "Research progress and future perspectives in antibodomics and antibodomic drugs" Xiandai Mianyixue 26(4):265-268 (2006).
NIH National Institutes of Health Recombinant DNA Advisory Committee (RAC). Cytokine release syndrome after T cell immunotherapy. Bethesda, MD NIH videocast Jun. 9, 2015. Available at: videocast.nih.gov/summary.asp?Live=16420&bhcp=1 Accessed: Jan. 30, 2017 https://videocast.nih.gov/watch=16420.
Niwa, R. et al., "The Current Status and Prospects of Antibody Engineering for Therapeutic Use: Focus on Glycoengineering Technology" J. Pharm. Sci. 104(3):930-941 (Jan. 12, 2015).
Nossent, J et al., "Disease activity and damage accrual during the early disease course in a multinational inception cohort of patients with systemic lupus erythematosus" Lupus 19:949-956 (2010).
Offner, H. et al., "T cell receptor peptide therapy triggers autoregulation of experimental encephalomyelitis" Science 251(4992):430-432 (Jan. 25, 1991).
Okazaki, A. et al., "Fucose depletion from human IgG1 oligosaccharide enhances binding enthalpy and association rate between IgG1 and FycγRIIIa" J Molec Biol 336:1239-1249 (2004).
Osbourn, J. et al., "From rodent reagents to human therapeutics using antibody guided selection" Methods 36(1):61-68 (May 1, 2005).
Owen, C. et al., "Obinutuzumab for the Treatment of Patients with Previously Untreated Chronic Lymphocytic Leukemia: Overview and Perspective" Therap. Adv. Hematol. 6(4):161-170 (2015).
Pace, C., et al., "How to measure and predict the molar absorption coefficient of a protein" Protein Sci 4(11):2411-2423 (Nov. 1, 1995).
Padlan, E. et al., "A possible procedure for reducing the immunogenicity of antibody variable domains while preserving their ligand-binding properties" Mol Immunol 28(4-5):489-498 (Apr. 30, 1991).
Pai, L. et al., "Anti-tumor activities of immunotoxins made of monoclonal antibody B3 and various forms of Pseudomonas exotoxin" PNAS, USA 88:3358-3362 (1991).
Pakula, A.A. et al., "Genetic analysis of protein stability and function" Annu Rev Genet 23:289-310 (Dec. 1, 1989).
Panelli, M. C. et al., "Forecasting the cytokine storm following systemic interleukin (IL)-2 administration" J Transl Med 2(17):1-14 (Jun. 2, 2004).
Pardridge, W.M. et al., "Re-Engineering Biopharmaceuticals for Delivery to Brain with Molecular Trojan Horses" Bioconjugate Chem 19(7):1327-1338 (Jun. 12, 2008).
Pastan, I. et al., "Characterization of Monoclonal Antibodies B1 and B3 That React With Mucinous Adenocarcinomas" Cancer Res. 51(14):3781-3787 (Jul. 15, 1991).
Petkova, S., et al., "Enhanced half-life of genetically engineered human IgGI antibodies in a humanized FcRn mouse model: potential application in humorally mediated autoimmune disease" Int Immunol 18(12):1759-1769 (Dec. 1, 2006).
Petri, M. et al., "Definition, incidence, and clinical description of flare in systemic lupus erythematosus. A prospective cohort study" Arthritis Rheum. 34:937-944 (1991).
Petri, M. et al., "Derivation and Validation of Systemic Lupus International Collaborating Clinics Classification Criteria for Systemic Lupus Erythematosus" Arthritis Rheum. 64(8):2677-2686 (Aug. 2012).
Picard, D. et al., "A lymphocyte-specific enhancer in the mouse immunoglobulin K gene" Nature 307:80-82 (Jan. 5, 1984).
Pitiot, A. et al., "Alternative Routes of Administration for Therapeutic Antibodies-State of the Art" Antibodies 11(56):1-25 (Aug. 26, 2022).
Pluckthun, A. et al., The Pharmacology of Monoclonal Antibodies "Chapter 11: Antibodies from *Escherichia coli*" (Plückthun, Chapter 11: Antibodies from *Escherichia coli*. The Pharmacology of

(56) References Cited

OTHER PUBLICATIONS

Monoclonal Antibodies. Martin Rosenberg and Gordon P. Moore, 269-315 (1994) (26 pages), Martin Rosenberg and Gordon P. Moore:269-315 (1994).
Polyak, M. et al., "Alanine-170 and Proline-172 Are Critical Determinants for Extracellular CD20 epitopes; Heterogeneity in te Fine Specificity of CD20 Monoclonal Antibodies Is Defined by Additional Requirements Imposed by Both Amino Acid Sequence and Quaternary Structure" Blood 99(9):3256-3262 (May 1, 2002).
Poosarla et al., "Computational De Novo Design of Antibodies Binding to a Peptide With High Affinity" Biotechnol. Bioeng. 114(6):1331-1342 (Feb. 2, 2017).
Poppema, S., et al., "Preparation and Application of Monoclonal Antibodies: B Cell Panel and Paraffin Tissue Reactive Panel." Biotest Bulletin 3:131-139 (1987).
Portolano, S., et al., "Lack of promiscuity in autoantigen-specific H and L chain combinations as revealed by human H and L chain 'roulette'" J Immunol 150(3):880-887 (Feb. 1, 1993).
Potter, K. et al., "Evidence For Involvement of a Hydrophobic Patch in Framework Region 1 of Human V4-34-Encoded Igs in Recognition of the Red Blood Cell I Antigen" J Immunol 169(7):3777-3782 (Oct. 1, 2002).
Presta, L. et al., "Humanization of an Anti-Vascular Endothelial Growth Factor Monoclonal Antibody for the Therapy of Solid Tumors and Other Disorders" Cancer Res 57(20):4593-4599 (Oct. 15, 1997).
Presta, L. et al., "Humanization of an Antibody Directed Against IgE" J Immunol 151(5):2623-2632 (Sep. 1, 1993).
Presta, L.G., "Antibody engineering" Curr Opin Struct Biol 2(4):593-596 (Aug. 1, 1992).
Queen, C., et al., "A humanized antibody that binds to the interleukin 2 receptor" PNAS USA 86(24):10029-10033 (Dec. 1, 1989).
Rabia, L. et al., "Understanding and Overcoming Trade-Offs Between Antibody Affinity, Specificity, Stability and Solubility" Biochem. Eng. J. 137:365-374 (Sep. 15, 2018).
Ramos-Casal et al., "B-Cell-Depleting Therapy in Systemic Lupus Erythematosus" Am. J. Med 125(4):327-336 (Apr. 2012).
Ramos-Casals, M et al., "Adult haemophagocytic syndrome" Lancet 383:1503-1516 (Apr. 26, 2014).
Ravetch, J., et al., "Fc receptors" Annu Rev Immunol 9:457-492 (Apr. 1, 1991).
Reddy, V et al., "Internalization of Rituximab and the Efficiency of B Cell Depletion in Rheumatoid Arthritis and Systemic Lupus Erythematosus" Arthritis & Rheumatology 67(8):2046-2055 (2015).
Reddy, V et al., "Obinutuzumab induces superior B-cell cytotoxicity to rituximab in rheumatoid arthritis and systemic lupus erythematosus patient samples" Rheumatology 56:1227-1237 (2017).
Reddy, V. et al., "Improving B-Cell Depletion in Rheumatoid Arthritis and Systemic Lupus Erythematosus: Resistance to Rituximab and the Potential of Obinutuzumab" Ann Rheum Dis 75(2 Suppl 116):1-2 (Jun. 9, 2016).
Reddy, V. et al., "Optimising B-Cell Depletion in Autoimmune Disease: Is Obinutuzumab the Answer?" Drug Discov. Today 21(8):1330-1338 (Jun. 22, 2016).
Reff, M.E. et al., "Depletion of B cells in vivo by a chimeric mouse human monoclonal antibody to CD20" Blood 83(2):435-445 (Jan. 15, 1994).
Reiter, Y. et al., "Engineering antibody Fv fragments for cancer detection and therapy: disulfide-stabilized Fv fragments" Nature Biotechnol 14:1239-1245 (Oct. 1996).
Reiter, Y. et al., "Disulfide Stabilization of Antibody Fv: Computer Predictions and Experimental Evaluation" Protein Eng. 8(12):1323-1331 (Dec. 1995).
Reusch, U. et al., "A tetravalent bispecific TandAb (CD19/CD3), AFM11, efficiently recruits T cells for the potent lysis of CD 19(+) tumor cells" MABS 7(3):584-604 (May 31, 2015).
Ridgway, J., et al., "Knobs-into-holes' engineering of antibody CH3 domains for heavy chain heterodimerization" Protein Eng 9(7):617-621 (Jul. 1, 1996).
Riechmann, L., "Reshaping human antibodies for therapy" Nature 332(6162):323-327 (Mar. 24, 1988).
Riegler, LL et al., "Current approaches in the grading and management of cytokine release syndrome after chimeric antigen receptor T-cell therapy" Ther Clin Risk Manag 15:323-335 (2019).
Ripka, J., et al., "Two Chinese Hamster Ovary Glycosylation Mutants Affected in the Conversion of GDP-Mannose to GDP-Fucose" Arch Biochem Biophys 249(2):533-545 (Sep. 1, 1986).
Robbins, M. et al., "siRNA and Innate Immunity" Oligonucleotides 19(2):89-102 (Jun. 2009).
Roche: "Roche's Gazyva (obinutuzumab) Delivers Positive Topline Results for Phase II Lupus Nephritis Study," Roche Media Release, 3 pages, Jun. 11, 2019.
Rogers, K. et al., "Obinutuzumab for the Treatment of Chronic Lymphocytic Leukemia" Drugs of Today 50(6):407-419 (2014).
Romee, R. et al., "NK Cell CD16 Surface Expression and Function is Regulated by a Disintegrin and Metalloprotease-17 (ADAM17)" Blood 121(18):3599-3608 (May 2, 2013).
Rosenberg, A et al., "A risk-based approach to immunogenicity concerns of therapeutic protein products: Part I: considering consequences of the immune response to a protein" Biopharm Int. 17:22-26 (2004).
Rosenberg, A et al., "A risk-based approach to immunogenicity concerns of therapeutic protein products: Part III: effects of manufacturing changes in immunogenicity and the utility of animal immunogenicity studies" Biopharm Int. 18:32-36 (2005).
Rosenberg, A et al., "A risk-based approach to immunogenicity concerns of therapeutic protein products: Part II: considering host-specific and product-specific factors impacting immunogenicity" Biopharm Int. 17:34-42 (2004).
Rosok, M., et al., "A combinatorial library strategy for the rapid humanization of anticarcinoma BR96 Fab" J Biol Chem 271(37):22611-22618 (Sep. 13, 1996).
Roujeau, J. et al., "Silent Lupus Nephritis Among Patients with Discoid Lupus Erythematosus" Acta Derm. Venereol. 64:160-163 (1984).
Rovin, B., "Efficacy and safety of rituximab in patients with active proliferative lupus nephritis: the Lupus Nephritis Assessment with Rituximab study" Arthritis Rheum 64(4):1215-1226 (Apr. 1, 2012).
Rozema et al., "Dynamic polyconjugates for targeted in vivo delivery of siRNA to hepatocytes" P Natl Acad Sci USA 104(32):12982-12987 (Aug. 7, 2007).
Rudikoff et al., "Single amino acid substitution altering antigen-binding specificity" Proc. Natl. Acad. Sci. USA, 79(6):1979-1983 (Mar. 1982).
Salvaris, R et al., "Bispecific Antibodies: A Review of Development, Clinical Efficacy and Toxicity in B-Cell Lymphomas" J. Pers. Med. 11(355):1-15 (2021).
Sambrook et al. "Molecular Cloning Chapter 5" Cold Spring Harbor Laboratory Press, 3rd edition, (2001).
Schier et al., "Identification of Functional and Structural Amino-Acid Residues by Parsimonious Mutagenesis." Gene 169:147-155 (1996).
Schindler, T. et al., "Nobility, a Phase 2 Trial to Assess the Safety and Efficacy of Obinutuzumab, a Novel Type 2 Anti-CD20 Monoclonal Antibody (mAB) in Patients (Pts) With ISN/RPS Class III or IV Lupus Nephritis (LN" Ann Rheum Dis AB0423 75(2):1051 (Jun. 9, 2016).
Schneider et al., "Targeted siRNA Delivery and mRNA Knockdown Mediated by Bispecific Digoxigenin-binding Antibodies" Molecular Therapy-Nucleic Acids 1(e46):1-11 (2012).
Schram, AM et al., "How I treat hemophagocytic lymphohistiocytosis in the adult patient" Blood 125(19):2908-2914 (May 7, 2015).
Semple, S. et al., "Rational Design of Cationic Lipids for siRNA Delivery" Nat. Biotechnol. 28(2):172-176 (2010).
Sharabi, A et al., "T cell metabolism: new insights in systemic lupus erythematosus pathogenesis and therapy" Nat Rev Rheumatol 16:100-112 (2020).
Sheriff et al., "Redefining the minimal antigen-binding fragment" Nature Struct Biol. 3(9):733-736 (Sep. 1996).
Shields, R., et al., "High resolution mapping of the binding site on human IgG1 for Fc gamma RI, Fc gamma RII, Fc gamma RIII, and

(56) References Cited

OTHER PUBLICATIONS

FcRn and design of IgG1 variants with improved binding to the Fc gamma R" J Biol Chem 276(9):6591-6604 (Mar. 2, 2001).
Sidhu et al., "Phage-displayed antibody libraries of synthetic heavy chain complementarity determining regions" J Mol Biol 338(2):299-310 (Apr. 23, 2004).
Sims, M., et al., "A Humanized CD18 Antibody Can Block Function Without Cell Destruction" J Immunol 151(4):2296-2308 (Aug. 15, 1993).
Singh, RR et al., "SLE mortality remains disproportionately high, despite improvements over the last decade" Lupus 27(10):1577-1581 (Sep. 2018).
Smith, P. et al., "Drug-Induced Lupus Nephritis in HIV Infection" Rheumatology 38:1017-1018 (Oct. 1, 1999).
Song et al., "Antibody mediated in vivo delivery of small interfering RNAs via cell-surface receptors" Nature Biotechnology 23(6):709-717 (Jun. 2005).
Song, L. et al., "Generation of Multivalent Antibody against Small Hapten and Studies on Its Bioactivities" China Doctoral Dissertation Full-Text Database, Medicine, Health, and Technology Section 10:1-76 (2009).
Sou, K. et al., "Poly(ethylene glycol)-Modification of the Phospholipid Vesicles by Using the Spontaneous Incorporation of Poly(ethylene glycol)-Lipid Into the Vesicles" Bioconjug. Chem. 11:372-379 (2000).
Soutschek, J. et al., "Therapeutic Silencing of an Endogenous Gene by Systemic Administration of Modified siRNAs" Nature 432:173-178 (Nov. 11, 2004).
Spiess, C et al., "Bispecific antibodies with natural architecture produced by co-culture of bacteria expressing two distinct half-antibodies" Nature Biotechnology 31(8):753-758 (Aug. 2013).
Stamenkovic, I. et al., "Analysis of Two cDNA Clones Encoding the B Lymphocyte Antigen CD20 (B1, Bp35), A Type III Integral Membrane Protein" J Exp Med 167:1975-1980 (Jun. 1988).
Stites, D. et al., "Immunoglobulin Proteins" Basic Clinical Immunology, 8th Edition, Appleton & Lange, Norwalk, CT, Chapter 6:67-79 (1994).
Summons to Attend Oral Proceedings Pursuant to Rule 115(1) EPC, mailed on Mar. 4, 2021, for European Patent Application No. 16725982.9, 8 pages.
Sun, L., et al., "Anti-CD20/CD3 T cell-dependent bispecific antibody for the treatment of B cell malignancies" Sci Trans Med 7(287):287ra70 (1-10) (May 13, 2015).
Tan et al., "The 1982 revised criteria for the classification of systemic lupus erythematosus" Arthritis Rheum 25(11):1271-1277 (Nov. 1982).
Tang, X. et al., "Clinical and Serologic Correlations and Autoantibody Clusters in Systemic Lupus Erythematosus: A Retrospective Review of 917 Patients in South China" Medicine 89(1):62-67 (Jan. 2010).
Tao, W. et al., "Noninvasive Imaging of Lipid Nanoparticle-Mediated Systemic Delivery of Small-Interfering RNA to the Liver" Mol. Ther. 18(9):1657-1666 (Sep. 2010).
Teachey, D. et al., "Cytokine release syndrome after blinatumomab treatment related to abnormal macrophage activation and ameliorated with cytokine-directed therapy" Blood 121(26):5154-5157 (2013).
Tedder, T. et al., "Isolation and structure of a cDNA encoding the B1 (CD20) cell-surface antigen of human B lymphocytes" P Natl Acad Sci USA 85(1):208-212 (Jan. 1988).
Tedder, T. et al., "Structure of the gene encoding the human B lymphocyte differentiation antigen CD20 (B1)." J Immunol 142(7):2560-2568 (Apr. 1, 1989).
Tew, G. et al., "Baseline Autoantibody Profiles Predict Normalization of Complement and Anti-dsDNA Autoantibody Levels Following Rituximab Treatment in Systemic Lupus Erythematosus" Lupus 19:146-157 (2010).
Thapa, DR et al., "Longitudinal analysis of peripheral blood T cell receptor diversity in patients with systemic lupus erythematosus by next-generation sequencing" Arthritis Res Ther 2015(17 Suppl 132):1-12 (2015).

Brazilian Office Action, mailed on Aug. 13, 2020, in the related Brazilian Patent Appl. BR11231601495-9, 5 pages.
Chinese Office Action, mailed on Oct. 23, 2020, in the related Chinese Patent Appl. No. 201710588836.1, with English Translation, 13 pages.
The Polymerase Chain Reaction, Birkhauser (TOC), (1994), 5 pages.
Tiera, M. et al., "Polymeric Systems as Nanodevices for siRNA Delivery" Curr. Gene Ther. 13(5):358-369 (Oct. 2013).
Toloue, M. et al., "Chapter 8: Antibody Targeted siRNA Delivery" Methods Mol. Biol. 764:123-139 (2011).
Torgov, M., et al., "Generation of an intensely potent anthracycline by a monoclonal antibody-(beta)-galactosidase conjugate" Bioconjugate Chem 16(3):717-721 (May 31, 2005).
Traunecker, A., et al., "Bispecific single chain molecules (Janusins) target cytotoxic lymphocytes on HIV infected cells" EMBO J 10(12):3655-3659 (Dec. 10, 1991).
Tselios, K. et al., "Do Current Arterial Hypertension Treatment Guidelines Apply to Systemic Lupus Erythematosus Patients? A Critical Appraisal" Seminar in Arthritis and Rheumatism (Abstract Only; Feb. 2014, e-pub. Aug. 15, 2013), 43(4):521-525.
Tutt, A. et al., "Trispecific F(ab')3 derivatives that use cooperative signaling via the TCR/CD3 complex and CD2 to activate and redirect resting cytotoxic T cells" J Immunol 147(1):60-69 (Jul. 1, 1991).
U.S. Appl. No. 18/045,313, Brunetta, P., filed Oct. 10, 2022. (Copy not submitted herewith pursuant to waiver of 37 C.F.R. § 1.98(a)(2)(iii) issued by the Office on Sep. 21, 2004).
Umana, P. et al., "Engineered Glycoforms of an Antineuroblastoma IgG1 with Optimized Antibody-Dependent Cellular Cytotoxic Activity" Nat Biotechnol 17(2):176-180 (Feb. 1, 1999).
Urlaub, G. et al., "Isolation of Chinese hamster cell mutants deficient in dihydrofolate reductase activity" PNAS US 77(7):4216-4220 (Jul. 1, 1980).
Valentine, M. et al., "Phosphorylation of the CD20 Phosphoprotein in Resting B Lymphocytes" J Biol Chem 264(19):11282-11287 (Jul. 5, 1989).
Vallurapalli, M. et al., "Emapalumab for the treatment of relapsed/refractory hemophagocytic lymphohistiocytosis" Blood 134(21):1783-1786 (Oct. 21, 2019).
Van Dijk, Van De Winkel et al., "Human antibodies as next generation therapeutics" Curr Opin Chem Biol 5(4):368-374 (Aug. 2001).
Van Vollenhoven, RF et al., "VH4-34 encoded antibodies in systemic lupus erythematosus: a specific diagnostic marker tat correlates with clinical disease characteristics" J Rheumatol 26:1727-1733 (1999).
Varghese, B. et al., "A novel CD20×CD3 bispecific fully human antibody induces potent anti-tumor effects against B cell lymphoma in mice" Blood 124(4501) (2014).
Vaswani, S. et al., "Humanized Antibodies as Potential Therapeutic Drugs" Ann Allergy Asthma Immunol 81(2):105-115 (Aug. 1998).
Viardot, A. et al., "Phase 2 study of the bispecific T-cell engager (BiTE) antibody blinatumomab in relapsed/refractory diffuse large B-cell lymphoma" Blood 127:1410-1416 (2016).
Viardot, A. et al., "Treatment of patients with non-Hodgkin lymphoma (NHL) with CD19/CD3 bispecific antibody blinatumomab (MT103): Double-step dose increase to continuous infusion of 60 mcg/m2/d is tolerable and highly effective" Presented at the 2010 annual meeting of the American Society of Hematology:abstract 2880.
Viardot, A. et al., "Treatment of relapsed/refractory diffuse large B-cell lymphoma with the bispecific t-cell engager (BiTE®) antibody construct blinatumomab: primary analysis results from an open-label, Phase 2 Study" Presented at the 2014 annual meeting of the American Society of Hematology:abstract 4460. (Dec. 6, 2014).
Vincent, P. et al., "A Comparison of the Binding of Biotin and Biotinylated Macromolecular Ligands to an Anti-Biotin Monoclonal Antibody and to Streptavidin" Journal of Immunological Methods 165:177-182 (1993).
Vital, E. et al., "B Cell Biomarkers of Rituximab Responses in Systemic Lupus Erythematosus" Arthritis Rheum. 63(10):3038-3047 (Oct. 2011).

(56) References Cited

OTHER PUBLICATIONS

Vitetta, E. et al., "Redesigning nature's poisons to create anti-tumor reagents" Science 238(4830):1098-1104 (Nov. 20, 1987).
Vo, A. et al., "Benefits of Rituximab Combined with Intravenous Immunoglobulin for Desensitization in Kidney Transplant Recipients" Transplantation 98(3):312-319 (Aug. 15, 2014).
Vo, A. et al., "Benefits, Efficacy, Cost-Effectiveness and Infectious Complications in Transplant Patients Desensitized with Intravenous Immunoglobulin and Anti-CD20 Therapy" Clin. Exp. Immunol. 174:48-51 (2014).
Vo, A. et al., "Rituximab and Intravenous Immune Globulin for Desensitization during Renal Transplantation" N. Engl. J. Med. 359:242-251 (Jul. 17, 2008).
Vollmers, H. et al., "The 'early birds': Natural IgM antibodies and immune surveillance" Histol Histopathol 20(3):927-937 (Jul. 1, 2005).
Vollmers, H. et al., "Death by stress: natural IgM-induced apoptosis" Methods Find Exp Clin Pharmacol 27(3):185-191 (Apr. 1, 2005).
Wang, Y. et al., "The Therapeutic Strategies for SLE by Targeting Anti-dsDNA Antibodies" Clin Rev Allerg Immunol 63:152-165 (2022).
Wark, K. et al., "Latest technologies for the enhancement of antibody affinity" Adv Drug Deliver Rev 58(5-6):657-670 (Aug. 2006).
Weening, J. et al., "The Classification of Glomerulonephritis in Systemic Lupus Erythematosus Revisited" J. Am. Soc. Nephrol. 15:241-250 (2004).
Weening, J. et al., "The classification of glomerulonephritis in systemic lupus erythematosus revisited" Kidney Int 65(2):521-30 (Feb. 2004).
Weidenbusch, M. et al., "Beyond the LUNAR Trial. Efficacy of Rituximab in Refractory Lupus Nephritis" Nephroloty Dial. Transplant. 28(1):106-111 (2012).
Weidle, U., et al., "The intriguing options of multispecific antibody formats for treatment of cancer" Cancer Genomics Proteomics 10(1):1-18 (Jan. 31, 2013).
Whittingham, "Autoantibodies in Systemic Lupus Erythematosus" Annals Academy of Medicine 17(2):195-200 (1988).
WHO Drug Information "International Non-Proprietary Names for Pharmaceutical Substances (INN)-Mosunetuzumab" (List-117), 31(2):303-305 (Jul. 7, 2017) https://cdn.who.int/media/docs/default-source/international-nonproprietary-names-(inn)/pl117.pdf?sfvrsn=5c8dac86_7.
Williams, D. et al., "Chapter 21: Humanising Antibodies by CDR Grafting" Antibodies Enginerring 1:319-339 (Jan. 1, 2010).
Winter, G. et al., "Making antibodies by phage display technology" Annu Rev Immunol 12(1):433-455 (Apr. 1, 1994).
Wittmann, S. et al., "Cytokine Upregulation of Surface Antigens Correlates to the Priming of the Neutrophil Oxidative Burst Response" Cytometry Part A. 57A(1):53-62 (2004).
Wolff et al., "Breaking the Bonds: Non-viral Vectors Become Chemically Dynamic" Gene Ther. 16:8-15 (2008).
Wong, S. et al., "Co-Injection of a Targeted, Reversibly Masked Endosomolytic Polymer Dramatically Improves the Efficacy of Cholesterol-Conjugated Small Interfering RNAs In Vivo" Nucleic Acid Ther. 22:380-390 (Dec. 2012).
Wright, A., et al., "Effect of Glycosylation on Antibody Function: Implications for Genetic Engineering" Trends Biotechnol 15(1):26-32 (Jan. 1, 1997).
Written Opinion mailed on Sep. 21, 2016, for PCT Patent Application No. PCT/US2016/031683, filed on May 10, 2016, 9 pages.
Written Opinion mailed on Sep. 27, 2016, for PCT Patent Application No. PCT/US2016/039905, filed on Jun. 28, 2016, 6 pages.
Written Opinion of International Searching Authority issued in International Patent Application No. PCT/EP2015/064322, dated Oct. 13, 2015, in 6 pages.
Extended European Search Report and Search Opinion mailed on May 17, 2022, for European Patent Application No. 21179958.9, filed on May 5, 2016, 21 pages.
Wu, BX et al., "Development of molecular and pharmacological switches for chimeric antigen receptor T cells" Exp Hematol Oncol 8(27):1-3 (2019).
Wu, H., "Simultaneous Humanization and Affinity Optimization of Monoclonal Antibodies" Methods in Molecular Biology 207:197-212 (2003).
Xu et al., "Diversity in the CDR3 region of $V_H$ is sufficient for most antibody specificities" Immunity 13:37-45 (Jul. 2000).
Yamane-Ohnuki, N. et al., "Establishment of FUT8 knockout Chinese hamster ovary cells: an ideal host cell line for producing completely defucosylated antibodies with enhanced antibody-dependent cellular cytotoxicity" Biotechnol Bioeng 87(5):614-622 (Sep. 5, 2004).
Yap, D.Y.H. et al., "Long-Term Data on Corticosteroids and Mycophenolate Mofetil Treatment in Lupus Nephritis" Rheumatology 52:480-486 (Nov. 12, 2012).
Yap, D.Y.H. et al., "B Cell Abnormalities in Systemic Lupus Erythematosus and Lupus Nephritis-Role in Pathogenesis and Effect of Immunosuppressive Treatments" Int J Mol Sci 20(6231):1-18 (2019).
Yazaki, P. et al., "Expression of recombinant antibodies in mammalian cell lines" Methods Molec Biol 248:255-268 (2004).
Yelton, D. et al., "Affinity maturation of the BR96 anti-carcinoma antibody by codon-based mutagenesis" J Immunol 155:1994-2004 (1995).
Yen and Singh et al., "Lupus—An Unrecognized Leading Cause of Death in Young Women: Population-based Study Using Nationwide Death Certificates, 2000-2015" Arthritis Rheumatol 70(8):1251-1255 (Aug. 2018).
Yu, B. et al., "Targeted Delivery Systems for Oligonucleotide Therapeutics" AAPS J 11(1):195-203 (Mar. 19, 2009).
Yung and Chan et al., "Mechanisms of Kidney Injury in Lupus Nephritis—the Role of Anti-dsDNA Antibodies" Front Immunol 6(Article 475):1-11 (Sep. 2015).
Zahnd, C. et al., "Directed in Vitro Evolution and Crystallographic Analysis of a Peptide-binding Single Chain Antibody Fragment (scFv) with Low Picomolar Affinity" The Journal of Biological Chemistry 279(18):18870-18877 (2004).
Zapata, G. et al., "Engineering linear F(ab')$_2$ fragments for efficient production in *Escherichia coli* and enhanced antiproliferative activity" Protein Eng 8(10):1057-1062 (1995).
Zhou, Q. H. et al., "Delivery of a Peptide Radiopharmaceutical to Brain with an IgG-Avidin Fusion Protein" Bioconjugate Chemistry 22(8):1611-1618 (2011).
Zimmermann, T.S. et al., "RNAi-Mediated Gene Silencing In Non-Human Primates" Nature 441(7089):111-114 (2006).

\* cited by examiner

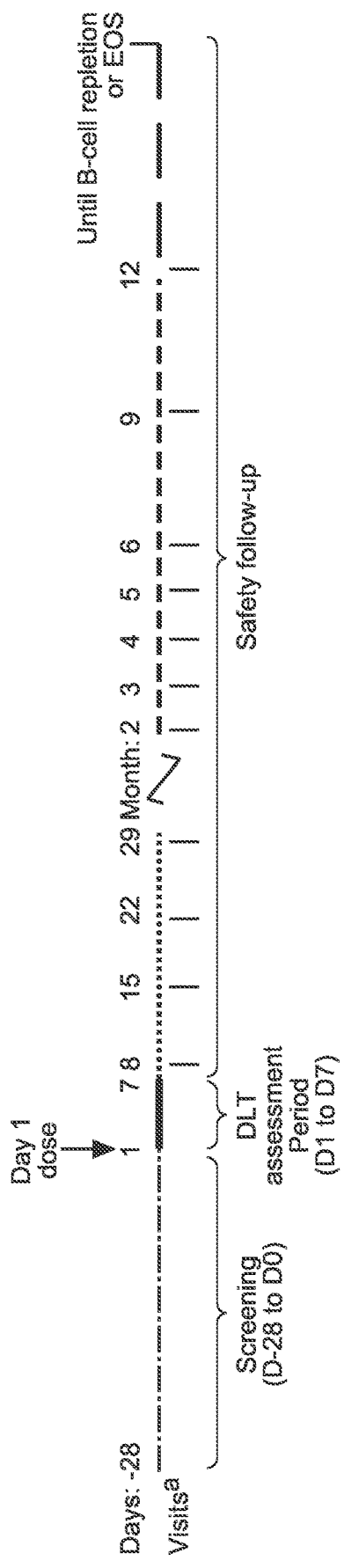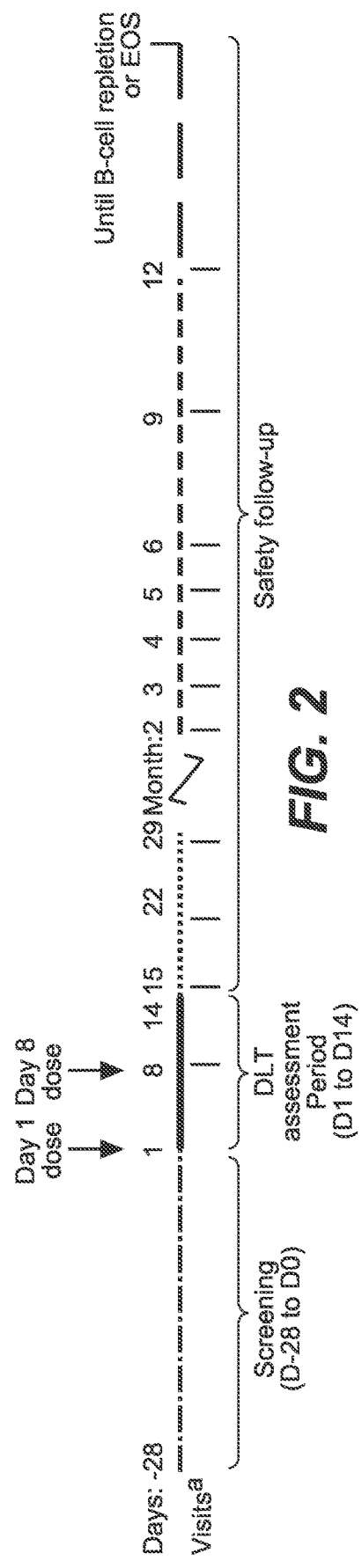
FIG. 2

Patient Global Impression of Severity (PGI-S)

Please choose the response below that best describes the severity of your Lupus over the past week.

None ☐

Mild ☐

Moderate ☐

Severe ☐

Very severe ☐

| | Screening[a] -28 to -1 | Predose | M1 Day 1 4h (±30 min) | M1 Day 1 10h (±30 min) | M1 Day 2 24h (±2 h) | M1 Day 3 48h (±4 h) | M1 Day 4 72h (±4 h) | M1 Day 8 | Day 15 (±2) | Day 22 (±2) | Day 29 (±2) | M2 Day 59 (±2) | M3 Day 89 (±2) | M4 Day 119 (±2) | M5 Day 149 (±7) | M6, M9 (±7) | M12 and every 6m thereafter (±7)[b] | Unscheduled Visit | Early Pt DSC from the Study Visit[c] |
|---|---|---|---|---|---|---|---|---|---|---|---|---|---|---|---|---|---|---|---|
| Written informed consent[d] | x | | | | | | | | | | | | | | | | | | |
| Review inclusion/exclusion criteria | x | | | | | | | | | | | | | | | | | | |
| Medical history and demographics | x | | | | | | | | | | | | | | | | | | |
| Height | x | | | | | | | | | | | | | | | | | | |
| Weight | x | | | | | | | | | | | | | | | | | | |
| Vital signs[e,f] | x | x | x | x | x | x | x | x | x | x | x | x | x | x | x | x | x | x | x |
| Complete physical examination[g] | x | | x | | | | | | | | | | | | | | | | |
| Targeted physical examination[h] | | x | | | x | x | x | x | x | x | x | x | x | x | x | x | x | x | x |
| Single 12-lead ECG[i] | x | x | | | x (±4h) | x | | | | | | | | | | | | | |
| Chest X-ray[j] | x | | | | | | | | | | | | | | | | | | |
| Mosunetuzumab administration | | | x | | | | | | | | | | | | | | | | |
| Dexamethasone premedication[k] | | x | | | | | | | | | | | | | | | | (x) | (x) |
| Concomitant medications[l] | x | x | x | x | x | x | x | x | x | x | x | x | x | x | x | x | x | x | x |
| Adverse events[m] | x | x | x | x | x | x | x | x | x | x | x | x | x | x | x | x | x | x | x |
| Participant-reported outcome (PGI-S)[n] | | x | | | | | | | x | x | x | x | x | x | x | x | x | x | x |
| Clinician-reported outcome (PGA)[o] | | x | | | | | | | x | x | x | x | x | x | x | x | x | x | x |

| Timepoint Relative to Injection | Screening[a] | M1 Predose | M1 4h (±30 min) | M1 10h (±30 min) | M1 24h (±2 h) | M1 48h (±4 h) | M1 72h (±4 h) | M1 Day 8 | M1 Day 15 (+2) | M1 Day 22 (+2) | M1 Day 29 (+2) | M2 Day 59 (+2) | M3 Day 89 (+2) | M4 Day 119 (+2) | M5 Day 149 (+7) | M6, M9 (+7) | M12 and every 6m thereafter (±7)[b] | Unscheduled Visit | Early Pt DSC from the Study Visit c |
|---|---|---|---|---|---|---|---|---|---|---|---|---|---|---|---|---|---|---|---|
| Month(s) | | | | | M1 | | | | | | | M2 | M3 | M4 | M5 | M6, M9 | | | |
| Day(s) | −28 to −1 | | 1 | | 2 | 3 | 4 | 8 | 15 | 22 | 29 | 59 | 89 | 119 | 149 | | | | |
| | | | | | | | | | | | | | | | | | | | |
| Local laboratory samples | | | | | | | | | | | | | | | | | | | |
| Hematology[p] | x | x | | | x | x | x | x | x | x | x | x | x | x | x | x | x | (x)[q] | x |
| Chemistry panel[r] | x | x | | | x | x | x | x | x | x | x | x | x | x | x | x | x | (x) | x |
| TB test[s] | x | | | | | | | | | | | | | | | | | | |
| CRP and ferritin | | x | | | x | x | x | x | x | | | | | | | | | | |
| Coagulation (aPTT, PT, INR, and fibrinogen)[t] | x | x | | | x | x | x | x | | | | | | | | | | | |
| Pregnancy test[u] | x | | | | | | | | | | | | | | | | | | |
| Urinalysis[v] | x | | | | | | | | | | | | | | | | | | |
| HBV and HCV serology[w] | x | | | | | | | | | | | | | | | | | | |
| HIV serology[x] | x | | | | | | | | | | | | | | | | | | |
| EBV and CMV serology[y] | x | | | | | | | | | | | | | | | | | | |
| SLE autoantibodies (eligibility) | (x)[z] | | | | | | | | | | | | | | | | | (x) | (x) |
| TBNK | (x)[aa] | | | | | | | | | | | | | | | | | | |

| Timepoint Month(s) / Day(s) Relative to Injection | Screening[a] -28 to -1 | Predose | M1 Day 1 (4h ±30 min) | M1 Day 1 (10h ±30 min) | M1 Day 2 (24h ±2h) | M1 Day 3 (48h ±4h) | M1 Day 4 (72h ±4h) | M1 Day 8 | M1 Day 15 (+2) | M1 Day 22 (+2) | M1 Day 29 (+2) | M2 Day 59 (+2) | M3 Day 89 (+2) | M4 Day 119 (+2) | M5 Day 149 (+2) | M6, M9 | M12 and every 6m thereafter (±7)[b] | Unscheduled Visit | Early Pt DSC from the Study Visit[c] |
|---|---|---|---|---|---|---|---|---|---|---|---|---|---|---|---|---|---|---|---|
| | | | Central laboratory samples | | | | | | | | | | | | | | | | |
| IgG, IgA, IgM, and total Ig | x | x | | | | | | | | | x | x | x | x | x | x | x | (x)[q] | x |
| SLE autoantibodies[bb] | x | x | | | | | | | | | x | x | x | x | x | x | x | | x |
| Complement proteins C3, C4 | x | x | | | | | | | x | | x | x | x | x | x | x | x | | |
| Vaccination antibody titers[cc] | x | x | | | | | | | | | | | | | | x[dd] | x[ee] | | |
| Plasma IL-6 sample | x | x | x | x | x | x | x | x | | | | | | | | | | | |
| Serum for CRS-associated biomarkers[ff] | x | x | x | x | x | x | x | x | | | | | | | | | | | |
| Plasma for CRS-associated biomarkers[ff] | x | x | x | x | x | x | x | x | | | | | | | | | | | |
| High-sensitivity flow cytometry | | x | x | x | x | x | x | x | x | x | x | x | x | x | x | x | x | | x |
| TBNK | x | x | x | | x | | | x | x | x | x | x | x | x | x | x | x | | x |
| Blood for T cell flow cytometry | | x | x | x | x | x | x | x | x | x | x | x | x | x | x | x | (x)[gg] | (x)[q] | x |
| Serum PK sample[hh] | | x | x | x | x | x | x | x | x | x | x | x | x | x | x | x | x | x | x |
| Serum ADA sample[hh] | | x | | | | | | | | | x | x | x | x | x | x[dd] | x[gg] | x | x |
| Serum for biomarkers | x | x | | | | | | x | x | | x | x | x | x | x | x | x[gg] | x | x |
| Plasma for biomarkers | | x | | | | | | x | x | | x | x | x | x | x | x | (x)[gg] | x | x |
| Blood for non-inherited genetic biomarkers[ii] | x | x | | | | | | | | | | | | | | x | (x)[gg] | x | x |

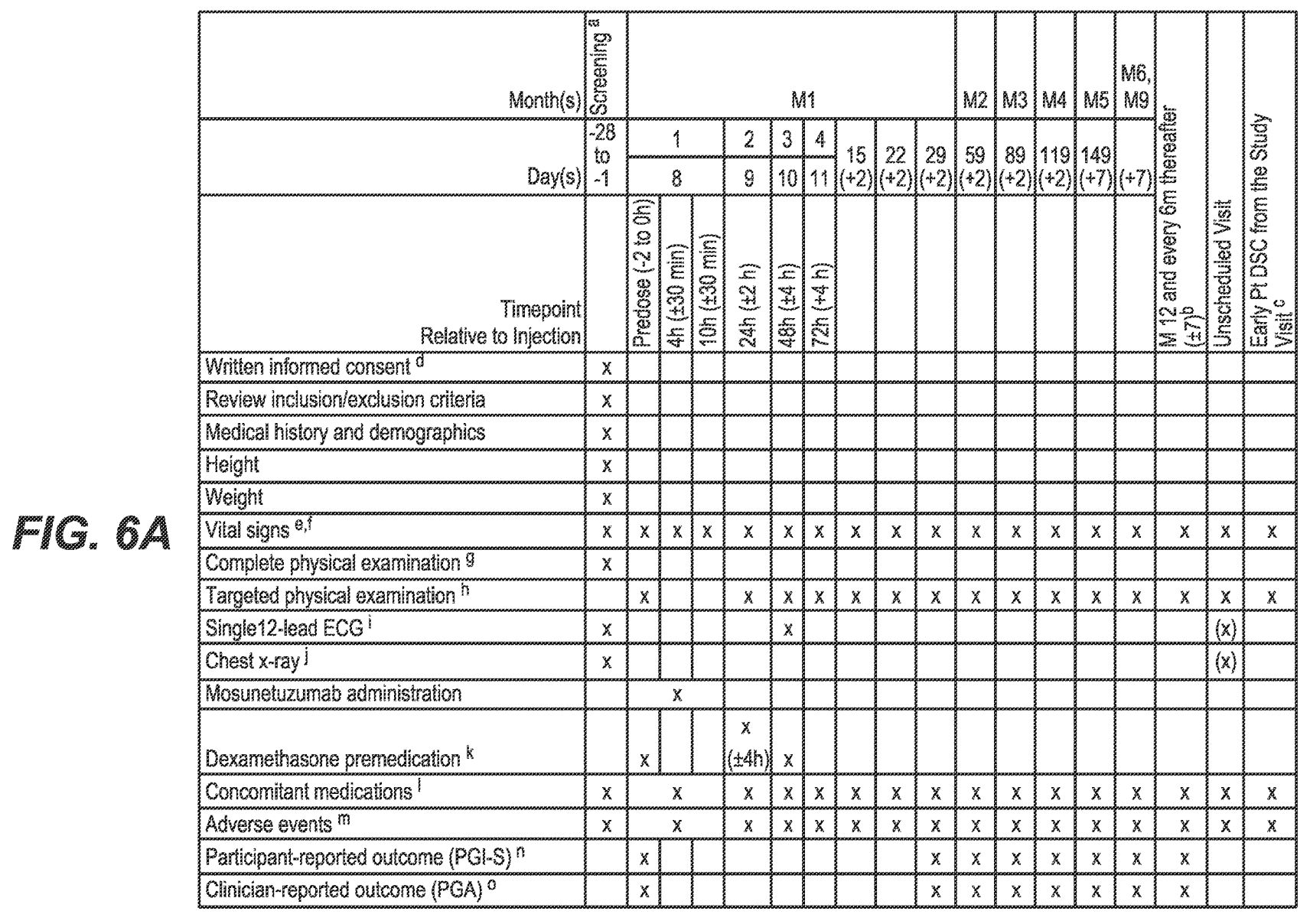

| Timepoint / Relative to Injection | Screening[a] -28 to -1 | M1 Predose (-2 to 0h) | M1 D1 4h (±30 min) | M1 D1 10h (±30 min) | M1 D2/9 24h (±2h) | M1 D3/10 48h (±4h) | M1 D4/11 72h (+4h) | D15 (+2) | D22 (+2) | M2 D29 (+2) | M3 D59 (+2) | M4 D89 (+2) | M5 D119 (+2) | M6, M9 D149 (+7) | M12 and every 6m thereafter (±7)[b] | Unscheduled Visit | Early Pt DSC from the Study Visit[c] |
|---|---|---|---|---|---|---|---|---|---|---|---|---|---|---|---|---|---|
| Written informed consent[d] | x | | | | | | | | | | | | | | | | |
| Review inclusion/exclusion criteria | x | | | | | | | | | | | | | | | | |
| Medical history and demographics | x | | | | | | | | | | | | | | | | |
| Height | x | | | | | | | | | | | | | | | | |
| Weight | x | | | | | | | | | | | | | | | | |
| Vital signs[e,f] | x | x | x | x | x | x | x | x | x | x | x | x | x | x | x | x | x |
| Complete physical examination[g] | x | | | | | | | | | | | | | | | | |
| Targeted physical examination[h] | | x | x | | x | x | x | x | x | x | x | x | x | x | x | x | x |
| Single 12-lead ECG[i] | x | | | | | x | | | | | | | | | | (x) | |
| Chest x-ray[j] | x | | | | | | | | | | | | | | | (x) | |
| Mosunetuzumab administration | | | | | x (±4h) | | | | | | | | | | | | |
| Dexamethasone premedication[k] | | | x | | | | | | | | | | | | | | |
| Concomitant medications[l] | x | x | x | | x | x | x | x | x | x | x | x | x | x | x | x | x |
| Adverse events[m] | x | x | x | | x | x | x | x | x | x | x | x | x | x | x | x | x |
| Participant-reported outcome (PGI-S)[n] | | x | | | | | | x | x | x | x | x | x | x | x | x | x |
| Clinician-reported outcome (PGA)[o] | | x | | | | | | x | x | x | x | x | x | x | x | x | x |

FIG. 6A

| Timepoint Relative to Injection | Screening[a] -28 to -1 | Predose (-2 to 0h) | M1 1 4h (±30 min) | M1 1 10h (±30 min) | M1 2 24h (±2 h) | M1 3 48h (±4 h) | M1 4 72h (+4 h) | M1 15 (+2) | 22 (+2) | 29 (+2) | M2 59 (+2) | M3 89 (+2) | M4 119 (+2) | M5 149 (+7) | M6, M9 (+7) | M 12 and every 6m thereafter (±7)[b] | Unscheduled Visit | Early Pt DSC from the Study Visit[c] |
|---|---|---|---|---|---|---|---|---|---|---|---|---|---|---|---|---|---|---|
| | | Local laboratory samples | | | | | | | | | | | | | | | | |
| Hematology[p] | x | x | | | x | x | x | x | x | x | x | x | x | x | x | x | (x)[q] | x |
| Chemistry panel[r] | x | x | | | x | x | x | x | x | x | x | x | x | x | x | x | (x) | x |
| TB test[s] | x | | | | | | | | | | | | | | | | | |
| CRP and ferritin | | x | | | x | | | x | | | | | | | | | | |
| Coagulation (aPTT, PT, INR, and fibrinogen[t]) | x | x | | | x | x | x | x | | | | | | | | | | |
| Pregnancy test[u] | x | x | | | | | | | | | | | | | | | | |
| Urinalysis[v] | x | | | | | | | | | | | | | | | | | |
| HBV and HCV serology[w] | x | | | | | | | | | | | | | | | | | |
| HIV serology[x] | x | | | | | | | | | | | | | | | | | |
| EBV and CMV serology[y] | | | | | | | | | | | | | | | | | | |
| SLE autoantibodies[z] | (x) | | | | | | | | | | | | | | | | (x) | (x) |
| TBNK[aa] | (x) | | | | | | | | | | | | | | | | | |

| Month(s) | Screening[a] | | | M1 | | | | | | | M2 | M3 | M4 | M5 | M6, M9 | M12 and every 6m thereafter (±7)[b] | Unscheduled Visit | Early Pt DSC from the Study Visit[c] |
|---|---|---|---|---|---|---|---|---|---|---|---|---|---|---|---|---|---|---|
| Day(s) | -28 to -1 | 1 | 1 | 1 | 2 | 3 | 4 | 15 | 22 | 29 | 59 | 89 | 119 | 149 | | | | |
| Timepoint Relative to Injection | | Predose (-2 to 0h) | 4h (±30 min) | 10h (±30 min) | 24h (±2 h) | 48h (±4 h) | 72h (±4 h) | (±2) | (±2) | (±2) | (±2) | (±2) | (±2) | (±7) | (+7) | | | |
| | | 8 | | | 9 | 10 | 11 | | | | | | | | | | | |
| | | Central laboratory samples | | | | | | | | | | | | | | | | |
| IgG, IgA, IgM, and total Ig | | x[bb] | | | | | | | | x | x | x | | x | x | x | (x)[q] | x |
| SLE autoantibodies [cc] | x | x[bb] | | | | | | | | x | x | x | | x | x | x | x | x |
| Complement proteins C3 and C4 | x | x | | | | | | | | x | x | x | | x | x | x | (x)[q] | |
| Vaccination antibody titers [dd] | | x[bb] | | | | | | | | | | | | | | | | x[ff] |
| Plasma IL-6 sample | | x | x | x | x | x | x | x | | | | | | | | | | |
| Serum for CRS associated biomarkers [gg] | | x | x | x | x | x | x | x | | | | | | | | | | |
| Plasma for CRS-associated biomarkers [gg] | | x | x | x | x | x | x | x | | | | | | | | | | |
| High sensitivity flow cytometry | | x | | x | x | x | x | x | x | x | x | x | x | x | x[ee] | (x)[hh] | x | x |
| TBNK | | x | | x | x | x | x | x | | x | x | x | | x | x | x | (x)[q] | x |
| Blood for T cell flow cytometry | | x | x | x | x | x | x | x | | x | x | x | | x | x | x[hh] | x | x |
| Serum PK sample [ii] | | x | x | x | x | x | x | x | x | x | x | x | x | x | x[ee] | x[hh] | x | x |
| Serum ADA sample [ii] | | x | | | | | | | | | x | x | | x | x | (x)[hh] | x | x |
| Serum for biomarkers | | x | | | | | | | | | x | x | | | x | (x)[hh] | x | x |
| Plasma for biomarkers | | x | | | | | | | | | x | x | | | x | (x)[hh] | x | x |
| Blood for non-inherited genetic biomarkers [jj] | x | x | | | | | | | | | x | x | | | x | (x)[hh] | x | x |

METHODS AND COMPOSITIONS FOR TREATING SYSTEMIC LUPUS ERYTHEMATOSUS (SLE) WITH MOSUNETUZUMAB

CROSS-REFERENCE TO RELATED APPLICATIONS

This application claims benefit of priority to U.S. provisional patent application No. 63/264,139, filed Nov. 16, 2021, and to U.S. provisional patent application No. 63/378,353, filed Oct. 19, 2022, the contents of which are incorporated by reference herein.

SEQUENCE LISTING

The instant application contains a Sequence Listing which has been submitted electronically in XML format and is hereby incorporated by reference in its entirety. Said XML copy, created on Apr. 16, 2024, is named P36994-US-2_replacement_sequence_listing_2024-04-15.xml and is 47,893 bytes in size.

FIELD OF THE INVENTION

The present invention relates to the treatment of systemic lupus erythematosus. More specifically, the invention pertains to treatment of subjects having systemic lupus erythematosus by administration of mosunetuzumab, a bispecific antibody that binds to anti-cluster of differentiation 20 (CD20) and anti-cluster of differentiation 3 (CD3).

BACKGROUND

Systemic Lupus Erythematosus

Systemic lupus erythematosus is an autoimmune rheumatic disease that occurs primarily in women of childbearing age. It is characterized by multisystem involvement and immunological abnormalities, including dysfunction of B cells and T cells. Much of the tissue damage is thought to occur through autoantibody formation and immune complex deposition, but the underlying cause remains unknown. Disease manifestations can range from mild to severe and potentially life-threatening and may display acute, subacute, and chronic patterns of progression. The protean and heterogeneous nature of SLE makes the diagnosis and management of SLE particularly challenging. Current standard-of-care therapies for SLE include oral corticosteroids (OCSs), antimalarial therapies (such as hydroxychloroquine, chloroquine, and quinacrine), and conventional immunosuppressants (such as mycophenolate mofetil [MMF], azathioprine, and methotrexate). More recently, belimumab (BENLYSTA), an inhibitor of B-lymphocyte stimulator was approved for the treatment of patients with active, autoantibody positive SLE who are receiving standard therapy (Burness and McCormack 2011). These agents generally have incomplete efficacy for inflammatory manifestations of SLE and their use is frequently limited by toxicities. For example, corticosteroids are effective for many of the manifestations of SLE but have significant short- and long-term adverse effects, including infections, osteoporosis, hyperglycemia, and hyperlipidemia. The unmet medical need in SLE is high. Despite the available therapies, patients with SLE remain at increased risk for damage accrual, cardiovascular disease, complications of therapy, and death (Cook et al. 2000; Gladman et al. 2002; Nossent et al. 2010, Lopez et al. 2012). The mortality risk is estimated to be 1.3-5.3 times greater than that of age-matched controls from the general population of the same region (Singh and Yen, 2018). SLE ranks as one of the leading causes of death in young women (15-24 years old) in the United States (Yen and Singh 2018).

Mosunetuzumab

Mosunetuzumab is a full length, humanized anti-cluster of differentiation 20 (CD20)/CD3 T-cell-dependent bispecific antibody of an immunoglobulin (Ig) G1 isotype that is produced using the knobs-into-holes technology (Atwell et al 1997; Spiess et al. 2013). One antigen-binding fragment (Fab) region of the antibody is directed against the extracellular domain of the CD3ε subunit of the T cell receptor complex and the other Fab region is directed against the extracellular domain of CD20 (Atwell et al 1997; Spiess et al. 2013). Mosunetuzumab contains the N297G amino acid substitution in the fragment crystallizable (Fc) region according to Eu numbering (Edelman et al. 1969; Kabat et al. 1991). This substitution results in a non-glycosylated heavy chain that has minimal binding to Fcγ receptors and, consequently, attenuated Fc-dependent cellular effector functions. Mosunetuzumab is produced from Chinese hamster ovary cells. As a T cell-recruiting bispecific antibody, mosunetuzumab is a conditional agonist; target B-cell killing is observed only upon simultaneous binding to CD20 on B cells and CD3 on T cells. Engagement of both arms of mosunetuzumab results in the formation of an immunologic synapse between a target B cell and a cytotoxic T cell resulting in T-cell activation in a target- and dose-dependent manner. T-cell activation is manifested by the expression of activation-related surface markers (e.g., CD69 and CD25), transient release of cytokines (e.g., interferon-γ [IFN-γ], Tumor necrosis factor-α [TNF-α], interleukins [IL]-2, 6, and 10), and robust T-cell proliferation. Subsequent directed release of perforin and a cocktail of granzymes from T cells through the immunologic synapse result in B-cell lysis.

BRIEF SUMMARY

Other technical features may be readily apparent to one skilled in the art from the following figures, descriptions, and claims.

In a first aspect, provided herein is a method of treating a patient, includes administering to the patient an effective amount of mosunetuzumab, where the patient has systemic lupus erythematosus. The method can also include where the administering an effective amount of mosunetuzumab includes administering mosunetuzumab according to a dosing regimen includes at least a first dosing cycle, where the first dosing cycle includes a first dose (C1D1) and a second dose (C1D2) of mosunetuzumab, where the C1D1 is less than C1D2, and where the C1D1 is between about 1.6 mg to about 5 mg and the C1D2 is between about 15 mg to about 60 mg. The method can also include where mosunetuzumab is administered subcutaneously. The method can include where the patient is further administered tocilizumab if the patient experiences cytokine release syndrome (CRS). The method can include administering to the patient a corticosteroid, cyclophosphamide, a B-cell-depleting therapy, or calcineurin inhibitor.

In another aspect, provided herein is a method of treating a patient, includes administering to the patient an effective amount of mosunetuzumab, where (a) the patient has systemic lupus erythematosus, (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is between about 1.6 mg to about 5 mg on day 1 of the cycle and the C1D2 is between about 15 mg to about 60 mg on day 8 of the cycle, and (c) mosunetuzumab is administered subcutaneously. The method can also include where C1D1 is 1.6 mg. The method can also include wherein C1D1 is 5 mg. The method can also include wherein C1D2 is 15 mg. The method can also include wherein C1D2 is 45 mg. The method can also include wherein C1D2 is 60 mg. The method can also include where C1D1 is 1.6 mg and C1D2 is 15 mg. The method can also include where C1D1 is 1.6 mg and C1D2 is 45 mg. The method can also include where C1D1 is 1.6 mg and C1D2 is 60 mg. The method can also include where C1D1 is 5 mg and C1D2 is 15 mg. The method can also include where C1D1 is 5 mg and C1D2 is 45 mg. The method can also include where C1D1 is 5 mg and C1D2 is 60 mg. The method can also include wherein at least one symptom of SLE is reduced. The method can also include where mosunetuzumab is administered subcutaneously. The method can also further include administering to the patient a corticosteroid, cyclophosphamide, a B-cell-depleting therapy, or calcineurin inhibitor.

In yet another aspect, a method of treating a patient who is part of a population of patients, includes administering to the patients an effective amount of mosunetuzumab, where each patient of the population of patients has systemic lupus erythematosus. The method can also include where at least one symptom of SLE is reduced in at least one patient in the population of patients. The method can also include where the administering an effective amount of mosunetuzumab includes administering mosunetuzumab according to a dosing regimen includes at least a first dosing cycle, where the first dosing cycle includes a first dose (C1D1) and a second dose (C1D2) of mosunetuzumab, where the C1D1 is less than C1D2, and where the C1D1 is between about 1.6 mg to about 5 mg and the C1D2 is between about 15 mg to about 60 mg. The method can also include where mosunetuzumab is administered subcutaneously. The method can further include administering to the patient a corticosteroid, cyclophosphamide, a B-cell-depleting therapy, or calcineurin inhibitor.

In another aspect, a method of treating a patient of a population of patients, includes administering to the patient an effective amount of mosunetuzumab, where (a) the population of patients has systemic lupus erythematosus, (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is between about 1.6 mg to about 5 mg on day 1 of the cycle and the C1D2 is between about 15 mg to about 60 mg on day 8 of the cycle, and (c) mosunetuzumab is administered subcutaneously. The method can also include where C1D1 is 1.6 mg. The method can also include wherein C1D1 is 5 mg. The method can also include wherein C1D2 is 15 mg. The method can also include wherein C1D2 is 45 mg. The method can also include wherein C1D2 is 60 mg. The method can also include where C1D1 is 1.6 mg and C1D2 is 15 mg. The method can also include where C1D1 is 1.6 mg and C1D2 is 45 mg. The method can also include where C1D1 is 1.6 mg and C1D2 is 60 mg. The method can also include where C1D1 is 5 mg and C1D2 is 15 mg. The method can also include where C1D1 is 5 mg and C1D2 is 45 mg. The method can also include where C1D1 is 5 mg and C1D2 is 60 mg. The method can also include wherein at least one symptom of SLE is reduced. The method can also include where mosunetuzumab is administered subcutaneously.

In yet another aspect, a kit is provided that includes (a) a first container includes mosunetuzumab, and (b) a package insert with instructions for providing a therapy to in a patient who has systemic lupus erythematosus where the mosunetuzumab is administered subcutaneously and according to a dosing regimen includes at least a first dosing cycle, where the first dosing cycle includes a first dose (C1D1) and a second dose (C1D2) of mosunetuzumab, where C1D1 is between about 1.6 mg to about 5 mg and administered on day 1 of the cycle and the C1D2 is between about 15 mg to about 60 mg and administered on day 8 of the cycle. The kit can also include where C1D1 is 1.6 mg, and C1D2 is 15 mg. The kit can also include where C1D1 is 1.6 mg, and C1D2 is 45 mg. The kit can also include where C1D1 is 1.6 mg, and C1D2 is 60 mg. The kit can also include where C1D1 is 5 mg, and C1D2 is 15 mg. The kit can also include where C1D1 is 5 mg, and C1D2 is 45 mg. The kit can also include where C1D1 is 5 mg, and C1D2 is 60 mg. The kit can also include where the mosunetuzumab is contained within an injection device. The kit can also include further includes a second container. The kit can also include where the injection device is a syringe or an autoinjector. The kit can also include where the first container includes an injection device includes sufficient mosunetuzumab to deliver the first dose and the second container includes an injection device includes sufficient mosunetuzumab to deliver the second dose. The kit can also include further includes at least a third container. The kit can also include where the third container includes a medicament, and the instructions further provide instructions for administering the medicament.

Other technical features may be readily apparent to one skilled in the art from the following figures, descriptions, and claims.

BRIEF DESCRIPTION OF THE SEVERAL VIEWS OF THE DRAWINGS

FIG. 2 shows the study timelines as discussed in the disclosure, including the examples. DLT=dose-limiting toxicity; EOS=end of study. a Visits within the DLT assessment period and those after Month 12 are not shown.

FIG. 3 shows an example of a Patient Global Impression of Severity (PGI-S), as discussed in the disclosure, including the examples.

FIG. 5 (shown as FIGS. 5A, 5B, and 5C) shows a schedule of activities for non-fractionated cohorts, as disclosed in the Examples. Notes for FIG. 7: On treatment days, all assessments should be performed prior to dosing, unless otherwise specified. For participants at participating sites who have provided written informed consent to participate in mobile nursing visits, mobile nursing may be used for those assessments that do not require administration of study treatment or planned treatment changes. Mobile nursing is not permitted for screening, injection visits, unscheduled visits, early discontinuation visits, or in replacement of protocol-required hospitalizations. ADA=anti-drug antibody; BCR=B-cell receptor; CD=cluster of differentiation; CMV=cytomegalovirus; CRP=C-reactive protein;

Figure 1:
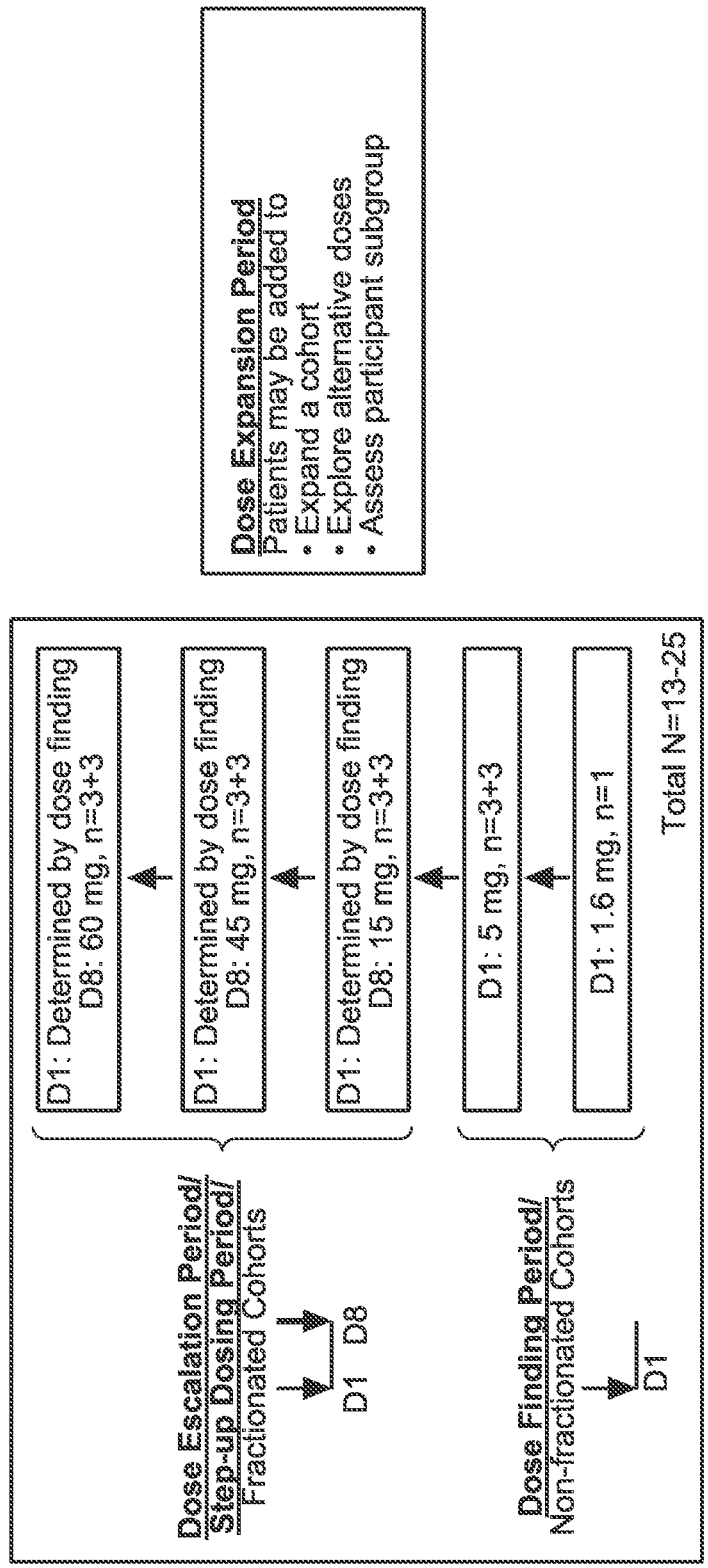
FIG. 1 shows a schema of the study as discussed in the disclosure, including the examples.

CRS=cytokine release syndrome; CT=computed tomography; DSC=discontinuation; dsDNA=double-stranded DNA; EBV=Epstein-Barr virus; eCRF=electronic Case Report Form; HBsAg=hepatitis B surface antigen; HBsAb=hepatitis B surface antibody; HBcAb=total hepatitis B core antibody; HBV=hepatitis B virus; HCV=hepatitis C virus; LPI=last patient in; NA=not applicable; NGS=next-generation sequencing; OCS=oral corticosteroid; PGA=Physicians Global Assessment; PGI-S=Patient Global Impression of Severity; PK=pharmacokinetic; Pt=participant; QTcF=QT interval corrected through use of Fridericia's formula; RBR=Research Biosample Repository; RNP=ribonucleoprotein; SFU=safety follow-up; Sm=Smith antigen TBNK=T, B, and natural killer cells; TCR=T-cell receptor; WES=whole exome sequencing; WGS=whole genome sequencing; (x)=as clinically indicated or in certain cases as per the respective footnote.

Notes for FIG. 5:

[a] Results of standard-of-care assessments performed prior to obtaining informed consent which are within 28 days prior to Day 1 may be used; such assessments do not need to be repeated for screening. Patients who do not meet the criteria for participation in this study may qualify for 3 re-screening opportunities (for a total of 4 screenings per patient) as described in 3.1.1 (Examples).

[b] SFU to be performed at Month 12 and every 6 months thereafter until B cell recovery or until the end of the study, whichever comes first.

[c] Participants who discontinue/withdraw prematurely from the study will return to the clinic for a final early participant discontinuation visit. The reasons for participant discontinuation from the study are described in 4.6.2 (Examples).

[d] Informed consent must be documented before any study-specific screening procedure is performed, and may be obtained more than 28 days before initiation of study treatment.

[e] Includes respiratory rate, pulse (heart rate), systolic and diastolic blood pressure while the participant is in a seated position, and body temperature at all visits, as well as oxygen saturation (pulse oximetry) at visits during the DLT assessment period.

[f] Vital signs should be recorded pre-injection (within 30 minutes) and every 15 (±10) minutes for 1 hour following SC mosunetuzumab injection. After this one hour period is completed, vital signs should be recorded every 30 (±15) minutes for 4 hours post-injection. Thereafter, vital signs should be monitored every 4 (±1) hours until hospital discharge.

[g] Includes evaluation of the head, eyes, ears, nose, and throat, and the cardiovascular, respiratory, neurologic, gastrointestinal, musculoskeletal, and dermatologic systems; genitourinary examinations may be performed if clinically indicated.

[h] Perform a targeted, symptom-directed examination at specified timepoints or as clinically indicated. At a minimum, a targeted examination will include a primary relevance systems assessment (i.e., cardiovascular, respiratory, neurologic).

[i] If at a particular postdose timepoint the mean QTcF is >500 ms and/or >60 ms longer than the baseline value, another ECG must be recorded, ideally within the next 5 minutes, and ECG monitoring should continue until QTcF has stabilized on two successive ECGs. If a PK sample is not scheduled for that timepoint, an unscheduled PK sample should be obtained.

[j] If a chest X-ray or CT scan of the chest has been obtained within the past 3 months and no clinically significant abnormality was observed and no new pulmonary signs or symptoms are exhibited, no chest X-ray is required.

[k] Ten mg dexamethasone should be administered orally predose, 24 (±4) hours and 48 (±4) hours after mosunetuzumab injection. For participants who are not hospitalized, adherence to oral dexamethasone prophylaxis should be monitored during clinic visits, mobile nursing visits, or at phone check-ins at 24 (±4) hours and 48 (±4) hours after the mosunetuzumab dose. The OCS dose should be held on the days when dexamethasone is administered as a premedication.

[l] Medication (e.g., prescription drugs, over-the-counter drugs, vaccines, herbal or homeopathic remedies, nutritional supplements) used by a patient in addition to protocol-mandated treatment from 7 days prior to initiation of study drug until the final SFU or early study discontinuation visit.

[m] After informed consent has been obtained but prior to initiation of study drug, only serious adverse events caused by a protocol-mandated intervention should be reported. After initiation of study drug, all adverse events will be reported until the final SFU visit. After this period, the Sponsor should be notified if the investigator becomes aware of any serious adverse event that is believed to be related to prior exposure to study drug (see 5.6 (Examples)).

[n] PGI-S will be self-administered before the patient receives any information on disease status, prior to the performance of non-PRO assessments, and prior to the administration of study treatment.

[o] PGA will be completed by the clinician after the physical examination but prior to the administration of study treatment. If the visit is conducted by mobile nursing staff without a physician, then the PGA will not be assessed at that visit.

[p] Hematology includes complete blood count, including RBC count, hemoglobin, hematocrit, platelet count, WBC count, ANC, absolute lymphocyte count, and other cells.

[q] For all serious infectious adverse events, CBC with differential, quantitative immunoglobulins, and flow cytometry should be measured within 1 week of onset.

[r] Chemistry panel (serum or plasma) includes bicarbonate or total carbon dioxide (if considered standard of care for the region), sodium, potassium, chloride, glucose, BUN or urea, creatinine, total protein, albumin, phosphate, calcium, magnesium, total and direct bilirubin, ALP, ALT, AST, gamma-glutamyl transferase (GGT), uric acid, and LDH

[s] The choice of TB test (skin or blood test) will be determined in accordance with local clinical practice.

[t] The routine coagulation panel (aPTT, PT, and INR) should be drawn at the scheduled timepoints. Fibrinogen should be added when monitoring HLH and/or severe CRS events.

[u] All women of childbearing potential will have a serum pregnancy test at screening. Urine pregnancy tests must be performed prior to mosunetuzumab injection. If a urine pregnancy test is positive, it must be confirmed by a serum pregnancy test.

[v] Includes dipstick (pH, specific gravity, glucose, protein, ketones, and blood) and microscopic examination (sediment, RBCs, WBCs, casts, crystals, epithelial cells, and bacteria).

[w] HBV serology: HBsAg, HBsAb, and HBcAb for all participants. HCV serology: HCV antibody for all participants. Participants who test negative for HBsAg and HBsAb tests and positive for HBcAb test are ineligible.

[x] HIV-1 and HIV-2 antibody test

[y] EBV and CMV by quantitative PCR using peripheral blood samples. If local laboratory assessments are not available for quantitative PCR detection of active EBV and CMV, then samples may be analyzed at a central laboratory.

[z] For eligibility screening only, a sample for ANA, anti-dsDNA, and anti-Sm should be collected for analysis by local laboratory if a qualifying test has not been documented within the 12 months prior to screening.

[aa] For eligibility screening, a sample for B cell count (CD19+) should be collected for analysis by local laboratory. If the test is not available via local laboratory, the test may be analyzed via central laboratory.

[bb] Autoantibodies include ANA, anti-dsDNA, anti-Sm, anti-SSA (Ro), anti-SSB (La), and anti-RNP.

[cc] Mumps, rubella, varicella, tetanus, influenza, and *Streptococcus pneumonia*

[dd] Collect sample at Month 6 only.

[ee] If patient discontinuation from the study occurs prior to Month 6.

[ff] CRS-associated biomarkers: potentially including but not limited to IL-2, IL-8, IFN-γ, and TNF-α.

[gg] Collect sample at Month 12 only.

[hh] Using validated assays for mosunetuzumab

[ii] Research may involve extraction of DNA and RNA for analysis of non-inherited BCR and TCR sequences and genomic profiling through use of NGS of a comprehensive panel of genes. NGS methods will not include WGS or WES.

FIG. 6 (shown as FIGS. 6A, 6B, and 6C) shows the Schedule of Activities: Fractionated Cohorts. Notes: On treatment days, all assessments should be performed prior to dosing, unless otherwise specified. For participants at participating sites who have provided written informed consent to participate in mobile nursing visits, mobile nursing may be used for those assessments that do not require administration of study treatment or planned treatment changes. Mobile nursing is not permitted for screening, injection visits, unscheduled visits, early discontinuation visits, or in replacement of protocol-required hospitalizations. ADA=anti-drug antibody; BCR=B-cell receptor; CD=cluster of differentiation; CMV=cytomegalovirus; CRP=C-reactive protein; CRS=cytokine release syndrome; CT=computed tomography; DSC=discontinuation; dsDNA=double stranded DNA; EBV=Epstein-Barr virus; eCRF=electronic Case Report Form; HBsAg=hepatitis B surface antigen; HBsAb=hepatitis B surface antibody; HBcAb=total hepatitis B core antibody; HBV=hepatitis B virus; HCV=hepatitis C virus; LPI=last patient in; NA=not applicable; NGS=next-generation sequencing; OCS=oral corticosteroid; PGA=Physicians Global Assessment; PGI-S=Patient Global Impression of Severity; PK=pharmacokinetic; Pt=participant; QTcF=QT interval corrected through use of Fridericia's formula; RBR=Research Biosample Repository; RNP=ribonucleoprotein; SFU=safety follow-up; Sm=Smith antigen TBNK=T, B, and natural killer cells; TCR=T-cell receptor; WES=whole exome sequencing; WGS=whole genome sequencing; (x)=as clinically indicated or in certain cases as per the respective footnote.

Notes for FIG. 6:

[a] Results of standard-of-care assessments performed prior to obtaining informed consent which are within 28 days prior to Day 1 may be used; such assessments do not need to be repeated for screening. Patients who do not meet the criteria for participation in this study may qualify for 3 re-screening opportunities (for a total of 4 screenings per patient) as described in 3.1.1 (Examples).

[b] SFU to be performed at Month 12 and every 6 months thereafter until B-cell recovery or until the end of the study, whichever comes first.

[c] Participants who discontinue/withdraw prematurely from the study will return to the clinic for a final early participant discontinuation visit. The reasons for participant discontinuation from the study are described in 4.6.2 (Examples).

[d] Informed consent must be documented before any study-specific screening procedure is performed, and may be obtained more than 28 days before initiation of study treatment.

[e] Includes respiratory rate, pulse (heart rate), and systolic and diastolic blood pressure while the participant is in a seated position, and body temperature at all visits, as well as oxygen saturation (pulse oximetry) at visits during the DLT assessment period.

[f] Vital signs should be recorded pre-injection (within 30 minutes) and every 15 (±10) minutes for 1 hour following SC mosunetuzumab injection. After this one hour period is completed, vital signs should be recorded every 30 (±15) minutes for 4 hours post-injection. Thereafter, vital signs should be monitored every 4 (±1) hours until hospital discharge. For participants who tolerated Day 1 injection without the development of CRS, for Day 8 injection, vital signs should be assessed pre-injection (within 30 minutes) and every 60 minutes (±30 minutes), for 4 hrs post-injection. For participants who experienced CRS with Day 1 injection, for Day 8 injection vital signs should be assessed pre-injection (within 30 minutes) and every 30 minutes (±15 minutes) for 4 hrs after the injection. Thereafter, vital signs should be monitored every 4 (±1) hrs until hospital discharge.

[g] Includes evaluation of the head, eyes, ears, nose, and throat, and the cardiovascular, respiratory, neurologic, gastrointestinal, musculoskeletal and dermatologic systems; genitourinary examinations may be performed if clinically indicated.

[h] Perform a targeted, symptom-directed examination at specified timepoints or as clinically indicated. At a minimum, a targeted examination will include a primary relevance systems assessment (i.e., cardiovascular, respiratory, neurologic).

[i] If at a particular postdose timepoint the mean QTcF is >500 ms and/or >60 ms longer than the baseline value, another ECG must be recorded, ideally within the next 5 minutes, and ECG monitoring should continue until QTcF has stabilized on two successive ECGs. If a PK sample is not scheduled for that timepoint, an unscheduled PK sample should be obtained.

[j] If a chest X-ray or CT scan of the chest has been obtained within the past 3 months and no clinically significant abnormality was observed and no new pulmonary signs or symptoms are exhibited, no chest X-ray is required.

[k] Ten mg dexamethasone should be administered orally predose, 24 (±4) hours and 48 (±4) hours after each mosunetuzumab injection. For participants who are not hospitalized, adherence to oral dexamethasone prophylaxis should be monitored during clinic visits, mobile nursing visits, or at phone check-ins at 24 (±4) hours and 48 (±4) hours after the mosunetuzumab dose. The OCS dose should be held on the days when dexamethasone is administered as a premedication.

$^l$ Medication (e.g., prescription drugs, over-the-counter drugs, vaccines, herbal or homeopathic remedies, nutritional supplements) used by a patient in addition to protocol-mandated treatment from 7 days prior to initiation of study drug until the final SFU or early discontinuation visit.

$^m$ After informed consent has been obtained but prior to initiation of study drug, only serious adverse events caused by a protocol-mandated intervention should be reported. After initiation of study drug, all adverse events will be reported until the final SFU visit. After this period, the Sponsor should be notified if the investigator becomes aware of any serious adverse event that is believed to be related to prior exposure to study drug (see 5.6 (Examples)).

$^n$ PGI will be self-administered before the patient receives any information on disease status, prior to the performance of non-PRO assessments, and prior to the administration of study treatment.

$^o$ PGA will be completed by the clinician after the physical examination but prior to the administration of study treatment. If the visit is conducted by mobile nursing staff without a physician, then the PGA will not be assessed at that visit.

$^p$ Hematology includes complete blood count, including RBC count, hemoglobin, hematocrit, platelet count, WBC count, ANC, absolute lymphocyte count, and other cells $^q$ For all serious infectious adverse events, CBC with differential, quantitative immunoglobulins, and flow cytometry should be measured within 1 week of onset.

$^r$ Chemistry panel (serum or plasma) includes bicarbonate or total carbon dioxide (if considered standard of care for the region), sodium, potassium, chloride, glucose, BUN or urea, creatinine, total protein, albumin, phosphate, calcium, magnesium, total and direct bilirubin, ALP, ALT, AST, gamma-glutamyl transferase (GGT), uric acid, and LDH $^s$ The choice of TB test (skin or blood test) will be determined in accordance with local clinical practice.

$^t$ The routine coagulation panel (aPTT, PT, and INR) should be drawn at the scheduled timepoints. Fibrinogen should be added when monitoring HLH and/or severe CRS events.

$^u$ All women of childbearing potential will have a serum pregnancy test at screening. Urine pregnancy tests must be performed prior to each mosunetuzumab injection. If a urine pregnancy test is positive, it must be confirmed by a serum pregnancy test.

$^v$ Includes dipstick (pH, specific gravity, glucose, protein, ketones, and blood) and microscopic examination (sediment, RBCs, WBCs, casts, crystals, epithelial cells, and bacteria).

$^w$ HBV serology: HBsAg, HBsAb, and HBcAb for all participants. HCV serology: HCV antibody for all participants. Participants who test negative for HBsAg and HBsAb tests and positive for HBcAb test are ineligible.

$^x$ HIV-1 and HIV-2 antibody test $^y$ EBV and CMV by quantitative PCR using peripheral blood samples. If local laboratory assessments are not available for quantitative PCR detection of active EBV and CMV, then samples may be analyzed at a central laboratory $^z$ For eligibility screening only, a sample for ANA, anti-dsDNA, and anti-Sm should be collected for analysis by local laboratory if a qualifying test has not been documented within the 12 months prior to screening.

$^{aa}$ For eligibility screening, a sample for B cell count (CD19+) should be collected for analysis by local laboratory. If the test is not available via local laboratory, the test may be analyzed via central laboratory.

$^{bb}$ Sample to be collected only on Day 1, not on Day 8.

$^{cc}$ Autoantibodies include ANA, anti-dsDNA, anti-Sm, anti-SSA (Ro), anti-SSB (La), and anti-RNP.

$^{dd}$ Mumps, rubella, varicella, tetanus, influenza, and *Streptococcus pneumonia*

$^{ee}$ Collect sample at Month 6 only $^{ff}$ If patient discontinuation from study occurs prior to Month 6

$^{gg}$ CRS-associated biomarkers: potentially including but not limited to IL-2, IL-8, IFN-γ, TNF-α

$^{hh}$ Collect sample at Month 12 only $^{ii}$ Using validated assays for mosunetuzumab $^{jj}$ Research may involve extraction of DNA and RNA for analysis of non-inherited BCR and TCR sequences and genomic profiling through use of NGS of a comprehensive panel of genes. NGS methods will not include WGS or WES.

Figure 7:
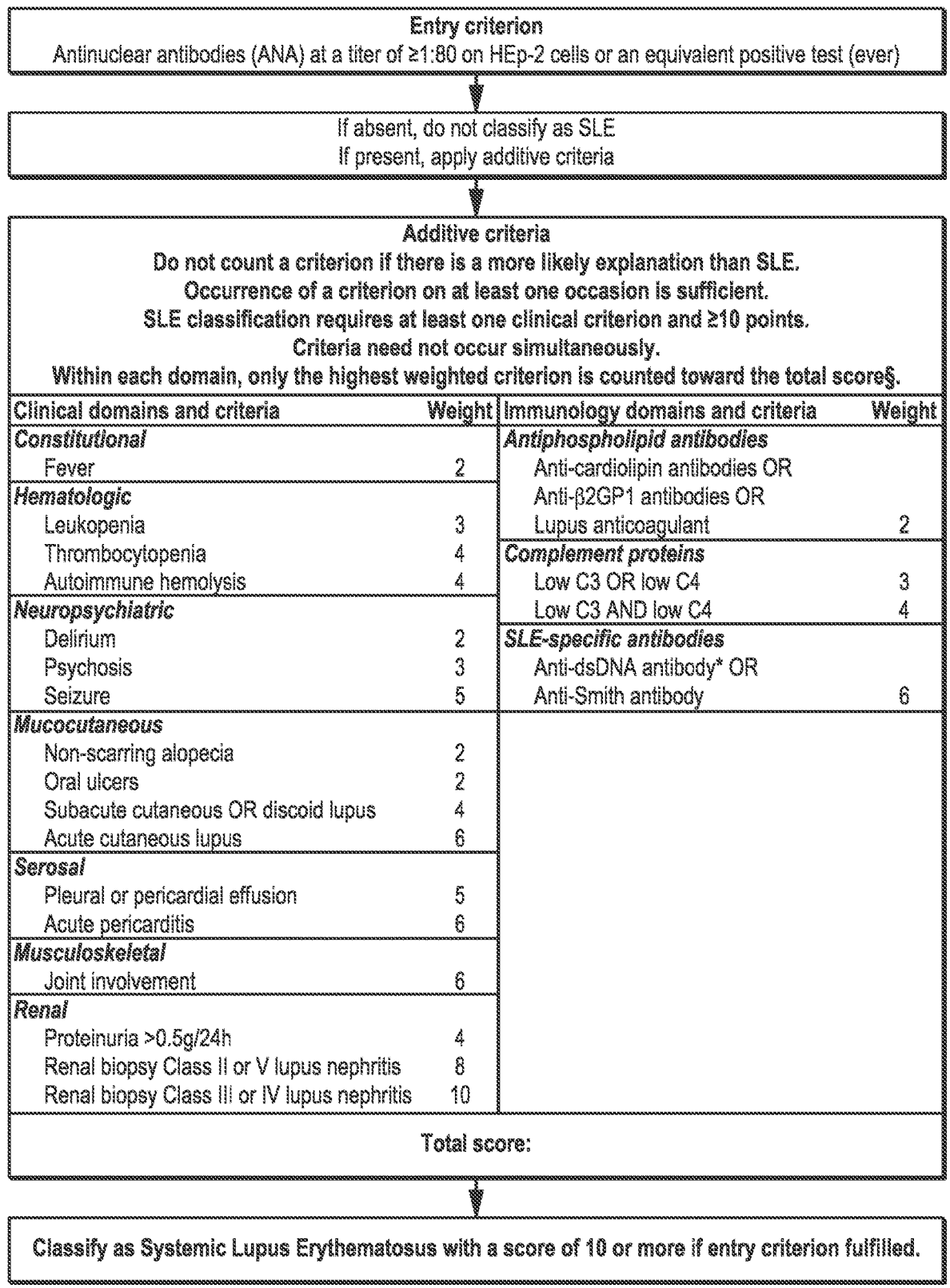

FIG. 7 shows the 2019 European League against Rheumatism (EULAR)/American College of Rheumatology (ACR) Classification Criteria for Systemic Lupus Erythematosus.

Figure 8:
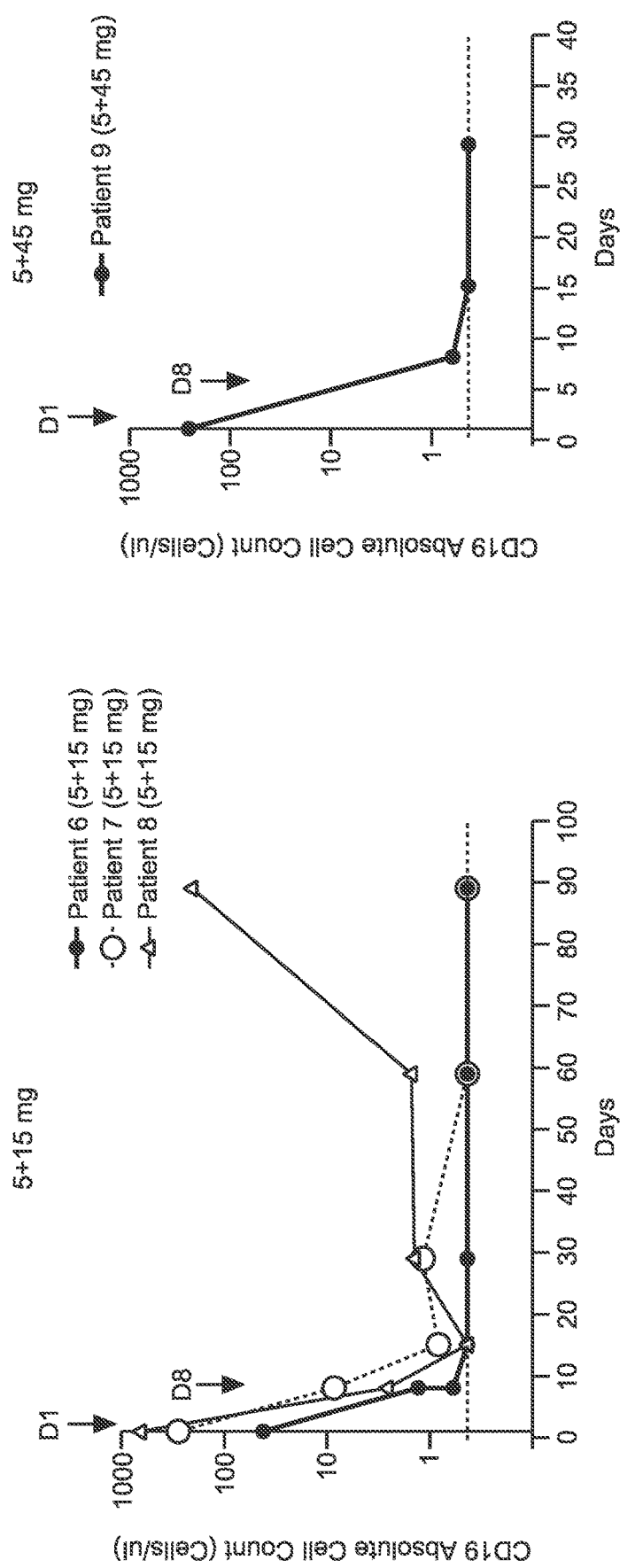

FIG. 8 shows B cell depletion in fractionated cohorts as disclosed in the Examples. The lower limit of quantitation was ≤0.441 cells/μL.

Figure 9:
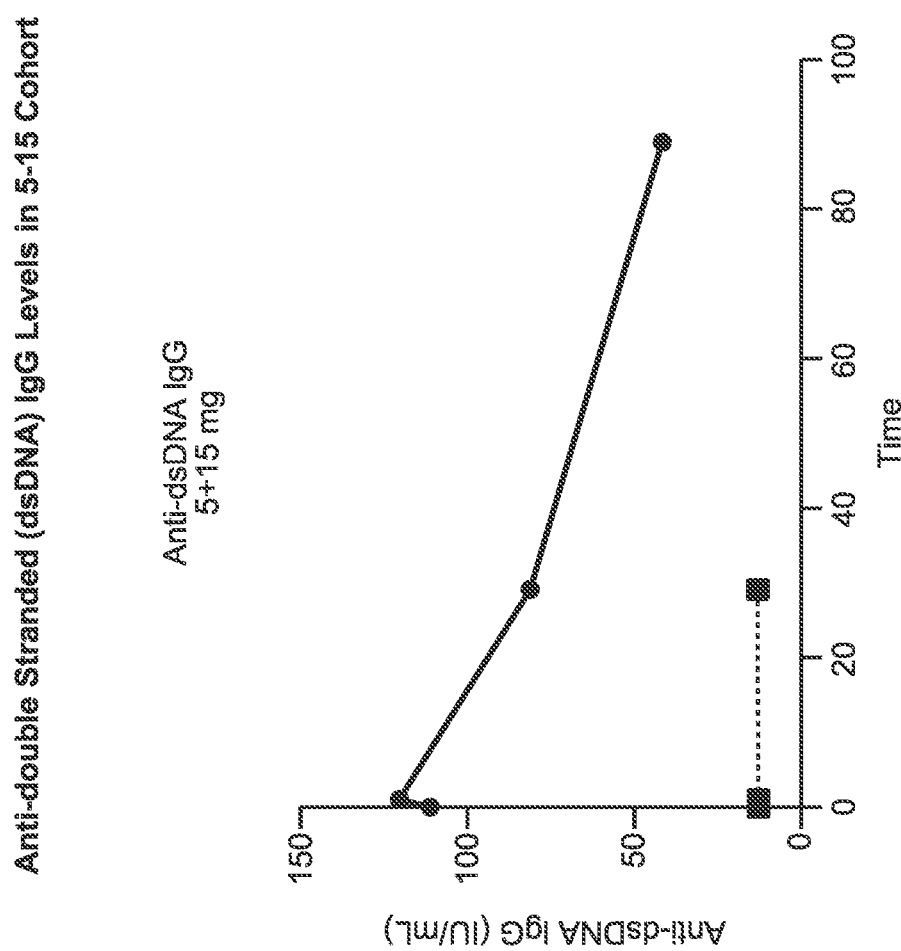

FIG. 9 shows anti-double stranded (dsDNA) antibody (IgG) levels in patients treated as according to the Examples.

Figure 10:
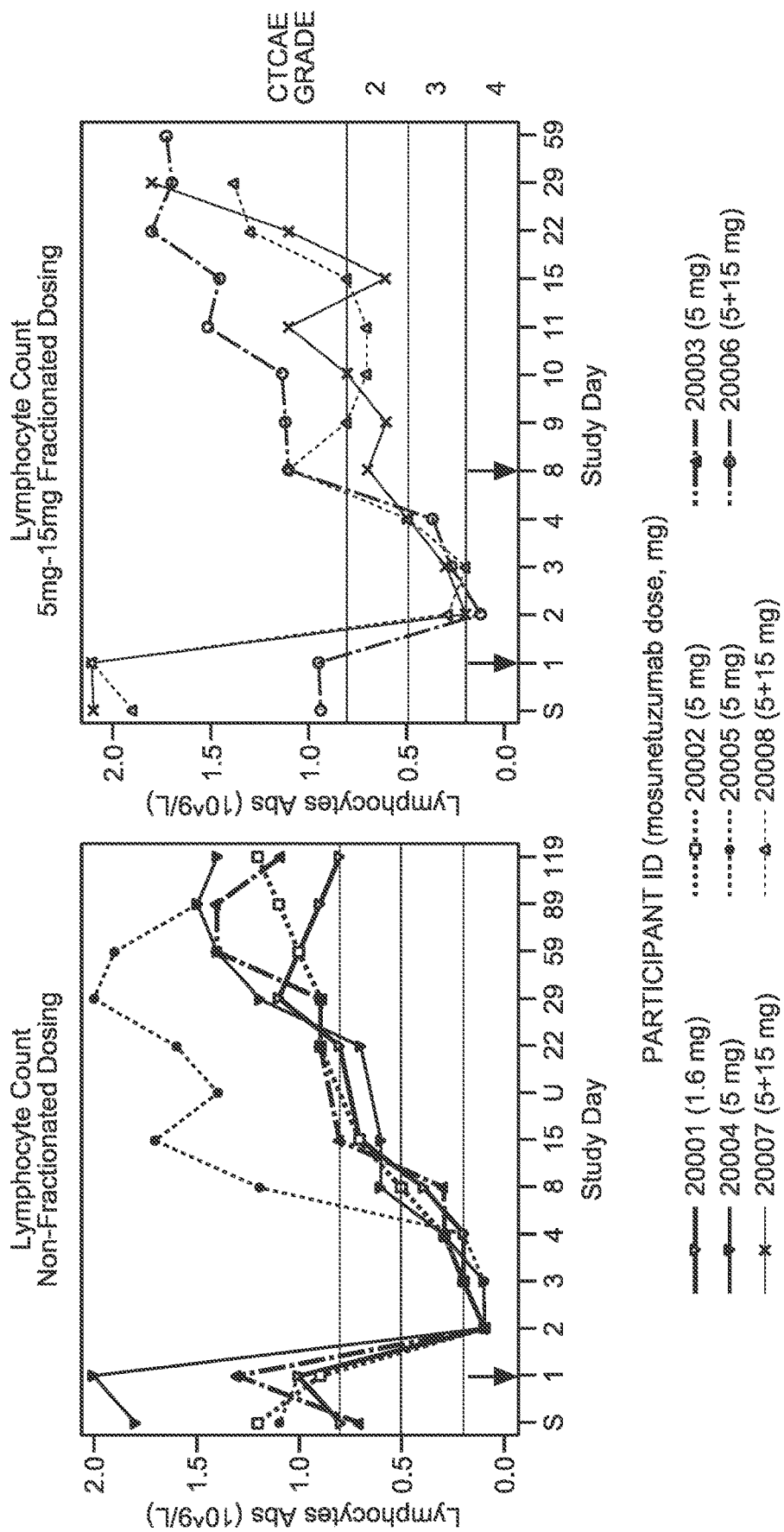

FIG. 10 shows a summary of safety date related to transient lymphopenia associated with mosunetuzumab of patients treated as according to the Examples.

DETAILED DESCRIPTION

I. General Techniques

The techniques and procedures described or referenced herein are generally well understood and commonly employed using conventional methodology by those skilled in the art, such as, for example, the widely utilized methodologies described in Sambrook et al., *Molecular Cloning: A Laboratory Manual* 3d edition (2001) Cold Spring Harbor Laboratory Press, Cold Spring Harbor, N.Y.; *Current Protocols in Molecular Biology* (F. M. Ausubel, et al. eds., (2003)); the series *Methods in Enzymology* (Academic Press, Inc.): *PCR 2: A Practical Approach* (M. J. MacPherson, B. D. Hames and G. R. Taylor eds. (1995)), Harlow and Lane, eds. (1988) *Antibodies, A Laboratory Manual, and Animal Cell Culture* (R. I. Freshney, ed. (1987)); *Oligonucleotide Synthesis* (M. J. Gait, ed., 1984); *Methods in Molecular Biology*, Humana Press; *Cell Biology: A Laboratory Notebook* (J. E. Cellis, ed., 1998) Academic Press; *Animal Cell Culture* (R. I. Freshney), ed., 1987); *Introduction to Cell and Tissue Culture* (J. P. Mather and P. E. Roberts, 1998) Plenum Press; *Cell and Tissue Culture: Laboratory Procedures* (A. Doyle, J. B. Griffiths, and D. G. Newell, eds., 1993-8) J. Wiley and Sons; *Handbook of Experimental Immunology* (D. M. Weir and C. C. Blackwell, eds.); *Gene Transfer Vectors for Mammalian Cells* (J. M. Miller and M. P. Calos, eds., 1987); *PCR: The Polymerase Chain Reaction*, (Mullis et al., eds., 1994); *Current Protocols in Immunology* (J. E. Coligan et al., eds., 1991); *Short Protocols in Molecular Biology* (Wiley and Sons, 1999); *Immunobiology* (C. A. Janeway and P. Travers, 1997); *Antibodies* (P. Finch, 1997); *Antibodies: A Practical Approach* (D. Catty., ed., IRL Press, 1988-1989); *Monoclonal Antibodies: A Practical Approach* (P. Shepherd and C. Dean, eds., Oxford University Press, 2000); *Using Antibodies: A Laboratory Manual* (E. Harlow and D. Lane (Cold Spring Harbor Laboratory Press, 1999); *The Antibodies* (M. Zanetti and J. D. Capra, eds., Harwood Academic Publishers, 1995); and *Cancer: Principles and Practice of Oncology* (V. T. DeVita et al., eds., J. B. Lippincott Company, 1993).

II. Definitions

It is to be understood that aspects and embodiments of the invention described herein include "comprising," "consisting," and "consisting essentially of" aspects and embodiments.

As used herein, the singular form "a," "an," and "the" includes plural references unless indicated otherwise.

The term "about" as used herein refers to the usual error range for the respective value readily known to the skilled person in this technical field. Reference to "about" a value or parameter herein includes (and describes) embodiments that are directed to that value or parameter per se.

A "disorder" is any condition that would benefit from treatment including, but not limited to, chronic and acute disorders or diseases including those pathological conditions which predispose the mammal to the disorder in question.

"Systemic lupus erythematosus" refers to an autoimmune rheumatic disease that occurs primarily in women of childbearing age. It is characterized by multisystem involvement and immunological abnormalities, including dysfunction of B cells and T cells. Much of the tissue damage is thought to occur through autoantibody formation and immune complex deposition, but the underlying cause remains unknown. Lupus nephritis is the most common target-organ manifestation. "SLE" refers to systemic lupus erythematosus.

"Lupus-associated neuropsychiatric diseases" include, but are not limited to meningitis, retinitis, cerebral vasculitis, myelopathy, demyelination syndromes, acute confusional state, psychosis, acute stroke or stroke syndrome, cranial neuropathy, status epilepticus or seizures, cerebellar ataxia, and mononeuritis multiplex.

"Overlap syndrome" refers to inflammatory rheumatic conditions. Most commonly involved in overlap syndromes is rheumatoid arthritis, scleroderma, lupus, and myositis. "Mixed connective tissue disease" refers to a manifestation of overlap syndrome that is defined by anti-U1 ribonucleoprotein autoimmunity with features of at least two of rheumatoid arthritis, lupus, scleroderma, and myositis.

"Antiphospholipid overlap syndrome" refers to an autoimmune disorder wherein anti-self phospholipid antibodies attack phospholipids. Symptoms are vary and can include blood clots, miscarriage, rash, chronic headaches, dementia, and seizures. "Severe antiphospholipid overlap syndrome" is an antiphospholipid overlap syndrome that is difficult to treat with conventional therapies. "Catastrophic antiphospholipid overlap syndrome" refers to a rare form of antiphospholipid overlap syndrome where multiple blood clots form throughout the body over a brief time period, often resulting in organ failure if untreated. Antiphospholipid overlap syndrome is often treated with anticoagulant therapy.

"Anticoagulant therapies" can include, for example, (oral) vitamin K antagonists (e.g., warfarin) and direct oral anticoagulants (such as rivaroxaban, apixaban and dabigatran).

"CD19" refers to "cluster of differentiation 19" and is expressed in the whole B lineage from the pro B cell to the mature B cell, it is not shed, is uniformly expressed on all lymphoma cells, and is absent from stem cells. "Anti-CD19 antibody therapy" indicates a therapy that administers an anti-CD19 antibody to a patient. An example of such therapy is the administration of blinatumab.

"Janus kinase inhibitor" refers to a compound that inhibits an activity of a Janus kinase ("JAK"), such as JAK1, JAK2, JAK3, and TYK2 (tyrosine kinase 2). Common Janus kinase inhibitors include baricitinib, tofacitinib, upadacitinib, and filgotinib, ibrutinib, of fenebrutinib.

"Bruton tyrosine kinase inhibitor" refers to an inhibitor of Bruton tyrosine kinase activity. Examples include ibrutinib, acalabrutinib, and zanubrutinib.

As used herein, "treatment" (and grammatical variations thereof, such as "treat" or "treating") refers to clinical intervention in an attempt to alter the natural course of the patient being treated, and can be performed either for prophylaxis or during the course of clinical pathology. Desirable effects of treatment include, but are not limited to, preventing occurrence or recurrence of disease, alleviation of symptoms, diminishment of any direct or indirect pathological consequences of the disease, decreasing the rate of disease progression, amelioration or palliation of the disease state, and remission or improved prognosis. In some embodiments, antibodies are used to delay development of a disease or to slow the progression of a disease.

As used herein, "delaying progression" of a disorder or disease means to defer, hinder, slow, retard, stabilize, and/or postpone development of the disease or disorder (e.g., systemic lupus erythematosus). This delay can be of varying lengths of time, depending on the history of the disease and/or patient being treated. As is evident to one skilled in the art, a sufficient or significant delay can, in effect, encompass prevention, in that the patient does not develop the disease.

By "reduce" or "inhibit" is meant the ability to cause an overall decrease, for example, of 20%, 30%, 40%, 50%, 60%, 70%, 75%, 80%, 85%, 90%, 95%, or greater. For clarity the term includes also reduction to zero (or below the detection limit of the analytical method), i.e., complete abolishment or elimination. In certain embodiments, reduce or inhibit can refer to the reduction or inhibition of undesirable events, such as cytokine-driven toxicities (e.g., cytokine release syndrome (CRS)), infusion-related reactions (IRRs), macrophage activation syndrome (MAS), neurologic toxicities, severe Tumor lysis syndrome (TLS), neutropenia, thrombocytopenia, elevated liver enzymes, and/or central nervous system (CNS) toxicities, following treatment with an anti-CD20/anti-CD3 bispecific antibody. In other embodiments, reduce or inhibit can refer to effector function of an antibody that is mediated by the antibody Fc region, such effector functions specifically including complement-dependent cytotoxicity (CDC), antibody-dependent cellular cytotoxicity (ADCC), and antibody-dependent cellular phagocytosis (ADCP). In other embodiments reduce or inhibit can refer to the symptoms of systemic lupus erythematosus.

As used herein, "administering" is meant a method of giving a dosage of a compound (e.g., a bispecific antibody)

or a composition (e.g., a pharmaceutical composition, e.g., a pharmaceutical composition including a bispecific antibody) to a patient. The compounds and/or compositions utilized in the methods described herein can be administered intravenously (e.g., by intravenous infusion).

A "fixed dose" or "flat dose" refers to a dose of a therapeutic agent (e.g., a bispecific antibody) herein that is administered to a patient without regard for the weight or body surface area (BSA) of the patient. The fixed or flat dose is therefore not provided as a mg/kg dose or a mg/m² dose, but rather as an absolute amount of the therapeutic agent (e.g., mg).

"Stable dose" refers to a dose that is consistent for a period of time, e.g., 40 mg/day of a drug for seven days. The period of time can be as short as a few days and as longs as many years. In opposition is an "adjustable dose."

A "patient" is a mammal. Mammals include, but are not limited to, primates (e.g., humans and non-human primates such as monkeys), domesticated animals (e.g., cows, sheep, cats, dogs, and horses), rabbits, and rodents (e.g., mice and rats). In certain embodiments, the patient or patient is a human.

"Patient response" or "response" refers to a response that can be assessed using any endpoint indicating a benefit to the patient, including, without limitation, inhibition, to some extent, of disease progression. Responses to therapy or treatment of systemic lupus erythematosus can be assessed, for example, using
  Patient Global Impression of Severity (PGI-S),
  a Physician Global Assessment (PGA),
  a change in titer of antinuclear antibody (ANA),
  a change in titer of Anti-double stranded DNA (dsDNA) antibodies,
  a change in complement C3, and/or
  a change in complement C4.

A "Patient Global Impression of Severity" or "PGI-S" refers to a single-item question that asks the patient how they would rate their overall lupus severity over the past week. The form asks, "[[p]]lease choose the response below that best describes the severity of your Lupus over the past week." There are five categories of response: (1) none, (2) mild, (3) moderate, (4) severe, and (5) very severe. An example is shown in FIG. 3.

Figure 4:
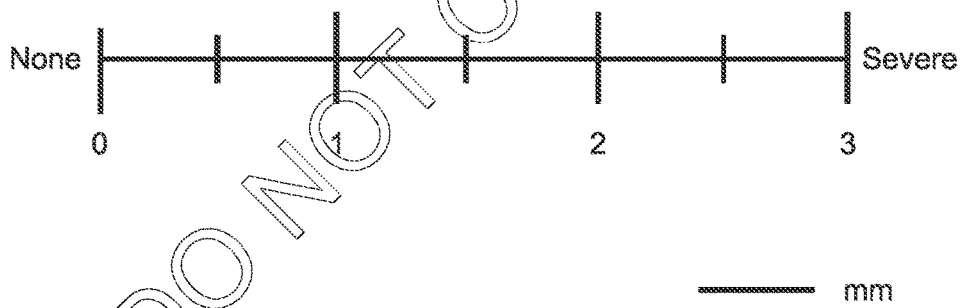
FIG. 4 shows an example of a Physician's Global Assessment (PGA) form, not to scale, as discussed in the disclosure, including the examples.

"Physician Global Assessment" or "PGA" refers to an evaluation instrument to be used by a physician when assessing a patient regarding the patient's systemic lupus erythematosus. The form ask, "Please answer the following questions by placing a vertical mark though the line (the "line" depicts a subdivided scale from None (0) to 3 (Severe). The question asked is, "On the line below, where would you rate the subject's SLE over the past 28 days?" An example is shown in FIG. 4.

"Antinuclear antibodies" (ANAs) refer to a diverse group of autoantibodies that recognize nuclear macromolecules and their complexes. ANAs represent key biomarkers in the evaluation of rheumatic diseases, such as systemic lupus erythematosus.

"Anti-double stranded DNA (dsDNA) antibodies" means a group of autoantibodies that recognize double stranded DNA (dsDNA).

An "effective amount" is at least the minimum concentration required to effect a measurable improvement or prevention of a particular disorder. An effective amount herein may vary according to factors such as the disease state, age, sex, and weight of the patient, and the ability of the antibody to elicit a desired response in the individual. An effective amount is also one in which any toxic or detrimental effects of the treatment are outweighed by the therapeutically beneficial effects. For prophylactic use, beneficial or desired results include results such as eliminating or reducing the risk, lessening the severity, or delaying the onset of the disease, including biochemical, histological and/or behavioral symptoms of the disease, its complications and intermediate pathological phenotypes presenting during development of the disease. For therapeutic use, beneficial or desired results include clinical results such as decreasing one or more symptoms resulting from the disease, increasing the quality of life of those suffering from the disease, decreasing the dose of other medications required to treat the disease, enhancing effect of another medication such as via targeting, delaying the progression of the disease, and/or prolonging survival. In the case of lupus nephritis, an effective amount of the drug may have the effect in and/or relieving to some extent one or more of the symptoms associated with the disorder. An effective amount can be administered in one or more administrations. For purposes of this invention, an effective amount of drug, compound, or pharmaceutical composition is an amount sufficient to accomplish prophylactic or therapeutic treatment either directly or indirectly. As is understood in the clinical context, an effective amount of a drug, compound, or pharmaceutical composition may or may not be achieved in conjunction with another drug, compound, or pharmaceutical composition. Thus, an "effective amount" may be considered in the context of administering one or more therapeutic agents, and a single agent may be considered to be given in an effective amount if, in conjunction with one or more other agents, a desirable result may be or is achieved.

An "effective response of a subject" or a patient's "responsiveness" to treatment with a medicament and similar wording refers to the clinical or therapeutic benefit imparted to a patient as risk for, or suffering from, a disease or disorder, such as systemic lupus erythematosus. In one embodiment, such benefit includes reducing or eliminating any symptom of systemic lupus erythematosus or a change in a biomarker associated with systemic lupus erythematosus that trends to, or achieves, a healthy value.

A patient who "does not have an effective response to treatment" refers to a patient who does not have improving signs or symptoms of systemic lupus erythematosus.

The term "antibody" herein is used in the broadest sense and encompasses various antibody structures, including but not limited to monoclonal antibodies, polyclonal antibodies, multispecific antibodies (e.g., bispecific antibodies), and antibody fragments so long as they exhibit the desired antigen-binding activity.

An "antibody fragment" refers to a molecule other than an intact antibody that comprises a portion of an intact antibody that binds the antigen to which the intact antibody binds. Examples of antibody fragments include but are not limited to Fv, Fab, Fab', Fab'-SH, F(ab')$_2$; diabodies; linear antibodies; single-chain antibody molecules (e.g., scFv); and multispecific antibodies formed from antibody fragments.

The terms "full-length antibody," intact antibody," and "whole antibody" are used herein interchangeably to refer to an antibody having a structure substantially similar to a native antibody structure or having heavy chains that contain an Fc region as defined herein.

By "binding domain" is meant a part of a compound or a molecule that specifically binds to a target epitope, antigen, ligand, or receptor. Binding domains include but are not limited to antibodies (e.g., monoclonal, polyclonal, recombinant, humanized, and chimeric antibodies), antibody fragments or portions thereof (e.g., Fab fragments, Fab'$_2$, scFv antibodies, SMIP, domain antibodies, diabodies, minibodies, scFv-Fc, affibodies, nanobodies, and VH and/or VL domains of antibodies), receptors, ligands, aptamers, and other molecules having an identified binding partner.

The term "Fc region" herein is used to define a C-terminal region of an immunoglobulin heavy chain that contains at least a portion of the constant region. The term includes native sequence Fc regions and variant Fc regions. In one embodiment, a human IgG heavy chain Fc region extends from Cys226, or from Pro230, to the carboxyl-terminus of the heavy chain. However, the C-terminal lysine (Lys447) of the Fc region may or may not be present. Unless otherwise specified herein, numbering of amino acid residues in the Fc region or constant region is according to the EU numbering system, also called the EU index, as described in Kabat et al. (1991).

The "class" of an antibody refers to the type of constant domain or constant region possessed by its heavy chain. There are five major classes of antibodies: IgA, IgD, IgE, IgG, and IgM, and several of these may be further divided into subclasses (isotypes), e.g., $IgG_1$, $IgG_2$, $IgG_3$, $IgG_4$, $IgA_1$, and $IgA_2$. The heavy chain constant domains that correspond to the different classes of immunoglobulins are called a, d, e, g, and m, respectively.

The term IgG "isotype" or "subclass" as used herein is meant any of the subclasses of immunoglobulins defined by the chemical and antigenic characteristics of their constant regions.

"Framework" or "FR" refers to variable domain residues other than hypervariable region (HVR) residues. The FR of a variable domain generally consists of four FR domains: FR1, FR2, FR3, and FR4. Accordingly, the HVR and FR sequences generally appear in the following sequence in VH (or VL): FR1-H1(L1)-FR2-H2(L2)-FR3-H3(L3)-FR4.

A "human consensus framework" is a framework which represents the most commonly occurring amino acid residues in a selection of human immunoglobulin VL or VH Framework sequences. Generally, the selection of human immunoglobulin VL or VH sequences is from a subgroup of variable domain sequences. Generally, the subgroup of sequences is a subgroup as in Kabat et al., *Sequences of Proteins of Immunological Interest*, Fifth Edition, NIH Publication 91-3242, Bethesda MD (1991), vols. 1-3. In one embodiment, for the VL, the subgroup is subgroup kappa I as in Kabat et al., supra. In one embodiment, for the VH, the subgroup is subgroup III as in Kabat et al., supra.

An "acceptor human framework" for the purposes herein is a Framework comprising the amino acid sequence of a light chain variable domain (VL) Framework or a heavy chain variable domain (VH) Framework derived from a human immunoglobulin Framework or a human consensus Framework, as defined below. An acceptor human Framework "derived from" a human immunoglobulin Framework or a human consensus Framework may comprise the same amino acid sequence thereof, or it may contain amino acid sequence changes. In some embodiments, the number of amino acid changes are 10 or less, 9 or less, 8 or less, 7 or less, 6 or less, 5 or less, 4 or less, 3 or less, or 2 or less. In some embodiments, the VL acceptor human Framework is identical in sequence to the VL human immunoglobulin Framework sequence or human consensus Framework sequence.

A "humanized" antibody refers to a chimeric antibody comprising amino acid residues from non-human HVRs and amino acid residues from human FRs. In certain embodiments, a humanized antibody will comprise substantially all of at least one, and typically two, variable domains, in which all or substantially all of the HVRs (e.g., CDRs) correspond to those of a non-human antibody, and all or substantially all of the FRs correspond to those of a human antibody. A humanized antibody optionally may comprise at least a portion of an antibody constant region derived from a human antibody. A "humanized form" of an antibody, e.g., a non-human antibody, refers to an antibody that has undergone humanization.

A "human antibody" is one which possesses an amino acid sequence which corresponds to that of an antibody produced by a human or a human cell or derived from a non-human source that utilizes human antibody repertoires or other human antibody-encoding sequences. This definition of a human antibody specifically excludes a humanized antibody comprising non-human antigen-binding residues. Human antibodies can be produced using various techniques known in the art, including phage-display libraries. Hoogenboom and Winter, *J. Mol. Biol.*, 227:381 (1991); Marks et al., *J. Mol. Biol.*, 222:581 (1991). Also available for the preparation of human monoclonal antibodies are methods described in Cole et al., *Monoclonal Antibodies and Cancer Therapy*, Alan R. Liss, p. 77 (1985); Boerner et al., *J. Immunol.*, 147(1):86-95 (1991). See also van Dijk and van de Winkel, *Curr. Opin. Pharmacol.*, 5: 368-74 (2001). Human antibodies can be prepared by administering the antigen to a transgenic animal that has been modified to produce such antibodies in response to antigenic challenge, but whose endogenous loci have been disabled, e.g., immunized xenomice (see, e.g., U.S. Pat. Nos. 6,075,181 and 6,150,584 regarding XENOMOUSE™ technology). See also, for example, Li et al., *Proc. Natl. Acad. Sci. USA*, 103:3557-3562 (2006) regarding human antibodies generated via a human B-cell hybridoma technology.

The term "variable region" or "variable domain" refers to the domain of an antibody heavy or light chain that is involved in binding the antibody to antigen. The variable domains of the heavy chain and light chain (VH and VL, respectively) of a native antibody generally have similar structures, with each domain comprising four conserved Framework regions (FRs) and three hypervariable regions (HVRs). (See, e.g., Kindt et al. *Kuby Immunology*, $6^{th}$ ed., W.H. Freeman and Co., page 91 (2007).) A single VH or VL domain may be sufficient to confer antigen-binding specificity. Furthermore, antibodies that bind a particular antigen may be isolated using a VH or VL domain from an antibody that binds the antigen to screen a library of complementary VL or VH domains, respectively. See, e.g., Portolano et al., *J. Immunol.* 150:880-887 (1993); Clarkson et al., *Nature* 352:624-628 (1991).

The term "hypervariable region" or "HVR" as used herein refers to each of the regions of an antibody variable domain which are hypervariable in sequence ("complementarity determining regions" or "CDRs") and/or form structurally defined loops ("hypervariable loops") and/or contain the antigen-contacting residues ("antigen contacts"). Generally, antibodies comprise six HVRs: three in the VH (H1, H2, H3), and three in the VL (L1, L2, L3). Exemplary HVRs herein include:
 1. hypervariable loops occurring at amino acid residues 26-32 (L1), 50-52 (L2), 91-96 (L3), 26-32 (H1), 53-55 (H2), and 96-101 (H3) (Chothia and Lesk, *J. Mol. Biol.* 196:901-917 (1987));
 2. CDRs occurring at amino acid residues 24-34 (L1), 50-56 (L2), 89-97 (L3), 31-35b (H1), 50-65 (H2), and 95-102 (H3) (Kabat et al., *Sequences of Proteins of Immunological Interest,* 5th Ed. Public Health Service, National Institutes of Health, Bethesda, MD (1991));

3. antigen contacts occurring at amino acid residues 27c-36 (L1), 46-55 (L2), 89-96 (L3), 30-35b (H1), 47-58 (H2), and 93-101 (H3) (MacCallum et al. *J. Mol. Biol.* 262: 732-745 (1996)); and
4. combinations of (1), (2), and/or (3), including HVR amino acid residues 46-56 (L2), 47-56 (L2), 48-56 (L2), 49-56 (L2), 26-35 (H1), 26-35b (H1), 49-65 (H2), 93-102 (H3), and 94-102 (H3).

Unless otherwise indicated, HVR residues and other residues in the variable domain (e.g., FR residues) are numbered herein according to Kabat et al., supra.

The term an "isolated antibody" when used to describe the various antibodies disclosed herein, means an antibody that has been identified and separated and/or recovered from a cell or cell culture from which it was expressed. Contaminant components of its natural environment are materials that would typically interfere with diagnostic or therapeutic uses for the polypeptide, and can include enzymes, hormones, and other proteinaceous or non-proteinaceous solutes. In some embodiments, an antibody is purified to greater than 95% or 99% purity as determined by, for example, electrophoretic (e.g., SDS-PAGE, isoelectric focusing (IEF), capillary electrophoresis) or chromatographic (e.g., ion exchange or reverse phase HPLC). For a review of methods for assessment of antibody purity, see, e.g., Flatman et al., *J. Chromatogr. B* 848:79-87 (2007). In preferred embodiments, the antibody will be purified (1) to a degree sufficient to obtain at least 15 residues of N-terminal or internal amino acid sequence by use of a spinning cup sequenator, or (2) to homogeneity by SDS-PAGE under non-reducing or reducing conditions using Coomassie blue or, preferably, silver stain. Isolated antibody includes antibodies in situ within recombinant cells, because at least one component of the polypeptide natural environment will not be present. Ordinarily, however, isolated polypeptide will be prepared by at least one purification step.

The term "monoclonal antibody" as used herein refers to an antibody obtained from a population of substantially homogeneous antibodies, i.e., the patient antibodies comprising the population are identical and/or bind the same epitope, except for possible variant antibodies, e.g., containing naturally occurring mutations or arising during production of a monoclonal antibody preparation, such variants generally being present in minor amounts. In contrast to polyclonal antibody preparations, which typically include different antibodies directed against different determinants (epitopes), each monoclonal antibody of a monoclonal antibody preparation is directed against a single determinant on an antigen. Thus, the modifier "monoclonal" indicates the character of the antibody as being obtained from a substantially homogeneous population of antibodies, and is not to be construed as requiring production of the antibody by any particular method. For example, the monoclonal antibodies to be used in accordance with the present invention may be made by a variety of techniques, including but not limited to the hybridoma method, recombinant DNA methods, phage-display methods, and methods utilizing transgenic animals containing all or part of the human immunoglobulin loci, such methods and other exemplary methods for making monoclonal antibodies being described herein.

"Affinity" refers to the strength of the sum total of noncovalent interactions between a single binding site of a molecule (e.g., an antibody) and its binding partner (e.g., an antigen). Unless indicated otherwise, as used herein, "binding Affinity" refers to intrinsic binding Affinity which reflects a 1:1 interaction between members of a binding pair (e.g., antibody and antigen). The Affinity of a molecule X for its partner Y can generally be represented by the dissociation constant (Kd). Affinity can be measured by common methods known in the art, including those described herein. Specific illustrative and exemplary embodiments for measuring binding affinity are described in the following.

An "affinity matured" antibody refers to an antibody with one or more alterations in one or more hypervariable regions (HVRs), compared to a parent antibody which does not possess such alterations, such alterations resulting in an improvement in the affinity of the antibody for antigen.

The terms "anti-CD3 antibody" and "an antibody that binds to CD3" refer to an antibody that is capable of binding CD3 with sufficient Affinity such that the antibody is useful as a diagnostic and/or therapeutic agent in targeting CD3. In one embodiment, the extent of binding of an anti-CD3 antibody to an unrelated, non-CD3 protein is less than about 10% of the binding of the antibody to CD3 as measured, e.g., by a radioimmunoassay (RIA). In certain embodiments, an antibody that binds to CD3 has a dissociation constant ($K_D$) of ≤1 µM, ≤100 nM, ≤10 nM, ≤1 nM, ≤0.1 nM, ≤0.01 nM, or ≤0.001 nM (e.g., $10^{-8}$M or less, e.g., from $10^{-8}$ M to $10^{-13}$M, e.g., from $10^{-9}$M to $10^{-13}$ M). In certain embodiments, an anti-CD3 antibody binds to an epitope of CD3 that is conserved among CD3 from different species.

The term "cluster of differentiation 3" or "CD3," as used herein, refers to any native CD3 from any vertebrate source, including mammals such as primates (e.g., humans) and rodents (e.g., mice and rats), unless otherwise indicated, including, for example, CD3ε, CD3γ, CD3α, and CD3β chains. The term encompasses "full-length," unprocessed CD3 (e.g., unprocessed or unmodified CD3ε or CD3γ), as well as any form of CD3 that results from processing in the cell. The term also encompasses naturally occurring variants of CD3, including, for example, splice variants or allelic variants. CD3 includes, for example, human CD3ε protein (NCBI RefSeq No. NP_000724), which is 207 amino acids in length, and human CD3γ protein (NCBI RefSeq No. NP_000064), which is 182 amino acids in length.

The terms "anti-CD20 antibody" and "an antibody that binds to CD20" refer to an antibody that is capable of binding CD20 with sufficient Affinity such that the antibody is useful as a diagnostic and/or therapeutic agent in targeting CD20. In one embodiment, the extent of binding of an anti-CD20 antibody to an unrelated, non-CD20 protein is less than about 10% of the binding of the antibody to CD20 as measured, e.g., by a radioimmunoassay (RIA). In certain embodiments, an antibody that binds to CD20 has a dissociation constant (Kd) of ≤1 µM, ≤100 nM, ≤10 nM, ≤1 nM, ≤0.1 nM, ≤0.01 nM, or ≤0.001 nM (e.g., $10^{-8}$ M or less, e.g., from $10^{-8}$M to $10^{-13}$M, e.g., from $10^{-9}$M to $10^{-13}$ M). In certain embodiments, an anti-CD20 antibody binds to an epitope of CD20 that is conserved among CD20 from different species.

The term "cluster of differentiation 20" or "CD20," as used herein, refers to any native CD20 from any vertebrate source, including mammals such as primates (e.g., humans) and rodents (e.g., mice and rats), unless otherwise indicated. The term encompasses "full-length," unprocessed CD20, as well as any form of CD20 that results from processing in the cell. The term also encompasses naturally occurring variants of CD20, including, for example, splice variants or allelic variants. CD20 includes, for example, human CD20 protein (see, e.g., NCBI RefSeq Nos. NP_068769.2 and NP_690605.1), which is 297 amino acids in length and may be generated, for example, from variant mRNA transcripts that lack a portion of the 5' UTR (see, e.g., NCBI RefSeq No.

NM_021950.3) or longer variant mRNA transcripts (see, e.g., NCBI RefSeq No. NM_152866.2).

"Anti-CD20 monoclonal antibody therapy" refers to the administering of an anti-CD20 monoclonal antibody to a patient. Examples include obinutuzumab, rituximab, ocrelizumab, and ofatumumab.

The terms "anti-CD20/anti-CD3 bispecific antibody," "bispecific anti-CD20/anti-CD3 antibody," and "antibody that binds to CD20 and CD3," or variants thereof, refer to a multispecific antibody (e.g., a bispecific antibody) that is capable of binding to CD20 and CD3 with sufficient Affinity such that the antibody is useful as a diagnostic and/or therapeutic agent in targeting CD20 and/or CD3. In one embodiment, the extent of binding of a bispecific antibody that binds to CD20 and CD3 to an unrelated, non-CD3 protein and/or non-CD20 protein is less than about 10% of the binding of the antibody to CD3 and/or CD20 as measured, e.g., by a radioimmunoassay (RIA). In certain embodiments, a bispecific antibody that binds to CD20 and CD3 has a dissociation constant (Kd) of $\leq 1$ µM, $\leq 100$ nM, $\leq 10$ nM, $\leq 1$ nM, $\leq 0.1$ nM, $\leq 0.01$ nM, or $\leq 0.001$ nM (e.g., $10^{-8}$ M or less, e.g., from $10^{-8}$ M to $10^{-13}$ M, e.g., from $10^{-9}$ M to $10^{-13}$ M). In certain embodiments, a bispecific antibody that binds to CD20 and CD3 binds to an epitope of CD3 that is conserved among CD3 from different species and/or an epitope of CD20 that is conserved among CD20 from different species. In one embodiment, the bispecific antibody binds monovalently to CD20 and binds monovalently to CD3. In one embodiment, a bispecific antibody that binds to CD20 and CD3 is mosunetuzumab.

As used herein, the term "mosunetuzumab" refers to an anti-CD20/anti-CD3 bispecific antibody having the International Nonproprietary Names for Pharmaceutical Substances (INN) List 117 (WHO Drug Information, Vol. 31, No. 2, 2017, p. 303), or the CAS Registry Number 1905409-39-3.

As used herein, the term "binds," "specifically binds to," or is "specific for" refers to measurable and reproducible interactions such as binding between a target and an antibody, which is determinative of the presence of the target in the presence of a heterogeneous population of molecules including biological molecules. For example, an antibody that specifically binds to a target (which can be an epitope) is an antibody that binds this target with greater Affinity, avidity, more readily, and/or with greater duration than it binds to other targets. In one embodiment, the extent of binding of an antibody to an unrelated target is less than about 10% of the binding of the antibody to the target as measured, for example, by a radioimmunoassay (RIA). In certain embodiments, an antibody that specifically binds to a target has a dissociation constant ($K_D$) of $\leq 1$ µM, $\leq 100$ nM, $\leq 10$ nM, $\leq 1$ nM, or $\leq 0.1$ nM. In certain embodiments, an antibody specifically binds to an epitope on a protein that is conserved among the protein from different species. In another embodiment, specific binding can include, but does not require exclusive binding. The term as used herein can be exhibited, for example, by a molecule having a $K_D$ for the target of $10^{-4}$ M or lower, alternatively $10^{-5}$ M or lower, alternatively $10^{-6}$ M or lower, alternatively $10^{-7}$ M or lower, alternatively $10^{-8}$ M or lower, alternatively $10^{-9}$ M or lower, alternatively $10^{-10}$ M or lower, alternatively $10^{-11}$ M or lower, alternatively $10^{-12}$ M or lower or a $K_D$ in the range of $10^{-4}$ M to $10^{-6}$ M or $10^{-6}$ M to $10^{-10}$ M or $10^{-7}$ M to $10^{-9}$ M. As will be appreciated by the skilled artisan, Affinity and $K_D$ values are inversely related. A high Affinity for an antigen is measured by a low $K_D$ value. In one embodiment, the term "specific binding" refers to binding where a molecule binds to a particular polypeptide or epitope on a particular polypeptide without substantially binding to any other polypeptide or polypeptide epitope.

"Percent (%) amino acid sequence identity" with respect to a reference polypeptide sequence is defined as the percentage of amino acid residues in a candidate sequence that are identical with the amino acid residues in the reference polypeptide sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN or MEGALIGN® (DNASTAR®) software. Those skilled in the art can determine appropriate parameters for aligning sequences, including any algorithms needed to achieve maximal alignment over the full length of the sequences being compared. For purposes herein, however, % amino acid sequence identity values are generated using the sequence comparison computer program ALIGN-2. The ALIGN-2 sequence comparison computer program was authored by Genentech, Inc., and the source code has been filed with user documentation in the U.S. Copyright Office, Washington D.C., 20559, where it is registered under U.S. Copyright Registration No. TXU510087. The ALIGN-2 program is publicly available from Genentech, Inc., South San Francisco, California, or may be compiled from the source code. The ALIGN-2 program should be compiled for use on a UNIX® operating system, including digital UNIX® V4.0D. All sequence comparison parameters are set by the ALIGN-2 program and do not vary.

In situations where ALIGN-2 is employed for amino acid sequence comparisons, the % amino acid sequence identity of a given amino acid sequence A to, with, or against a given amino acid sequence B (which can alternatively be phrased as a given amino acid sequence A that has or comprises a certain % amino acid sequence identity to, with, or against a given amino acid sequence B) is calculated as follows:

$$100 \text{ times the fraction } X/Y$$

where X is the number of amino acid residues scored as identical matches by the sequence alignment program ALIGN-2 in that program's alignment of A and B, and where Y is the total number of amino acid residues in B. It will be appreciated that where the length of amino acid sequence A is not equal to the length of amino acid sequence B, the % amino acid sequence identity of A to B will not equal the % amino acid sequence identity of B to A. Unless specifically stated otherwise, all % amino acid sequence identity values used herein are obtained as described in the immediately preceding paragraph using the ALIGN-2 computer program.

The term "pharmaceutical formulation" refers to a preparation which is in such form as to permit the biological activity of an active ingredient contained therein to be effective, and which contains no additional components which are unacceptably toxic to a patient to which the formulation would be administered.

A "pharmaceutically acceptable carrier" refers to an ingredient in a pharmaceutical formulation, other than an active ingredient, which is nontoxic to a patient. A pharmaceutically acceptable carrier includes, but is not limited to, a buffer, excipient, stabilizer, or preservative.

The term "package insert" is used to refer to instructions customarily included in commercial packages of therapeutic products, that contain information about the indications, usage, dosage, administration, combination therapy, contraindications and/or warnings concerning the use of such therapeutic products.

III. Therapeutic Methods

Provided herein are methods of treating a patient having systemic lupus erythematosus comprising administering a regimen of mosunetuzumab.

A. Characteristics of Systemic Lupus Erythematosus

Systemic lupus erythematosus is an unpredictable disease that is characterized by alternating periods of remission and a wide variety of clinical manifestations that may affect any organ (Fortuna G, Brennan M T. Systemic lupus erythematosus: epidemiology, pathophysiology, manifestations, and management. *Dent Clin North Am.* 2013; 57(4):631-655). Accordingly, there are two major categories: (1) constitutional and (2) organ sign/symptoms. The remainder of this section refers to Fortuna and Brennan, ibid.).

The constitutional category includes fatigue (80-100% of all patients), which appears correlated to depression, stress, anemia, smoking habits, sedentary lifestyle, sleep, and coexistent fibromyalgia. In addition, fever is observed in about 50% of systemic lupus erythematosus patients, which may be the result of the disease, a drug reaction, or a systemic lupus erythematosus-induced infection. Finally weigh loss is often observed before diagnosis of systemic lupus erythematosus; observed weight gain after diagnosis seems to relate to the side effects of corticosteroid treatments.

Organ signs/symptoms are more numerous. They include:

Musculoskeletal: arthralgia (often migratory), arthritis (often migratory), osteonecrosis avascular necrosis of bone and myopathy.

Renal: due to direct damage from systemic lupus erythematosus to the kidney. These include lupus nephritis, which is responsible for a significant morbidity and mortality. Forms of lupus nephritis include glomerulonephritis; other lesions can include renal amyloidosis, focal segmental glomerulosclerosis, IgA and IgM nephropathy, and necrotizing glomerulitis.

Gastrointestinal: mesenteric vasculitis and thrombosis; protein-losing enteropathy, intestinal pseudo-obstruction, and acute pancreatitis; and rarely, celiac disease, inflammatory bowel diseases, eosinophilic enteritis, and pneumatosis cystoides intestinalis.

Pulmonary: pleuritis is most common; sometimes observed are pneumonitis, acute respiratory distress, diffuse alveolar hemorrhage, chronic interstitial pneumonitis, and shrinking (vanishing) lung syndrome. More rare is acute reversible hypoxemia, pulmonary embolisms, pulmonary arterial hypertension, and airway disease obstructive lung disease and upper airways disease.

Cardiovascular: valvular heart diseases associated with Libman-Sacks disease lesions, sterile vegetations, serositis associated with pericardial disease, and venous and arterial thrombosis associated with antiphospholipid antibodies are sometimes observed.

Neuropsychiatric: seizures and cerebrovascular disease, such as stroke, transient ischemic attack, and venous sinus thrombosis; psychiatric manifestations include depression and cognitive dysfunction. Additional such symptoms can present, including headaches, mood disorders, acute confusional states, and anxiety.

Hematological: cytopenia and thrombophilia. Systemic lupus erythematosus patients may also present with anemia, thrombocytopenia, neutropenia, and leukopenia.

Ocular: About a third of systemic lupus erythematosus patients will have ocular involvement, including that of the optic nerve, periorbita, and ocular adnex, the most common manifestation is keratoconjunctivitis sicca. Ocular damage can harm visual acuity.

Cutaneous: 85% of systemic lupus erythematosus patients present with cutaneous symptoms, and may be the only involve organ. Three groups of mucocutaneous manifestations can present: (1) chronic cutaneous lupus erythematosus (CCLE), (2) subacute cutaneous lupus erythematosus (SCLE), and (3) acute cutaneous lupus erythematosus (ACLE).

Cutaneous manifestations include malar rash, discoid lesions (localized or generalized), photosensitivity, papular/plaque lesions with slight scaling, alopecia, deep brawny indurations or subcutaneous nodule, atrophie blanche, and livedo reticularis.

Oropharyngeal: in addition to lesions, oral candidiasis, dysphagia, and (perhaps) xerostomia.

Immunologic: antinuclear antibody (ANA) titers that are abnormal, either above a laboratory reference range or as determined by immunofluorescence or equivalent assay. Antibodies recognizing native (ds) DNA assays show results above a laboratory reference range (if ELISA, usually twice the above laboratory reference range is used). Present of antibody to the SM nuclear antigen (anti-SM antibodies). Anti-phospholipid antibodies, which can be determined by a lupus anticoagulant test; false-positive test for syphilis; anticardiolipin antibody (at least twice normal or medium-high titer); anti-b2 glycoprotein 1. Low levels complement C3, C4, or CH50 can be present. Finally, a positive Direct Coombs test, in the absence of hemolytic anemia.

"Reducing at least one symptom of systemic lupus erythematosus" refers to in part reducing any of the above listed symptoms, whether they be constitutional or organ signs/symptoms.

B. Therapeutic Methods for Dosing of the Anti-CD20/Anti-CD3 Bispecific Antibody (e.g., Mosunetuzumab)

The invention provides methods for treating a patient or a population of patients having systemic lupus erythematosus that includes administering to the patient an anti-CD20/anti-CD3 bispecific antibody (e.g., mosunetuzumab). Such treatment with the anti-CD20/anti-CD3 bispecific antibody, such as mosunetuzumab, can be administered to a patient after the patient is administered a corticosteroid (such as an oral corticosteroid), an antimalarial agent, or an immunosuppressant.

Examples of corticosteroids include, for example, hydrocortisone, cortisone acetate, prednisolone, dexamethasone, betamethasone, triamcinolone, beclometasone, methylprednisolone or prednisone.

Examples of antimalarial agents include, for example, hydroxychloroquine.

Examples of common immunosuppressants include azathiprine, mycophenolic acid, mofetil, methotrexate, cyclophosphamide, cyclosporine, tacrolimus, and sirolimus (rapamycin).

The disclosed methods can also include where the patient does not have a lupus-associated neuropsychiatric disease.

The disclosed methods can also include where the patient does not have active overlap syndrome with mixed connective tissue disease or systemic sclerosis within a year of being administered the effective amount of mosunetuzumab.

The disclosed methods can also include where the patient does not have catastrophic or severe antiphospholipid syndrome within a year of being administered the effective amount of mosunetuzumab, unless the severe antiphospholipid syndrome has been adequately controlled by administering anticoagulant therapy to the patient at least three months of being administered the effective amount of mosunetuzumab.

The disclosed methods can also include where the patient has not been administered a biologic therapy at least 12 months before being administered the effective amount of mosunetuzumab anti-CD19 antibody therapy or anti-CD20 monoclonal antibody therapy.

The disclosed methods can also include administering to a patient an effective amount of mosunetuzumab (a) to a patient who has not been administered at least 12 months before being administered the effective amount of mosunetuzumab anti-CD19 antibody therapy or anti-CD20 monoclonal antibody therapy, or (b) to a patient who has not been administered at least 30 days before being administered the effective amount of mosunetuzumab (i) kinase inhibitors of Janus Kinase (JAK) kinase, Bruton tyrosine kinase, or tyrosine kinase 2, or (ii) tacrolimus, ciclosporin, or voclosporin, or (c) to a patient who has not been administered at least 2 months before being administered the effective amount of mosunetuzumab (i) cyclophosphamide, or (ii) biologic therapy.

The disclosed methods can also include where the patient does not have significant lupus-associated renal disease or significant renal impairment.

The disclosed methods can also include where the patient does not have one laboratory parameter selected from the group consisting of (a) total bilirubin>1.5×ULN, (b) ANC<1.5×109/L (<1500/mm3), (c) platelet count<100× 109/L (100,000/mm3), (d) hemoglobin<100 g/L, (e) estimated glomulerular filtration rate (eGFR)<30 ml/min/1.73m2 calculated according to the Chronic Kidney Disease Epidemiology Collaboration equation, and (f) positive serum human chorionic gonadotropin.

The disclosed methods can also include where at least one symptom of SLE is reduced.

The disclosed methods are directed to methods where the administering an effective amount of mosunetuzumab includes administering mosunetuzumab according to a dosing regimen includes at least a first dosing cycle, where the first dosing cycle includes a first dose (C1D1) and a second dose (C1D2) of mosunetuzumab, where the C1D1 is less than C1D2, and where the C1D1 is between about 1.6 mg to about 5 mg and the C1D2 is between about 15 mg to about 60 mg.

The method can also include where mosunetuzumab is administered subcutaneously.

In one embodiment, a method of treating a patient is provided, which includes administering to the patient an effective amount of mosunetuzumab, where (a) the patient has systemic lupus erythematosus, and (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is between about 1.6 mg to about 5 mg on day 1 of the cycle and the C1D2 is between about 15 mg to about 60 mg on day 8 of the cycle.

In another embodiment, a method of treating a patient is provided, which includes administering to the patient an effective amount of mosunetuzumab, where (a) the patient has systemic lupus erythematosus, and (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is about 1.6 mg on day 1 of the cycle and the C1D2 is between about 15 mg to about 60 mg on day 8 of the cycle.

In another embodiment, a method of treating a patient is provided, which includes administering to the patient an effective amount of mosunetuzumab, where (a) the patient has systemic lupus erythematosus, and (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is about 1.6 mg on day 1 of the cycle and the C1D2 is about 15 mg on day 8 of the cycle.

In another embodiment, a method of treating a patient is provided, which includes administering to the patient an effective amount of mosunetuzumab, where (a) the patient has systemic lupus erythematosus, and (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is about 1.6 mg on day 1 of the cycle and the C1D2 is about 45 mg on day 8 of the cycle.

In another embodiment, a method of treating a patient is provided, which includes administering to the patient an effective amount of mosunetuzumab, where (a) the patient has systemic lupus erythematosus, and (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is about 1.6 mg on day 1 of the cycle and the C1D2 is about 60 mg on day 8 of the cycle.

In another embodiment, a method of treating a patient is provided, which includes administering to the patient an effective amount of mosunetuzumab, where (a) the patient has systemic lupus erythematosus, and (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is about 5 mg on day 1 of the cycle and the C1D2 is between about 15 mg to about 60 mg on day 8 of the cycle.

In another embodiment, a method of treating a patient is provided, which includes administering to the patient an effective amount of mosunetuzumab, where (a) the patient has systemic lupus erythematosus, and (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is about 5 mg on day 1 of the cycle and the C1D2 is about 15 mg on day 8 of the cycle.

In another embodiment, a method of treating a patient is provided, which includes administering to the patient an effective amount of mosunetuzumab, where (a) the patient has systemic lupus erythematosus, and (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is about 5 mg on day 1 of the cycle and the C1D2 is about 45 mg on day 8 of the cycle.

In another embodiment, a method of treating a patient is provided, which includes administering to the patient an effective amount of mosunetuzumab, where (a) the patient has systemic lupus erythematosus, and (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is about 5 mg on day 1 of the cycle and the C1D2 is about 60 mg on day 8 of the cycle.

In all embodiments, mosunetuzumab can be administered subcutaneously. In some embodiments, mosunetuzumab can be administered intravenously.

In all embodiments, wherein at least one symptom of systemic lupus erythematosus is reduced, the reduction in symptoms can be measured using, for example, a Patient Global Impression of Severity (PGI-S), a Physician Global Assessment (PGA), a decrease in titer of antinuclear antibody (ANA), a decrease in titer of anti-double stranded DNA (dsDNA) antibody (IgG) titer, an increase in complement C3 levels, or an increase in complement C4 levels. In some instances, a reduction in symptoms of systemic lupus erythematosus is measured using PGI-S, and the change is a change from "very severe" to "severe," "severe" to "moderate," "moderate" to "mild," or "mild" to "none," or even greater changes (e.g., "very severe" to "none" being an extreme example). In other embodiments, the change is measured using a PGA administered by a healthcare provider or other appropriately trained person, wherein the change is a decrease from a previous rating using the PGA.

In some embodiments, the patient is further administered tocilizumab if the patient experiences cytokine release syndrome (CRS). In yet other embodiments, the disclosed methods further include administering to the patient a corticosteroid, cyclophosphamide, a B-cell-depleting therapy, or calcineurin inhibitor. Exemplary corticosteroids include hydrocortisone, cortisone acetate, prednisolone, dexamethasone, betamethasone, triamcinolone, beclometasone, methylprednisolone or prednisone. Exemplary cell-depleting therapies include administering rituximab, ocrelizumab, ofatumumab, or obinutuzumab. Exemplary calcineurin inhibitors include ciclosporin, tacrolimus, or vocolosporin.

The method can also include where the patient has been administered a stable dose of at least 40 mg/day prednisone (or equivalent) for at least 7 days prior to being administered an effective amount of mosunetuzumab.

The method can also include where the patient has been administered the antimalarial agent at a stable dose for at least 4 weeks prior to being administered an effective amount of mosunetuzumab.

The method can also include where the patient has been administered an immunosuppressant at a stable dose for at least 4 weeks prior to being administered an effective amount of mosunetuzumab; the immunosuppressant can be azathioprine, mycophenolate mofetil, mycophenolic acid, or methotrexate.

The method can also include where the patient does not have a lupus-associated neuropsychiatric disease, such as meningitis, retinitis, cerebral vasculitis, myelopathy, demyelination syndromes, acute confusional state, psychosis, acute stroke or stroke syndrome, cranial neuropathy, status epilepticus or seizures, cerebellar ataxia, or mononeuritis multiplex.

The method can also include where the patient has not been previously administered an anti-CD19 therapy, such as blinatumomab, or has not been administered an anti-CD20 therapy, such as obinutuzumab, rituximab, ocrelizumab, or ofatumumab, or has not been administered a kinase inhibitor, such as baricitinib, tofacitinib, upadacitinib, filgotinib, ibrutinib, or fenebrutinib, or has not been administered a biologic therapy, such as belimumab, ustekinumab, anifrolumab, secukinumab, or atacicept.

The method can also include where the at least one reduced symptom of SLE is measured using a Patient Global Impression of Severity (PGI-S), a Physician Global Assessment (PGA), a decrease in titer of antinuclear antibody (ANA), a decrease in titer of anti-double stranded DNA (dsDNA) antibody (IgG) titer, an increase in complement C3 levels, or an increase in complement C4 levels.

The method can also include where the at least one reduced symptom is a change in response of at least one step on the PGI-S from a previous response, where the change is one change of from "very severe" to "severe," "severe" to "moderate," "moderate" to "mild," or "mild" to "none."

The method can also include where the at least one reduced symptom is a change in rating by a healthcare provider or other appropriately trained professional using the PGA, where the change is a decrease from a previous rating using the PGA.

The method can also include where the first dose cycle is about 8 days.

The method can also include where the C1D2 dose of mosunetuzumab is administered on about day 8 of the cycle.

In some instances, methods of treating a population of patients having systemic lupus erythematosus comprising administering an effective amount of mosunetuzumab are disclosed.

The disclosed methods can also include where the population of patients does not have a lupus-associated neuropsychiatric disease.

The disclosed methods can also include where the population of patients does not have active overlap syndrome with mixed connective tissue disease or systemic sclerosis within a year of being administered the effective amount of mosunetuzumab.

The disclosed methods can also include where the population of patients does not have catastrophic or severe antiphospholipid syndrome within a year of being administered the effective amount of mosunetuzumab, unless the severe antiphospholipid syndrome has been adequately controlled by administering anticoagulant therapy to the patient at least three months of being administered the effective amount of mosunetuzumab.

The disclosed methods can also include where the population of patients has not been administered a biologic therapy at least 12 months before being administered the effective amount of mosunetuzumab anti-CD19 antibody therapy or anti-CD20 monoclonal antibody therapy.

The disclosed methods can also include administering to patients an effective amount of mosunetuzumab (a) to patients who have not been administered at least 12 months before being administered the effective amount of mosunetuzumab anti-CD19 antibody therapy or anti-CD20 monoclonal antibody therapy, or (b) to patients who have not been administered at least 30 days before being administered the effective amount of mosunetuzumab (i) kinase inhibitors of Janus Kinase (JAK) kinase, Bruton tyrosine kinase, or tyrosine kinase 2, or (ii) tacrolimus, ciclosporin, or voclosporin, or (c) to patients who have not been administered at least 2 months before being administered the effective amount of mosunetuzumab (i) cyclophosphamide, or (ii) biologic therapy.

The disclosed methods can also include where the population of patients does not have significant lupus-associated renal disease or significant renal impairment.

The disclosed methods can also include where the population of patients does not have one laboratory parameter selected from the group consisting of (a) total bilirubin>1.5× ULN, (b) ANC<1.5×109/L (<1500/mm3), (c) platelet count<100×109/L (100,000/mm3), (d) hemoglobin<100 g/L, (e) estimated glomulerular filtration rate (eGFR)<30 ml/min/1.73m2 calculated according to the Chronic Kidney Disease Epidemiology Collaboration equation, and (f) positive serum human chorionic gonadotropin.

The disclosed methods can also include where at least one symptom of SLE is reduced in the population of patients.

The disclosed methods are directed to methods where the administering an effective amount of mosunetuzumab includes administering mosunetuzumab according to a dosing regimen includes at least a first dosing cycle, where the first dosing cycle includes a first dose (C1D1) and a second dose (C1D2) of mosunetuzumab, where the C1D1 is less than C1D2, and where the C1D1 is between about 1.6 mg to about 5 mg and the C1D2 is between about 15 mg to about 60 mg.

The method can also include where mosunetuzumab is administered subcutaneously.

In one embodiment, a method of treating a population of patients is provided, which includes administering to the patient an effective amount of mosunetuzumab, where (a) the patient has systemic lupus erythematosus, and (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is between about 1.6 mg to about 5 mg on day 1 of the cycle and the C1D2 is between about 15 mg to about 60 mg on day 8 of the cycle.

In another embodiment, a method of treating a population of patients is provided, which includes administering to the patient an effective amount of mosunetuzumab, where (a) the patient has systemic lupus erythematosus, and (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is about 1.6 mg on day 1 of the cycle and the C1D2 is between about 15 mg to about 60 mg on day 8 of the cycle.

In another embodiment, a method of treating a population of patients is provided, which includes administering to the patient an effective amount of mosunetuzumab, where (a) the patient has systemic lupus erythematosus, and (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is about 1.6 mg on day 1 of the cycle and the C1D2 is about 15 mg on day 8 of the cycle.

In another embodiment, a method of treating a population of patients is provided, which includes administering to the patient an effective amount of mosunetuzumab, where (a) the patient has systemic lupus erythematosus, and (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is about 1.6 mg on day 1 of the cycle and the C1D2 is about 45 mg on day 8 of the cycle.

In another embodiment, a method of treating a population of patients is provided, which includes administering to the patient an effective amount of mosunetuzumab, where (a) the patient has systemic lupus erythematosus, and (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is about 1.6 mg on day 1 of the cycle and the C1D2 is about 60 mg on day 8 of the cycle.

In another embodiment, a method of treating a population of patients is provided, which includes administering to the patient an effective amount of mosunetuzumab, where (a) the patient has systemic lupus erythematosus, and (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is about 5 mg on day 1 of the cycle and the C1D2 is between about 15 mg to about 60 mg on day 8 of the cycle.

In another embodiment, a method of treating a population of patients is provided, which includes administering to the patient an effective amount of mosunetuzumab, where (a) the patient has systemic lupus erythematosus, and (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is about 5 mg on day 1 of the cycle and the C1D2 is about 15 mg on day 8 of the cycle.

In another embodiment, a method of treating a population of patients is provided, which includes administering to the patient an effective amount of mosunetuzumab, where (a) the patient has systemic lupus erythematosus, and (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is about 5 mg on day 1 of the cycle and the C1D2 is about 45 mg on day 8 of the cycle.

In another embodiment, a method of treating a population of patients is provided, which includes administering to the patient an effective amount of mosunetuzumab, where (a) the patient has systemic lupus erythematosus, and (b) mosunetuzumab is administered according to a dosing regimen includes at least a first dosing cycle of about 8 days, where the first dosing cycle includes a first dose (C1D1) and a second dose (C1D2) of mosunetuzumab, where C1D1 is about 5 mg on day 1 of the cycle and the C1D2 is about 60 mg on day 8 of the cycle.

In all embodiments, mosunetuzumab can be administered subcutaneously. In some embodiments, mosunetuzumab can be administered intravenously.

In all embodiments, wherein at least one symptom of systemic lupus erythematosus is reduced, the reduction in symptoms can be measured using, for example, a Patient Global Impression of Severity (PGI-S), a Physician Global Assessment (PGA), a decrease in titer of antinuclear antibody (ANA), a decrease in titer of anti-double stranded DNA (dsDNA) antibody (IgG) titer, an increase in complement C3 levels, or an increase in complement C4 levels. In some instances, a reduction in symptoms of systemic lupus erythematosus is measured using PGI-S, and the change is a change from "very severe" to "severe," "severe" to "moderate," "moderate" to "mild," or "mild" to "none," or even greater changes (e.g., "very severe" to "moderate"). In other embodiments, the change is measured using a PGA administered by a healthcare provider or other appropriately trained person, wherein the change is a decrease from a previous rating using the PGA.

In some embodiments, patients in the population of patients can be further administered tocilizumab if the patients experience cytokine release syndrome (CRS). In yet other embodiments, the disclosed methods further include administering to the patients a corticosteroid, cyclophosphamide, a B-cell-depleting therapy, or calcineurin inhibitor. Exemplary corticosteroids include hydrocortisone, cortisone acetate, prednisolone, dexamethasone, betamethasone, triamcinolone, beclometasone, methylprednisolone or prednisone. Exemplary cell-depleting therapies include administering rituximab, ocrelizumab, ofatumumab, or obinutuzumab. Exemplary calcineurin inhibitors include ciclosporin, tacrolimus, or vocolosporin.

The method can also include where patients in the population of patients has been administered a stable dose of at least 40 mg/day prednisone (or equivalent) for at least 7 days prior to being administered an effective amount of mosunetuzumab.

The method can also include where patients in the population of patients has been administered the antimalarial agent at a stable dose for at least 4 weeks prior to being administered an effective amount of mosunetuzumab.

The method can also include where patients in the population of patients has been administered an immunosuppressant at a stable dose for at least 4 weeks prior to being administered an effective amount of mosunetuzumab; the immunosuppressant can be azathioprine, mycophenolate mofetil, mycophenolic acid, or methotrexate.

The method can also include where patients in the population of patients does not have a lupus-associated neuropsychiatric disease, such as meningitis, retinitis, cerebral vasculitis, myelopathy, demyelination syndromes, acute confusional state, psychosis, acute stroke or stroke syndrome, cranial neuropathy, status epilepticus or seizures, cerebellar ataxia, or mononeuritis multiplex.

The method can also include where patients in the population of patients has not been previously administered an anti-CD19 therapy, such as blinatumomab, or has not been administered an anti-CD20 therapy, such as obinutuzumab, rituximab, ocrelizumab, or ofatumumab, or has not been administered a kinase inhibitor, such as baricitinib, tofacitinib, upadacitinib, filgotinib, ibrutinib, or fenebrutinib, or has not been administered a biologic therapy, such as belimumab, ustekinumab, anifrolumab, secukinumab, or atacicept.

The method can also include wherein the at least one reduced symptom of SLE is measured using a Patient Global Impression of Severity (PGI-S), a Physician Global Assessment (PGA), a decrease in titer of antinuclear antibody (ANA), a decrease in titer of anti-double stranded DNA (dsDNA) antibody (IgG) titer, an increase in complement C3 levels, or an increase in complement C4 levels.

The method can also include where the at least one reduced symptom is a change in response of at least one step on the PGI-S from a previous response, where the change is one change of from "very severe" to "severe," "severe" to "moderate," "moderate" to "mild," or "mild" to "none."

The method can also include where the at least one reduced symptom is a change in rating by a healthcare provider or other appropriately trained professional using the PGA, where the change is a decrease from a previous rating using the PGA.

The method can also include where the first dose cycle is about 8 days.

The method can also include where the C1D2 dose of mosunetuzumab is administered on about day 8 of the cycle.

Any of the methods described herein may involve monitoring a patient for cytokine release syndrome (CRS), e.g., a CRS event following commencement of any of the methods described above. Current clinical management focuses on treating the patient signs and symptoms, providing supportive care, and attempting to dampen the inflammatory response using a high dose of corticosteroids. However, this approach is not always successful, especially in the case of late intervention. The CRS grading criteria used by the methods described herein are published by the American Society for Transplantation and Cellular Therapy (ASTCT) to define mild, moderate, severe, or life-threatening CRS and harmonize reporting across clinical trials to allow rapid recognition and treatment of CRS (Lee et al. *Biology of Blood and Marrow Transplantation.* 25(4): 625-638, 2019). The ASTCT criteria is intended to be objective, easy to apply, and more accurately categorize the severity of CRS. This CRS grading system is shown below in Table 1.

TABLE 1

| CRS Grading System | | | | | |
|---|---|---|---|---|---|
| Parameter | Grade 1 | Grade 2 | Grade 3 | Grade 4 | Grade 5 [d] |
| Fever [a] | Temperature ≥38° C. | Temperature ≥38° C. | Temperature ≥38° C. With | Temperature ≥38° C. | |
| Hypotension | None | Not requiring vasopressors | Requiring a vasopressor with or without vasopressin | Requiring multiple vasopressors (excluding vasopressin) | |

TABLE 1-continued

CRS Grading System

| Parameter | Grade 1 | Grade 2 | Grade 3 | Grade 4 | Grade 5 [d] |
|---|---|---|---|---|---|
| | | and/or [b] | | | |
| Hypoxia | None | Requiring low-glow nasal cannula [c] or blow-by | Requiring high-flow nasal cannula, facemask, nonrebreather mask or Venturi mask | Requiring positive pressure (e.g., C-PAP, BiPAP, intubation and mechanical ventilation) | Death |

ASTCT = American Society for Transplantation and Cellular Therapy; BiPAP = bilevel positive airway pressure; CPAP = continuous positive airway pressure; CRS = cytokine release syndrome; CTCAE = Common Terminology Criteria for Adverse Events.
Note:
Organ toxicities associated with CRS may be graded according to NCI CTCAE v5.0 but they do not influence CRS grading.
[a] Fever is defined as a temperature ≥38° C. not attributable to any other cause. In participants who have CRS and then receive antipyretic or anticytokine therapy such as tocilizumab or steroids, fever is no longer required to grade subsequent CRS severity. In this case, CRS grading is determined by hypotension and/or hypoxia.
[b] CRS grade is determined by the more severe event, hypotension or hypoxia not attributable to any other cause. For example, a participant with temperature of 39.5° C., hypotension requiring one vasopressor, and hypoxia requiring low-flow nasal cannula is classified as Grade 3 CRS.
[c] Low-flow nasal cannula is defined as oxygen delivered at ≤6 L/min. Low flow also includes blow-by oxygen delivery, sometimes used in pediatrics. A high-low nasal cannula is defined as oxygen delivered at >6 L/min.
[d] Grade 5 CRS is defined as death due to CRS.

Fever is defined as a temperature≥38° C. not attributable to any other cause. In patients who have CRS then receive antipyretic or anticytokine therapy such as tocilizumab or steroids, fever is no longer required to grade subsequent CRS severity. In this case, CRS grading is determined by hypotension and/or hypoxia.

CRS grade is determined by the more severe event, hypotension or hypoxia not attributable to any other cause. For example, a patient with temperature of 39.5° C., hypotension requiring 1 vasopressor, and hypoxia requiring low-flow nasal cannula is classified as Grade 3 CRS.

Low-flow nasal cannula is defined as oxygen delivered at ≤6 L/minute. Low flow also includes blow-by oxygen delivery, sometimes used in pediatrics. High-flow nasal cannula is defined as oxygen delivered at >6 L/minute.

CRS is associated with elevations in a wide array of cytokines, including marked elevations in IFN-g, IL-6, and TNF-a levels. Emerging evidence implicates IL-6, in particular, as a central mediator in CRS. IL-6 is a proinflammatory, multi-functional cytokine produced by a variety of cell types, which has been shown to be involved in a diverse array of physiological processes, including T cell activation. Regardless of the inciting agent, CRS is associated with high IL-6 levels (Nagorsen et al. *Cytokine.* 25(1): 31-5, 2004; Lee et al. *Blood.* 124(2): 188-95, 2014); Doesegger et al. *Clin. Transl. Immunology.* 4(7): e39, 2015), and IL-6 correlates with the severity of CRS, with patients who experience a Grade 4 or 5 CRS event having much higher IL-6 levels compared to patients who do not experience CRS or experience milder CRS (Grades 0-3) (Chen et al. *J. Immunol. Methods.* 434:1-8, 2016).

Therefore, blocking the inflammatory action of IL-6 using an agent that inhibits IL-6-mediated signaling to manage CRS observed in patients during the double-step fractionated, dose-escalation dosing regimen is an alternative to steroid treatment that would not be expected to negatively impact T cell function or diminish the efficacy or clinical benefit of anti-CD20/anti-CD3 bispecific antibody therapy in the treatment of CD20-positive cell proliferative disorders (e.g., a B cell proliferative disorders).

Tocilizumab (ACTEMRA®/RoACTEMRA®) is a recombinant, humanized, anti-human monoclonal antibody directed against soluble and membrane-bound IL-6R, which inhibits IL-6-mediated signaling (see, e.g., WO 1992/019579, which is incorporated herein by reference in its entirety).

If the patient has a cytokine release syndrome (CRS) event following administration of the bispecific antibody, the method may further involve administering to the patient an effective amount of an interleukin-6 receptor (IL-6R) antagonist (e.g., an anti-IL-6R antibody, e.g., tocilizumab (ACTEMRA®/RoACTEMRA®)) to manage the event. In some instances, tocilizumab is administered intravenously to the patient as a single dose of about 8 mg/kg. In some instances, each dose of tocilizumab does not exceed 800 mg/dose. Other anti-IL-6R antibodies that could be used instead of, or in combination with, tocilizumab include sarilumab, vobarilizumab (ALX-0061), satralizumab (SA-237), and variants thereof.

If the patient has a CRS event that does not resolve or worsens within 24 hours of administering the IL-6R antagonist to treat the symptoms of the CRS event, and the method may further comprise administering to the patient one or more additional doses of the IL-6R antagonist (e.g., an anti-IL-6R antibody, e.g., tocilizumab) to manage the CRS event. The patient may be administered a corticosteroid, such as methylprednisolone or dexamethasone if CRS event is not managed through administration of the IL-6R antagonist.

Management of the CRS events may be tailored based on the Stage of the CRS and the presence of comorbidities. For example, if the patient has a Grade 2 cytokine release syndrome (CRS) event in the absence of comorbidities or in the presence of minimal comorbidities following administration of the bispecific antibody, the method may further include treating the symptoms of the Grade 2 CRS event while suspending treatment with the bispecific antibody. If the Grade 2 CRS event then resolves to a Grade≤1 CRS event for at least three consecutive days, the method may further include resuming treatment with the bispecific antibody without altering the dose. On the other hand, if the Grade 2 CRS event does not resolve or worsens to a Grade≥3 CRS event within 24 hours of treating the symptoms of the Grade 2 CRS event, the method may further involve administering to the patient an effective amount of an interleukin-6 receptor (IL-6R) antagonist (e.g., an anti-IL-6R antibody, e.g., tocilizumab (ACTEMRA®/Ro- ACTEMRA®)) to manage the Grade 2 or Grade≥3 CRS event. In some instances, tocilizumab is administered intravenously to the patient as a single dose of about 8 mg/kg. In some instances, each dose of tocilizumab does not exceed 800 mg/dose. Other anti-IL-6R antibodies that could be used instead of, or in combination with, tocilizumab include sarilumab, vobarilizumab (ALX-0061), satralizumab (SA-237), and variants thereof.

If the patient has a grade 2, 3, or 4 CRS event in the presence of extensive comorbidities following administration of the bispecific antibody, the method may further include methods understood in the art to mitigate the CRS event, such as administering to the patient a first dose of an IL-6R antagonist (e.g., an anti-IL-6R antibody, e.g., tocilizumab (ACTEMRA®/RoACTEMRA®)) to manage the CRS event while suspending treatment with the bispecific antibody. Other anti-IL-6R antibodies that could be used instead of, or in combination with, tocilizumab include sarilumab, vobarilizumab (ALX-0061), satralizumab (SA-237), and variants thereof. In some instances, the method further includes administering to the patient an effective amount of a corticosteroid, such as methylprednisolone or dexamethasone.

In some instances, treating a population of patients having previously untreated (1 L) diffuse large B-cell lymphoma using a dosing regimen provided by the methods of the present invention results in the population of patients having a rate of cytokine release syndrome having a grade of 3 or higher (as defined by the American Society for Transplantation and Cellular Therapy, 2018; ASTCT) less than 5% (e.g., less than 4%, less than 3%, less than 2%, or less than 1%; e.g., 4%, 3%, 2%, 1%, or 0%). In some instances, the rate of cytokine release syndrome having a grade of 3 or higher (as defined by the ASTCT) is less than 3%. In some instances, the rate of cytokine release syndrome having a grade of 3 or higher (as defined by the ASTCT) is less than 1%. In some instances, the rate of cytokine release syndrome having a grade of 3 or higher (as defined by the ASTCT) is 5%. In some instances, the rate of cytokine release syndrome having a grade of 3 or higher (as defined by the ASTCT) is 3%. In some instances, the rate of cytokine release syndrome having a grade of 3 or higher (as defined by the ASTCT) is 1%. In some instances, the rate of cytokine release syndrome having a grade of 3 or higher (as defined by the ASTCT) is 0%.

C. Bispecific Antibodies that Bind to CD20 and CD3

The invention provides bispecific antibodies that bind to CD20 and CD3 (i.e., anti-CD20/anti-CD3 antibodies) useful for treating systemic lupus erythematosus.

In some instances, the invention provides a bispecific antibody that includes an anti-CD20 arm having a first binding domain comprising at least one, two, three, four, five, or six hypervariable regions (HVRs) selected from (a) an HVR-H1 comprising the amino acid sequence of GYTFTSYNMH (SEQ ID NO:1); (b) an HVR-H2 comprising the amino acid sequence of AIYPGNGDTSYNQKFKG (SEQ ID NO:2); (c) an HVR-H3 comprising the amino acid sequence of VVYYSNSYWYFDV (SEQ ID NO:3); (d) an HVR-L1 comprising the amino acid sequence of RASSSVSYMH (SEQ ID NO:4); (e) an HVR-L2 comprising the amino acid sequence of APSNLAS (SEQ ID NO:5); and (f) an HVR-L3 comprising the amino acid sequence of QQWSFNPPT (SEQ ID NO:6). In some instances, the anti-CD20/anti-CD3 bispecific antibody comprises at least one (e.g., 1, 2, 3, or 4) of heavy chain framework regions FR-H1, FR-H2, FR-H3, and FR-H4 comprising the sequences of SEQ ID NOs:17-20, respectively, and/or at least one (e.g., 1, 2, 3, or 4) of the light chain framework regions FR-L1, FR-L2, FR-L3, and FR-L4 comprising the sequences of SEQ ID NOs:21-24, respectively. In some instances, the bispecific antibody comprises an anti-CD20 arm comprising a first binding domain comprising (a) a heavy chain variable (VH) domain comprising an amino acid sequence having at least 90% sequence identity (e.g., at least 91%, 92%, 93%, 94%, 95%, 96%, 97%, 98%, or 99% sequence identity) to, or the sequence of, SEQ ID NO:7; (b) a light chain variable (VL) domain comprising an amino acid sequence having at least 90% sequence identity (e.g., at least 91%, 92%, 93%, 94%, 95%, 96%, 97%, 98%, or 99% sequence identity) to, or the sequence of, SEQ ID NO:8; or (c) a VH domain as in (a) and a VL domain as in (b). Accordingly, in some instances, the first binding domain comprises a VH domain comprising an amino acid sequence of SEQ ID NO:7 and a VL domain comprising an amino acid sequence of SEQ ID NO:8.

In some instances, the invention provides a bispecific antibody that includes an anti-CD3 arm having a second binding domain comprising at least one, two, three, four, five, or six HVRs selected from (a) an HVR-H1 comprising the amino acid sequence of NYYIH (SEQ ID NO:9); (b) an HVR-H2 comprising the amino acid sequence of WIYPGDGNTKYNEKFKG (SEQ ID NO:10); (c) an HVR-H3 comprising the amino acid sequence of DSYSNYYFDY (SEQ ID NO:11); (d) an HVR-L1 comprising the amino acid sequence of KSSQSLLNSRTRKNYLA (SEQ ID NO:12); (e) an HVR-L2 comprising the amino acid sequence of WASTRES (SEQ ID NO:13); and (f) an HVR-L3 comprising the amino acid sequence of TQSFILRT (SEQ ID NO:14). In some instances, the anti-CD20/anti-CD3 bispecific antibody comprises at least one (e.g., 1, 2, 3, or 4) of heavy chain Framework regions FR-H1, FR-H2, FR-H3, and FR-H4 comprising the sequences of SEQ ID NOs:25-28, respectively, and/or at least one (e.g., 1, 2, 3, or 4) of the light chain Framework regions FR-L1, FR-L2, FR-L3, and FR-L4 comprising the sequences of SEQ ID NOs:29-32, respectively. In some instances, the bispecific antibody comprises an anti-CD3 arm comprising a second binding domain comprising (a) a VH domain comprising an amino acid sequence having at least 90% sequence identity (e.g., at least 91%, 92%, 93%, 94%, 95%, 96%, 97%, 98%, or 99% sequence identity) to, or the sequence of, SEQ ID NO:15; (b) a VL domain comprising an amino acid sequence having at least 90% sequence identity (e.g., at least 91%, 92%, 93%, 94%, 95%, 96%, 97%, 98%, or 99% sequence identity) to, or the sequence of, SEQ ID NO:16; or (c) a VH domain as in (a) and a VL domain as in (b). Accordingly, in some instances, the second binding domain comprises a VH domain comprising an amino acid sequence of SEQ ID NO:15 and a VL domain comprising an amino acid sequence of SEQ ID NO:16.

In some instances, the invention provides a bispecific antibody that includes (1) an anti-CD20 arm having a first binding domain comprising at least one, two, three, four, five, or six HVRs selected from (a) an HVR-H1 comprising the amino acid sequence of GYTFTSYNMH (SEQ ID NO:1); (b) an HVR-H2 comprising the amino acid sequence of AIYPGNGDTSYNQKFKG (SEQ ID NO:2); (c) an HVR-H3 comprising the amino acid sequence of VVYYSNSYWYFDV (SEQ ID NO:3); (d) an HVR-L1 comprising the amino acid sequence of RASSSVSYMH (SEQ ID NO:4); (e) an HVR-L2 comprising the amino acid sequence of APSNLAS (SEQ ID NO:5); and (f) an HVR-L3 comprising the amino acid sequence of QQWSFNPPT (SEQ ID NO:6); and (2) an anti-CD3 arm having a second binding domain comprising at least one, two, three, four, five, or six HVRs selected from (a) an HVR-H1 comprising the amino acid sequence of NYYIH (SEQ ID NO:9); (b) an HVR-H2 comprising the amino acid sequence of WIYPGDGNT-KYNEKFKG (SEQ ID NO:10); (c) an HVR-H3 comprising the amino acid sequence of DSYSNYYFDY (SEQ ID NO:11); (d) an HVR-L1 comprising the amino acid sequence of KSSQSLLNSRTRKNYLA (SEQ ID NO:12); (e) an HVR-L2 comprising the amino acid sequence of WASTRES (SEQ ID NO:13); and (f) an HVR-L3 comprising the amino acid sequence of TQSFILRT (SEQ ID NO:14). In some instances, the anti-CD20/anti-CD3 bispecific antibody comprises (1) at least one (e.g., 1, 2, 3, or 4) of heavy chain Framework regions FR-H1, FR-H2, FR-H3, and FR-H4 comprising the sequences of SEQ ID NOs:17-20, respectively, and/or at least one (e.g., 1, 2, 3, or 4) of the light chain Framework regions FR-L1, FR-L2, FR-L3, and FR-L4 comprising the sequences of SEQ ID NOs:21-24, respectively, and (2) at least one (e.g., 1, 2, 3, or 4) of heavy chain Framework regions FR-H1, FR-H2, FR-H3, and FR-H4 comprising the sequences of SEQ ID NOs:25-28, respectively, and/or at least one (e.g., 1, 2, 3, or 4) of the light chain Framework regions FR-L1, FR-L2, FR-L3, and FR-L4 comprising the sequences of SEQ ID NOs:29-32, respectively. In some instances, the anti-CD20/anti-CD3 bispecific antibody comprises (1) an anti-CD20 arm comprising a first binding domain comprising (a) a VH domain comprising an amino acid sequence having at least 90% sequence identity (e.g., at least 91%, 92%, 93%, 94%, 95%, 96%, 97%, 98%, or 99% sequence identity) to, or the sequence of, SEQ ID NO:7; (b) a VL domain comprising an amino acid sequence having at least 90% sequence identity (e.g., at least 91%, 92%, 93%, 94%, 95%, 96%, 97%, 98%, or 99% sequence identity) to, or the sequence of, SEQ ID NO:8; or (c) a VH domain as in (a) and a VL domain as in (b), and (2) an anti-CD3 arm comprising a second binding domain comprising (a) a VH domain comprising an amino acid sequence having at least 90% sequence identity (e.g., at least 91%, 92%, 93%, 94%, 95%, 96%, 97%, 98%, or 99% sequence identity) to, or the sequence of, SEQ ID NO:15; (b) a VL domain comprising an amino acid sequence having at least 90% sequence identity (e.g., at least 91%, 92%, 93%, 94%, 95%, 96%, 97%, 98%, or 99% sequence identity) to, or the sequence of, SEQ ID NO:16; or (c) a VH domain as in (a) and a VL domain as in (b). In some instances, the anti-CD20/anti-CD3 bispecific antibody comprises (1) a first binding domain comprising a VH domain comprising an amino acid sequence of SEQ ID NO:7 and a VL domain comprising an amino acid sequence of SEQ ID NO:8 and (2) a second binding domain comprising a VH domain comprising an amino acid sequence of SEQ ID NO:15 and a VL domain comprising an amino acid sequence of SEQ ID NO:16.

In some instances, the anti-CD20/anti-CD3 bispecific antibody is mosunetuzumab, having the International Nonproprietary Names for Pharmaceutical Substances (INN) List 117 (WHO Drug Information, Vol. 31, No. 2, 2017, p. 303), or CAS Registry No. 1905409-39-3, and having (1) an anti-CD20 arm comprising the heavy chain and light chain sequences of SEQ ID NOs:33 and 34, respectively; and (2) an anti-CD3 arm comprising the heavy chain and light chain sequences of SEQ ID NOs:35 and 36, respectively. In some instances, the anti-CD20/anti-CD3 bispecific antibody comprises (1) an anti-CD20 arm comprising a first binding domain comprising (a) a heavy chain comprising an amino acid sequence having at least 90% sequence identity (e.g., at least 91%, 92%, 93%, 94%, 95%, 96%, 97%, 98%, or 99% sequence identity) to, or the sequence of, SEQ ID NO:33; (b) a light chain comprising an amino acid sequence having at least 90% sequence identity (e.g., at least 91%, 92%, 93%, 94%, 95%, 96%, 97%, 98%, or 99% sequence identity) to, or the sequence of, SEQ ID NO:34; or (c) a heavy chain as in (a) and a light chain as in (b), and (2) an anti-CD3 arm comprising a second binding domain comprising (a) a heavy chain comprising an amino acid sequence having at least 90% sequence identity (e.g., at least 91%, 92%, 93%, 94%, 95%, 96%, 97%, 98%, or 99% sequence identity) to, or the sequence of, SEQ ID NO:35; (b) a light chain comprising an amino acid sequence having at least 90% sequence identity (e.g., at least 91%, 92%, 93%, 94%, 95%, 96%, 97%, 98%, or 99% sequence identity) to, or the sequence of, SEQ ID NO:36; or (c) a heavy chain as in (a) and a light chain as in (b). In some instances, the anti-CD20/anti-CD3 bispecific antibody comprises (1) an anti-CD20 arm comprising a first binding domain comprising a heavy chain comprising an amino acid sequence of SEQ ID NO:33 and a light chain comprising an amino acid sequence of SEQ ID NO:34 and (2) an anti-CD3 arm comprising a second binding domain comprising a heavy chain comprising an amino acid sequence of SEQ ID NO:35 and a light chain comprising an amino acid sequence of SEQ ID NO:36.

Amino acid sequences of mosunetuzumab are summarized in Table 2 below.

TABLE 2

Sequence IDs for Mosunetuzumab

| CD3 Arm | | CD20 Arm | |
|---|---|---|---|
| SEQ ID NO: | Description | SEQ ID NO: | Description |
| 9 | CD3 HVR-H1 | 1 | CD20 HVR-H1 |
| 10 | CD3 HVR-H2 | 2 | CD20 HVR-H2 |
| 11 | CD3 HVR-H3 | 3 | CD20 HVR-H3 |
| 12 | CD3 HVR-L1 | 4 | CD20 HVR-L1 |
| 13 | CD3 HVR-L2 | 5 | CD20 HVR-L2 |
| 14 | CD3 HVR-L3 | 6 | CD20 HVR-L3 |
| 15 | CD3 VH | 7 | CD20 VH |
| 16 | CD3 VL | 8 | CD20 VL |
| 35 | CD3 heavy chain | 33 | CD20 heavy chain |
| 36 | CD3 light chain | 34 | CD20 light chain |

The anti-CD20/anti-CD3 bispecific antibody may be produced using recombinant methods and compositions, for example, as described in U.S. Pat. No. 4,816,567.

In some instances, the anti-CD20/anti-CD3 bispecific antibody according to any of the above embodiments described above may incorporate any of the features, singly or in combination, as described in Section C below.

D. Antibody Formats and Properties

The methods described herein may further include any of the antibodies described above, wherein the antibody comprises any of the features, singly or in combination, as described below.

1. Antibody Affinity

In certain instances, an anti-CD20/anti-CD3 bispecific antibody has a dissociation constant ($K_D$) of $\leq 1$ µM, $\leq 100$ nM, $\leq 10$ nM, $\leq 1$ nM, $\leq 0.1$ nM, $\leq 0.01$ nM, or $\leq 0.001$ nM (e.g., $10^{-8}$ M or less, e.g., from $10^{-8}$ M to $10^{-13}$ M, e.g., from $10^{-9}$ M to $10^{-13}$ M).

In one instance, $K_D$ is measured by a radiolabeled antigen binding assay (RIA). In one instance, an RIA is performed with the Fab version of an antibody of interest and its antigen. For example, solution binding Affinity of Fabs for antigen is measured by equilibrating Fab with a minimal concentration of ($^{125}$I)-labeled antigen in the presence of a titration series of unlabeled antigen, then capturing bound antigen with an anti-Fab antibody-coated plate (see, e.g., Chen et al., *J. Mol. Biol.* 293:865-881(1999)). To establish conditions for the assay, MICROTITER® multi-well plates (Thermo Scientific) are coated overnight with 5 µg/ml of a capturing anti-Fab antibody (Cappel Labs) in 50 mM sodium carbonate (pH 9.6), and subsequently blocked with 2% (w/v) bovine serum albumin in PBS for two to five hours at room temperature (approximately 23° C.). In a non-adsorbent plate (Nunc #269620), 100 pM or 26 pM [$^{125}$I]-antigen are mixed with serial dilutions of a Fab of interest (e.g., consistent with assessment of the anti-VEGF antibody, Fab-12, in Presta et al., *Cancer Res.* 57:4593-4599 (1997)). The Fab of interest is then incubated overnight; however, the incubation may continue for a longer period (e.g., about 65 hours) to ensure that equilibrium is reached. Thereafter, the mixtures are transferred to the capture plate for incubation at room temperature (e.g., for one hour). The solution is then removed and the plate washed eight times with 0.1% polysorbate 20 (TWEEN-20®) in PBS. When the plates have dried, 150 µl/well of scintillant (MICROSCINT-20™; Packard) is added, and the plates are counted on a TOP-COUNT™ gamma counter (Packard) for ten minutes. Concentrations of each Fab that give less than or equal to 20% of maximal binding are chosen for use in competitive binding assays.

According to another instance, $K_D$ is measured using a BIACORE® surface plasmon resonance assay. For example, an assay using a BIACORE®-2000 or a BIACORE®-3000 (BIACORE®, Inc., Piscataway, NJ) is performed at 25° C. with immobilized antigen CM5 chips at ~10 response units (RU). In one instance, carboxymethylated dextran biosensor chips (CM5, BIACORE®, Inc.) are activated with N-ethyl-N'-(3-dimethylaminopropyl)-carbodiimide hydrochloride (EDC) and N-hydroxysuccinimide (NHS) according to the supplier's instructions. Antigen is diluted with 10 mM sodium acetate, pH 4.8, to 5 µg/ml (~0.2 µM) before injection at a flow rate of 5 µl/minute to achieve approximately 10 response units (RU) of coupled protein. Following the injection of antigen, 1 M ethanolamine is injected to block unreacted groups. For kinetics measurements, two-fold serial dilutions of Fab (0.78 nM to 500 nM) are injected in PBS with 0.05% polysorbate 20 (TWEEN-20®) surfactant (PBST) at 25° C. at a flow rate of approximately 25 µl/min. Association rates ($k_{on}$) and dissociation rates ($k_{off}$) are calculated using a simple one-to-one Langmuir binding model (BIACORE® Evaluation Software version 3.2) by simultaneously fitting the association and dissociation sensorgrams. The equilibrium dissociation constant ($K_D$) is calculated as the ratio $k_{off}/k_{on}$. See, for example, Chen et al., *J. Mol. Biol.* 293:865-881 (1999). If the on-rate exceeds $10^6$ $M^{-1}s^{-1}$ by the surface plasmon resonance assay above, then the on-rate can be determined by using a fluorescent quenching technique that measures the increase or decrease in fluorescence emission intensity (excitation=295 nm; emission=340 nm, 16 nm band-pass) at 25° C. of a 20 nM anti-antigen antibody (Fab form) in PBS, pH 7.2, in the presence of increasing concentrations of antigen as measured in a spectrometer, such as a stop-flow equipped spectrophotometer (Aviv Instruments) or a 8000-series SLM-AMINCO™ spectrophotometer (ThermoSpectronic) with a stirred cuvette.

2. Antibody Fragments

In certain instances, an anti-CD20/anti-CD3 bispecific antibody provided herein is an antibody fragment. Antibody fragments include, but are not limited to, Fab, Fab', Fab'-SH, F(ab')$_2$, Fv, and scFv fragments, and other fragments described below. For a review of certain antibody fragments, see Hudson et al. *Nat. Med.* 9:129-134 (2003). For a review of scFv fragments, see, e.g., Pluckthün, in *The Pharmacology of Monoclonal Antibodies*, vol. 113, Rosenburg and Moore eds., (Springer-Verlag, New York), pp. 269-315 (1994); see also WO 93/16185; and U.S. Pat. Nos. 5,571,894 and 5,587,458. For discussion of Fab and F(ab')$_2$ fragments comprising salvage receptor binding epitope residues and having increased in vivo half-life, see U.S. Pat. No. 5,869,046.

Diabodies are antibody fragments with two antigen-binding sites that may be bivalent or bispecific. See, for example, EP 404,097; WO 1993/01161; Hudson et al. *Nat. Med.* 9:129-134 (2003); and Hollinger et al. *Proc. Natl. Acad. Sci. USA* 90: 6444-6448 (1993). Triabodies and tetrabodies are also described in Hudson et al. *Nat. Med.* 9:129-134 (2003).

Single-domain antibodies are antibody fragments comprising all or a portion of the heavy chain variable domain or all or a portion of the light chain variable domain of an antibody. In certain instances, a single-domain antibody is a human single-domain antibody (Domantis, Inc., Waltham, MA; see, e.g., U.S. Pat. No. 6,248,516 B1).

Antibody fragments can be made by various techniques, including but not limited to proteolytic digestion of an intact antibody as well as production by recombinant host cells (e.g., *E. coli* or phage), as described herein.

3. Chimeric and Humanized Antibodies

In certain instances, an anti-CD20/anti-CD3 bispecific antibody provided herein is a chimeric antibody. Certain chimeric antibodies are described, e.g., in U.S. Pat. No. 4,816,567; and Morrison et al. *Proc. Natl. Acad. Sci. USA,* 81:6851-6855 (1984)). In one example, a chimeric antibody comprises a non-human variable region (e.g., a variable region derived from a mouse, rat, hamster, rabbit, or non-human primate, such as a monkey) and a human constant region. In a further example, a chimeric antibody is a "class switched" antibody in which the class or subclass has been changed from that of the parent antibody. Chimeric antibodies include antigen-binding fragments thereof.

In certain instances, a chimeric antibody is a humanized antibody. Typically, a non-human antibody is humanized to reduce immunogenicity to humans, while retaining the specificity and Affinity of the parental non-human antibody. Generally, a humanized antibody comprises one or more variable domains in which HVRs, e.g., CDRs, (or portions thereof) are derived from a non-human antibody, and FRs (or portions thereof) are derived from human antibody sequences. A humanized antibody optionally will also comprise at least a portion of a human constant region. In some instances, some FR residues in a humanized antibody are substituted with corresponding residues from a non-human antibody (e.g., the antibody from which the HVR residues are derived), e.g., to restore or improve antibody specificity or Affinity.

Humanized antibodies and methods of making them are reviewed, e.g., in Almagro and Fransson, *Front. Biosci.* 13:1619-1633 (2008), and are further described, e.g., in Riechmann et al., *Nature* 332:323-329 (1988); Queen et al., *Proc. Natl Acad. Sci. USA* 86:10029-10033 (1989); U.S. Pat.

Nos. 5,821,337, 7,527,791, 6,982,321, and 7,087,409; Kashmiri et al., *Methods* 36:25-34 (2005) (describing specificity determining region (SDR) grafting); Padlan, *Mol. Immunol.* 28:489-498 (1991) (describing "resurfacing"); Dall'Acqua et al., *Methods* 36:43-60 (2005) (describing "FR shuffling"); and Osbourn et al., *Methods* 36:61-68 (2005) and Klimka et al., *Br. J. Cancer*, 83:252-260 (2000) (describing the "guided selection" approach to FR shuffling).

Human Framework regions that may be used for humanization include but are not limited to: Framework regions selected using the "best-fit" method (see, e.g., Sims et al. *J. Immunol.* 151:2296 (1993)); Framework regions derived from the consensus sequence of human antibodies of a particular subgroup of light or heavy chain variable regions (see, e.g., Carter et al. *Proc. Natl. Acad. Sci. USA*, 89:4285 (1992); and Presta et al. *J. Immunol.*, 151:2623 (1993)); human mature (somatically mutated) Framework regions or human germline Framework regions (see, e.g., Almagro and Fransson, *Front. Biosci.* 13:1619-1633 (2008)); and Framework regions derived from screening FR libraries (see, e.g., Baca et al., *J. Biol. Chem.* 272:10678-10684 (1997) and Rosok et al., *J. Biol. Chem.* 271:22611-22618 (1996)).

4. Human Antibodies

In certain instances, an anti-CD20/anti-CD3 bispecific antibody is a human antibody. Human antibodies can be produced using various techniques known in the art. Human antibodies are described generally in van Dijk and van de Winkel, *Curr. Opin. Pharmacol.* 5: 368-74 (2001) and Lonberg, *Curr. Opin. Immunol.* 20:450-459 (2008).

Human antibodies may be prepared by administering an immunogen to a transgenic animal that has been modified to produce intact human antibodies or intact antibodies with human variable regions in response to antigenic challenge. Such animals typically contain all or a portion of the human immunoglobulin loci, which replace the endogenous immunoglobulin loci, or which are present extrachromosomally or integrated randomly into the animal's chromosomes. In such transgenic mice, the endogenous immunoglobulin loci have generally been inactivated. For review of methods for obtaining human antibodies from transgenic animals, see Lonberg, *Nat. Biotech.* 23:1117-1125 (2005). See also, e.g., U.S. Pat. Nos. 6,075,181 and 6,150,584 describing XENO-MOUSE™ technology; U.S. Pat. No. 5,770,429 describing HuMab® technology; U.S. Pat. No. 7,041,870 describing K-M MOUSE® technology, and U.S. Patent Application Publication No. US 2007/0061900, describing VelociMouse® technology). Human variable regions from intact antibodies generated by such animals may be further modified, e.g., by combining with a different human constant region.

Human antibodies can also be made by hybridoma-based methods. Human myeloma and mouse-human heteromyeloma cell lines for the production of human monoclonal antibodies have been described. (See, e.g., Kozbor *J. Immunol.*, 133: 3001 (1984); Brodeur et al., *Monoclonal Antibody Production Techniques and Applications*, pp. 51-63 (Marcel Dekker, Inc., New York, 1987); and Boerner et al., *J. Immunol.*, 147: 86 (1991).) Human antibodies generated via human B-cell hybridoma technology are also described in Li et al., *Proc. Natl. Acad. Sci. USA*, 103:3557-3562 (2006). Additional methods include those described, for example, in U.S. Pat. No. 7,189,826 (describing production of monoclonal human IgM antibodies from hybridoma cell lines) and Ni, *Xiandai Mianyixue*, 26(4):265-268 (2006) (describing human-human hybridomas). Human hybridoma technology (Trioma technology) is also described in Vollmers and Brandlein, *Histology and Histopathology*, 20(3):927-937 (2005) and Vollmers and Brandlein, *Methods and Findings in Experimental and Clinical Pharmacology*, 27(3):185-91 (2005).

Human antibodies may also be generated by isolating Fv clone variable domain sequences selected from human-derived phage display libraries. Such variable domain sequences may then be combined with a desired human constant domain. Techniques for selecting human antibodies from antibody libraries are described below.

5. Library-Derived Antibodies

Anti-CD20/anti-CD3 bispecific antibodies of the invention may be isolated by screening combinatorial libraries for antibodies with the desired activity or activities. For example, a variety of methods are known in the art for generating phage display libraries and screening such libraries for antibodies possessing the desired binding characteristics. Such methods are reviewed, e.g., in Hoogenboom et al. in *Methods in Molecular Biology* 178:1-37 (O'Brien et al., ed., Human Press, Totowa, NJ, 2001) and further described, e.g., in the McCafferty et al., *Nature* 348:552-554; Clackson et al., *Nature* 352: 624-628 (1991); Marks et al., *J. Mol. Biol.* 222: 581-597 (1992); Marks and Bradbury, in *Methods in Molecular Biology* 248:161-175 (Lo, ed., Human Press, Totowa, NJ, 2003); Sidhu et al., *J. Mol. Biol.* 338(2): 299-310 (2004); Lee et al., *J. Mol. Biol.* 340(5): 1073-1093 (2004); Fellouse, *Proc. Natl. Acad. Sci. USA* 101(34): 12467-12472 (2004); and Lee et al., *J. Immunol. Methods* 284(1-2): 119-132(2004).

In certain phage display methods, repertoires of VH and VL genes are separately cloned by polymerase chain reaction (PCR) and recombined randomly in phage libraries, which can then be screened for antigen-binding phage as described in Winter et al., *Ann. Rev. Immunol.*, 12: 433-455 (1994). Phage typically display antibody fragments, either as single-chain Fv (scFv) fragments or as Fab fragments. Libraries from immunized sources provide high-Affinity antibodies to the immunogen without the requirement of constructing hybridomas. Alternatively, the naive repertoire can be cloned (e.g., from human) to provide a single source of antibodies to a wide range of non-self and also self antigens without any immunization as described by Griffiths et al., *EMBO J*, 12: 725-734 (1993). Finally, naive libraries can also be made synthetically by cloning unrearranged V-gene segments from stem cells, and using PCR primers containing random sequence to encode the highly variable CDR3 regions and to accomplish rearrangement in vitro, as described by Hoogenboom and Winter, *J. Mol. Biol.*, 227: 381-388 (1992). Patent publications describing human antibody phage libraries include, for example: U.S. Pat. No. 5,750,373, and U.S. Patent Publication Nos. 2005/0079574, 2005/0119455, 2005/0266000, 2007/0117126, 2007/0160598, 2007/0237764, 2007/0292936, and 2009/0002360.

Anti-CD20/anti-CD3 bispecific antibodies or antibody fragments isolated from human antibody libraries are considered human antibodies or human antibody fragments herein.

6. Antibody Variants

In certain instances, amino acid sequence variants of anti-CD20/anti-CD3 bispecific antibodies of the invention are contemplated. For example, it may be desirable to improve the binding Affinity and/or other biological properties of the antibody. Amino acid sequence variants of an antibody may be prepared by introducing appropriate modifications into the nucleotide sequence encoding the antibody, or by peptide synthesis. Such modifications include, for example, deletions from, and/or insertions into and/or substitutions of residues within the amino acid sequences of the antibody. Any combination of deletion, insertion, and substitution can be made to arrive at the final construct, provided that the final construct possesses the desired characteristics, for example, antigen-binding.

a. Substitution, Insertion, and Deletion Variants

In certain instances, anti-CD20/anti-CD3 bispecific antibody variants having one or more amino acid substitutions are provided. Sites of interest for substitutional mutagenesis include the HVRs and FRs. Conservative substitutions are shown in Table 3 under the heading of "preferred substitutions." More substantial changes are provided in Table 3 under the heading of "exemplary substitutions," and as further described below in reference to amino acid side chain classes. Amino acid substitutions may be introduced into an antibody of interest and the products screened for a desired activity, for example, retained/improved antigen binding, decreased immunogenicity, or improved ADCC or CDC.

TABLE 3

Exemplary and Preferred Amino Acid Substitutions

| Original Residue | Exemplary Substitutions | Preferred Substitutions |
|---|---|---|
| Ala (A) | Val; Leu; Ile | Val |
| Arg (R) | Lys; Gln; Asn | Lys |
| Asn (N) | Gln; His; Asp, Lys; Arg | Gln |
| Asp (D) | Glu; Asn | Glu |
| Cys (C) | Ser; Ala | Ser |
| Gln (Q) | Asn; Glu | Asn |
| Glu (E) | Asp; Gln | Asp |
| Gly (G) | Ala | Ala |
| His (H) | Asn; Gln; Lys; Arg | Arg |
| Ile (I) | Leu; Val; Met; Ala; Phe; Norleucine | Leu |
| Leu (L) | Norleucine; Ile; Val; Met; Ala; Phe | Ile |
| Lys (K) | Arg; Gln; Asn | Arg |
| Met (M) | Leu; Phe; Ile | Leu |
| Phe (F) | Trp; Leu; Val; Ile; Ala; Tyr | Tyr |
| Pro (P) | Ala | Ala |
| Ser (S) | Thr | Thr |
| Thr (T) | Val; Ser | Ser |
| Trp (W) | Tyr; Phe | Tyr |
| Tyr (Y) | Trp; Phe; Thr; Ser | Phe |
| Val (V) | Ile; Leu; Met; Phe; Ala; Norleucine | Leu |

Amino acids may be grouped according to common side-chain properties:

(1) hydrophobic: Norleucine, Met, Ala, Val, Leu, Ile;
(2) neutral hydrophilic: Cys, Ser, Thr, Asn, Gln;
(3) acidic: Asp, Glu;
(4) basic: His, Lys, Arg;
(5) residues that influence chain orientation: Gly, Pro;
(6) aromatic: Trp, Tyr, Phe.

Non-conservative substitutions will entail exchanging a member of one of these classes for another class.

One type of substitutional variant involves substituting one or more hypervariable region residues of a parent antibody (e.g., a humanized or human antibody). Generally, the resulting variant(s) selected for further study will have modifications (e.g., improvements) in certain biological properties (e.g., increased Affinity, reduced immunogenicity) relative to the parent antibody and/or will have substantially retained certain biological properties of the parent antibody. An exemplary substitutional variant is an Affinity matured antibody, which may be conveniently generated, e.g., using phage display-based Affinity maturation techniques such as those described herein. Briefly, one or more HVR residues are mutated and the variant antibodies displayed on phage and screened for a particular biological activity (e.g., binding Affinity).

Alterations (e.g., substitutions) may be made in HVRs, e.g., to improve antibody Affinity. Such alterations may be made in HVR "hotspots," i.e., residues encoded by codons that undergo mutation at high frequency during the somatic maturation process (see, e.g., Chowdhury, *Methods Mol. Biol.* 207:179-196 (2008)), and/or residues that contact antigen, with the resulting variant VH or VL being tested for binding Affinity. Affinity maturation by constructing and reselecting from secondary libraries has been described, e.g., in Hoogenboom et al. in *Methods in Molecular Biology* 178:1-37 (O'Brien et al., ed., Human Press, Totowa, NJ, (2001).) In some instances of Affinity maturation, diversity is introduced into the variable genes chosen for maturation by any of a variety of methods (e.g., error-prone PCR, chain shuffling, or oligonucleotide-directed mutagenesis). A secondary library is then created. The library is then screened to identify any antibody variants with the desired Affinity. Another method to introduce diversity involves HVR-directed approaches, in which several HVR residues (e.g., 4-6 residues at a time) are randomized. HVR residues involved in antigen binding may be specifically identified, e.g., using alanine scanning mutagenesis or modeling. CDR-H3 and CDR-L3 in particular are often targeted.

In certain instances, substitutions, insertions, or deletions may occur within one or more HVRs so long as such alterations do not substantially reduce the ability of the antibody to bind antigen. For example, conservative alterations (e.g., conservative substitutions as provided herein) that do not substantially reduce binding Affinity may be made in HVRs. Such alterations may, for example, be outside of antigen contacting residues in the HVRs. In certain instances of the variant VH and VL sequences provided above, each HVR either is unaltered, or includes no more than one, two, or three amino acid substitutions.

A useful method for identification of residues or regions of an antibody that may be targeted for mutagenesis is called "alanine scanning mutagenesis" as described by Cunningham and Wells (1989) *Science,* 244:1081-1085. In this method, a residue or group of target residues (e.g., charged residues such as Arg, Asp, His, Lys, and Glu) are identified and replaced by a neutral or negatively charged amino acid (e.g., alanine or polyalanine) to determine whether the interaction of the antibody with antigen is affected. Further substitutions may be introduced at the amino acid locations demonstrating functional sensitivity to the initial substitutions. Alternatively, or additionally, a crystal structure of an antigen-antibody complex to identify contact points between the antibody and antigen. Such contact residues and neighboring residues may be targeted or eliminated as candidates for substitution. Variants may be screened to determine whether they contain the desired properties.

Amino acid sequence insertions include amino- and/or carboxyl-terminal fusions ranging in length from one residue to polypeptides containing a hundred or more residues, as well as intrasequence insertions of single or multiple amino acid residues. Examples of terminal insertions include an antibody with an N-terminal methionyl residue. Other insertional variants of the antibody molecule include the fusion to the N- or C-terminus of the antibody to an enzyme (e.g., for ADEPT) or a polypeptide which increases the serum half-life of the antibody.

b. Glycosylation Variants

In certain instances, anti-CD20/anti-CD3 bispecific antibodies of the invention can be altered to increase or decrease the extent to which the antibody is glycosylated. Addition or deletion of glycosylation sites to anti-CD20/anti-CD3 bispecific antibodies of the invention may be conveniently accomplished by altering the amino acid sequence such that one or more glycosylation sites is created or removed.

Where the antibody comprises an Fc region, the carbohydrate attached thereto may be altered. Native antibodies produced by mammalian cells typically comprise a branched, biantennary oligosaccharide that is generally attached by an N-linkage to Asn297 of the CH2 domain of the Fc region. See, e.g., Wright et al. *TIBTECH* 15:26-32 (1997). The oligosaccharide may include various carbohydrates, e.g., mannose, N-acetyl glucosamine (GlcNAc), galactose, and sialic acid, as well as a fucose attached to a GlcNAc in the "stem" of the biantennary oligosaccharide structure. In some instances, modifications of the oligosaccharide in an antibody of the invention are made in order to create antibody variants with certain improved properties.

In one instance, anti-CD20/anti-CD3 bispecific antibody variants are provided having a carbohydrate structure that lacks fucose attached (directly or indirectly) to an Fc region. For example, the amount of fucose in such antibody may be from 1% to 80%, from 1% to 65%, from 5% to 65% or from 20% to 40%. The amount of fucose is determined by calculating the average amount of fucose within the sugar chain at Asn297, relative to the sum of all glycostructures attached to Asn297 (e.g. complex, hybrid and high mannose structures) as measured by MALDI-TOF mass spectrometry, as described in WO 2008/077546, for example. Asn297 refers to the asparagine residue located at about position 297 in the Fc region (EU numbering of Fc region residues); however, Asn297 may also be located about ±3 amino acids upstream or downstream of position 297, i.e., between positions 294 and 300, due to minor sequence variations in antibodies. Such fucosylation variants may have improved ADCC function. See, e.g., U.S. Patent Publication Nos. US 2003/0157108 (Presta, L.); US 2004/0093621 (Kyowa Hakko Kogyo Co., Ltd). Examples of publications related to "defucosylated" or "fucose-deficient" antibody variants include: US 2003/0157108; WO 2000/61739; WO 2001/29246; US 2003/0115614; US 2002/0164328; US 2004/0093621; US 2004/0132140; US 2004/0110704; US 2004/0110282; US 2004/0109865; WO 2003/085119; WO 2003/084570; WO 2005/035586; WO 2005/035778; WO2005/053742; WO2002/031140; Okazaki et al. *J. Mol. Biol.* 336:1239-1249 (2004); Yamane-Ohnuki et al. *Biotech. Bioeng.* 87: 614 (2004). Examples of cell lines capable of producing defucosylated antibodies include Lec13 CHO cells deficient in protein fucosylation (Ripka et al. *Arch. Biochem. Biophys.* 249:533-545 (1986); U.S. Patent Application No. US 2003/0157108 A1, Presta, L; and WO 2004/056312 A1, Adams et al., especially at Example 11), and knockout cell lines, such as alpha-1,6-fucosyltransferase gene, FUT8, knockout CHO cells (see, e.g., Yamane-Ohnuki et al. *Biotech. Bioeng.* 87: 614 (2004); Kanda, Y. et al., *Biotechnol. Bioeng.*, 94(4):680-688 (2006); and WO2003/085107).

In view of the above, in some instances, the methods of the invention involve administering to the patient in the context of a fractionated, dose-escalation dosing regimen an anti-CD20/anti-CD3 bispecific antibody variant that comprises an aglycosylation site mutation. In some instances, the aglycosylation site mutation reduces effector function of the antibody. In some instances, the aglycosylation site mutation is a substitution mutation. In some instances, the antibody comprises a substitution mutation in the Fc region that reduces effector function. In some instances, the substitution mutation is at amino acid residue N297, L234, L235, and/or D265 (EU numbering). In some instances, the substitution mutation is selected from the group consisting of N297G, N297A, L234A, L235A, D265A, and P329G (EU numbering). In some instances, the substitution mutation is at amino acid residue N297 (EU numbering). In a preferred instance, the substitution mutation is N297A (EU numbering). In some embodiments the anti-CD20 arm of the anti-CD20/anti-CD3 bispecific antibody further comprises T366W and N297G substitution mutations (EU numbering). In some embodiments, the anti-CD3 arm of the anti-CD20/anti-CD3 bispecific antibody further comprises T366S, L368A, Y407V, and N297G substitution mutations (EU numbering). In some embodiments, (a) the anti-CD20 arm further comprises T366W and N297G substitution mutations and (b) the anti-CD3 arm further comprises T366S, L368A, Y407V, and N297G substitution mutations (EU numbering).

Anti-CD20/anti-CD3 bispecific antibody variants are further provided with bisected oligosaccharides, for example, in which a biantennary oligosaccharide attached to the Fc region of the antibody is bisected by GlcNAc. Such antibody variants may have reduced fucosylation and/or improved ADCC function. Examples of such antibody variants are described, e.g., in WO 2003/011878 (Jean-Mairet et al.); U.S. Pat. No. 6,602,684 (Umana et al.); and US 2005/0123546 (Umana et al.). Antibody variants with at least one galactose residue in the oligosaccharide attached to the Fc region are also provided. Such antibody variants may have improved CDC function. Such antibody variants are described, e.g., in WO 1997/30087 (Patel et al.); WO 1998/58964 (Raju, S.); and WO 1999/22764 (Raju, S.).

c. Fc Region Variants

In certain instances, one or more amino acid modifications are introduced into the Fc region of an anti-CD20/anti-CD3 bispecific antibody of the invention, thereby generating an Fc region variant (see e.g., US 2012/0251531). The Fc region variant may comprise a human Fc region sequence (e.g., a human IgG1, IgG2, IgG3 or IgG4 Fc region) comprising an amino acid modification (e.g., a substitution) at one or more amino acid positions.

In certain instances, the invention contemplates an anti-CD20/anti-CD3 bispecific antibody variant that possesses some but not all effector functions, which make it a desirable candidate for applications in which the half-life of the antibody in vivo is important yet certain effector functions (such as complement and ADCC) are unnecessary or deleterious. In vitro and/or in vivo cytotoxicity assays can be conducted to confirm the reduction/depletion of CDC and/or ADCC activities. For example, Fc receptor (FcR) binding assays can be conducted to ensure that the antibody lacks FcgR binding (hence likely lacking ADCC activity), but retains FcRn binding ability. The primary cells for mediating ADCC, NK cells, express Fc(RIII only, whereas monocytes express Fc(RI, Fc(RII, and Fc(RIII. FcR expression on hematopoietic cells is summarized in Table 3 on page 464 of Ravetch and Kinet, *Annu. Rev. Immunol.* 9:457-492 (1991). Non-limiting examples of in vitro assays to assess ADCC activity of a molecule of interest is described in U.S. Pat. No. 5,500,362 (see, e.g., Hellstrom, I. et al. *Proc. Natl Acad. Sci. USA* 83:7059-7063 (1986)) and Hellstrom, I. et al., *Proc. Natl Acad. Sci. USA* 82:1499-1502 (1985); U.S. Pat. No. 5,821,337 (see Bruggemann, M. et al., *J. Exp. Med.* 166: 1351-1361 (1987)). Alternatively, non-radioactive assays methods may be employed (see, for example, ACTI™ non-radioactive cytotoxicity assay for flow cytometry (CellTechnology, Inc. Mountain View, CA; and CYTOTOX 96® non-radioactive cytotoxicity assay (PROMEGA®, Madison, WI). Useful effector cells for such assays include peripheral blood mononuclear cells (PBMC) and Natural Killer (NK) cells. Alternatively, or additionally, ADCC activity of the molecule of interest may be assessed in vivo, e.g., in an animal model such as that disclosed in Clynes et al. *Proc. Natl Acad. Sci. USA* 95:652-656 (1998). C1q binding assays may also be carried out to confirm that the antibody is unable to bind C1q and hence lacks CDC activity. See, e.g., C1q and C3c binding ELISA in WO 2006/029879 and WO 2005/100402. To assess complement activation, a CDC assay may be performed (see, for example, Gazzano-Santoro et al. *J. Immunol. Methods* 202: 163 (1996); Cragg, M. S. et al. *Blood.* 101:1045-1052 (2003); and Cragg, M. S. and M. J. Glennie Blood. 103: 2738-2743 (2004)). FcRn binding and in vivo clearance/half-life determinations can also be performed using methods known in the art (see, e.g., Petkova, S. B. et al. *Int'l. Immunol.* 18(12):1759-1769 (2006)).

Antibodies with reduced effector function include those with substitution of one or more of Fc region residues 238, 265, 269, 270, 297, 327 and 329 (U.S. Pat. Nos. 6,737,056 and 8,219,149). Such Fc mutants include Fc mutants with substitutions at two or more of amino acid positions 265, 269, 270, 297 and 327, including the so-called "DANA" Fc mutant with substitution of residues 265 and 297 to alanine (U.S. Pat. Nos. 7,332,581 and 8,219,149).

In certain instances, the proline at position 329 of a wild-type human Fc region in the antibody is substituted with glycine or arginine or an amino acid residue large enough to destroy the proline sandwich within the Fc/Fc.gamma receptor interface that is formed between the proline 329 of the Fc and tryptophan residues Trp 87 and Trp 110 of FcgRIII (Sondermann et al.: Nature 406, 267-273 (20 Jul. 2000)). In certain instances, the antibody comprises at least one further amino acid substitution. In one instance, the further amino acid substitution is S228P, E233P, L234A, L235A, L235E, N297A, N297D, or P331S, and still in another instance the at least one further amino acid substitution is L234A and L235A of the human IgG1 Fc region or S228P and L235E of the human IgG4 Fc region (see e.g., US 2012/0251531), and still in another instance the at least one further amino acid substitution is L234A and L235A and P329G of the human IgG1 Fc region.

Certain antibody variants with improved or diminished binding to FcRs are described. (See, e.g., U.S. Pat. No. 6,737,056; WO 2004/056312, and Shields et al., *J. Biol. Chem.* 9(2): 6591-6604 (2001).)

In certain instance, an antibody variant comprises an Fc region with one or more amino acid substitutions which improve ADCC, e.g., substitutions at positions 298, 333, and/or 334 of the Fc region (EU numbering of residues).

In some instances, alterations are made in the Fc region that result in altered (i.e., either improved or diminished) C1q binding and/or Complement Dependent Cytotoxicity (CDC), e.g., as described in U.S. Pat. No. 6,194,551, WO 99/51642, and Idusogie et al. *J. Immunol.* 164: 4178-4184 (2000).

Antibodies with increased half-lives and improved binding to the neonatal Fc receptor (FcRn), which is responsible for the transfer of maternal IgGs to the fetus (Guyer et al., *J. Immunol.* 117:587 (1976) and Kim et al., *J. Immunol.* 24:249 (1994)), are described in US2005/0014934A1 (Hinton et al.). Those antibodies comprise an Fc region with one or more substitutions therein which improve binding of the Fc region to FcRn. Such Fc variants include those with substitutions at one or more of Fc region residues: 238, 256, 265, 272, 286, 303, 305, 307, 311, 312, 317, 340, 356, 360, 362, 376, 378, 380, 382, 413, 424, or 434, e.g., substitution of Fc region residue 434 (U.S. Pat. No. 7,371,826).

See also Duncan & Winter, *Nature* 322:738-40 (1988); U.S. Pat. Nos. 5,648,260; 5,624,821; and WO 94/29351 concerning other examples of Fc region variants.

In some aspects, the anti-CD20/anti-CD3 bispecific antibody comprises an Fc region comprising an N297G mutation (EU numbering).

In some instances, the anti-CD20/anti-CD3 bispecific antibody comprises one or more heavy chain constant domains, wherein the one or more heavy chain constant domains are selected from a first CH1 ($CH1_1$) domain, a first CH2 ($CH2_1$) domain, a first CH3 ($CH3_1$) domain, a second CH1 ($CH1_2$) domain, second CH2 ($CH2_2$) domain, and a second CH3 ($CH3_2$) domain. In some instances, at least one of the one or more heavy chain constant domains is paired with another heavy chain constant domain. In some instances, the $CH3_1$ and $CH3_2$ domains each comprise a protuberance or cavity, and wherein the protuberance or cavity in the $CH3_1$ domain is positionable in the cavity or protuberance, respectively, in the CH32 domain. In some instances, the $CH3_1$ and $CH3_2$ domains meet at an interface between said protuberance and cavity. In some instances, the $CH2_1$ and $CH2_2$ domains each comprise a protuberance or cavity, and wherein the protuberance or cavity in the $CH2_1$ domain is positionable in the cavity or protuberance, respectively, in the $CH2_2$ domain. In other instances, the $CH2_1$ and $CH2_2$ domains meet at an interface between said protuberance and cavity. In some instances, the anti-CD20/anti-CD3 bispecific antibody is an IgG1 antibody.

d. Cysteine Engineered Antibody Variants

In certain instances, it is desirable to create cysteine engineered anti-CD20/anti-CD3 bispecific antibodies, e.g., "thioMAbs," in which one or more residues of an antibody are substituted with cysteine residues. In particular instances, the substituted residues occur at accessible sites of the antibody. By substituting those residues with cysteine, reactive thiol groups are thereby positioned at accessible sites of the antibody and may be used to conjugate the antibody to other moieties, such as drug moieties or linker-drug moieties, to create an immunoconjugate, as described further herein. In certain instances, any one or more of the following residues are substituted with cysteine: V205 (Kabat numbering) of the light chain; A118 (EU numbering) of the heavy chain; and S400 (EU numbering) of the heavy chain Fc region. Cysteine engineered antibodies may be generated as described, for example, in U.S. Pat. No. 7,521,541.

e. Antibody Derivatives

In certain instances, an anti-CD20/anti-CD3 bispecific antibody provided herein is further modified to contain additional nonproteinaceous moieties that are known in the art and readily available. The moieties suitable for derivatization of the antibody include but are not limited to water soluble polymers. Non-limiting examples of water soluble polymers include, but are not limited to, polyethylene glycol (PEG), copolymers of ethylene glycol/propylene glycol, carboxymethylcellulose, dextran, polyvinyl alcohol, polyvinyl pyrrolidone, poly-1, 3-dioxolane, poly-1,3,6-trioxane, ethylene/maleic anhydride copolymer, polyaminoacids (either homopolymers or random copolymers), and dextran or poly(n-vinyl pyrrolidone)polyethylene glycol, polypropylene glycol homopolymers, polypropylene oxide/ethylene oxide co-polymers, polyoxyethylated polyols (e.g., glycerol), polyvinyl alcohol, and mixtures thereof. Polyethylene glycol propionaldehyde may have advantages in manufacturing due to its stability in water. The polymer may be of any molecular weight, and may be branched or unbranched. The number of polymers attached to the antibody may vary, and if more than one polymer are attached, they can be the same or different molecules. In general, the number and/or type of polymers used for derivatization can be determined based on considerations including, but not limited to, the particular properties or functions of the antibody to be improved, whether the antibody derivative will be used in a therapy under defined conditions, etc.

In another instance, conjugates of an antibody and non-proteinaceous moiety that may be selectively heated by exposure to radiation are provided. In one instance, the nonproteinaceous moiety is a carbon nanotube (Kam et al., *Proc. Natl. Acad. Sci. USA* 102: 11600-11605 (2005)). The radiation may be of any wavelength, and includes, but is not limited to, wavelengths that do not harm ordinary cells, but which heat the nonproteinaceous moiety to a temperature at which cells proximal to the antibody-nonproteinaceous moiety are killed.

7. Recombinant Production Methods

Anti-CD20/anti-CD3 bispecific antibodies of the invention may be produced using recombinant methods and compositions, for example, as described in U.S. Pat. No. 4,816,567, which is incorporated herein by reference in its entirety.

For recombinant production of an anti-CD20/anti-CD3 bispecific antibody, nucleic acid encoding an antibody is isolated and inserted into one or more vectors for further cloning and/or expression in a host cell. Such nucleic acid may be readily isolated and sequenced using conventional procedures (e.g., by using oligonucleotide probes that are capable of binding specifically to genes encoding the heavy and light chains of the antibody).

Suitable host cells for cloning or expression of antibody-encoding vectors include prokaryotic or eukaryotic cells described herein. For example, antibodies may be produced in bacteria, in particular when glycosylation and Fc effector function are not needed. For expression of antibody fragments and polypeptides in bacteria, see, e.g., U.S. Pat. Nos. 5,648,237, 5,789,199, and 5,840,523. (See also Charlton, *Methods in Molecular Biology, Vol.* 248 (B. K. C. Lo, ed., Humana Press, Totowa, NJ, 2003), pp. 245-254, describing expression of antibody fragments in *E. coli*.) After expression, the antibody may be isolated from the bacterial cell paste in a soluble fraction and can be further purified.

In addition to prokaryotes, eukaryotic microbes such as filamentous fungi or yeast are suitable cloning or expression hosts for antibody-encoding vectors, including fungi and yeast strains whose glycosylation pathways have been "humanized," resulting in the production of an antibody with a partially or fully human glycosylation pattern. See Gerngross, *Nat. Biotech.* 22:1409-1414 (2004), and Li et al., *Nat. Biotech.* 24:210-215 (2006).

Suitable host cells for the expression of glycosylated antibody are also derived from multicellular organisms (invertebrates and vertebrates). Examples of invertebrate cells include plant and insect cells. Numerous baculoviral strains have been identified which may be used in conjunction with insect cells, particularly for transfection of *Spodoptera frugiperda* cells.

Plant cell cultures can also be utilized as hosts. See, e.g., U.S. Pat. Nos. 5,959,177, 6,040,498, 6,420,548, 7,125,978, and 6,417,429 (describing PLANTIBODIES™ technology for producing antibodies in transgenic plants).

Vertebrate cells may also be used as hosts. For example, mammalian cell lines that are adapted to grow in suspension may be useful. Other examples of useful mammalian host cell lines are monkey kidney CV1 line transformed by SV40 (COS-7); human embryonic kidney line (293 or 293 cells as described, e.g., in Graham et al., *J. Gen Virol.* 36:59 (1977)); baby hamster kidney cells (BHK); mouse sertoli cells (TM4 cells as described, e.g., in Mather, *Biol. Reprod.* 23:243-251 (1980)); monkey kidney cells (CV1); African green monkey kidney cells (VERO-76); human cervical carcinoma cells (HELA); canine kidney cells (MDCK; buffalo rat liver cells (BRL 3A); human lung cells (W138); human liver cells (Hep G2); mouse mammary Tumor (MMT 060562); TRI cells, as described, e.g., in Mather et al., *Annals N.Y. Acad. Sci.* 383:44-68 (1982); MRC 5 cells; and FS4 cells. Other useful mammalian host cell lines include Chinese hamster ovary (CHO) cells, including DHFR" CHO cells (Urlaub et al., *Proc. Natl. Acad. Sci. USA* 77:4216 (1980)); and myeloma cell lines such as Y0, NS0 and Sp2/0. For a review of certain mammalian host cell lines suitable for antibody production, see, e.g., Yazaki and Wu, *Methods in Molecular Biology, Vol.* 248 (B. K. C. Lo, ed., Humana Press, Totowa, NJ), pp. 255-268 (2003).

E. Additional Therapeutic Agents

In some instances, the methods described herein include administering the bispecific anti-CD20/anti-CD3 antibody in combination with one or more additional therapeutic agents.

In some instances, the one or more additional therapeutic agents may reduce the rate or the severity of cytokine release syndrome (CRS). In some instances, the one or more additional therapeutic agents may prevent symptoms associated with CRS. In particular instances, the additional therapeutic agent used to reduce the rate or severity of CRS or prevent symptoms associated with CRS is a corticosteroid (e.g., dexamethasone (CAS #: 50-02-2), prednisone (CAS #: 53-03-2), prednisolone (CAS #50-42-8), or methylprednisolone (CAS #: 83-43-2)) or an IL-6R antagonist (e.g., tocilizumab, sarilumab, vobarilizumab (ALX-0061), satralizumab (SA-237), and variants thereof). In some instances, the additional therapeutic agent is dexamethasone. In some instances, the additional therapeutic agent is prednisone. In some instances, the additional therapeutic agent is tocilizumab.

In some instances, additional therapeutic agents useful in the present invention include corticosteroids, cyclophosphamides, B-cell-depleting therapies, and calineurin inhibitors. Examples of corfticosteroids include hydrocortisone, cortisone acetate, prednisolone, dexamethasone, betamethasone, triamcinolone, beclometasone, methylprednisolone, and prednisone. Exemplary B-cell-depleting therapies include rituximab, ocrelizumab, ofatumumab, and obinutuzumab. Examplary calcineurin inhibitors comprises ciclosporin, tacrolimus, and vocolosporin.

IV. Pharmaceutical Compositions and Formulations

Any of the antibodies (e.g., anti-CD20/anti-CD3 bispecific antibodies) described herein can be used in pharmaceutical compositions and formulations. Pharmaceutical compositions and formulations of antibodies and/or other agents describe herein can be prepared by mixing one, two, or all three agents having the desired degree of purity with one or more optional pharmaceutically acceptable carriers (*Remington's Pharmaceutical Sciences* 16th edition, Osol, A. Ed. (1980)), in the form of lyophilized formulations or aqueous solutions. Pharmaceutically acceptable carriers are generally nontoxic to recipients at the dosages and concentrations employed, and include, but are not limited to: buffers such as phosphate, citrate, and other organic acids; antioxidants including ascorbic acid and methionine; preservatives (such as octadecyldimethylbenzyl ammonium chloride; hexamethonium chloride; benzalkonium chloride; benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g., Zn-protein complexes); and/or non-ionic surfactants such as polyethylene glycol (PEG). Exemplary pharmaceutically acceptable carriers herein further include interstitial drug dispersion agents such as soluble neutral-active hyaluronidase glycoproteins (sHASEGP), for example, human soluble PH-20 hyaluronidase glycoproteins, such as rHuPH20 (HYLENEX®, Baxter International, Inc.). Certain exemplary sHASEGPs and methods of use, including rHuPH20, are described in U.S. Patent Publication Nos. 2005/0260186 and 2006/0104968. In one aspect, a sHASEGP is combined with one or more additional glycosaminoglycanases such as chondroitinases.

Exemplary lyophilized antibody formulations are described in U.S. Pat. No. 6,267,958. Aqueous antibody formulations include those described in U.S. Pat. No. 6,171,586 and WO2006/044908, the latter formulations including a histidine-acetate buffer.

The formulation herein may also contain more than one active ingredient as necessary for the particular indication being treated, preferably those with complementary activities that do not adversely affect each other. For example, it may be desirable to further provide an additional therapeutic agent (e.g., a chemotherapeutic agent, a cytotoxic agent, a growth inhibitory agent, and/or an anti-hormonal agent, such as those recited herein above). Such active ingredients are suitably present in combination in amounts that are effective for the purpose intended.

Active ingredients may be entrapped in microcapsules prepared, for example, by coacervation techniques or by interfacial polymerization, for example, hydroxymethylcellulose or gelatin-microcapsules and poly-(methyl methacrylate) microcapsules, respectively, in colloidal drug delivery systems (for example, liposomes, albumin microspheres, microemulsions, nano-particles and nanocapsules) or in macroemulsions. Such techniques are disclosed in *Remington's Pharmaceutical Sciences* 16th edition, Osol, A. Ed. (1980).

Sustained-release preparations may be prepared. Suitable examples of sustained-release preparations include semipermeable matrices of solid hydrophobic polymers containing the antibody, which matrices are in the form of shaped articles, for example, films, or microcapsules.

The formulations to be used for in vivo administration are generally sterile. Sterility may be readily accomplished, e.g., by filtration through sterile filtration membranes.

V. Kits and Articles of Manufacture

In another aspect of the invention, a kit or an article of manufacture containing materials useful for the treatment, prevention, and/or diagnosis of the disorders described above is provided. The kit or article of manufacture comprises a container and a label or package insert on or associated with the container. Suitable containers include, for example, bottles, vials, syringes, IV solution bags, etc. The containers may be formed from a variety of materials such as glass or plastic. The container holds a composition which is by itself or combined with another composition effective for treating, preventing and/or diagnosing the condition and may have a sterile access port (for example the container may be a vial having a stopper pierceable by a hypodermic injection needle). At least one active agent in the composition is an anti-CD20/anti-CD3 bispecific antibody described herein. The label or package insert indicates that the composition is used for treating the previously untreated condition of choice (e.g., a previously untreated B cell proliferation disorder, e.g., a high grade B-cell lymphoma (HGBL) or non-Hodgkin's lymphoma (NHL), e.g., diffuse large B cell lymphoma (DLBCL)) and further includes information related to at least one of the dosing regimens described herein. Moreover, the kit or article of manufacture may comprise (a) a first container with a composition contained therein, wherein the composition comprises an anti-CD20/anti-CD3 bispecific antibody described herein; and (b) a second container with a composition contained therein, wherein the composition comprises a further cytotoxic or otherwise therapeutic agent. Alternatively, or additionally, the kit or article of manufacture may further comprise a second (or third) container comprising a pharmaceutically-acceptable buffer, such as bacteriostatic water for injection (BWFI), phosphate-buffered saline, Ringer's solution and dextrose solution. It may further include other materials desirable from a commercial and user standpoint, including other buffers, diluents, filters, needles, and syringes.

In one aspect, a kit, includes (a) a first container includes mosunetuzumab, and (b) a package insert with instructions for providing a therapy to in a patient who has systemic lupus erythematosus where the mosunetuzumab is administered subcutaneously and according to a dosing regimen includes at least a first dosing cycle, where the first dosing cycle includes a first dose (C1D1) and a second dose (C1D2) of mosunetuzumab, where C1D1 is between about 1.6 mg to about 5 mg and administered on day 1 of the cycle and the C1D2 is between about 15 mg to about 60 mg and administered on day 8 of the cycle.

The kit can also include where C1D1 is 1.6 mg, and C1D2 is 15 mg.

The kit can also include where C1D1 is 1.6 mg, and C1D2 is 45 mg.

The kit can also include where C1D1 is 1.6 mg, and C1D2 is 60 mg.

The kit can also include where C1D1 is 5 mg, and C1D2 is 15 mg.

The kit can also include where C1D1 is 5 mg, and C1D2 is 45 mg.

The kit can also include where C1D1 is 5 mg, and C1D2 is 60 mg.

Each dose may be provided in one or multiple containers. In some embodiments, the kit includes a container of mosunetuzumab sufficient to administer the indicated dosse. In other embodiments, the kit contains a container for each dose; e.g., a container providing sufficient mosunetuzumab for administering C1D1, another for C1D2. For example, in the instance where a kit provides C1D1 as 5 mg and C1D2 as 60 mg, then a container is dedicated to C1D1 and contains sufficient quantity of mosunetuzumab to deliver 5 mg, and a second container contains sufficient quantity of mosunetuzumab to deliver 60 mg.

In some embodiments, mosunetuzumab is contained within at least one injection device, such as a pre-filled syringe or autoinjector.

Other technical features may be readily apparent to one skilled in the art from the following figures, descriptions, and claims.

VI. Measuring Changes in Systemic Lupus Erythematosus

Provided herein are methods of treating patients who have systemic lupus erythematosus by administering an effective amount of a bispecific antibody that binds CD3 and CD20, mosunetuzumab. In treating patients, any tool available to one in the skill of the art to assess a change in a symptom of systemic lupus erythematosus can be used. The tools can be used singly or in any combination. Following are some examples of such tools.

One tool is known as the Patient Global Impression of Severity (PGI-S). It is a simple tool shown in FIG. 3 that asks a patient to describe the severity of their lupus over the past week, choosing from the categories of None, Mild, Moderate, Severe, to Very severe. A decrease in a symptom of systemic lupus erythematosus would be a PGI-S result that moves from anything other than "None" towards "None."

Another tool is the Physician Global Assessment (PGA) (FIG. 4). The PGA is a 0-10 cm Visual Analogue Scale, anchored at 0 (none) and 3 (severe), with intermediate lines at 1 (mild), and 2 (moderate) designed for the physician to indicate the subject's overall disease activity at a particular visit (Petri et al. 1999). Patient history, results of the physical examination, as well as pertinent laboratory values are taken into account when rating the participant's disease activity. Each PGA measurement can be transformed linearly (×3/10) to obtain a value between 0.00 and 3.00. A decrease in a symptom of systemic lupus erythematosus would be a PGA assessment that moves away from "severe (3)" to "none (0)."

Changes in titer of antinuclear antibody (ANA), as previously discussed, are often elevated in systemic lupus erythematosus. ANA can be determined using standard assays, including assays using immunofluorescence. In one embodiment, ANA titers are greater 1:80 on HEp-2 cells or equivalent positive test, indicating a symptom of systemic lupus erythematosus. In one embodiment, reduction in ANA titer indicates an improvement in systemic lupus erythematosus.

Changes in anti-double stranded DNA (dsDNA) antibodies (IgG) titer can also be used. Standard assays can be sued to detect and quantify dsDNA. In one embodiment, a reduction in dsDNA antibody (IgG) titer indicates an improvement in systemic lupus erythematosus.

Complement C3 and/or complement C4 levels are often reduced in systemic lupus erythematosus patients. Changes in these levels can be assayed using any standard assay to quantify changes. An increase in complement C3 and/or complement C4 indicates an improvement in systemic lupus erythematosus.

The tools list above and others that may be selected by one of skill in the art can be used and interpreted in reference to expected average values for a patient. In addition, changes can be interpreted relative to a baseline set by an initial test or assay, which changes are detected by repeated administration of the same test or assay over time and the resulting values compared to the observed baseline.

VII. Embodiments

Embodiment 1. A method of treating a patient, comprising administering to the patient an effective amount of mosunetuzumab, wherein the patient has systemic lupus erythematosus.

Embodiment 2. The method of Embodiment 1, wherein the patient is being administered before being administered the effective amount of mosunetuzumab an oral corticosteroid, an antimalarial agent, or an immunosuppressant.

Embodiment 3. The method of Embodiment 2, wherein the patient has been administered a stable dose of at least 40 mg/day prednisone (or equivalent) for at least 7 days prior to being administered an effective amount of mosunetuzumab.

Embodiment 4. The method of Embodiment 2, wherein the patient has been administered the antimalarial agent at a stable dose for at least 4 weeks prior to being administered an effective amount of mosunetuzumab.

Embodiment 5. The method of Embodiment 2, wherein the patient has been administered an immunosuppressant at a stable dose for at least 4 weeks prior to being administered an effective amount of mosunetuzumab.

Embodiment 6. The method of Embodiment 5, wherein the immunosuppressant is azathioprine, mycophenolate mofetil, mycophenolic acid, or methotrexate.

Embodiment 7. The method of Embodiment 1, wherein the patient does not have a lupus-associated neuropsychiatric disease.

Embodiment 8. The method of Embodiment 7, wherein the lupus-associated neuropsychiatric disease is meningitis, retinitis, cerebral vasculitis, myelopathy, demyelination syndromes, acute confusional state, psychosis, acute stroke or stroke syndrome, cranial neuropathy, status epilepticus or seizures, cerebellar ataxia, or mononeuritis multiplex.

Embodiment 9. The method of Embodiment 1, wherein the patient does not have active overlap syndrome with mixed connective tissue disease or systemic sclerosis within a year of being administered the effective amount of mosunetuzumab.

Embodiment 10. The method of Embodiment 1, wherein the patient does not have catastrophic or severe antiphospholipid syndrome within a year of being administered the effective amount of mosunetuzumab, unless the severe antiphospholipid syndrome has been adequately controlled by administering anticoagulant therapy to the patient at least 3 months of being administered the effective amount of mosunetuzumab.

Embodiment 11. The method of Embodiment 1, wherein the patient has not been administered:
(a) at least 12 months before being administered the effective amount of mosunetuzumab:
  (i) anti-CD19 antibody therapy, or
  (ii) anti-CD20 monoclonal antibody therapy;
or
(b) at least 30 days before being administered the effective amount of mosunetuzumab:
  (i) kinase inhibitors of Janus Kinase (JAK) kinase, Bruton tyrosine kinase, or tyrosine kinase 2, or
  (ii) tacrolimus, ciclosporin, or voclosporin;

or
(c) at least 2 months before being administered the effective amount of mosunetuzumab:
(i) cyclophosphamide, or
(ii) biologic therapy.

Embodiment 12. The method of Embodiment 11, wherein:
(a) the anti-CD19 therapy is blinatumomab;
(b) the anti-CD20 therapy is obinutuzumab, rituximab, ocrelizumab, or ofatumumab;
(c) the kinase inhibitors are baricitinib, tofacitinib, upadacitinib, filgotinib, ibrutinib, or fenebrutinib; or
(d) the biologic therapy is belimumab, ustekinumab, anifrolumab, secukinumab, or atacicept.

Embodiment 13. The method of Embodiment 1, wherein the patient does not have significant lupus-associated renal disease or significant renal impairment.

Embodiment 14. The method of Embodiment 1, wherein the patient does not have one laboratory parameter selected from the group consisting of:
(a) total bilirubin>1.5×ULN,
(b) ANC<1.5×10$^9$/L (<1500/mm$^3$),
(c) platelet count<100×10$^9$/L (100,000/mm$^3$),
(d) hemoglobin<100 g/L,
(e) estimated glomulerular filtration rate (eGFR)<30 ml/min/1.73 m$^2$ calculated according to the Chronic Kidney Disease Epidemiology Collaboration equation, and
(f) positive serum human chorionic gonadotropin.

Embodiment 15. The method of Embodiment 1, wherein at least one symptom of SLE is reduced.

Embodiment 16. The method of Embodiment 15, wherein the at least one reduced symptom of SLE is measured using a Patient Global Impression of Severity (PGI-S), a Physician Global Assessment (PGA), a decrease in titer of antinuclear antibody (ANA), a decrease in titer of anti-double stranded DNA (dsDNA) antibody (IgG) titer, an increase in complement C3 levels, or an increase in complement C4 levels.

Embodiment 17. The method of Embodiment 16, wherein the at least one reduced symptom is a change in response of at least one step on the PGI-S from a previous response, wherein the change is one change of from "very severe" to "severe," "severe" to "moderate," "moderate" to "mild," or "mild" to "none."

18. The method of Embodiment 16, wherein the at least one reduced symptom is a change in rating by a healthcare provider using the PGA, wherein the change is a decrease from a previous rating using the PGA.

Embodiment 19. The method of Embodiment 18, wherein the decrease from a previous rating using the PGA is >0.3 points from baseline.

Embodiment 20. The method of Embodiment 1, wherein the administering an effective amount of mosunetuzumab comprises administering mosunetuzumab according to a dosing regimen comprising at least a first dosing cycle, wherein the first dosing cycle comprises a first dose (C1D1) and a second dose (C1D2) of mosunetuzumab, wherein the C1D1 is less than C1D2, and wherein the C1D1 is between about 1.6 mg to about 5 mg and the C1D2 is between about 15 mg to about 60 mg.

Embodiment 21. The method of Embodiment 20, wherein the C1D2 is 15 mg, 45 mg, or 60 mg.

Embodiment 22. The method of Embodiment 20, wherein the first dose cycle is about 8 days.

Embodiment 23. The method of Embodiment 22, wherein the C1D1 dose of mosunetuzumab is administered on about day 1 of the cycle.

Embodiment 24. The method of Embodiment 22, wherein the C1D2 dose of mosunetuzumab is administered on about day 8 of the cycle.

Embodiment 25. The method of Embodiment 1, wherein mosunetuzumab is administered subcutaneously.

Embodiment 26. The method of Embodiment 1, wherein the patient is further administered tocilizumab if the patient experiences cytokine release syndrome (CRS).

Embodiment 27. The method of Embodiment 1, further comprising administering to the patient a corticosteroid, cyclophosphamide, a B-cell-depleting therapy, or calcineurin inhibitor.

Embodiment 28. The method of Embodiment 27, wherein the corticosteroid comprises hydrocortisone, cortisone acetate, prednisolone, dexamethasone, betamethasone, triamcinolone, beclometasone, methylprednisolone or prednisone; wherein the B-cell-depleting therapy comprises administering rituximab, ocrelizumab, ofatumumab, or obinutuzumab, or wherein the calcineurin inhibitor comprises ciclosporin, tacrolimus, or vocolosporin.

Embodiment 29. The method of Embodiment 16, wherein the ANA are at an initial titer that is greater than or equal to 1:80 on HEp-2 cells or equivalent positive test.

Embodiment 30. The method of Embodiment 16, wherein the ANA are at a titer that is less than 1:80 on HEp-2 cells or equivalent positive test.

Embodiment 31. A method of treating a patient, comprising administering to the patient an effective amount of mosunetuzumab, wherein:
(a) the patient has systemic lupus erythematosus;
(b) mosunetuzumab is administered according to a dosing regimen comprising at least a first dosing cycle of about 8 days, wherein the first dosing cycle comprises a first dose (C1D1) and a second dose (C1D2) of mosunetuzumab, wherein C1D1 is between about 1.6 mg to about 5 mg on day 1 of the cycle and the C1D2 is between about 15 mg to about 60 mg on day 8 of the cycle; and
(c) mosunetuzumab is administered subcutaneously.

Embodiment 32. The method of Embodiment 31, wherein C1D1 is 1.6 mg.

Embodiment 33. The method of Embodiment 31, wherein C1D1 is 5 mg.

Embodiment 34. The method of Embodiment 31, wherein C1D2 is 15 mg.

Embodiment 35. The method of Embodiment 31, wherein C1D2 is 45 mg.

Embodiment 36. The method of Embodiment 31, wherein C1D2 is 60 mg.

Embodiment 37. The method of Embodiment 31, wherein C1D1 is 1.6 mg and C1D2 is 15 mg.

Embodiment 38. The method of Embodiment 31, wherein C1D1 is 1.6 mg and C1D2 is 45 mg.

Embodiment 39. The method of Embodiment 31, wherein C1D1 is 1.6 mg and C1D2 is 60 mg.

Embodiment 40. The method of Embodiment 31, wherein C1D1 is 5 mg and C1D2 is 15 mg.

Embodiment 41. The method of Embodiment 31, wherein C1D1 is 5 mg and C1D2 is 45 mg.

Embodiment 42. The method of Embodiment 31, wherein C1D1 is 5 mg and C1D2 is 60 mg.

Embodiment 43. The method of Embodiment 31, wherein at least one symptom of SLE is reduced.

Embodiment 44. The method of Embodiment 43, wherein the at least one reduced symptom of SLE is measured using a Patient Global Impression of Severity (PGI-S), a Physician Global Assessment (PGA), a decrease in titer of antinuclear antibody (ANA), a decrease in titer of anti-double stranded DNA (dsDNA) antibody (IgG) titer, an increase in complement C3 levels, or an increase in complement C4 levels.

Embodiment 45. The method of Embodiment 44, wherein the at least one reduced symptom is a change in response of at least one step on the PGI-S from a previous response, wherein the change is one change of from "very severe" to "severe," "severe" to "moderate," "moderate" to "mild," or "mild" to "none."

46. The method of Embodiment 44, wherein the at least one reduced symptom is a change in rating by a healthcare provider using the PGA, wherein the change is a decrease from a previous rating using the PGA.

Embodiment 47. The method of Embodiment 46, wherein the decrease from a previous rating using the PGA is >0.3 points from baseline.

Embodiment 48. The method of Embodiment 31, wherein mosunetuzumab is administered subcutaneously.

Embodiment 49. The method of Embodiment 31, wherein the patient is further administered tocilizumab if the patient experiences cytokine release syndrome (CRS).

Embodiment 50. The method of Embodiment 31, further comprising administering to the patient a corticosteroid, cyclophosphamide, a B-cell-depleting therapy, or calcineurin inhibitor.

Embodiment 51. The method of Embodiment 50, wherein the corticosteroid comprises hydrocortisone, cortisone acetate, prednisolone, dexamethasone, betamethasone, triamcinolone, beclometasone, methylprednisolone or prednisone; wherein the B-cell-depleting therapy comprises administering rituximab, ocrelizumab, ofatumumab, or obinutuzumab, or wherein the calcineurin inhibitor comprises ciclosporin, tacrolimus, or vocolosporin.

Embodiment 52. The method of Embodiment 44, wherein the ANA are at an initial titer that is greater than or equal to 1:80 on HEp-2 cells or equivalent positive test.

Embodiment 53. The method of Embodiment 44, wherein the ANA are at a titer that is less than the titer of 1:80 on HEp-2 cells or equivalent positive test.

Embodiment 54. A method of treating a patient who is part of a population of patients, comprising administering to the patients an effective amount of mosunetuzumab, wherein each patient of the population of patients has systemic lupus erythematosus.

Embodiment 55. The method of Embodiment 54, wherein the patient is being administered before being administered the effective amount of mosunetuzumab an oral corticosteroid, an antimalarial agent, or an immunosuppressant.

Embodiment 56. The method of Embodiment 55, wherein the patient has been administered a stable dose of at least 40 mg/day prednisone (or equivalent) for at least 7 days prior to being administered an effective amount of mosunetuzumab.

Embodiment 57. The method of Embodiment 55, wherein the patient has been administered the antimalarial agent at a stable dose for at least 4 weeks prior to being administered an effective amount of mosunetuzumab.

Embodiment 58. The method of Embodiment 55, wherein the patient has been administered an immunosuppressant at a stable dose for at least 4 weeks prior to being administered an effective amount of mosunetuzumab.

Embodiment 59. The method of Embodiment 58, wherein the immunosuppressant is azathioprine, mycophenolate mofetil, mycophenolic acid, or methotrexate.

Embodiment 60. The method of Embodiment 54, wherein the patient does not have a lupus-associated neuropsychiatric disease.

Embodiment 61. The method of Embodiment 60, wherein the lupus-associated neuropsychiatric disease is meningitis, retinitis, cerebral vasculitis, myelopathy, demyelination syndromes, acute confusional state, psychosis, acute stroke or stroke syndrome, cranial neuropathy, status epilepticus or seizures, cerebellar ataxia, or mononeuritis multiplex.

Embodiment 62. The method of Embodiment 54, wherein the patient does not have active overlap syndrome with mixed connective tissue disease or systemic sclerosis within a year of being administered the effective amount of mosunetuzumab.

Embodiment 63. The method of Embodiment 54, wherein the patient does not have catastrophic or severe antiphospholipid syndrome within a year of being administered the effective amount of mosunetuzumab, unless the severe antiphospholipid syndrome has been adequately controlled by administering anticoagulant therapy to the patient at least 3 months of being administered the effective amount of mosunetuzumab.

Embodiment 64. The method of Embodiment 54, wherein the patient has not been administered:
  (a) at least 12 months before being administered the effective amount of mosunetuzumab:
    (i) anti-CD19 antibody therapy, or
    (ii) anti-CD20 monoclonal antibody therapy;
  or
  (b) at least 30 days before being administered the effective amount of mosunetuzumab:
    (i) kinase inhibitors of Janus Kinase (JAK) kinase, Bruton tyrosine kinase, or tyrosine kinase 2, or
    (ii) tacrolimus, ciclosporin, or voclosporin;
  or
  (c) at least 2 months before being administered the effective amount of mosunetuzumab:
    (i) cyclophosphamide, or
    (ii) biologic therapy.

Embodiment 65. The method of Embodiment 64, wherein:
  (a) the anti-CD19 therapy is blinatumomab;
  (b) the anti-CD20 therapy is obinutuzumab, rituximab, ocrelizumab, or ofatumumab;
  (c) the kinase inhibitors are baricitinib, tofacitinib, upadacitinib, filgotinib, ibrutinib, or fenebrutinib;
  or
  (d) the biologic therapy is belimumab, ustekinumab, anifrolumab, secukinumab, or atacicept.

Embodiment 66. The method of Embodiment 54, wherein the patient does not have significant lupus-associated renal disease or significant renal impairment.

Embodiment 67. The method of Embodiment 54, wherein the patient does not have one laboratory parameter selected from the group consisting of:
  (a) total bilirubin>1.5×ULN,
  (b) ANC<1.5×10$^9$/L (<1500/mm$^3$),
  (c) platelet count<100×10$^9$/L (100,000/mm$^3$),
  (d) hemoglobin<100 g/L,
  (e) estimated glomulerular filtration rate (eGFR)<30 ml/min/1.73 m$^2$ calculated according to the Chronic Kidney Disease Epidemiology Collaboration equation, and
  (f) positive serum human chorionic gonadotropin.

Embodiment 68. The method of Embodiment 54, wherein at least one symptom of SLE is reduced in at least one patient in the population of patients.

Embodiment 69. The method of Embodiment 68, wherein the at least one reduced symptom of SLE is measured using a Patient Global Impression of Severity (PGI-S), a Physician Global Assessment (PGA), a decrease in titer of antinuclear antibody (ANA), a decrease in titer of anti-double stranded DNA (dsDNA) antibody (IgG) titer, an increase in complement C3 levels, or an increase in complement C4 levels.

Embodiment 70. The method of Embodiment 69, wherein the at least one reduced symptom is a change in response of at least one step on the PGI-S from a previous response, wherein the change is one change of from "very severe" to "severe," "severe" to "moderate," "moderate" to "mild," or "mild" to "none."

71. The method of Embodiment 69, wherein the at least one reduced symptom is a change in rating by a healthcare provider using the PGA, wherein the change is a decrease from a previous rating using the PGA.

Embodiment 72. The method of Embodiment 71, wherein the decrease from a previous rating using the PGA is ≥0.3 points from baseline.

Embodiment 73. The method of Embodiment 54, wherein the administering an effective amount of mosunetuzumab comprises administering mosunetuzumab according to a dosing regimen comprising at least a first dosing cycle, wherein the first dosing cycle comprises a first dose (C1D1) and a second dose (C1D2) of mosunetuzumab, wherein the C1D1 is less than C1D2, and wherein the C1D1 is between about 1.6 mg to about 5 mg and the C1D2 is between about 15 mg to about 60 mg.

Embodiment 74. The method of Embodiment 73, wherein the C1D2 is 15 mg, 45 mg, or 60 mg.

Embodiment 75. The method of Embodiment 73, wherein the first dose cycle is about 8 days.

Embodiment 76. The method of Embodiment 75, wherein the C1D1 dose of mosunetuzumab is administered on about day 1 of the cycle.

Embodiment 77. The method of Embodiment 75, wherein the C1D2 dose of mosunetuzumab is administered on about day 8 of the cycle.

Embodiment 78. The method of Embodiment 54, wherein mosunetuzumab is administered subcutaneously.

Embodiment 79. The method of Embodiment 54, wherein the patient is further administered tocilizumab if the patient experiences cytokine release syndrome (CRS).

Embodiment 80. The method of Embodiment 54, further comprising administering to the patient a corticosteroid, cyclophosphamide, a B-cell-depleting therapy, or calcineurin inhibitor.

Embodiment 81. The method of Embodiment 80, wherein the corticosteroid comprises hydrocortisone, cortisone acetate, prednisolone, dexamethasone, betamethasone, triamcinolone, beclometasone, methylprednisolone or prednisone; wherein the B-cell-depleting therapy comprises administering rituximab, ocrelizumab, ofatumumab, or obinutuzumab, or wherein the calcineurin inhibitor comprises ciclosporin, tacrolimus, or vocolosporin.

Embodiment 82. The method of Embodiment 69, wherein the ANA are at an initial titer that is greater than or equal to 1:80 on HEp-2 cells or equivalent positive test.

Embodiment 83. The method of Embodiment 69, wherein the ANA are at a titer that is less than 1:80 on HEp-2 cells or equivalent positive test.

Embodiment 84. A method of treating a patient of a population of patients, comprising administering to the patient an effective amount of mosunetuzumab, wherein:
 (a) the population of patients has systemic lupus erythematosus;
 (b) mosunetuzumab is administered according to a dosing regimen comprising at least a first dosing cycle of about 8 days, wherein the first dosing cycle comprises a first dose (C1D1) and a second dose (C1D2) of mosunetuzumab, wherein C1D1 is between about 1.6 mg to about 5 mg on day 1 of the cycle and the C1D2 is between about 15 mg to about 60 mg on day 8 of the cycle; and
 (c) mosunetuzumab is administered subcutaneously.

Embodiment 85. The method of Embodiment 84, wherein C1D1 is 1.6 mg.

Embodiment 86. The method of Embodiment 84, wherein C1D1 is 5 mg.

Embodiment 87. The method of Embodiment 84, wherein C1D2 is 15 mg.

Embodiment 88. The method of Embodiment 84, wherein C1D2 is 45 mg.

Embodiment 89. The method of Embodiment 84, wherein C1D2 is 60 mg.

Embodiment 90. The method of Embodiment 84, wherein C1D1 is 1.6 mg and C1D2 is 15 mg.

Embodiment 91. The method of Embodiment 84, wherein C1D1 is 1.6 mg and C1D2 is 45 mg.

Embodiment 92. The method of Embodiment 84, wherein C1D1 is 1.6 mg and C1D2 is 60 mg.

Embodiment 93. The method of Embodiment 84, wherein C1D1 is 5 mg and C1D2 is 15 mg.

Embodiment 94. The method of Embodiment 84, wherein C1D1 is 5 mg and C1D2 is 45 mg.

Embodiment 95. The method of Embodiment 84, wherein C1D1 is 5 mg and C1D2 is 60 mg.

Embodiment 96. The method of Embodiment 84, wherein at least one symptom of SLE is reduced.

Embodiment 97. The method of Embodiment 96, wherein the at least one reduced symptom of SLE is measured using a Patient Global Impression of Severity (PGI-S), a Physician Global Assessment (PGA), a decrease in titer of antinuclear antibody (ANA), a decrease in titer of anti-double stranded DNA (dsDNA) antibody (IgG) titer, an increase in complement C3 levels, or an increase in complement C4 levels.

Embodiment 98. The method of Embodiment 97, wherein the at least one reduced symptom is a change in response of at least one step on the PGI-S from a previous response, wherein the change is one change of from "very severe" to "severe," "severe" to "moderate," "moderate" to "mild," or "mild" to "none."

99. The method of Embodiment 97, wherein the at least one reduced symptom is a change in rating by a healthcare provider using the PGA, wherein the change is a decrease from a previous rating using the PGA.

Embodiment 100. The method of Embodiment 99, wherein the decrease from a previous rating using the PGA is >0.3 points from baseline.

Embodiment 101. The method of Embodiment 84, wherein mosunetuzumab is administered subcutaneously.

Embodiment 102. The method of Embodiment 84, wherein the patient is further administered tocilizumab if the patient experiences cytokine release syndrome (CRS).

Embodiment 103. The method of Embodiment 84, further comprising administering to the patient a corticosteroid, cyclophosphamide, a B-cell-depleting therapy, or calcineurin inhibitor.

Embodiment 104. The method of Embodiment 103, wherein the corticosteroid comprises hydrocortisone, cortisone acetate, prednisolone, dexamethasone, betamethasone, triamcinolone, beclometasone, methylprednisolone or prednisone; wherein the B-cell-depleting therapy comprises administering rituximab, ocrelizumab, ofatumumab, or obinutuzumab, or wherein the calcineurin inhibitor comprises ciclosporin, tacrolimus, or vocolosporin.

Embodiment 105. The method of Embodiment 97, wherein the ANA are at an initial titer that is greater than or equal to 1:80 on HEp-2 cells or equivalent positive test.

Embodiment 106. The method of Embodiment 97, wherein the ANA are at a titer that is less than the titer of 1:80 on HEp-2 cells or equivalent positive test.

Embodiment 107. A kit, comprising:
(a) a first container comprising mosunetuzumab; and
(b) a package insert with instructions for providing a therapy to in a patient who has Systemic lupus erythematosus wherein the mosunetuzumab is administered subcutaneously and according to a dosing regimen comprising at least a first dosing cycle, wherein the first dosing cycle comprises a first dose (C1D1) and a second dose (C1D2) of mosunetuzumab, wherein C1D1 is between about 1.6 mg to about 5 mg and administered on day 1 of the cycle and the C1D2 is between about 15 mg to about 60 mg and administered on day 8 of the cycle.

Embodiment 108. The kit of Embodiment 107, wherein C1D1 is 1.6 mg, and C1D2 is 15 mg.

Embodiment 109. The kit of Embodiment 107, wherein C1D1 is 1.6 mg, and C1D2 is 45 mg.

Embodiment 110. The kit of Embodiment 107, wherein C1D1 is 1.6 mg, and C1D2 is 60 mg.

Embodiment 111. The kit of Embodiment 107, wherein C1D1 is 5 mg, and C1D2 is 15 mg.

Embodiment 112. The kit of Embodiment 107, wherein C1D1 is 5 mg, and C1D2 is 45 mg.

Embodiment 113. The kit of Embodiment 107, wherein C1D1 is 5 mg, and C1D2 is 60 mg.

Embodiment 114. The kit of Embodiment 107, wherein the mosunetuzumab is contained within an injection device.

Embodiment 115. The kit of Embodiment 114, wherein the injection device is a syringe or an autoinjector.

Embodiment 116. The kit of Embodiment 107, further comprising a second container.

Embodiment 117. The kit of Embodiment 116, wherein the first container comprises an injection device comprising sufficient mosunetuzumab to deliver the first dose and the second container comprises an injection device comprising sufficient mosunetuzumab to deliver the second dose.

Embodiment 118. The kit of Embodiment 116, further comprising at least a third container.

Embodiment 119. The kit of Embodiment 118, wherein the third container comprises a medicament, and the instructions further provide instructions for administering the medicament.

Embodiment 120. The kit of Embodiment 119, wherein the medicament comprises a corticosteroid, cyclophosphamide, a B-cell-depleting therapy, or a calcineurin inhibitor.

Embodiment 121. The kit of Embodiment 120, wherein the corticosteroid comprises hydrocortisone, cortisone acetate, prednisolone, dexamethasone, betamethasone, triamcinolone, beclometasone, methylprednisolone or prednisone; wherein the B-cell-depleting therapy comprises rituximab, ocrelizumab, ofatumumab, or obinutuzumab, and wherein the calcineurin inhibitor comprises ciclosporin, tacrolimus, or vocolosporin.

VIII. Examples

The following Examples are not meant to be construed as to limit the invention in any way.

Example 1. Study Rational and Benefit-Risk Assessment (Prophetic)

The objectives of this Phase Ib study are to evaluate the safety and tolerability, pharmacokinetics, and pharmacodynamics of escalating doses of mosunetuzumab in participants with SLE to inform dose selection for subsequent studies of mosunetuzumab in patients with lupus nephritis (LN) and extra-renal SLE, as well as studies in other autoimmune diseases.

B cells play an active role in the pathogenesis of SLE. Autoreactive B cells recognize and present self-antigens, produce autoantibodies, secrete proinflammatory cytokines, and participate in T-cell co-stimulation. For this reason, they are attractive therapeutic targets in SLE, although there have been a number of failed studies evaluating agents that target B cells, B-cell activation, or B-cell survival factors, including randomized controlled trials of the Type I anti-CD20 monoclonal antibody rituximab for treatment of SLE (StudyU2971g [EXPLORER]) and severe LN (Study U2970g [LUNAR]). These prior failures may be due in part to B-cell dysregulation in SLE that was associated with resistance to depletion (Yap 2019). More recently, associations have been demonstrated in multiple cohorts between the degree and duration of B cell-depletion in SLE, specifically LN, and the degree of clinical benefit, generating the hypothesis that a greater level of B cell-depletion may be necessary to achieve efficacy (Md Yusof et al. 2017; Gomez Mendez et al. 2018; Furie et al. 2020).

The rationale for testing mosunetuzumab in the treatment of SLE was based on this hypothesis. Mosunetuzumab may achieve a greater degree of B cell-depletion compared with other anti-CD20 molecules, based on the T cell-dependent mechanism, more extensive killing of tissue-infiltrating B cells, and more efficient killing of cells with very low levels of CD20 expression, which in turn may translate to improved efficacy.

Overall, the nonclinical data and data from prior and ongoing clinical studies in oncologic indications support the initiation of this Phase Ib study in participants with SLE. The potential safety issues associated with administration of mosunetuzumab were expected to be clinically monitorable and manageable, and measures will be taken to avoid or minimize such toxicities in this trial.

According to its currently known mechanism of action, mosunetuzumab binds to CD3 on T cells and CD20 on B cells simultaneously, leading to the activation of T cells and subsequent T cell-mediated killing of B cells. The proposed starting and maximum clinical doses and SC route of administration for mosunetuzumab were selected based on several factors, including currently available clinical safety and efficacy data from oncology trials, mosunetuzumab molecule properties, mechanism of action, and nonclinical safety data in cynomolgus monkeys.

Based on the currently available clinical safety data and benefit-risk considerations for the patient population in this study, the first mosunetuzumab dose to be tested is 1.6 mg SC, a pharmacologically active dose level that was previously determined to be safe and tolerable in humans in SC formulations (Study G029781 Group D). The dose escalation factor from cohort to cohort will be approximately 3-fold (refer to 3.1 and FIG. 1 for the doses administered during dose finding and dose escalation).

CRS is the main acute toxicity of concern and is associated with cytokine exposures. The number of circulating B and T cells at baseline may inform about the potential CRS risks. Currently, available clinical data suggest that the baseline B-cell and T-cell counts range in patients with SLE (Study U2971g) are more similar to those seen in patients with previously untreated B-cell non-Hodgkin lymphoma (NHL; Study G029044) and elderly patients with previously untreated diffuse large B-cell lymphoma (Study G040554 Cohort B) compared with patients with relapse or refractory (R/R) B-cell NHL (Study G029365), suggesting lower risk of CRS. In Phase I/II study G040554 in elderly patients with previously untreated diffuse large B-cell lymphoma (Cohort B, n=40), IV mosunetuzumab has shown an acceptable safety profile: 25% of participants had Grade 1 CRS in the 1/2/13.5-mg cohort (Cycle 1 Day 1 at 1 mg, Cycle 1 Day 8 at 2 mg, and Cycle 1 Day 15 at 13.5 mg, followed by Day 1 of subsequent cycles (Q3W) at 13.5 mg); 12.5% had Grade 1 and 9.4% had Grade 2 in the 1/2/30 mg cohort (CCOD, 15 Jan. 2021). SC administration may help mitigate the risk of CRS as compared to IV administration by a reduction in maximum concentration observed in serum (Cmax), which is associated with CRS, while maintaining similar area under the concentration-time curve (AUC). SC administration of mosunetuzumab is currently being tested in Study G029781 in participants with R/R NHL and has also shown an acceptable safety profile. In a recent analysis of Group D (SC fixed-dose escalation) in this study (Matasar et al. 2020), participants received single-agent mosunetuzumab every 3 weeks (Q3W) for eight cycles. As of 23 Jan. 2021, 48 participants had received SC mosunetuzumab at fixed doses between 1.6 and 20 mg. CRS occurred in 29.2% of participants (n=14). Most CRS events—graded according to ASTCT Consensus Grading Criteria (Lee et al. 2019)—occurred during Cycle 1 (93%) and all events were Grade 1 (n=11; 22.9%) or Grade 2 (n=3; 6.3%). In participants dosed with SC mosunetuzumab, one CRS event was treated with tocilizumab and 2 participants were treated with low-flow oxygen. No intensive care unit admissions or use of high-flow oxygen or vasopressors were required. Notably, the frequency of Grade 2 CRS events was lower with the SC formulation of mosunetuzumab versus the IV fixed-dosing group despite 7-fold higher dose levels. The data suggest a manageable safety profile for SC mosunetuzumab dose of 1.6-20 mg in participants with R/R NHL (refer to the Mosunetuzumab Investigator's Brochure). Step-up fractionated dosing may further minimize the rate and severity of CRS events by reducing Cmax while maintaining AUC. A step-up dosing regimen is being evaluated in Group F in Study G029781 in participants with NHL. As of 23 Jan. 2021, the initial 5/15/45-mg cohort (5/15/45-mg Cycle 1 step-up dosing on Day 1/8/15 respectively, followed by Q3W dosing) has been cleared and the maximum tolerated dose (MTD) was not reached. Of the 8 participants treated with Cycle-1 step-up 5/15/45-mg SC mosunetuzumab, CRS was reported in 3 participants (37.5%). All were Grade 1 (n=1; 12.5%) or Grade 2 (n=2; 25.0%). Two participants received treatment with tocilizumab and no participants required supplemental oxygen, vasopressors or intensive care unit admission. The maximum IV step-up clinical dose of 1/2/60 mg has been studied in oncology patients. To further support the maximum dose level of 60 mg, an exploratory quantitative systems pharmacology (QSP) model was used to simulate the time course of systemic B cell dynamics for 60 days after mosunetuzumab administration. The systemic B cell-depletion and rebound in the QSP model was implemented and validated based on non-clinical data of mosunetuzumab in cynomolgus monkeys (Hosseini et al. 2020). To predict the circulating B cell dynamics in SLE patients, the model representation was first translated from cynomolgus monkeys to human by changing physiological parameters (i.e., tissue compartment volumes and cell counts in each compartment) and mosunetuzumab PK properties to human values. Then, baseline circulating B and T cells of SLE patients from Study U2971g was applied to the peripheral blood compartment. Model-based simulations of the planned doses up to 60 mg suggest that there is a dose-dependent increase in the duration of B cell-depletion ($<5$ cells/µL) and, at 60 mg, more than 90% of the simulated patients can maintain B cell-depletion at 60 days.

Example 2. Objectives and Endpoints (Prophetic)

This clinical trial is designed to evaluate the safety, tolerability, pharmacokinetics, and pharmacodynamics of mosunetuzumab in participants with Systemic lupus erythematosus. Regarding the exploratory activity objective, which was to assess clinical response of mosunetuzumab in participants with SLE on the basis of the following endpoints.

2.1 Primary Safety Objective

The safety objective for this study is to evaluate the safety of mosunetuzumab, including the tolerability of the dosing schedule(s) and dose(s), and characterization of dose limiting toxicities (DLTs) on the basis of the following endpoints:
  Incidence and severity of adverse events, including DLTs, with severity determined according to National Cancer Institute Common Terminology Criteria for Adverse Events (NCI CTCAE) v5.0 and cytokine-release syndrome (CRS) severity determined according to the 2019 American Society for Transplantation and Cellular Therapy (ASTCT) CRS Consensus grading criteria
  Change from baseline in targeted vital signs
  Change from baseline in targeted clinical laboratory test result 2.2 Pharmacokinetic Objectives The pharmacokinetic (PK) objective for this study is to characterize PK profile of a fractionated and non-fractionated single dosing of mosunetuzumab on the basis of the following endpoints:
  Serum concentrations of mosunetuzumab at specified timepoints
  PK parameters of mosunetuzumab
  The exploratory PK objective for this study is to evaluate potential relationships between drug exposure, pharmacodynamics and safety of mosunetuzumab on the basis of the following endpoint:
  Relationship between serum concentration or PK parameters for mosunetuzumab, pharmacodynamics, and safety endpoints 2.3 Pharmacodynamic Objective The pharmacodynamic (PD) objective for this study is to characterize the PD effects of mosunetuzumab in participants with SLE on the basis of the following endpoints:

Peripheral B-cell counts at specified timepoints
Duration of B cell-depletion

2.4 Immunogenicity Objectives

The immunogenicity objective for this study is to evaluate the immune response to mosunetuzumab on the basis of the following endpoint:
Prevalence of anti-drug antibodies (ADAs) at baseline and incidence of ADAs during the study
The exploratory immunogenicity objective for this study is to evaluate potential effects of ADAs
on the basis of the following endpoint:
Relationship between ADA status and safety, PK, and biomarker endpoints

2.5 Exploratory Activity Objective

Patient Global Impression of Severity (PGI-S)
Physician Global Assessment (PGA)
Change from baseline titer in antinuclear antibody (ANA) and anti-double stranded DNA (dsDNA) antibody (IgG) titers
Change from baseline in complement C3
Change from baseline in complement C4

2.6 Exploratory Biomarker Objective

The exploratory biomarker objective for this study is to identify and/or evaluate biomarkers that are associated with susceptibility to developing adverse events or can lead to improved adverse event monitoring or investigation (i.e., safety biomarkers), can provide evidence of mosunetuzumab activity (i.e., PD biomarkers) or can increase the knowledge and understanding of disease biology and drug safety, on the basis of the following endpoints:
Relationship between biomarkers in blood, plasma, and serum, and PD, safety, PK, or other
biomarker endpoints
Relationship between biomarkers in blood, plasma, and serum and the mechanism of
action of mosunetuzumab
Change in titers of autoantibodies (anti-Smith antigen [Sm], anti-Sjögren syndrome related
antigen A[SSA], anti-Sjögren syndrome related antigen B [SSB], and anti-ribonucleoprotein [RNP]) at specified timepoints following mosunetuzumab administration
Change in CRS-associated biomarkers at specified timepoints following mosunetuzumab administration
Change in T cell subsets at specified timepoints following mosunetuzumab administration

2.7 Other Exploratory Objectives

An additional exploratory objective was to assess the efficacy of tocilizumab in the treatment of severe cytokine release syndrome (CRS) following mosunetuzumab treatment based on the following endpoints:
CRS event outcomes and event duration
Changes in cytokine levels, CRS-associated biomarkers, and clinical laboratory values following administration of tocilizumab for the treatment of CRS.

Example 3 Study Design (Prophetic)

3.1 Description of Study

This is a Phase Ib multicenter, open-label, dose-escalation study to evaluate the safety, tolerability, pharmacokinetics, and pharmacodynamics of mosunetuzumab in participants with SLE. The study will enroll up to 50 participants with SLE at approximately 15 investigative sites globally. Approximately 13-25 participants will be enrolled during the dose-finding and dose-escalation periods. Participants withdrawn during the DLT assessment period (see 3.1.7.2) for any reasons other than a DLT will be replaced. Additional participants may be added during the dose expansion period to replace participants who discontinue prematurely, expand an existing dose cohort, fill a cohort at a modified dose, or assess a particular subgroup of interest (e.g., participants receiving a specific permitted SLE background therapy). FIG. 1 and FIG. 2 present an overview of the study design.

The study consists of the following study periods: screening, dose finding, dose escalation, dose-expansion, and safety follow-up (SFU). Participants in the non-fractionated/dose-finding cohorts receive a non-fractionated dose of mosunetuzumab on Day 1, while participants in the fractionated/dose-escalation cohorts receive a fractionated dose administered on Day 1 and Day 8. The duration of SFU is a minimum of 12 months or longer depending on a patient participant's time to B-cell repletion.

Screening

Consenting participants enter a screening period of up to 28 days to be evaluated for eligibility.

Patients who do not meet the criteria for participation in this study (screen failure) may qualify for three re-screening opportunities (for a total of four screenings per patient). The investigator will record reasons for screen failure in the screening log.

3.1.2 Dose Finding

The non-fractionated/dose-finding cohorts of the study are comprised of 1 participant allocated to receive a single dose of 1.6-mg mosunetuzumab followed by participants who receive a single 5-mg dose of mosunetuzumab, respectively. The 5-mg cohort is conducted using a 3+3 design consisting of at least 3 participants for up to a total of 6 participants. In the event that DLTs are observed in the first 2 participants in the 5-mg cohort, then only 2 participants will be enrolled in the 5-mg cohort.

In order to assess for any severe and unexpected acute drug or injection-related toxicities, dosing of participants will be staggered by at least 72 hours, and all participants will be hospitalized for 72 hours.

The step dose that will be utilized as the Day 1 dose during the dose-escalation period will be informed by the totality of the clinical data obtained during the dose-finding period.

3.1.3 Dose Escalation

Fractionated dosing on Day 1 and Day 8 is planned for dose escalation. Participants will receive the step-dose (determined by dose-finding period) on Day 1, followed by doses of 15, 45, or 60 mg on Day 8 for the respective fractionated/dose-escalation cohorts. Dose escalation will be conducted using a 3+3 design consisting of at least 3 participants for up to a total of 6 participants for each fractionated cohort. In each fractionated cohort, the Day 1 dose for each participant must be separated from the previous participant's Day 1 dose by an interval of at least 72 hours.

In this study, an interval of at least 7 days between the last participant in the non-fractionated dose-finding cohort and the first participant of the first, fractionated dose-escalation cohort will be instituted to allow completion of the DLT assessment period for the non-fractionated dose-finding cohort and review of data by the Internal Monitoring Committee (IMC). Similarly, subsequent dose escalation cohorts will also be separated by an interval of at least 7 days from the preceding cohort's last participant's last dose to allow completion of the DLT assessment period and review of data by the IMC.

As in the non-fractionated dose-finding cohorts, dosing of participants will be staggered by at least 72 hours, and all participants will be hospitalized for 72 hours following the Day 1 and Day 8 doses. Hospitalization requirements will be reassessed at regular intervals by the IMC as more safety, PK, and PD information from participants receiving fractionated dosing becomes available throughout dose escalation.

Following completion of the DLT assessment period (7-14 days), all participants will be closely monitored for adverse events throughout the study and during the SFU. Adverse events will be graded according to NCI CTCAE v5.0, with CRS graded according to the ASTCT 2019 CRS Consensus Grading Criteria.

The IMC will review safety data and make recommendations regarding dose-escalation and overall study conduct to ensure participant safety while receiving study treatment.

3.1.3.1 Dose Escalation Rules

All dose-escalation decisions will be made based on recommendations of the IMC. Safety information, including relevant adverse events and clinical laboratory data, will be reviewed prior to each dose escalation decision. On the basis of a review of real-time clinical data, dose escalation may be halted or modified by the Sponsor as deemed appropriate.

In the dose-escalation period, the decision to proceed to the next higher dose will be conducted in accordance with the following rules based on the 3+3 dose escalation design:

A minimum of 3 participants will be enrolled in the cohort unless the first 2 enrolled participants experience a DLT, in which case enrollment into the cohort will be terminated.

If none of the first 3 DLT-evaluable participants experiences a DLT, enrollment of the next dose-escalation cohort may proceed upon completion of the DLT assessment period and IMC confirmation.

If 1 of the first 3 DLT-evaluable participants experiences a DLT, the cohort will be expanded to at least 6 participants. All participants will be evaluated for DLTs before any dose-escalation decision is made.

If DLTs are observed in 17% of participants in a given cohort (e.g., DLTs observed in 1 of 6 DLT-evaluable participants), enrollment of the next dose-escalation cohort may proceed.

If DLTs are observed in 17% of participants in a given cohort, further enrollment at that dose level and dose-escalation will be halted.

Available PK and PD data (e.g., evidence of dose-dependent increases in plasma IL-6 levels after mosunetuzumab administration) may also be reviewed by the IMC as supportive data to assist in the interpretation of the clinical data where relevant.

3.1.4 Dose Expansion

The dose-expansion period is designed to obtain additional safety, tolerability, PK, and PD information for doses at or below the highest dose level cleared by the IMC. In addition to the planned 13-25 participants in the dose-finding and dose-escalation cohorts, additional participants may be enrolled for existing cohorts based on the recommendations of the IMC and at the discretion of the Sponsor. Alternatively, additional participants may be enrolled to gain more information for certain participant subpopulations or to evaluate additional dose cohorts that assess intermediate dose levels between two dose levels.

Dose-expansion may be initiated at any time in the study provided that the mosunetuzumab dose administered does not exceed the highest dose level cleared by the IMC. In total, up to 50 participants may be enrolled in the study.

Administration of the Day 1 doses to each participant in dose-expansion will be staggered by at least 24 hours. The hospitalization requirement during the dose expansion will be based on the available safety, PK, and PD data and the recommendation of the IMC. The dose staggering and hospitalization requirements may be further modified based on the recommendation of the IMC. The Sponsor must receive confirmation on the status of the prior participant before the next participant receives study drug.

3.1.5 Safety Follow-up

All participants who receive any amount of mosunetuzumab will be followed for safety for at least 12 months from the mosunetuzumab dose.

If participants' B-cell count recovers to lowest pre treatment value or the lower limit of normal (LLN), whichever is lower, by the 12-month SFU visit, no further SFU is required.

If participants' B-cell count does not recover to the lowest pre treatment value or the LLN, whichever is lower, by the 12-month SFU visit, and they did not receive a subsequent therapy associated with reductions in peripheral B cells (including, but not limited to, rituximab, cyclophosphamide, obinutuzumab, ofatumumab, or belimumab), SFU will continue every 6 months until any of the following occurs:

Return of peripheral cluster of differentiation $19^+$ ($CD19^+$) B cells to the lowest pre-treatment value or the LLN, whichever is lower Receipt of therapies associated with reductions in peripheral B-cells The study ends If any therapy associated with reductions in peripheral B-cells is planned during the SFU period after Month 12, a final SFU visit will need to take place prior to the receipt of this therapy.

3.1.6 Internal Monitoring Committee

An IMC will be utilized during the study to make recommendations regarding study conduct on the basis of the study safety data, PK, and PD information to ensure participant safety.

The IMC will consist of an IMC Medical Monitor Chair external to the project and representatives from Clinical Science, Safety Science, and Biostatistics. The IMC may request that additional Sponsor's representatives (e.g., Clinical Pharmacology or Biomarker scientists) participate in data analysis and/or dose-escalation or modification decisions.

The IMC will review all the cumulative data including, but not limited to, the incidence and nature of adverse events, serious adverse events, deaths, Grade 3 adverse events, and adverse events of special interest. The IMC will make decisions regarding dose escalations and provide recommendations regarding enrollment into the expansion cohorts.

The IMC may further make recommendations regarding study conduct, including but not limited to, the following: performing additional safety analyses, modification of hospitalization and premedication requirements, amending the study protocol, holding participant enrollment pending further safety evaluations, enrolling additional participants at a specific dose level and schedule to obtain additional safety data, holding or discontinuing study drug, or terminating the study.

The IMC will be convened after all patients in dose finding cohorts complete the DLT assessment period and prior to dose escalation for any mosunetuzumab dose cohort>5 mg.

The IMC may also be convened ad hoc and at the request of the Medical Monitor.

3.1.7 Dose-Limiting Toxicity 3.1.7.1 Definition of Dose-Limiting Toxicity

A DLT will be defined as any of the adverse events described below occurring during the DLT assessment period (defined in 3.1.7.2).

Grade≥3 CRS (according to ASTCT CRS Grading Criteria) with the following exception:
- Grade 3 CRS responsive to treatment (i.e., clinical improvement within 8-12 hours following tocilizumab/corticosteroids administration) and symptoms resolve to Grade≤1 for 3 consecutive days Any drug-related Grade≥3 hematologic adverse event in the absence of another clearly identifiable cause, with the following exceptions:
- Non-febrile Grade 3 or 4 neutropenia (i.e., ANC<1.0× $10^9$/L and not accompanied by a
- single temperature of ≥38.3° C. [101° F.] or a temperature of ≥38.0° C. [100.4° F.] sustained for ≥1 hour) that improves to Grade≤2 (i.e., ANC≥1.0×$10^9$/L) without a delay of the next dose exceeding 3 days and/or within the DLT assessment period
- Grade 3 or 4 thrombocytopenia (i.e., platelet count<50×$10^9$/L) that improves to Grade
- 1 or better (i.e., platelet count≥75×$10^9$/L) without a delay of the next dose exceeding 3 days and/or within the DLT assessment period without platelet transfusion and is not associated with bleeding that is considered by the investigator to be clinically significant
- Grade 3 or 4 anemia (i.e., hemoglobin<8.0 g/dL) that improves to Grade≤2 (i.e., hemoglobin≥8.0 g/dL) without a delay of the next dose exceeding 3 days and/or within the DLT assessment period and does not require an emergency transfusion
- Lymphopenia, and/or leukopenia due to decreases in B cells, monocytes, T cells and natural killer (NK) cells, will not be considered DLTs as they are expected PD outcomes of SC mosunetuzumab treatment Any drug-related Grade≥3 non-hematologic adverse event not considered by the investigator to be attributable to another clearly identifiable cause, with the following exceptions:
- Grade 3 (according to the NCI CTCAE v5.0) patient signs and symptoms of CRS[1] that occur in the context of Grade≤2 CRS (according to ASTCT CRS Consensus Grading Criteria) and last≥3 days
- Elevation of AST or ALT and/or total bilirubin with no patient laboratory value exceeding Grade 3[2] (according to the NCI CTCAE v5.0) that occurs in the context of Grade≤2 CRS (according to the ASTCT CRS Grading Criteria) and improves to Grade1 or better[3] without a delay of the next dose exceeding 3 days and/or within the DLT assessment period
- Grade 3 laboratory abnormality that is asymptomatic and deemed by the investigator not to be clinically significant or relevant.
- Case of Hy's Law: any event involving an increase in AST or ALT>3× upper limit of normal (ULN) in combination with either an elevated total bilirubin>2× ULN or clinical jaundice, in the absence of initial findings of cholestasis (elevated serum ALP) or other causes, such as preexisting or acute liver disease, concomitant exposure to known hepatotoxic agent, a documented infectious etiology (e.g., HIV, hepatitis B virus [HBV], and hepatitis C virus [HCV]), or CRS. Hy's law is suggestive of potential drug-induced liver injury and will be considered a DLT (see 5.3.5.11).

Signs and symptoms of SLE, SLE progression, as well as recognized complications of the illness, will not be considered a DLT.

3.1.7.2 Dose-Limiting Toxicity Assessment Period

For non-fractionated doses (administered as a single dose on Day 1), the DLT assessment period is defined as Day 1 through Day 7. In the event of toxicity, recovery will be assessed within ≤3 days following the end of the DLT period for the purpose of DLT determination.

For fractionated doses (administered on Day 1 and Day 8) the DLT assessment period is defined as Day 1 through Day 14. In the event of a ≤3 day delay of the scheduled Day 8 dose, the end of the DLT assessment period will be extended by the respective number of days (≤3 days) following the day on which the Day 8 dose is administered.

3.1.7.3 Definition of Dose-Limiting Toxicity-Evaluable

Determination of whether a participant is evaluable for DLT assessment will be made in accordance with the following rules:
- Participants who receive mosunetuzumab and remain on study through the DLT assessment period will be considered DLT evaluable.
- Participants who experience a DLT during the DLT assessment period will be considered DLT evaluable.
- Participants who discontinue from study treatment or study prior to completing the DLT assessment period for reasons other than a DLT will be deemed non-evaluable for DLT assessment and will be replaced with an additional participant.
- Participants who have a delay of the scheduled Day 8 dose exceeding 3 days for a non-DLT event will be discontinued from study treatment. These participants may be deemed DLT-unevaluable and may be replaced at the discretion of the Medical Monitor.

3.2 End of Study and Length of Study

The end of this study is defined as the date when the last participant, last visit (LPLV), occurs. The LPLV will occur when the last participant completes the SFU requirements as outlined in 3.1.4 for up to a maximum of 18 months from the mosunetuzumab dose. In addition, the Sponsor may decide to terminate the study at any time. The total length of the study, from screening of the first participant to the end of the study, is expected to be approximately 41 months.

Example 4 Materials and Methods (Prophetic)

4.1 Participants

Approximately 13 to 25 participants with active SLE on background standard-of-care non-biologic therapies for SLE will be enrolled in the dose-finding and dose-escalation periods of the study. Additional participants may be enrolled in the dose-expansion period based on the recommendations of the IMC and at the discretion of the Sponsor. In total, up to 50 participants may be enrolled in this study.

4.1.1 Inclusion Criteria

Participants must meet the following criteria for study entry:

Signed Informed Consent Form

Age 18 to 75 years at time of signing Informed Consent For

Ability to comply with the study protocol

Diagnosis of SLE according to the 2019 European League Against Rheumatism (EULAR)/American College of Rheumatology (ACR) Classification Criteria (see FIG. 6) at least 12 weeks or more prior to screening Positive ANA (1:160), or anti-dsDNA, and/or anti-Sm antibodies above the ULN, documented within the past 12 months or during screening Active SLE disease at screening per clinical assessment Current receipt of one or more of the following classes of standard therapies for the treatment of SLE at stable doses: OCSs, antimalarial agents, conventional immunosuppressants For participants receiving an OCS, treatment with ≤40 mg/day prednisone or equivalent (see Table 4) during screening, at a dose that has been stable for at least 7 days prior to Day 1

For participants receiving an antimalarial, the medication(s) must have been at a stable dose≥4 weeks prior to and during screening.

For participants receiving immunosuppressants, treatment with a single immunosuppressant at a stable dose for at least 4 weeks prior to screening and during screening. Conventional immunosuppressants include azathioprine, MMF, mycophenolic acid, and methotrexate (oral, SC, or intramuscular routes)

For women of childbearing potential: agreement to remain abstinent (refrain from heterosexual intercourse) or use contraception, as defined below: Women must remain abstinent or use contraceptive methods with a failure rate of ≤1% per year during the treatment period and for 3 months after the final dose of mosunetuzumab and 3 months after the final dose of tocilizumab.

A woman is considered to be of childbearing potential if she is postmenarchal, has not reached a postmenopausal state (≥12 continuous months of amenorrhea with no identified cause other than menopause), and is not permanently infertile due to surgery (i.e., removal of ovaries, fallopian tubes, and/or uterus) or another cause as determined by the investigator (e.g., Müllerian agenesis). The definition of childbearing potential may be adapted for alignment with local guidelines or regulations.

Examples of contraceptive methods with a failure rate of ≤1% per year include bilateral tubal ligation, male sterilization, hormonal contraceptives that inhibit ovulation, hormone-releasing intrauterine devices, and copper intrauterine devices.

The reliability of sexual abstinence should be evaluated in relation to the duration of the clinical trial and the preferred and usual lifestyle of the participant. Periodic abstinence (e.g., calendar, ovulation, symptothermal, or postovulation methods) and withdrawal are not adequate methods of contraception. If required per local guidelines or regulations, locally recognized adequate methods of contraception and information about the reliability of abstinence will be described in the local Informed Consent Form.

TABLE 4

Corticosteroid Equivalence Chart

| Corticosteroid | Equivalent Dose (mg) |
| --- | --- |
| Hydrocortisone | 20 |
| Cortisone acetate | 25 |
| Prednisone | 5 |
| Prednisolone | 5 |
| Methylprednisolone | 4 |
| Dexamethasone | 0.75 |
| Betamethasone | 0.75 |
| Triamcinolone | 4 |
| Beclometasone | 0.75 |

Note:
Cortisol (hydrocortisone) is the standard of comparison for glucocorticoid potency. Hydrocortisone is the name used for pharmaceutical preparations of cortisol.

4.1.2 Exclusion Criteria

Participants are excluded from the study if any of the following criteria apply:

Pregnant or breastfeeding, or intending to become pregnant during the study or within 3 months after the final dose of mosunetuzumab and 3 months after the final dose of tocilizumab Women of childbearing potential must have a negative serum pregnancy test result at screening prior to initiation of study drug.

Active severe or unstable lupus-associated neuropsychiatric disease that is likely to require treatment with protocol-prohibited therapies (see 4.4.3) Examples of neuropsychiatric SLE manifestations include, but are not limited to the following: meningitis, retinitis, cerebral vasculitis, myelopathy, demyelination syndromes, acute confusional state, psychosis, acute stroke or stroke syndrome, cranial neuropathy, status epilepticus or seizures, cerebellar ataxia, and mononeuritis multiplex.

Active overlap syndrome with mixed connective tissue disease or systemic sclerosis within 1 year of Day 1

Catastrophic or severe antiphospholipid syndrome within 1 year of Day 1 Antiphospholipid syndrome adequately controlled by anticoagulant therapy for at least 3 months prior to Day 1 is acceptable.

Presence of significant lupus-associated renal disease and/or renal impairment that is likely to require treatment with protocol-prohibited therapies Peripheral CD19+B-cell count<25 cells/μL, Receipt of an investigational therapy within 30 days or 5 drug-elimination half-lives (whichever is longer) prior to initiation of study treatment and during the study SARS-CoV-2 vaccines approved via Emergency Use Authorization procedure in the United States and all other procedures in other regions are not deemed investigational for the purpose of this exclusion.

Receipt of any of the following excluded therapies:
Any anti-CD19 or anti-CD20 therapy such as blinatumomab, obinutuzumab, rituximab, ocrelizumab, or ofatumumab less than 12 months prior to screening or during screening Inhibitors of JAK, Bruton tyrosine kinase, or tyrosine kinase 2, including baricitinib, tofacitinib, upadacitinib, filgotinib, ibrutinib, or fenebrutinib or any investigational agent within 30 days prior to screening or during screening Tacrolimus, ciclosporin, or voclosporin within 30 days prior to screening or during screening Cyclophosphamide or a biologic therapy such as, but not limited to, belimumab, ustekinumab, anifrolumab, secukinumab, or atacicept during 2 months prior to screening or during screening Any live or attenuated vaccine during 28 days prior to screening or during screening SARS-CoV-2 vaccines that are not live or attenuated are permitted.

High risk for clinically significant bleeding or any condition requiring plasmapheresis, IV immunoglobulin, or acute blood product transfusions Significant or uncontrolled medical disease that would preclude participant participation HIV infection (defined as a positive HIV-1 and/or HIV-2 antibody test)

Acute or chronic HBV (defined as positive hepatitis B surface antigen [HBsAg] serology [Centers for Disease Control and Prevention 2021])

Participants who test negative for HBsAg and hepatitis B surface antibody (HBsAb) tests and positive for total hepatitis B core antibody (HBcAb) test are ineligible.

Acute or chronic HCV (defined as a positive hepatitis C virus antibody test)

Tuberculosis (TB) infection

Testing for TB will be performed at screening. The choice of test (skin or blood test) will be in accordance with local clinical practice.

Latent TB after completion of appropriate treatment is not exclusionary.

Known or suspected chronic active Epstein-Barr virus (EBV) infection or cytomegalovirus (CMV) infection Active infection of any kind, excluding fungal infection of the nail beds Any major episode of infection that fulfills any of the following criteria:

Requires hospitalization during 8 weeks prior to screening or during screening

Requires treatment with IV antibiotics (or anti-infective medications) during 8 weeks prior to screening or during screening Requires treatment with oral antibiotics (or anti-infective medications) during 2 weeks prior to screening or during screening Antibiotics or anti-infective medications given in the absence of a major episode of infection are not exclusionary.

History of serious recurrent or chronic infection

History of progressive multifocal leukoencephalopathy (PML)

History of cancer, including solid Tumors, hematological malignancies, and carcinoma in situ, within the past 5 years Participants with non-melanomatous carcinomas of the skin that have been treated or excised and have resolved are eligible.

Major surgery requiring hospitalization during 4 weeks prior to screening or during screening or any planned surgery or procedure requiring hospitalization during 12 weeks following study drug administration Current alcohol or drug abuse or history of alcohol or drug abuse within 12 months prior to screening or during screening Intolerance or contraindication to study therapies including history of severe allergic or anaphylactic reactions to monoclonal antibodies or known hypersensitivity to any component of mosunetuzumab injection Any of the following laboratory parameters:

AST or ALT>2.5×ULN

Total bilirubin>1.5×ULN Participants with a documented history of Gilbert syndrome and in whom total bilirubin elevations are accompanied by elevated indirect bilirubin are eligible.

ANC<1.5×109/L (<1500/mm$^3$)

Platelet count<100×10$^9$/L (100,000/mm$^3$)

Hemoglobin<100 g/L

Estimated glomerular filtration rate (eGFR)≤30 ml/min/1.73 m$^2$ calculated according to the Chronic Kidney Disease Epidemiology Collaboration equation (Levey et al. 2009)

Positive serum human chorionic gonadotropin measured at screening

4.2 Method of Treatment Assignment 4.2.1 Treatment Assignment

This is an open-label study. After initial written informed consent has been obtained, all screening procedures and assessments have been completed, and eligibility has been established for a participant, the study site will obtain the participant's identification number and cohort assignment from an interactive voice or web-based response system (IxRS).

The study will enroll up to 50 participants with SLE at approximately 15 investigative sites globally. Approximately 13-25 participants will be enrolled during the dose-finding and dose-escalation periods. Participants withdrawn during the DLT assessment period for any reasons other than a DLT will be replaced. Additional participants may be added during the dose expansion period to replace participants who discontinue prematurely, expand an existing dose cohort, fill a cohort at a modified dose, or assess a particular subgroup of interest (e.g., participants receiving a specific permitted SLE background therapy)

Target Population

Inclusion Criteria

Participants must meet the following criteria for study entry:

Signed Informed Consent Form

Age 18 to 75 years at time of signing Informed Consent Form

Ability to comply with the study protocol

4.3 Study Treatment and Other Treatments Relevant to the Study Design

The investigational medicinal product (IMP) for this study is mosunetuzumab. Tocilizumab for the treatment of CRS is also considered an IMP. Corticosteroids, immunosuppressants, antimalarial agents, and premedications for mosunetuzumab are considered non-investigational medicinal products (NIMPs).

4.3.1 Study Treatment Formulation and Packaging 4.3.1.1 Mosunetuzumab for Subcutaneous Administration Mosunetuzumab for SC administration will be supplied by the Sponsor as sterile liquid in 2 mL glass vials. For information on the formulation, packaging, and handling of mosunetuzumab, refer to the pharmacy manual and the Mosunetuzumab Investigator's Brochure.

4.3.1.2 Tocilizumab Tocilizumab will be supplied by the Sponsor as a sterile liquid in 10 mL glass vials. For information on the tocilizumab formulation, refer to the pharmacy manual and the Tocilizumab Investigator's Brochure. Tocilizumab may be obtained locally by the study sites for emergency purposes if permitted by local regulations and will be prepared and handled by a healthcare professional according to local prescribing information. Refer to the local prescribing information for further instructions regarding recommended storage conditions and packaging configuration.

4.3.2 Study Treatment Dosage, Administration, and Compliance The treatment regimens are summarized in 3.1. Refer to the pharmacy manual for detailed instructions on drug preparation and administration of mosunetuzumab.

4.3.2.1 Mosunetuzumab Flat dosing independent of body weight will be used for mosunetuzumab. The dose of mosunetuzumab for each participant will depend on the dose level assignment as detailed in 4.2.1. Mosunetuzumab will be administered to participants by SC injection using standard medical syringes with a final mosunetuzumab volume not to exceed 2.0 mL. Mosunetuzumab will be administered in a setting with immediate access to trained critical care personnel and facilities equipped to respond to and manage medical emergencies. Mosunetuzumab will be administered by qualified staff over 30 seconds to 2 minutes. Following each SC dose of mosunetuzumab, participants will be observed for fever, chills, rigors, hypotension, nausea, or other signs and symptoms of CRS. Vital signs should be monitored according to schedule of assessment. The recommended management of CRS is detailed in Section 5.1.3.3.

4.3.2.2 Premedications

The following premedications will be administered for each mosunetuzumab injection in all participants:

Corticosteroid premedication consisting of 10 mg dexamethasone should be administered orally pre-dose, 24 hrs±4 hrs post-, and 48 hrs±4 hrs post—each mosunetuzumab injection, i.e. on Days 1, 2, 3 for non-fractionated cohorts and on Days 1, 2, 3 and 8, 9, 10 for fractionated cohorts. OCS dose should be held on the days when dexamethasone is administered as a pre-medication.

In addition, oral acetaminophen (e.g., 500-1000 mg) and oral diphenhydramine (50-100 mg) will be administered prior to administration of mosunetuzumab. Decisions to modify the requirement for corticosteroid premedication will be made based on the recommendation of the IMC (see 3.1.6).

4.3.2.3 Tocilizumab

Tocilizumab should be administered for the treatment of CRS when necessary as described in Section 5.1.3.3. Tocilizumab may be obtained locally by the study sites for emergency purposes, if permitted by local regulations, and will be prepared and handled by a healthcare professional according to standard practice. Refer to the local prescribing information for further instructions on dosage, administration, recommended storage conditions and packaging configuration. If not permitted by local regulations, tocilizumab will be supplied by the Sponsor and information on the formulation, handling, and administration of tocilizumab will be provided in the pharmacy manual. Any overdose or incorrect administration of tocilizumab should be noted on the Study Drug Administration electronic Case Report Form (eCRF). Adverse events associated with an overdose or incorrect administration of study drug should be recorded on the Adverse Event eCRF.

4.4 Concomitant Therapy

Concomitant therapy consists of any medication (e.g., prescription drugs, over-the-counter drugs, vaccines, herbal or homeopathic remedies, nutritional supplements) used by a participant in addition to protocol-mandated treatment from 7 days prior to initiation of study drug to the final SFU/early termination visit. All such medications should be reported to the investigator and recorded on the Concomitant Medications eCRF.

Any approved (full marketing authorization or temporary) SARS-CoV2 vaccine administered during the specified time period should be reported as a concomitant medication.

4.4.1 Permitted Therapy

In general, investigators should manage a participant's care with supportive therapies as clinically indicated, per local standard practice. Participants are permitted to use the following therapies during the study:

Oral contraceptives (see 4.1.1)

Hormone-replacement therapies

Oral prednisone up to 40 mg/day or equivalent (see Table 4) for entry into the study although efforts should be made to maintain a stable dose from screening through the DLT assessment period, with the exception that the OCS dose should be held on the days when dexamethasone is administered as a premedication.

Following the DLT assessment period, the prednisone dose may be adjusted and tapered as clinically appropriate.

Use of a single topical corticosteroid agent (with or without OCS) is permitted

Antimalarial agents (hydroxychloroquine, chloroquine, or quinacrine) and conventional immunosuppressants (i.e., azathioprine, MMF, mycophenolic acid, or methotrexate [oral, SC, or intramuscular routes]) (see 4.1.1)

During screening and the DLT assessment periods, the dose of antimalarial and/or oral immunosuppressant medication may not be adjusted, except if one or more toxicities associated with the medication occur(s).

Non-steroidal anti-inflammatory drugs (NSAIDs)

NSAID use at approved dosage is permitted during the study, although initiation of new agents from screening until completion of the DLT assessment period should be avoided if possible.

Acetaminophen (paracetamol)

Care must be taken to ensure the total dose of acetaminophen (paracetamol), including that given for premedication, does not exceed the approved daily dose range.

Treatment of CRS according to published recommendations and/or institutional practice Calcium and/or vitamin D supplementation Anticoagulant or anti-platelet therapy for control of thrombotic risk if started at least 2 months prior to screening Antihypertensive therapy
  Antihypertensive therapy, including angiotensin-converting enzyme inhibitors or angiotensin-receptor blockers, is permitted although initiation of new agents from screening until completion of the DLT assessment period should be avoided if possible.

Hydroxymethylglutaryl-CoA (HMG-CoA) reductase inhibitors ("statins") and bisphosphonates
  HMG-CoA reductase inhibitors and bisphosphonates are permitted but may not be initiated until completion of the DLT assessment period. If participants enter the study taking such medications, every effort should be made to keep their dosage stable to prevent confounding of study results.

Hematopoietic growth factors and blood component transfusions
  Hematopoietic growth factors and blood component transfusions should not be initiated during screening. After initiation of study drug, treatment of neutropenia, thrombocytopenia, and anemia should follow the published guidelines and/or institutional practice. In general, investigators should manage a patient's care with supportive therapies as clinically indicated, per local standard practice.

4.4.2 Cautionary Therapy 4.4.2.1 Immunizations

The efficacy and safety of immunization during periods of peripheral B cell-depletion have not been adequately studied. It is recommended that a patient's vaccination record and the need for immunization be carefully evaluated prior to receiving mosunetuzumab. For participants who are likely to require immunization in the foreseeable future, such as participants planning to travel to countries where specific immunization is required or participants requiring a vaccination/booster for their professional activity, any required vaccination/booster should be given at least 28 days prior to receipt of study drug. Review of a patient's immunization status or need for the following vaccinations in advance of receipt of study drug is recommended: tetanus; diphtheria; influenza; pneumococcus polysaccharide; varicella; measles, mumps, and rubella; hepatitis B vaccines; and SARS-CoV-2 vaccines (where locally available, refer to Section 1.3). The safety and efficacy of immunization with a live or attenuated live vaccine in B cell-depleted participants are not known. For this reason, the use of live or attenuated vaccines (e.g., measles, mumps, rubella, oral polio vaccine, Bacillus Calmette-Guérin, typhoid, yellow fever, vaccinia, or any other vaccines not yet licensed but belonging to this category) is specifically excluded for 28 days prior to screening through the end of the SFU or B-cell recovery, whichever occurs first.

Vaccines that do not contain live organisms (e.g., influenza, Pneumovax®, tetanus, and SARS-CoV-2 vaccines [refer to 1.3]) are not prohibited; however, vaccines received during peripheral B cell-depletion may be ineffective.

4.4.2.2 Other Therapies for Systemic Lupus Erythematosus

Disease flares may be managed with temporary increases in corticosteroid doses while continuing the study, although efforts should be made to maintain stable dosing from screening through the DLT assessment period. In some cases of worsening or severely active disease, the investigator may conclude that additional therapy for SLE is indicated, including the following:

High dose corticosteroids (IV methylprednisolone≥250 mg or equivalent or oral prednisone>40 mg/day or equivalent (see Table 4 for 4 weeks or longer)

Cyclophosphamide

Any B-cell-depleting therapies, including but not limited to rituximab, ocrelizumab, ofatumumab, and obinutuzumab Calcineurin inhibitors including ciclosporin, tacrolimus, and voclosporin Other biologic, or targeted therapies used for the treatment of SLE Because the safety of mosunetuzumab in combination with these therapies is unknown, participants who receive such therapy will not receive additional injections of mosunetuzumab.

4.4.2.3 Medications Given with Precaution Due to Effects Related to Cytochrome P450 Enzymes Given the expected pharmacology of mosunetuzumab, the transient release of cytokines may suppress cytochrome P450 (CYP450) enzymes and cause drug-drug interactions. Preliminary clinical data indicate that SC mosunetuzumab administration induced a transient elevation in plasma IL-6 levels, with peak levels occurring in the majority of patients within 1-3 days of the Day 1 of Cycle 1 dose, and returning to baseline by 3-4 days. Participants with highest risk of a drug-drug interaction are those receiving concomitant medications that are CYP450 substrates and have a narrow therapeutic index (see Table 5). Such concomitant medications should be monitored for toxicity, and the dose adjusted accordingly (see Table 5).

TABLE 5

Examples of Sensitive In Vivo CYP Substrates and CYP Substrates with Narrow Therapeutic Range

| CYP Enzymes $^a$ | Sensitive Substrates $^b$ | Substrates with Narrow Therapeutic Range $^c$ |
|---|---|---|
| CYP1A2 | alosetron, caffeine, duloxetme, melatonin, ramelteon, lasimelteon, tizanidine | theophylline, tizanidine |
| CYP2B6 $^d$ | bupropion | |
| CYP2C8 | repaglinide $^e$ | paclitaxel |
| CYP2C9 | celecoxib | warfarin, phenytoin |
| CYP2C19 | omeprazole. S-mephenytoin | S-mephenytoin |
| CYP3A $^f$ | alfentanil, avanafil, buspirone, conivaptan, darifenacin, darunavir, ebastine, everolimus, ibrutinib, lomitapide, lovastatin, midazolam, naloxegol, nisoldipine, saquinavir, simvastatin, sirolimus, tacrolimus, tipranvir, triazolam, vardenafil, budesonide, dasatinib. dronedarone, eletriptan, eplerenone, felodipine, indinavir, lurasidone, maraviroc, quetiapine, sildenafil, ticagrelor, tolvaptan | alfentanil, astemizole $^g$, cisapride $^g$, cyclosporine, dihydroergotamine, ergotamine, fentanyl, pimozide, quinidine, sirolimus, tacrolimus, terfenadine $^g$ |

TABLE 5-continued

Examples of Sensitive In Vivo CYP Substrates and
CYP Substrates with Narrow Therapeutic Range

| CYP Enzymes [a] | Sensitive Substrates [b] | Substrates with Narrow Therapeutic Range [c] |
|---|---|---|
| CYP2D6 | atomoxetine, desipramine, dextromethorphan, eliglustat, nebivolol, nortriptyline, perphenazine, tolterodine, R-venlafaxine | thioridazine |

AUG -area under the concentration-time curve . . . CYP- cytochrome P450, P-gP-P-glycoprotein.

[a] Note that this is not an exhaustive list. For an updated list, see the following link: www.fda.gov/Drugs/DevelopmentApprovalProcess/DevelopmentResources/DrugInteractionsLabeling/ucm080499.htm.

[b] Sensitive CYP substrates refer to drugs whose plasma AUC values have been shown to increase 5-fold or higher when co-administered with a known CYP inhibitor.

[c] CYP substrates with narrow therapeutic range refers to drugs whose exposure-response relationship indicates that small increases in their exposure levels by the concomitant use of CYP inhibitors may lead to serious safety concerns (e.g., torsades de pointes).

[d] The AUC of these substrates was not increased by 5-fold or more with a CYP2B6 inhibitor, but they represent the most sensitive substrates studied with available inhibitors evaluated to date.

[e] Repaglinide is also a substrate for OATP1B1, and it is only suitable as a CYP2C8 substrate if the inhibition of OATP1B1 by the investigational drug has been ruled out.

[f] Because a number of CYP3A substrates (e.g., darunavir, maraviroc) are also substrates of Pgp, the observed increase in exposure could be due to inhibition of both CYP3A and P-gp-.

[g] Withdrawn from the U.S. market because of safety reason.

CYP450 enzymes in the liver are down-regulated by infection and inflammatory stimuli, including cytokines such as IL-6. Inhibition of IL-6 signaling in participants who are treated with tocilizumab may restore CYP450 activities to higher levels than those in participants not treated with tocilizumab, leading to increased metabolism of drugs that are CYP450 substrates. In vitro studies showed that tocilizumab has the potential to affect expression of multiple CYP enzymes, including CYP1A2, CY2B6, CYP2C9, CYP2C19, CYP2D6, and CYP3A4. The effects of tocilizumab on CYP2C8 or transporters are unknown. In vivo studies with omeprazole (metabolized by CYP2C19 and CYP3A4) and simvastatin (metabolized by CYP3A4) showed up to a 28% and 57% decrease in exposure 1 week following a single dose of tocilizumab, respectively.

The effect of tocilizumab on CYP enzymes may be clinically relevant for CYP450 substrates with narrow therapeutic index (see Table 5), where the dose is individually adjusted:

Upon initiation or discontinuation of tocilizumab in participants being treated with these types of medicinal products, therapeutic monitoring of effect (e.g., warfarin) or drug concentration (e.g., cyclosporine or theophylline) should be performed and the patient dose of the medicinal product adjusted as needed.

Prescribers should exercise caution when tocilizumab is co-administered with CYP3A4 substrate drugs for which a decrease in effectiveness is undesirable (e.g., oral contraceptives, lovastatin, atorvastatin). The effect of tocilizumab on CYP450 enzyme activity may persist for several weeks after stopping therapy.

4.4.3 Prohibited Therapy Use of the Following Concomitant Therapies is Prohibited as Described Below:

Investigational therapy (other than protocol-mandated study treatment) within 30 days or 5 drug-elimination half-lives (whichever is longer) prior to initiation of study treatment and during the study.

Herbal therapies from screening through the DLT assessment period, because their pharmacokinetics, safety profiles, and potential drug-drug interactions are generally unknown.

4.4.4 Additional Restrictions

Participants will be required to abstain from the following:

Illicit drug or hallucinogenic substance from screening until completion of the study, with the exception of appropriate use of a prescribed medication, as determined by the investigator.

4.5 Study Assessments

The schedule of activities to be performed during the study is provided in FIGS. 5A-5C (FIG. 5; non-fractionated cohorts) and FIGS. 6A-FIG. 6C (FIG. 6; fractionated cohorts). All activities should be performed and documented for each participant. Participants will be closely monitored for safety and tolerability throughout the study. Participants should be assessed for toxicity prior to each dose; dosing will occur only if the clinical assessment and laboratory test values are acceptable.

Example 5 Assessment of Safety (Prophetic)

5.1 Safety Plan

This is the first study in which the SC formulation of mosunetuzumab will be administered to participants with autoimmune disease, specifically SLE. As such, the actual risks in this participant population are unknown. Mosunetuzumab is currently not approved; clinical development of IV and SC formulations of mosunetuzumab in hemato-oncology indications is ongoing. The safety plan for participants in this study is based on clinical experience with mosunetuzumab in ongoing hemato-oncology studies. The anticipated important safety risks for mosunetuzumab are outlined below. Eligibility criteria have been designed to exclude participants at higher risk for toxicities (see 4.1.2). Enrollment will be staggered such that all participants in the dose-finding and dose-escalation cohorts will have the Day 1 dose administered 72 hours apart (refer to 3.1 for details). Subsequent enrollment of participants in the expansion period will be staggered by at least 24 hours, which may be further modified per recommendation of the IMC (see 3.1.4). Hospitalization is required for all participants in the dose-finding cohorts. Hospitalization requirements for participants in the dose-escalation cohorts and expansion period will be defined based on the emerging PK and safety data and recommendations from the IMC.

The IMC will be instituted to ensure participant's safety during the study (see 3.1.6). Premedication will be used employed to reduce the frequency and severity of CRS (see 4.3.2.2). Administration of mosunetuzumab will be performed in a clinical setting with immediate access to a critical care unit and staff who are trained to monitor and respond to medical emergencies. Participants will undergo safety monitoring during the study, including assessment of the nature, frequency, and severity of adverse events. In addition, guidelines for managing adverse events, including criteria for treatment interruption or discontinuation, are provided below.

5.1.1 Risks Associated with Subcutaneous Mosunetuzumab 5.1.1.1 Cytokine-Release Syndrome The mechanism of action of mosunetuzumab is immune cell activation against CD20-expressing cells; therefore, a spectrum of events involving IRRs, target-mediated cytokine release, and/or hypersensitivity with or without emergent ADAs, may occur. Other CD20-directed therapies and immunomodulatory therapies have been associated with IRRs, CRS, and/or hypersensitivity (Rituxan USPI; Gazyva USPI; Blincyto USPI).

CRS following mosunetuzumab administration has been reported in hemato-oncology clinical trials of mosunetuzumab.

To date CRS events observed with mosunetuzumab in hemato-oncology clinical trials have been mostly mild to moderate in severity, and include symptoms such as fever, headache, and myalgia, and respond to symptomatic treatment with analgesics, antipyretic medications, and antihistamines as indicated.

Severe or life-threatening presentations of CRS, such as hypotension, tachycardia, dyspnea, or chest discomfort, should be treated aggressively with supportive and resuscitative measures as indicated, including the use of tocilizumab and/or high dose corticosteroids, IV fluids, and other supportive measures per institutional practice. Severe CRS may be associated with other clinical sequelae such as disseminated intravascular coagulation, capillary leak syndrome, or may manifest as HLH (see 5.1.1.3). Standard of care for severe or life threatening CRS resulting from immune-based monoclonal antibody therapy has not been established; case reports and recommendations for CD19 CAR-T-cell therapies have been published (Teachey et al. 2013; Lee et al. 2014, Maude et al. 2014; Neelapu et al. 2018; Yescarta® USPI; Kymriah USPI; Tecartus® USPI).

To minimize the risk and sequelae of CRS, corticosteroid premedication should be administered as described in 4.3.2.2.

For CRS adverse event reporting procedures, refer to 5.3.5.1.

For CRS grading according to the ASTCT consensus grading criteria (Lee, 2019), refer to Table 1.

Guidelines for management of participants who develop CRS are provided in 5.1.3.3, Table 6.

For management guidelines for anaphylaxis:

These guidelines are intended as a reference and should not supersede pertinent local or institutional standard operating procedures.

Clinical Criteria for Diagnosing Anaphylaxis

Anaphylaxis is highly likely when any one of the following 3 criteria are fulfilled (Sampson et al. 2006):

Acute onset of an illness (from minutes to several hours) with involvement of the skin, mucosal tissue, or both (e.g., generalized hives, pruritus or flushing, swollen lips, tongue, uvula) and at least one of the following:
Respiratory compromise (e.g., dyspnea, wheeze-bronchospasm, stridor, reduced peak expiratory flow [PEF], hypoxemia)
Reduced blood pressure (BP) or associated symptoms of end-organ dysfunction (e.g., hypotonia [collapse], syncope, incontinence Two or more of the following that occur rapidly after exposure to a likely allergen for that patient (minutes to several hours):
Involvement of the skin mucosal tissue (e.g., generalized hives, itch-flush, swollen lips, tongue, uvula)
Respiratory compromise (e.g., dyspnea, wheeze-bronchospasm, stridor, reduced PEF, hypoxemia)
Reduced BP or associated symptoms (e.g., hypotonia [collapse], syncope, incontinence)
Persistent gastrointestinal symptoms (e.g., crampy abdominal pain, vomiting)
Reduced BP after exposure to known allergen for that patient (minutes to several hours):
Adults: systolic BP of ≤90 mm Hg or ≥30% decrease from that person's baseline Required Equipment and Medication The following equipment and medication are needed in the event of a suspected anaphylactic reaction during study treatment administration in a clinical setting:
Monitoring devices: ECG monitor, blood pressure monitor, oxygen saturation monitor, and thermometer
Oxygen
Epinephrine for intramuscular (preferred route), subcutaneous, intravenous, or endotracheal administration in accordance with institutional guidelines
Antihistamines
Corticosteroids
Intravenous infusion solutions, tubing, catheters, and tape PROCEDURES In the event of a suspected anaphylactic reaction during study treatment administration, the following procedures should be performed:
1. Stop the study treatment administration, if possible.
2. Call for additional medical assistance.
3. Maintain an adequate airway.
4. Ensure that appropriate monitoring is in place, with continuous ECG and pulse oximetry monitoring if possible.
5. Administer antihistamines, epinephrine, or other medications and IV fluids as required by patient status and as directed by the physician in charge.
6. Continue to observe the patient and document observations.

(Sampson H A, Munoz-Furlong A, Campbell R, et al. Second symposium on the definition and management of anaphylaxis: Summary report—Second National Institute of Allergy and Infectious Disease/Food Allergy and Anaphylaxis Network symposium, J Allergy Clin Immunol. 2006; 117:391-397).

5.1.1.2 Neutropenia

Neutorpenia is common in SLE and generally correlates with disease activity. Neutropenia is a known class effect associated with other CD20-directed therapies, as well as blinatumomab (Blincyto USPI). Reversible neutropenia has been observed following mosunetuzumab treatment in hemato-oncology study GO29781. Some participants developing neutropenia have received growth factor support and/or had temporary treatment holds. Refer to the Mosunetuzumab Investigator's Brochure for details. Guidelines for management of participants who develop neutropenia are provided in 5.1.3.3, Table 7.

5.1.1.3 Hemophagocytic Lymphohistiocytosis CRS with features of adult-onset secondary or reactive macrophage activation syndrome (MAS) or HLH has been reported for anti-CD19 therapy, blinatumomab, as well as adoptive CAR-T-cell therapy (Blincyto USPI; Teachey et al. 2013; Lee et al. 2014). A fatal case of secondary HLH, in a participant with NHL and evidence of chronic active EBV infection (positive for EBV as assessed by EBV-encoded small RNA in situ hybridization), has been reported in mosunetuzumab hemato-oncology study G029781 (refer to the Mosunetuzumab Investigator's Brochure for details). While severe CRS and secondary HLH have overlapping presentation and symptoms, secondary HLH may be precipitated by other conditions including infections and malignancies, and autoimmune diseases (Dhote et al. 2003, Ramos-Casals et al. 2014). Of the autoimmune diseases, SLE has been mostly commonly reported, particularly in the setting of disease flares (Fukaya et al. 2008, Kim et al. 2012). The distinction between CRS and HLH and identification of inciting factors are challenging. Active infection with EBV is one of the most common infectious causes of HLH (Hashemi-Sadraei et al. 2015; Schram and Berliner 2015), while reactivation of latent EBV may occur in participants with SLE (Jog and James 2021), which in turn may lead to HLH (Lim et al. 2014). CMV has also been associated with development of secondary HLH. Participants with known or suspected chronic active EBV infection or CMV will be excluded from this trial due to the risk of secondary HLH (see 4.1.2). It remains unknown whether mosunetuzumab treatment may further increase the risk of developing HLH in participants who have additional risk factors. While there is no universally accepted set of criteria for diagnosing secondary or reactive HLH in the adult population, proposed criteria have been published (Henter et al. 2007; Fardet et al. 2014; Hejblum et al. 2014). Participants with suspected HLH should be diagnosed according to published HLH diagnostic criteria (Jordan et al. 2011). A participant should be classified as having HLH if five of the following eight criteria are met:

Fever≥38.5° C.

Splenomegaly

Peripheral blood cytopenia consisting of at least two of the following:

Hemoglobin<90 g/L (9 g/dL)

Platelet count<100×$10^9$/L (100,000/µL)

ANC<1.0×$10^9$/L (1000/µL)

Fasting hypertriglyceridemia>2.992 mmol/L (265 mg/dL) and/or hypofibrinogenemia<1.5 g/L (150 mg/dL)

Hemophagocytosis in bone marrow, spleen, lymph node, or liver

Low or absent NK-cell activity

Ferritin>500 mg/L (500 ng/mL)

Soluble IL-2 receptor (soluble CD25) elevated>2 standard deviations above age-adjusted laboratory-specific norms In all cases of suspected HLH, the Medical Monitor should be immediately notified. Guidelines for management of participants who develop HLH are provided in 5.1.3.3, Table 8.

5.1.1.4 Injection-Site Reactions

Localized injection-site reactions following SC administration of the anti-CD20 monoclonal antibody rituximab have been observed (Assouline et al. 2016). Most events were mild to moderate in severity (Rituxan Hycela® USPI). As CD4+ and CD8+ T cells (Mueller et al. 2014) as well as B cells (Egbuniwe et al. 2015) reside in the skin, localized reactions following SC administration of mosunetuzumab administration may occur and mild injection-site reactions have been observed in participants treated with SC mosunetuzumab in hemato-oncology study G029781. Refer to 5.3.5.2 for adverse event reporting procedures related to injection-site reactions.

Guidelines for management of participants who develop injection-site reaction are provided in 5.1.3.3, Table 9.

5.1.1.5 Neurologic Adverse Events

In participants treated with blinatumomab and CD19 CAR-T-cell therapy, neurologic toxicity was frequently reported (Blincyto USPI; Kochenderfer et al. 2014; Maude et al. 2014) with reported symptoms that include headache, confusion, aphasia, encephalopathy, tremor, seizure, and other neurologic events. The etiology of toxicity in these settings is uncertain and may not be responsive to cytokine-directed therapy such as tocilizumab but has generally improved with treatment discontinuation and corticosteroids (Blincyto USPI; Viardot et al. 2010; Kochenderfer et al. 2014).

Neurologic toxicity has been reported in cynomolgus monkeys administered mosunetuzumab (refer to the Mosunetuzumab Investigator's Brochure for details). Encephalopathy was observed in the setting of CRS and/or elevation in liver function tests (LFTs) following mosunetuzumab treatment in patients with hematological malignancies (refer to the Mosunetuzumab Investigator's Brochure for details). Based on available clinical data, neurologic adverse events observed with mosunetuzumab have been mild in severity with early onset. The most frequent neurologic events include headache, dizziness, and insomnia (refer to the Mosunetuzumab Investigator's Brochure for details).

Guidelines for management of participants who develop neurologic adverse events are provided in 5.1.3.3, Table 10.

5.1.1.6 Infections

Due to its anticipated mode of action resulting in profound B cell-depletion, mosunetuzumab may be associated with an increased risk of infections. Infections have been reported in participants receiving other CD20-directed therapies as well as blinatumomab (Blincyto USPI; Gazyva USPI; Rituxan USPI). In addition, participants with SLE may be on corticosteroids and other conventional immunosuppressants, further increasing risk of infection. Therefore, mosunetuzumab should not be administered in the presence of active infection and to participants with a history of recurrent or chronic infections are to be excluded.

PML has been associated with treatment with CD20-directed therapies including rituximab and obinutuzumab. The diagnosis of PML should be considered in any participant presenting with new-onset neurologic manifestations and consultation with a neurologist and diagnostic procedures including brain magnetic resonance imaging (MRI) and lumbar puncture should be performed as clinically indicated. However, new-onset neurologic adverse events following initial doses of mosunetuzumab may be more likely due to acute effects of mosunetuzumab (see 5.1.1.5), as PML associated with rituximab generally occurred following long-term exposure (Carson et al. 2009).

Hepatitis B reactivation has been reported with other CD20 directed therapies. Participants with acute or chronic HBV infection or HCV infection are not eligible for this trial (see 4.1.2).

Participants with HIV infection will be excluded from participation in the study because signs and symptoms of HIV may confound assessment of the safety profile of encephalopathy, tremor, seizure, and other neurologic events. The etiology of toxicity in these settings is uncertain and may not be responsive to cytokine-directed therapy such as tocilizumab but has generally improved with treatment discontinuation and corticosteroids (Blincyto USPI; Viardot et al. 2010; Kochenderfer et al. 2014).

Neurologic toxicity has been reported in cynomolgus monkeys administered mosunetuzumab.

Encephalopathy was observed in the setting of CRS and/or elevation in liver function tests (LFTs) following mosunetuzumab treatment in patients with hematological malignancies. Based on available clinical data, neurologic adverse events observed with mosunetuzumab have been mild in severity with early onset. The most frequent neurologic events include headache, dizziness, and insomnia.

Guidelines for management of participants who develop neurologic adverse events are provided in 5.1.3.3, Table 10.

5.1.1.6 Infections

Due to its anticipated mode of action resulting in profound B cell-depletion, mosunetuzumab may be associated with an increased risk of infections. Infections have been reported in participants receiving other CD20-directed therapies as well as blinatumomab (Blincyto USPI; Gazyva USPI; Rituxan USPI). In addition, participants with SLE may be on corticosteroids and other conventional immunosuppressants, further increasing risk of infection. Therefore, mosunetuzumab should not be administered in the presence of active infection and to participants with a history of recurrent or chronic infections are to be excluded.

PML has been associated with treatment with CD20-directed therapies including rituximab and obinutuzumab. The diagnosis of PML should be considered in any participant presenting with new-onset neurologic manifestations and consultation with a neurologist and diagnostic procedures including brain magnetic resonance imaging (MRI) and lumbar puncture should be performed as clinically indicated. However, new-onset neurologic adverse events following initial doses of mosunetuzumab may be more likely due to acute effects of mosunetuzumab (see 5.1.1.5), as PML associated with rituximab generally occurred following long-term exposure (Carson et al. 2009).

Hepatitis B reactivation has been reported with other CD20 directed therapies. Participants with acute or chronic HBV infection or HCV infection are not eligible for this trial (see 4.1.2).

Participants with HIV infection will be excluded from participation in the study because signs and symptoms of HIV may confound assessment of the safety profile of mosunetuzumab. HIV, active EBV infection, and CMV infection have been associated with development of secondary HLH. Participants with HIV and known or suspected chronic active EBV infection or CMV infection will be excluded from this trial due to the risk of secondary HLH (see 4.1.2).

In the setting of the COVID pandemic, screening for COVID prior to and during study participation should be considered according to local/institutional guidelines or those of applicable professional societies (e.g., ACR, EULAR).

Guidelines for management of participants who develop infections are provided in 5.1.3.3.

5.1.1.7 Thrombocytopenia

Thrombocytopenia is associated with other CD20 directed therapies as well as blinatumomab (Blincyto USPI). Reversible thrombocytopenia has been observed following mosunetuzumab treatment in hemato-oncology study G029781. In addition, thrombocytopenia is associated with the underlying SLE disease. In nonclinical testing of mosunetuzumab in cynomolgus monkeys, hematologic findings included transiently decreased WBC count, lymphocyte, monocyte, eosinophil, basophil, and platelet counts within the first day of mosunetuzumab exposure, followed by recovery or rebound recovery between Days 4 and 8. Guidelines for management of participants who develop thrombocytopenia are provided in 5.1.3.3, Table 11.

5.1.1.8 Elevated Liver Enzymes

Transient Grade 3 AST elevation in the setting of Grade 2 CRS as well as Grade 3 hepatic encephalopathy and Grade 4 elevation in LFTs have been observed following mosunetuzumab treatment in hemato-oncology clinical trials.

In nonclinical testing with mosunetuzumab in cynomolgus monkeys, dose-dependent increases in serum total bilirubin along with C-reactive protein (CRP), fibrinogen, PT, and a PTT were observed, consistent with mosunetuzumab-induced cytokine release and an acute phase protein response, with minimal activation of the coagulation system. Possible drug-related microscopic findings in the liver included single-cell hepatocyte degeneration or necrosis and immune cell infiltration in the portal area. All findings showed evidence of reversibility.

Participants with elevated LFTs at screening will be excluded from this trial (see 4.1.2).

Guidelines for management of participants who develop elevated liver enzymes are provided in 5.1.3.3, Table 12.

5.1.1.9 Immunogenicity (Anti-Drug Antibodies)

As with any recombinant antibody, mosunetuzumab may elicit an immune response, participants may develop antibodies against the molecule. Participants will be closely monitored for any potential immune response to mosunetuzumab, that may have an impact on the benefit/risk profile. Therefore, a risk-based strategy (Rosenberg and Worobec 2004a, 2004b, 2005, and Koren et al. 2008) will be utilized to detect and characterize ADA responses to mosunetuzumab. Refer to the Mosunetuzumab Investigator's Brochure for updated ADA information.

5.1.2 Risks Associated with Tocilizumab 5.1.3 Management of Participants Who Experience Adverse Events 5.1.3.1 Dose Modifications Dose Modifications are not Permitted.

5.1.3.2 Treatment Interruptions

In patients who experience adverse events, mosunetuzumab treatment may be temporarily suspended (i.e., the Day 8 injection in the fractionated dose schedule may be delayed) to allow for adverse event resolution (refer to 5.1.3.3). Mosunetuzumab will only be administered if a patient's clinical assessment and laboratory test values are acceptable. All considerations of schedule modifications should be discussed with the Medical Monitor. The following guidelines regarding schedule modifications should be followed:

Participants who experience a Grade 2 or 3 CRS event (by 2019 ASTCT CRS consensus grading criteria; Table 1) will be allowed to delay Day 8 dosing for up to 3 days in order to recover from the toxicity:

For Grade 3 CRS; participants may receive the next dose provided CRS was responsive to treatment (i.e., clinical improvement within 8-12 hours following tocilizumab/corticosteroids administration) and symptoms resolve to Grade 1 or better for 3 consecutive days For Grade 2 CRS; participants may receive the next dose provided CRS resolved to Grade 1 or better for 3 consecutive days Participants who experience a Grade≤3 adverse event (by NCI CTCAE v5.0) will be allowed to delay Day 8 dosing for up to 3 days in order to recover from the toxicity:

For hematologic laboratory abnormalities of Grade 3 or 4 (if no clinically significant symptoms are present) and for anemia and thrombocytopenia no transfusions are required; participants may receive the next dose provided they improve to Grade≤2.

For adverse events that are not considered to be attributable to another clearly identifiable cause such as worsening of SLE, concomitant medication, or preexisting medical condition, participants may receive the next dose provided that the event has resolved to Grade 1 or better.

For clinically relevant decreased lab values, the abnormality should have resolved to the lower limit of Grade 1 or better, or return to ≥80% of the baseline value, whichever is lower.—For clinically relevant increased lab values, the abnormality should have resolved to the upper limit of Grade 1 or better, or return to ≥120% of the baseline value, whichever is higher.

For the following findings that occur in the context of Grade≤2 CRS (by ASTCT CRS consensus grading criteria; Table 1) participants may receive the next dose provided:
  Grade 3 (by NCI CTCAE v5.0) individual signs and symptoms of CRS that last≤3 days
  Elevation of AST or ALT and/or total bilirubin with no individual laboratory value exceeding Grade 3 7 (by NCI CTCAE v5.0) that has improved to Grade 1 or better Participants who experience a Grade 4 (according to NCI CTCAE v5.0) non-hematological adverse event or DLT (see 3.1.7) during fractionated dose administration should discontinue further dosing (see 4.6.1).

In the event of a delay of the next dose exceeding 3 days due to toxicity or other reasons, the study treatment will be discontinued If study treatment is discontinued (i.e. no Day 8 dose is administered), the participant will remain in the study and will continue with study visits and respective assessments following the schedule of activities for non-fractionated cohorts (see FIG. 5)

5.1.3.3 Management Guidelines Cytokine-Release Syndrome

Premedication with corticosteroid, antihistamine, and antipyretics/analgesics is required prior to treatment with mosunetuzumab (see 4.3.1.1).

Given the mechanism of action of mosunetuzumab, systemic injection-related reaction and CRS may be indistinguishable, hence their evaluation and treatment are identical.

As participants have received corticosteroid premedication, a fever response may be blunted. Therefore, adverse events attributed to mosunetuzumab consistent with a diagnosis of systemic injection-related reaction or CRS, and associated with fever, hypotension or hypoxia not attributable to any other cause, should be recorded as CRS. CRS events that manifest with hypotension and/or hypoxia, but with no fever, should be graded depending on management required for hypotension and/or hypoxia. These types of events correspond to minimum ASTCT Grade 2 CRS. In the absence of fever, hypotension, or hypoxia, adverse events occurring within 24 hours after mosunetuzumab administration should be reported as individual adverse events e.g., headache or chills.

Management of Grade≥3 CRS should be immediately discussed between the treating investigator and the Medical Monitor. As noted in Table 6, even moderate presentations of CRS in participants with extensive comorbidities should be monitored closely with consideration given to intensive care unit (ICU) admission and tocilizumab administration. Severe SARS-CoV-2 infection is associated with a CRS involving the inflammatory cytokines IL-6, IL-10, IL-2, and IFN-γ. If a trial patient develops severe CRS, the differential diagnosis should include SARS-CoV-2 and relevant testing performed at the discretion of the investigator. If a diagnosis of COVID-19 is confirmed, the disease should be managed as per local or institutional guidelines.

In atypical cases such as late onset CRS (onset>72 hours following mosunetuzumab injection) or CRS that is refractory to treatment, work-up for HLH should be initiated, and all cases of suspected HLH should be discussed with the Medical Monitor immediately.

TABLE 6

Management of Cytokine-Release Syndrome

| CRS Grade [a] | Supportive Care | Anti-IL-6 or Corticosteroid Therapy | Action for Next Mosunetuzumab Dose |
|---|---|---|---|
| Grade 1 (fever ≥38° C. [b]) | Supportive care c for constitutional symptoms and organ toxicities Maintenance fluids for hydration Consider hospitalization until symptoms completely resolve. | If rapid decline or prolonged CRS (>2 days) in participants with significant symptoms and/or comorbidities (per investigator discretion, e.g., impaired cardiovascular function, reduced pulmonary reserve), consider tocilizumab and IV corticosteroids as per Grade 2 guidelines | Consider hospitalization for next dose |
| Grade 2 (fever ≥38° C. [b] with hypotension not requiring vasopressors and/or | Supportive care [c] for constitutional symptoms and organ toxicities Consider ICU admission for hemodynamic and other | Administer tocilizumab. [e] For persistent refractory hypotension after 1 or 2 doses of anti- | May receive the next dose of mosunetuzumab if symptoms resolve to Grade 1 or better for 3 consecutive days. |

TABLE 6-continued

Management of Cytokine-Release Syndrome

| CRS Grade [a] | Supportive Care | Anti-IL-6 or Corticosteroid Therapy | Action for Next Mosunetuzumab Dose |
|---|---|---|---|
| hypoxia requiring low-flow oxygen [d] by nasal cannula or blow-by) | organ functions monitoring. For hypotension: IV fluid bolus as needed; For refractory or unstable hypotension after at most 2 fluid boluses and anti-IL-6 therapy, start vasopressors, and manage as Grade 3 For hypoxia: treat with low-flow oxygen d Rule out other inflammatory conditions, which can mimic severe CRS (e.g., infections (e.g., COVID-19) or sepsis). If no improvement within 24 hours, initiate work-up and assess for signs and symptoms of HLH as described in Sections 5.1.1.3 and 5.1.3.3 (Table 8). Hospitalization until complete resolution of signs/symptoms [f] | IL-6 therapy, consider 10 mg IV dexamethasone every 6 hours (or equivalent). Manage per Grade 3 guidelines if no improvement within 8-12 hours after starting tocilizumab. | Hospitalization for next dose |
| Grade 3 (fever ≥38° C. [b] with hypotension requiring a vasopressor [with or without vasopressin] and/or hypoxia requiring high-flow oxygen by nasal cannula [d], face mask, non-rebreather mask, or Venturi-mask) | Supportive care [c] for constitutional symptoms and organ toxicities Admit participant to ICU for hemodynamic and other organ functions monitoring. For hypotension: IV fluid bolus; vasopressor support at high and repeated doses as required For hypoxia: treat with high-flow oxygen Rule out other inflammatory conditions that can mimic severe CRS (e.g., infections (e.g., COVID-19) or sepsis) If no improvement within 24 hours, initiate work-up and assess for signs and symptoms of HLH (see Sections 5.1.1.3 and 5.1.3.3 [Table 8) Hospitalization until complete resolution of signs/symptoms [f] | Administer tocilizumab. [e] Dexamethasone 10 mg IV every 6 hours (or equivalent). If refractory, manage as per Grade 4 guidelines. Manage per Grade 4 guidelines if no improvement within 8-12 hours after second dose of tocilizumab. | May receive the next dose of mosunetuzumab if CRS event was responsive to treatment (i.e., clinical improvement within 8-12 hours following tocilizumab/corticosteroids administration) and symptoms resolve to Grade 1 or better for 3 consecutive days; hospitalization for next dose If CRS event is not responsive to treatment and symptoms do not resolve in the specified timeframe, permanently discontinue mosunetuzumab. |
| Grade 4 (fever ≥38° [b] with hypotension requiring multiple vasopressors [excluding vasopressin]and/or hypoxia requiring oxygen by positive pressure [e.g., C-PAP, BiPAP, intubation, and | ICU admission for hemodynamic monitoring Mechanical ventilation as needed IV fluids and vasopressors as needed Supportive care c for constitutional symptoms and organ toxicities Rule out other inflammatory conditions that can mimic severe CRS (e.g., infection | Administer tocilizumab. [e] For participants who are refractory to tocilizumab, treatment with siltuximab, anakinra, dasatinib, or emapalumab, at the discretion of the investigator; management should be discussed with the Medical Monitor [g] Administer 10 mg IV | Permanently discontinue mosunetuzumab |

TABLE 6-continued

Management of Cytokine-Release Syndrome

| CRS Grade [a] | Supportive Care | Anti-IL-6 or Corticosteroid Therapy | Action for Next Mosunetuzumab Dose |
|---|---|---|---|
| mechanical ventilation]) | (e.g., COVID-19) or sepsis) If no improvement within 24 hours, initiate work up and assess for signs and symptoms HLH (see Table 8) | dexamethasone every 6 hours (or equivalent) If participants are refractory, consider 1000 mg/day IV methylprednisolone [h] | |

ASTCT = American Society for Transplantation and Cellular Therapy; BiPAP = bilevel positive airway pressure; C-PAP = continuous positive airway pressure; CRS = cytokine-release syndrome; G-CSF = granulocyte colony-stimulating factor; HLH = hemophagocytic lymphohistiocytosis; ICU = intensive care unit.
[a] Cytokine-release syndrome will be assessed according to the ASTCT consensus grading criteria (Lee et al. 2019).
[b] Fever is defined as temperature ≥38° C., not attributable to any other cause. As participants may have received corticosteroid premedication, a fever response may be blunted. CRS events that manifest with hypotension and/or hypoxia, but with no fever, should be graded depending on management required for hypotension and/or hypoxia. Such type of events correspond to minimum ASTCT Grade 2. In participants who develop CRS and then receive antipyretic or anti-cytokine therapy (e.g. tocilizumab or steroids), fever is no longer required to grade subsequent CRS severity. In this case, CRS grade is driven by hypotension and/or hypoxia.
[c] Patients should be treated with acetaminophen and an antihistamine (e.g., diphenhydramine), if they have not been administered in the previous 4 hours. For bronchospasm, urticaria, or dyspnea, treat per institutional practice. Treat fever and neutropenia as required; consider broad spectrum antibiotics and/or G-CSF, if indicated.
[d] Low-flow nasal cannula is defined as oxygen delivered at ≤6 L/min. Low flow also includes blow-by oxygen delivery. High-flow nasal cannula is defined as oxygen delivered at >6 L/min.
[e] Refer to Appendix 4 for schedule of activities following tocilizumab administration. Tocilizumab should be administered by IV infusion at a dose of 8 mg/kg (8 mg/kg for participants weighing ≥30 kg; doses exceeding 800 mg per infusion are not recommended); repeat every 8 hours as necessary (for up to a maximum of 4 doses).
[f] For the purpose of management, CRS resolution is defined as the patient no longer requiring vasopressor support or oxygen supplementation because of CRS.
[g] Riegler et al. 2019, Wu et al. 2019
[h] For example, 1000 mg/day IV methylprednisolone for 3 days, followed by a rapid taper over 1 week (e.g., 250 mg every 12 hours for 2 days, 125 mg every 13 hours for 2 days, and 60 mg every 12 hours for 2 days).

Neutropenia

All participants should be monitored at each visit for neutropenia, and participants experiencing neutropenia should undergo blood cell monitoring until resolution of the event to Grade≤2. See Table 7.

TABLE 7

Management Guidelines for Neutropenia

| Grade | Management |
|---|---|
| Grade 1 or 2 (ANC ≥ 1.0 × 10$^9$/L) | Manage according to institutional practice. Continue study treatment. |
| Grade 3 or 4 (ANC < 1.0 × 10$^9$/L) | For uncomplicated neutropenia, further mosunetuzumab dosing may continue provided it improves to Grade ≤2 (i.e. ANC ≥ 1.0 × 10$^9$/L) prior to the next dose. The dose of mosunetuzumab should not be modified Growth factors (e.g., G-CSF) to be considered as clinically indicated according to institutional practice |
| Febrile neutropenia (ANC < 1.0 × 10$^9$/L with a single temperature of >38.3° C. [101° F.] or a sustained temperature of ≥38° C. [100.4° F.] for more than 1 hour) | To be managed according to local guidelines or as per institutional practice Permanently discontinue study treatment |

G-CSF = granulocyte colony-stimulating factor.

Hemophagocytic Lymphohistiocytosis

In the setting of T-cell engaging therapies including mosunetuzumab, CRS is much more likely compared with secondary HLH. Considering the overlapping presentation of symptoms, management of these participants should be primarily focused on treatment of CRS (see Table 6).

The supportive management of HLH is generally similar to that of CRS. See Table 8.

In all cases of suspected HLH, participants should be hospitalized with the following diagnostic and monitoring measures initiated:

Frequent (e.g., every 4 hours) vital signs and physical examination including evaluation for splenomegaly Serial (at least daily) monitoring of serum chemistries, CBCs, LFTs, ferritin, PT/PTT, fibrinogen, D-dimer and triglycerides Consideration of bone marrow and/or lymph node biopsy to assess for hemophagocytosis and active infection, including assessment of EBV protein localization in T/B/NK cells Complete infectious disease work-up including the following:—Blood cultures (bacterial and fungal)

Urine cultures and urinalysis

Radiographic assessments (e.g., chest X-ray or CT scan)

Assessment for active viral infections, including but not limited to EBV and CMV Assessment for soluble CD25 and assessment of NK cell function. If not available locally, can be tested at central laboratory.

TABLE 8

Management Guidelines for Suspected Hemophagocytic Lymphohistiocytosis

| AE | Management |
|---|---|
| Suspected HLH | Withhold study treatment and contact Medical Monitor. Consider participant referral to hematologist. Initiate supportive care, including intensive care monitoring as indicated, per institutional guideline. Consider treatment for HLH with appropriate therapy. |
| Confirmed HLH | Permanently discontinue study treatment and contact the Medical Monitor. Refer participant to a hematologist. Supportive and interventional care should follow the management guidelines described for CRS (refer to Table 6) and/or institutional standards) For cases of HLH, where anti-cytokine therapies (with or without high dose corticosteroids) fail to induce the desired response, treatment options will be based on published guidelines (La Rosée 2015; |

TABLE 8-continued

Management Guidelines for Suspected
Hemophagocytic Lymphohistiocytosis

| AE | Management |
|---|---|
| | Schram and Berliner 2015; Goldsmith et al. 2019; Vallurupalli and Berliner 2019) |

HLH = hemophagocytic lymphohistiocytosis.

Injection-Site Reactions

Participants who experience localized injection-site reactions following SC administration of mosunetuzumab should be managed according to the guidelines detailed in Table 9.

TABLE 9

Management Guidelines for Injection-Site Reactions

| NCI CTCAE v5.0 Grade | Management |
|---|---|
| Grade 1 (tenderness with or without associated symptoms [e.g., warmth, erythema, itching]) | Consider treatment with topical steroids. Continue mosunetuzumab. |
| Grade 2 (pain, lipodystrophy, edema, phlebitis) | Initiate treatment with topical steroids. If progressive after 24 hours, consider 10-30 mg/day prednisone or equivalent (see Appendix 9) Continue mosunetuzumab if improvement to Grade 1 or better during DLT assessment period |
| Grade 3 (ulceration or necrosis, severe tissue damage, operative intervention indicated) | Notify Medical Monitor. Permanently discontinue mosunetuzumab. Initiate 1 mg/kg/day prednisone or equivalent Obtain a dermatology consultation. Taper steroids after improvement to Grade 1 or better |
| Grade 4 (life-threatening consequences, urgent intervention indicated) | Notify Medical Monitor. Permanently discontinue SC mosunetuzumab. Management as for Grade 3 |

NCI CTCAE = National Cancer Institute Common Terminology Criteria for Adverse Events.

Neurologic Adverse Events

Neurologic adverse events will be monitored closely during the trial. Participants should be routinely assessed for any signs or symptoms of neurologic adverse events as part of the on-treatment clinical examination. If new or worsening neurologic adverse events are suspected, the participant should be referred to a neurologist for further evaluation of potential drug-related neurotoxicity. Corticosteroids should be considered to treat suspected neurologic toxicity. Imaging studies (e.g., diffusion-weighted MRI) should be performed if clinically indicated (see Table 10). Decisions on whether to continue or to hold study treatment for any Grade 1 neurologic adverse events will be at the discretion of the study investigator. For Grade 2 neurologic adverse events, study treatment should be held until the event returns to baseline for at least 3 days without any medication. For Grade 3 and 4 neurologic adverse events, study treatment should be permanently discontinued. Study treatment should be permanently discontinued for Grade$\geq$3 seizures.

Participants who develop a neurologic adverse event that may affect driving, the investigator should advise them to refrain from driving or engaging in hazardous occupations or activities until the event is resolved. Neurologic adverse events with the potential to impact cognition or consciousness that may affect driving (driving-impacting cognition or consciousness neurologic events) include, but are not limited to, amnesia, aphasia, confusional state, delirium, depressed level of consciousness, disturbance in attention, encephalopathy, hallucination, hepatic encephalopathy, insomnia, memory impairment, seizure, visual hallucination, and vertigo.

Participants who develop other neurologic adverse events such as tremor or dizziness should be assessed by neurologic examination to determine if the adverse event may impair the ability of the participant to drive or engage in hazardous occupations or activities. For participants assessed to be at increased risk, the investigator should advise them to refrain from driving or engaging in hazardous occupations or activities until the event is resolved.

Management guidelines for neurologic adverse events are summarized in Table 10.

TABLE 10

Management of Guidelines for Neurologic Adverse Events

| Adverse Event | NCI CTCAE v5.0 Grade | Management |
|---|---|---|
| Seizure | Grades 1 or 2 (brief partial seizure and no loss of consciousness or brief generalized seizure) | Withhold further study treatment. Provide supportive care, consider treatment with corticosteroids Obtain neurologist consultation; consider brain MRI (with diffusion-weighted imaging), lumbar puncture, and EEG Study treatment may be resumed if no recurrent seizure for at least 3 days and with confirmation of neurologic examination |
| | Grades 3 or 4 (new onset seizures (partial or generalized); multiple seizures despite medical intervention or life-threatening consequences; prolonged repetitive seizures) | Permanently discontinue study treatment. Consider treatment with corticosteroids. Obtain neurologist consultation. |
| Immune-mediated neuropathy | Grade 1 asymptomatic; clinical or diagnostic observations only) | Continue study treatment. Investigate etiology. |
| | Grade 2 (moderate symptoms; limiting instrumental ADL) | Withhold study treatment. Investigate etiology. Initiate treatment as per institutional guidelines. Resume study treatment if event resolves to Grade $\leq$1 for at least 3 consecutive days prior to next dose. |

TABLE 10-continued

Management of Guidelines for Neurologic Adverse Events

| Adverse Event | NCI CTCAE v5.0 Grade | Management |
|---|---|---|
| | | Permanently discontinue study treatment if event does not resolve to Grade ≤1 for at least 3 consecutive days prior to next dose. |
| | Grade 3 or 4 (severe symptoms; limiting self-care ADL or life-threatening consequences; urgent intervention indicated) | Permanently discontinue study treatment and notify Medical Monitor. Initiate treatment as per institutional guidelines. |
| Neurologic events not otherwise specified | Grade 1 | Consider withholding study treatment during evaluation. |
| | Grade 2 | Withhold further study treatment. Consider treatment with corticosteroids. Consider neurologist consultation. Study treatment may be resumed when symptoms have returned to baseline for at least 3 consecutive days prior to the next dose without the need for medical management and with confirmation of neurologic examination. |
| | Grade 3 | Notify Medical Monitor. Permanently discontinue study treatment. Consider treatment with corticosteroids. Obtain neurologist consultation. |
| | Grade 4 | Notify Medical Monitor. Permanently discontinue study treatment. Obtain neurologist consultation. |

ADL = activities of daily living; EEG = electroencephalogram; MRI = magnetic resonance imaging; NCI CTCAE = National Cancer Institute Common Terminology Criteria for Adverse Events; IV = intravenous; MRI = magnetic resonance imaging; ADL = activities of daily living.

Infections

Treatment for infections will follow institutional practice.

For all serious infectious adverse events, CBC with differential, quantitative immunoglobulins, and flow cytometry should be measured within 1 week of onset.

Patients who develop an active Grade 1 or 2 infection during fractionated dose-administration will have Day 8 injection withheld until infection has resolved.

Patients who develop an active Grade 3 or 4 infection during fractionated dose-administration will discontinue study treatment.

Participants who demonstrate evidence of hepatitis reactivation will discontinue study treatment.

Thrombocytopenia

All participants should be monitored for thrombocytopenia, and participants experiencing thrombocytopenia should undergo blood cell monitoring until resolution of the event to Grade 1 (platelet count≥75,000/μL).

TABLE 11

Management Guidelines for Thrombocytopenia

| NCI CTCAE v5.0 Grade | Management |
|---|---|
| Grade 1 (platelet count ≥ 75 × $10^9$/L) | Manage according to institutional practice. Continue study treatment. |
| Grade 2, 3 or 4 (platelet count < 75 × $10^9$/L) | For uncomplicated thrombocytopenia, further mosunetuzumab dosing may continue provided it improves to Grade 1 or better (i.e. platelet count ≥ 75 × $10^9$/L) prior to next dose. The dose of mosunetuzumab should not be modified. Platelet transfusion to be considered as clinically indicated, according to institutional practice For thrombocytopenia requiring platelet transfusion or associated with bleeding that is considered clinically significant, study treatment will be permanently discontinued. Use of concomitant therapies that could possibly worsen thrombocytopenia-related events, such as platelet inhibitors and anticoagulants, should be taken into consideration. |

NCI CTCAE = National Cancer Institute Common Terminology Criteria for Adverse Events Elevated Liver Enzymes and Hepatic Events Participants with right upper-quadrant abdominal pain and/or unexplained nausea or vomiting should have LFTs performed immediately and reviewed before administration of the next dose of study drug.

LFTs will be assessed regularly during study and should be managed according to guidelines in Table 12.

For participants with elevated LFTs, concurrent medication, viral hepatitis, and toxic or neoplastic etiologies should be considered and addressed, as appropriate.

5.2 Safety Parameters and Definitions

Safety assessments will consist of monitoring and recording adverse events, including serious adverse events and adverse events of special interest, performing protocol-specified safety laboratory assessments, measuring protocol-specified vital signs, and conducting other protocol-specified tests that are deemed critical to the safety evaluation of the study.

TABLE 12

Management Guidelines for Liver Function Test Abnormalities and Hepatic Events

| LFT Abnormality | Management |
| --- | --- |
| Grade 1 AST or ALT elevation (>ULN-3.0 × ULN if baseline was normal; 1.5-3.0 × baseline if baseline was abnormal) | Continue study treatment. Monitor LFTs (including AST, ALT, and bilirubin) as clinically indicated, at least weekly |
| Grade 2 AST or ALT elevation (>3.0 × -5.0 × ULN if baseline was normal; >3.0 × -5.0 × baseline if baseline was abnormal) | Withhold further study treatment. Monitor LFTs as clinically indicated at least weekly until values resolve to normal or baseline. Consider hepatologist consultation. If event immune related $^a$, initiate treatment with 1-2 mg/kg/day oral prednisone or equivalent When event resolves to Grade 1 or better, taper corticosteroids per institutional practice Further mosunetuzumab dosing may continue provided LFTs improve to Grade 1 or better prior to the next dose. The dose of mosunetuzumab should not be modified. |
| Grade 3 AST or ALT elevation (>5.0 × -20.0 × ULN if baseline was normal; >5.0 × -20.0 × baseline if baseline was abnormal) | Withhold further study treatment. Monitor LFTs every 24-48 hours until decreasing, then follow weekly. Obtain hepatologist consultation; liver biopsy to assess hepatic injury to be considered as clinically indicated If event immune related $^a$, initiate treatment with 1-2 mg/kg/day oral prednisone or equivalent If no improvement within 48 hours after initiating corticosteroids, consider additional immunosuppressive agent(s). When event resolves to Grade 1 or better, taper corticosteroids per institutional practice Further mosunetuzumab dosing may continue provided LFTs improve to Grade 1 or better prior to the next dose. The dose of mosunetuzumab should not be modified. |
| Grade 4 AST or ALT elevation (>20.0 × ULN if baseline was normal; >20.0 × baseline if baseline was abnormal) | Permanently discontinue study treatment. Follow management guidelines as described for Grade 3 events. |

CRS = cytokine release syndrome; HLH = hemophagocytic lymphohistiocytosis; LFT = liver function test; ULN = upper limit of normal.
$^a$ Immune-mediated event should be considered when concurrent clinical and laboratory manifestations of CRS and/or HLH are present, or in instances where no alternative etiology (e.g., viral, neoplastic) can account for observed LFT abnormalities.

5.1.3.4 Management of Increases in QT Interval

Study drug should be discontinued in participants who develop any of the following, unless there is a clear alternative cause for the changes:

Sustained (at least two ECG measurements>30 minutes apart) QTcF that is >500 ms and >60 ms longer than the baseline value Sustained absolute QTcF that is >515 ms An episode of torsades de pointes or a new ECG finding of clinical concern If drug-induced arrhythmia including sustained QTcF prolongation is suspected based on ECG changes, consultation with a cardiologist should be obtained and managed as clinically indicated. Management of participants with sustained QTcF prolongation should include close monitoring, with ECGs repeated at least hourly until two successive ECGs show resolution of the findings, correction of any electrolyte abnormalities, and possible discontinuation of other concomitant medications that are known to prolong the QT interval.

Certain types of events require immediate reporting to the Sponsor, as outlined in 5.4.

5.2.1 Adverse Events

According to the ICH guideline for Good Clinical Practice, an adverse event is any untoward medical occurrence in a clinical investigation patient administered a pharmaceutical product, regardless of causal attribution. An adverse event can therefore be any of the following:

Any unfavorable and unintended sign (including an abnormal laboratory finding), symptom, or disease temporally associated with the use of a medicinal product, whether or not considered related to the medicinal product Any new disease or exacerbation of an existing disease (a worsening in the character, frequency, or severity of a known condition) (see 5.3.5.9 and 5.3.5.10 for more information)

Recurrence of an intermittent medical condition (e.g., headache) not present at baseline Any deterioration in a laboratory value or other clinical test (e.g., ECG, Xray) that is associated with symptoms or leads to a change in study treatment or concomitant treatment or discontinuation from study drug Adverse events that are related to a protocol-mandated intervention, including those that occur prior to assignment of study treatment (e.g., screening invasive procedures such as biopsies)

5.2.2 Serious Adverse Events (Immediately Reportable to the Sponsor)

A serious adverse event is any adverse event that meets any of the following criteria:

- Is fatal (i.e., the adverse event actually causes or leads to death)
- Is life threatening (i.e., the adverse event, in the view of the investigator, places the participant at immediate risk of death) This does not include any adverse event that, had it occurred in a more severe form or was allowed to continue, might have caused death.
- Requires or prolongs inpatient hospitalization (see 5.3.5.11)
- Results in persistent or significant disability/incapacity (i.e., the adverse event results in substantial disruption of the participant's ability to conduct normal life functions)
- Is a congenital anomaly/birth defect in a neonate/infant born to a mother exposed to study drug
- Is a significant medical event in the investigator's judgment (e.g., may jeopardize the participant or may require medical/surgical intervention to prevent one of the outcomes listed above)

The terms "severe" and "serious" are not synonymous. Severity refers to the intensity of an adverse event (e.g., rated as mild, moderate, or severe, or according to NCI CTCAE; see 5.3.3); the event itself may be of relatively minor medical significance (such as severe headache without any further findings).

Severity and seriousness need to be independently assessed for each adverse event recorded on the eCRF.

Serious adverse events are required to be reported by the investigator to the Sponsor immediately (i.e., no more than 24 hours after learning of the event; see 5.4.2 for reporting instructions).

5.2.3 Adverse Events of Special Interest (Immediately Reportable to the Sponsor)

Adverse events of special interest are required to be reported by the investigator to the Sponsor immediately (i.e., no more than 24 hours after learning of the event; see 5.4.2 for reporting instructions). Adverse events of special interest for this study are as follows:

- Cases of potential drug-induced liver injury that include an elevated ALT or AST in combination with either an elevated bilirubin or clinical jaundice, as defined by Hy's Law (see 5.3.5.8)
- Suspected transmission of an infectious agent by the study drug, as defined below
  - Any organism, virus, or infectious particle (e.g., prion protein transmitting transmissible spongiform encephalopathy), pathogenic or non-pathogenic, is considered an infectious agent. A transmission of an infectious agent may be suspected from clinical symptoms or laboratory findings that indicate an infection in a participant exposed to a medicinal product. This term applies only when a contamination of the study drug is suspected.
- Any adverse event that fulfills protocol-defined DLT criteria (see 3.1.7.1)
- Grade≥2 CRS
- Grade≥2 neurologic adverse event
- Grade≥2 injection-site reaction
- Any suspected HLH
- Febrile neutropenia (minimum Grade 3 by definition)
- Grade≥2 AST, ALT, or total bilirubin elevation
- Any grade disseminated intravascular coagulation (minimum Grade 2 by definition)
- Any grade pneumonitis or interstitial lung disease (excluding pneumonia of infectious etiology)

5.3 Methods and Timing for Capturing and Assessing Safety Parameters

The investigator is responsible for ensuring that all adverse events (see 5.2.1 for definition) are recorded on the Adverse Event eCRF and reported to the Sponsor in accordance with instructions provided in this section and in 5.4-5.6. For each adverse event recorded on the Adverse Event eCRF, the investigator will make an assessment of seriousness (see 5.2.2 for seriousness criteria), severity (see 5.3.3), and causality (see 5.3.4).

5.3.1 Adverse Event Reporting Period

Investigators will seek information on adverse events at each participant contact. All adverse events, whether reported by the participant or noted by study personnel, will be recorded in the participant's medical record and on the Adverse Event eCRF. After informed consent has been obtained but prior to initiation of study drug, only serious adverse events caused by a protocol-mandated intervention (e.g., invasive procedures such as biopsies, discontinuation of medications) should be reported (see 5.4.2 for instructions for reporting serious adverse events). After initiation of study drug, all adverse events will be reported until the end of SFU (see 3.1). Instructions for reporting adverse events that occur after the adverse event reporting period are provided in 5.6.

5.3.2 Eliciting Adverse Event Information

A consistent methodology of non-directive questioning should be adopted for eliciting adverse event information at all participant evaluation timepoints. Examples of nondirective questions include the following:

"How have you felt since your last clinic visit?"

"Have you had any new or changed health problems since you were last here?"

5.3.3 Assessment of Severity of Adverse Events The adverse event severity grading scale for the NCI CTCAE (v5.0) will be used for assessing adverse event severity and severity of individual signs and symptoms of CRS. CRS will be graded using the ASTCT CRS Consensus Grading Criteria (Lee et al. 2019) (see Table 1). Table 13 will be used for assessing severity for adverse events that are not specifically listed in the NCI CTCAE.

TABLE 13

Adverse Event Severity Grading Scale for Events Not Specifically Listed in NCI CTCAE

| Grade | Severity |
|---|---|
| 1 | Mild; asymptomatic or mild symptoms; clinical or diagnostic observations only; or intervention not indicated |
| 2 | Moderate; minimal, local, or non-invasive intervention indicated; or limiting age-appropriate instrumental activities of daily living [a] |
| 3 | Severe or medically significant, but not immediately life threatening; hospitalization or prolongation of hospitalization indicated; disabling; or limiting self-care activities of daily living [b, c] |

TABLE 13-continued

Adverse Event Severity Grading Scale for Events
Not Specifically Listed in NCI CTCAE

| Grade | Severity |
|---|---|
| 4 | Life-threatening consequences or urgent intervention indicated [d] |
| 5 | Death related to adverse event [d] |

NCI CTCAE = National Cancer Institute Common Terminology Criteria for Adverse Events.
Note:
Based on the most recent version of NCI CTCAE (v5.0), which can be found at: (http://)ctep.cancer.gov/protocolDevelopment/electronic_applications/ctc.htm
[a] Instrumental activities of daily living refer to preparing meals, shopping for groceries or clothes, using the telephone, managing money, etc.
[b] Examples of self-care activities of daily living include bathing, dressing and undressing, feeding oneself, using the toilet, and taking medications, as performed by participants who are not bedridden.
[c] If an event is assessed as a "significant medical event," it must be reported as a serious adverse event.
[d] Grade 4 and 5 events must be reported as serious adverse events.

5.3.4 Assessment of Causality of Adverse Events

Investigators should use their knowledge of the participant, the circumstances surrounding the event, and an evaluation of any potential alternative causes to determine whether an adverse event is considered to be related to the study drug, indicating "yes" or "no" accordingly. The following guidance should be taken into consideration (see also Table 14):

Temporal relationship of event onset to the initiation of study drug

Course of the event, with special consideration of the effects of dose reduction, discontinuation of study drug, or reintroduction of study drug (as applicable)

Known association of the event with the study drug or with similar treatments

Known association of the event with the disease under study

Presence of risk factors in the participant or use of concomitant medications known to increase the occurrence of the event Presence of non-treatment-related factors that are known to be associated with the occurrence of the event

TABLE 14

Causal Attribution Guidance
Is the adverse event suspected to be caused by the study drug on the basis of facts, evidence, science-based rationales, and clinical judgment?

| | |
|---|---|
| YES | There is a plausible temporal relationship between the onset of the adverse event and administration of the study drug, and the adverse event cannot be readily explained by the participant's clinical state, intercurrent illness, or concomitant therapies; and/or the adverse event follows a known pattern of response to the study drug; and/or the adverse event abates or resolves upon discontinuation of the study drug or dose reduction and, if applicable, reappears upon rechallenge. |
| NO | An adverse event will be considered related, unless it fulfills the criteria specified below. Evidence exists that the adverse event has an etiology other than the study drug (e.g., preexisting medical condition, underlying disease, intercurrent illness, or concomitant medication); and/or the adverse event has no plausible temporal relationship to administration of the study drug (e.g., cancer diagnosed 2 days after first dose of study drug). |

An adverse event should be considered related to mosunetuzumab unless the event is clearly attributed by the investigator to another clearly identifiable cause (e.g., documented worsening of underlying SLE, concomitant medication, or preexisting medical condition).

5.3.5 Procedures for Recording Adverse Events

Investigators should use correct medical terminology/concepts when recording adverse events on the Adverse Event eCRF. Avoid colloquialisms and abbreviations.

Only one adverse event term should be recorded in the event field on the Adverse Event eCRF.

5.3.5.1 Cytokine-Release Syndrome

Given the mechanism of action of mosunetuzumab, systemic injection-related reactions and CRS may be indistinguishable from one another. Therefore, all adverse events consistent with a diagnosis of systemic injection-related reaction or CRS that are attributed to mosunetuzumab will be recorded singularly as CRS. Adverse events of CRS are graded using the ASTCT CRS consensus grading criteria (Lee et al. 2019; Table 1).

The one exception to this reporting guidance is if a clinical presentation suggests an immediate, acute hypersensitivity (e.g., generalized hives, mucosal edema, with or without wheezing and hypotension), a diagnosis of "allergic reaction" or "anaphylaxis" should be used (see 5.1.1.1).

Localized injection-site reactions related to a SC injection should be captured as injection-site reactions (see 5.3.5.2) rather than CRS events. For adverse events with a diagnosis of "cytokine release syndrome", associated signs, symptoms, and laboratory abnormalities should be recorded on the dedicated Cytokine Release Syndrome eCRF. The NCI CTCAE v5.0 should be used for grading signs and symptoms associated with CRS.

Each occurrence of CRS should be recorded separately on the Adverse Event eCRF, with signs, symptoms, and laboratory abnormalities also recorded separately on the dedicated eCRF for CRS events. Ambiguous terms such as "systemic reaction" should be avoided.

In addition to documentations on the Adverse Event eCRF, non-serious Grade$\geq$2 CRS events should be reported as a non-serious adverse event of special interest (see 5.2.3).

In the absence of fever, hypotension or hypoxia, adverse events occurring within 24 hours after mosunetuzumab administration, should be reported as individual adverse events e.g., headache or chills.

5.3.5.2 Injection-Site Reactions

Localized injection-site reactions following SC mosunetuzumab administration should be captured as a diagnosis of "injection site reactions" on the Adverse Event eCRF. Associated signs and symptoms will be recorded separately on the dedicated Injection-Site Reaction eCRF. In addition, Grade$\geq$2 injection-site reaction should be reported as a non-serious adverse event of special interest (see 5.2.3).

If a patient experiences both a local (injection-site reaction) and systemic reaction (CRS) to a single administration of study treatment, each reaction should be recorded separately on the Adverse Event eCRF, with signs and symptoms also recorded separately on the dedicated Cytokine Release Syndrome and Injection-Site Reaction eCRFs.

5.3.5.3 Diagnosis Versus Signs and Symptoms

For adverse events other than CRS and injection-site reaction (see 5.3.5.1 and 5.3.5.2), a diagnosis (if known) should be recorded on the Adverse Event eCRF rather than individual signs and symptoms (e.g., record only liver failure or hepatitis rather than jaundice, asterixis, and elevated transaminases). However, if a constellation of signs and/or symptoms cannot be medically characterized as a single diagnosis or syndrome at the time of reporting, each individual event should be recorded on the Adverse Event eCRF. If a diagnosis is subsequently established, all previously reported adverse events based on signs and symptoms should be nullified and replaced by one adverse event report based on the single diagnosis, with a starting date that corresponds to the starting date of the first symptom of the eventual diagnosis.

5.3.5.4 Adverse Events that are Secondary to Other Events

In general, adverse events that are secondary to other events (e.g., cascade events or clinical sequelae) should be identified by their primary cause, with the exception of severe or serious secondary events. A medically significant secondary adverse event that is separated in time from the initiating event should be recorded as an independent event on the Adverse Event eCRF. For example:

- If vomiting results in mild dehydration with no additional treatment in a healthy adult, only vomiting should be reported on the eCRF.
- If vomiting results in severe dehydration, both events should be reported separately on the eCRF.
- If a severe gastrointestinal hemorrhage leads to renal failure, both events should be reported separately on the eCRF.
- If dizziness leads to a fall and consequent fracture, all three events should be reported separately on the eCRF.
- If neutropenia is accompanied by an infection, both events should be reported separately on the eCRF.

All adverse events should be recorded separately on the Adverse Event eCRF if it is unclear as to whether the events are associated.

5.3.5.5 Persistent or Recurrent Adverse Events

A persistent adverse event is one that extends continuously, without resolution, between participant evaluation timepoints. Such events should only be recorded once on the Adverse Event eCRF. The initial severity (intensity or grade) of the event will be recorded at the time the event is first reported. If a persistent adverse event becomes more severe, the most extreme severity should also be recorded on the Adverse Event eCRF. Details regarding any increases or decreases in severity will be captured on the Adverse Event Intensity or Grade Changes eCRF. If the event becomes serious, it should be reported to the Sponsor immediately (i.e., no more than 24 hours after learning that the event became serious; see 5.4.2 for reporting instructions). The Adverse Event eCRF should be updated by changing the event from "non-serious" to "serious," providing the date that the event became serious, and completing all data fields related to serious adverse events.

A recurrent adverse event is one that resolves between participant evaluation timepoints and subsequently recurs. Each recurrence of an adverse event should be recorded as a separate event on the Adverse Event eCRF.

5.3.5.6 Abnormal Laboratory Values

Not every laboratory abnormality qualifies as an adverse event. A laboratory test result must be reported as an adverse event if it meets any of the following criteria:

- Is accompanied by clinical symptoms
- Results in a change in study treatment (e.g., dosage modification, treatment interruption, or treatment discontinuation)
- Results in a medical intervention (e.g., potassium supplementation for hypokalemia) or a change in concomitant therapy
- Is clinically significant in the investigator's judgment It is the investigator's responsibility to review all laboratory findings. Medical and scientific judgment should be exercised in deciding whether an isolated laboratory abnormality should be classified as an adverse event.

If a clinically significant laboratory abnormality is a sign of a disease or syndrome (e.g., ALP and bilirubin 5×ULN associated with cholestasis), only the diagnosis (i.e., cholestasis) should be recorded on the Adverse Event eCRF.

If a clinically significant laboratory abnormality is not a sign of a disease or syndrome, the abnormality itself should be recorded on the Adverse Event eCRF, along with a descriptor indicating whether the test result is above or below the normal range (e.g., "elevated potassium," as opposed to "abnormal potassium"). If the laboratory abnormality can be characterized by a precise clinical term per standard definitions, the clinical term should be recorded as the adverse event. For example, an elevated serum potassium level of 7.0 mEq/L should be recorded as "hyperkalemia."

Observations of the same clinically significant laboratory abnormality from visit to visit should only be recorded once on the Adverse Event eCRF (see 5.3.5.4 for details on recording persistent adverse events).

5.3.5.7 Abnormal Vital Sign Values

Not every vital sign abnormality qualifies as an adverse event. A vital sign result must be reported as an adverse event if it meets any of the following criteria:

- Is accompanied by clinical symptoms
- Results in a change in study treatment (e.g., dosage modification, treatment interruption, or treatment discontinuation)
- Results in a medical intervention or a change in concomitant therapy
- Is clinically significant in the investigator's judgment It is the investigator's responsibility to review all vital sign findings. Medical and scientific judgment should be exercised in deciding whether an isolated vital sign abnormality should be classified as an adverse event.

If a clinically significant vital sign abnormality is a sign of a disease or syndrome (e.g., high blood pressure), only the diagnosis (e.g., hypertension) should be recorded on the Adverse Event eCRF.

Observations of the same clinically significant vital sign abnormality from visit to visit should only be recorded once on the Adverse Event eCRF (see 5.3.5.4 for details on recording persistent adverse events).

5.3.5.8 Abnormal Liver Function Tests

The finding of an elevated ALT or AST (>3×ULN) in combination with either an elevated total bilirubin (>2× ULN) or clinical jaundice in the absence of cholestasis or other causes of hyperbilirubinemia is considered to be an indicator of severe liver injury (as defined by Hy's Law). Therefore, investigators must report as an adverse event the occurrence of either of the following:

- Treatment-emergent ALT or AST>3×ULN in combination with total bilirubin>2×ULN
- Treatment-emergent ALT or AST>3×ULN in combination with clinical jaundice The most appropriate diagnosis or (if a diagnosis cannot be established) the abnormal laboratory values should be recorded on the Adverse Event eCRF (see 5.3.5.3) and reported to the Sponsor immediately (i.e., no more than 24 hours after learning of the event), either as a serious adverse event or an adverse event of special interest (see 5.4.2).

5.3.5.9 Deaths

All deaths that occur during the protocol-specified adverse event reporting period (see 5.3.1), regardless of relationship to study drug, must be recorded on the Adverse Event eCRF and immediately reported to the Sponsor (see 5.4.2). This includes death attributed to progression of SLE.

Death should be considered an outcome and not a distinct event. The event or condition that caused or contributed to the fatal outcome should be recorded as the single medical concept on the Adverse Event eCRF. Generally, only one such event should be reported. If the cause of death is unknown and cannot be ascertained at the time of reporting, "unexplained death" should be recorded on the Adverse Event eCRF. If the cause of death later becomes available (e.g., after autopsy), "unexplained death" should be replaced by the established cause of death. The term "sudden death" should not be used unless combined with the presumed cause of death (e.g., "sudden cardiac death").

If the death is attributed solely to progression of the underlying disease, "systemic lupus erythematosus progression" should be recorded on the Adverse Event eCRF.

Deaths that occur after the adverse event reporting period should be reported as described in 5.6.

5.3.5.10 Preexisting Medical Conditions

A preexisting medical condition is one that is present at the screening visit for this study. Such conditions should be recorded on the General Medical History and Baseline Conditions eCRF.

A preexisting medical condition should be recorded as an adverse event only if the frequency, severity, or character of the condition worsens during the study. When recording such events on the Adverse Event eCRF, it is important to convey the concept that the preexisting condition has changed by including applicable descriptors (e.g., "more frequent headaches").

5.3.5.11 Lack of Efficacy or Worsening of Systemic Lupus Erythematosus Deterioration that is judged by the investigator to have unexpectedly worsened in severity or frequency or changed in nature (i.e., deterioration beyond the expected pattern of progression of the underlying disease) should be recorded as an adverse event. When recording an unanticipated worsening of SLE on the Adverse Event eCRF, it is important to convey the concept that the condition has changed by including applicable descriptors (e.g., "accelerated worsening of systemic lupus erythematosus}"). Events that are clearly consistent with the expected pattern of progression of the underlying disease should not be recorded as adverse events. If there is any uncertainty as to whether an event is due to disease progression, it should be reported as an adverse event.

5.3.5.12 Hospitalization or Prolonged Hospitalization

Any adverse event that results in hospitalization (i.e., in participant admission to a hospital) or prolonged hospitalization should be documented and reported as a serious adverse event (per the definition of serious adverse event in 5.2.2), except as outlined below. An event that leads to hospitalization under the following circumstances should not be reported as an adverse event or a serious adverse event:

Planned hospitalization required by the protocol

Hospitalization for a preexisting condition, provided that all of the following criteria are met:
  The hospitalization was planned prior to the study or was scheduled during the study when elective surgery became necessary because of the expected normal progression of the disease
  The participant has not experienced an adverse event Hospitalization due solely to progression of SLE An event that leads to hospitalization under the following circumstances is not considered to be a serious adverse event, but should be reported as an adverse event instead:
  Hospitalization that was necessary because of participant requirement for outpatient care outside of normal outpatient clinic operating hours 5.3.5.13 Cases of Accidental Overdose or Medication Error Accidental overdose and medication error (hereafter collectively referred to as "special situations"), are defined as follows:
  Accidental overdose: accidental administration of a drug in a quantity that is higher than the assigned dose
  Medication error: accidental deviation in the administration of a drug
    In some cases, a medication error may be intercepted prior to administration of the drug.

Special situations are not in themselves adverse events, but may result in adverse events. Each adverse event associated with a special situation should be recorded separately on the Adverse Event eCRF. If the associated adverse event fulfills seriousness criteria or qualifies as an adverse event of special interest, the event should be reported to the Sponsor immediately (i.e., no more than 24 hours after learning of the event; see 5.4.2). For mosunetuzumab and tocilizumab adverse events associated with special situations should be recorded as described below for each situation:
  Accidental overdose: Enter the adverse event term. Check the "Accidental overdose" and "Medication error" boxes.
  Medication error that does not qualify as an overdose: Enter the adverse event term. Check the "Medication error" box.
  Medication error that qualifies as an overdose: Enter the adverse event term. Check the "Accidental overdose" and "Medication error" boxes.

In addition, all special situations associated with mosunetuzumab and tocilizumab, regardless of whether they result in an adverse event, should be recorded on the Adverse Event eCRF as described below:
  Accidental overdose: Enter the drug name and "accidental overdose" as the event term. Check the "Accidental overdose" and "Medication error" boxes.
  Medication error that does not qualify as an overdose: Enter the name of the drug administered and a description of the error (e.g., wrong dose administered, wrong dosing schedule, incorrect route of administration, wrong drug, expired drug administered) as the event term. Check the "Medication error" box.
  Medication error that qualifies as an overdose: Enter the drug name and "accidental overdose" as the event term. Check the "Accidental overdose" and "Medication error" boxes. Enter a description of the error in the additional case details.
  Intercepted medication error: Enter the drug name and "intercepted medication error" as the event term. Check the "Medication error" box. Enter a description of the error in the additional case details.

As an example, an accidental overdose that resulted in a headache would require two entries on the Adverse Event eCRF, one entry to report the accidental overdose and one entry to report the headache. The "Accidental overdose" and "Medication error" boxes would need to be checked for both entries.

5.3.5.14 Patient-Reported or Observer-Reported Outcome Data

Adverse event reports will not be derived from PRO data by the Sponsor. In addition, the Sponsor will make no attempt to reconcile participant reports of treatment-related symptoms with investigator reports of adverse events. Sites are not expected to review PRO or ObsRO data for adverse events.

5.3.5.15 Safety Biomarker Data

Adverse event reports will not be derived from safety biomarker data by the Sponsor, and safety biomarker data will not be included in the formal safety analyses for this study. In addition, safety biomarker data will not inform decisions on participant management.

Example 6. Statistical Considerations and Analysis Plan (Prophetic)

6.1 Determination of Sample Size

The sample size for this study is based on the dose-escalation rules described in 3.1. Approximately 13-25 participants will be enrolled during the dose-finding and dose-escalation periods. Additional participants may be added in the dose-expansion period after the candidate doses have been identified to gain more information for certain doses, alternative doses, and sub populations. This study plans to enroll a maximum of 50 participants.

Any participant who withdraws from the study within the DLT assessment period for any reason other than a DLT will be considered non-evaluable for dose-escalation decision and MTD assessment and will be replaced by an additional participant at the same dose level.

This study is intended to obtain primary safety, PK, PD, and initial disease activity information in the treated populations, and the sample size do not reflect the explicit power and type I error consideration.

This study will initiate with dose-finding cohorts followed by dose-escalation cohorts and may be followed by dose-expansion cohorts. The 5-mg dose-finding cohort and dose-escalation cohorts will be conducted based on the 3+3 design. The probabilities of observing no DLT in 3 participants or observing one or no DLTs in 6 participants given different true underlying DLT rates are provided in Table 15. For example, if the true underlying DLT rate is 20%, the probabilities of observing no DLT in 3 participants or one or no DLTs in 6 participants are 0.51 and 0.66 respectively.

TABLE 15

| Probability of Observing Dose Limiting Toxicities During Dose Escalation | | |
|---|---|---|
| True Underlying DLT Rate | Probability of Observing No DLTs in 3 Participants | Probability of Observing 1 or No DLTs in 6 Participants |
| 0.10 | 0.73 | 0.89 |
| 0.20 | 0.51 | 0.66 |
| 0.30 | 0.33 | 0.36 |
| 0.40 | 0.22 | 0.23 |
| 0.50 | 0.13 | 0.11 |
| 0.60 | 0.06 | 0.04 |

DLT = dose-limiting toxicity

6.2 Summaries of Conduct of Study

Summaries of study conduct will include all enrolled participants. The number of participants who are enrolled, discontinue early, or complete the study will be summarized by dose level. Major protocol deviations will be listed and evaluated for their potential impacts on the interpretation on the study results.

6.3 Summaries of Demographic and Baseline Characteristics

Demographic and baseline characteristics (including age, sex, weight, self-reported race/ethnicity, region, sub-type of SLE, and baseline disease characteristics) will summarized using descriptive statistics for the overall population and by dose level.

6.4 Safety Analyses

Safety analysis will include all participants who receive any amount of study drug. Safety data will be summarized overall and by dose level. Analysis of DLT will be based on DLT-evaluable participants.

Safety will be assessed through summaries of exposure to study treatment, adverse events, changes in laboratory test results, and changes in vital signs and ECGs.

Study treatment exposure will be summarized by dose level. The proportion of participants who received or did not receive full dose will be reported along with the reason of treatment interruption.

All verbatim adverse event terms will be mapped to Medical Dictionary for Regulatory Activities thesaurus terms, and adverse event severity will be graded according to NCI CTCAE v5.0. All adverse events including DLTs, serious adverse events, adverse events leading to death, adverse events of special interest, and adverse events leading to study treatment discontinuation that occur on or after the first dose of study treatment (i.e., treatment emergent adverse events) will be summarized by mapped term, appropriate thesaurus level, and severity grade. For events of varying severity, the highest grade will be used in the summaries. Deaths and cause of death will be summarized. Adverse event data will be listed by dose level, participant number and study day.

Adverse events leading to treatment discontinuation will be listed. Participants who withdraw from the study prior to completing the DLT assessment window for reasons other than a DLT will be considered non-evaluable for DLT and MTD assessment.

Relevant laboratory, vital sign, and ECG data will be displayed by time, with grades identified where appropriate. Additionally, a shift table of selected laboratory tests will be used to summarize the baseline and maximum postbaseline severity grade. Changes in vital signs and ECGs will be summarized. Concomitant medications will be presented in summary and listing using the standard and preferred terms.

6.5 Pharmacokinetic Analyses

The PK analysis population will consist of participants with sufficient data to enable estimation of key parameters (e.g., AUC, tmax, Cmax, apparent clearance [CL/F], apparent volume of distribution [Vd/F], and terminal drug-elimination half-life), with participants grouped according to treatment received. Individual and mean serum mosunetuzumab concentration versus time data will be tabulated and plotted by dose level. The serum pharmacokinetics of mosunetuzumab will be summarized by estimating total exposure (AUC), Cmax, CL/F, Vd/F, and terminal drug-elimination half-life (as appropriate for data collected). Estimates for these parameters will be tabulated and summarized (mean, standard deviation, coefficient of variation, median, and minimum and maximum). Inter-participant variability will be evaluated. An exploratory and descriptive analysis of the potential relationship between PK and other endpoints (e.g., safety, PD etc.) may be conducted. Additional PK analyses will be conducted as appropriate.

6.6 Pharmacodynamic Analyses

The primary PD marker will be CD19+B-cell counts by flow cytometry (TBNK and HSFC). The absolute and percent change from baseline will be computed at each sampling timepoint using the Day 1 predose value as the baseline. The proportion of participants with depleted B cells (defined as ≤5 cells/µL for TBNK cells or ≤0.441 cells/µL for HSFC) will be calculated at each sampling visit. Measures will be presented graphically and descriptively, as appropriate. The key exploratory analyses will be specified in the Statistical Analysis Plan.

6.7 Immunogenicity Analyses

The immunogenicity analysis population will consist of all participants with at least one ADA assessment. Participants will be grouped by dose level.

The numbers and proportions of ADA-positive participants and ADA-negative participants at baseline (baseline prevalence) and after drug administration (postbaseline incidence) will be summarized by dose level. When determining postbaseline incidence, participants are considered to be ADA positive if they are ADA negative or have missing data at baseline but develop an ADA response following study drug exposure (treatment-induced ADA response), or if they are ADA positive at baseline and the titer of one or more postbaseline samples is at least 0.60 titer unit greater than the titer of the baseline sample (treatment-enhanced ADA response). Participants are considered to be ADA negative if they are ADA negative or have missing data at baseline and all postbaseline samples are negative, or if they are ADA positive at baseline but do not have any postbaseline samples with a titer that is at least 0.60 titer unit greater than the titer of the baseline sample (treatment unaffected).

The relationship between ADA status and safety, PK, and biomarker endpoints may be analyzed and reported via descriptive statistics.

6.8 Exploratory Analyses of PGA and PGI-S Data

PGA and PGI-S will be summarized descriptively at baseline and each available timepoint thereafter by dose level.

PGA will be reported as mean and SD at each timepoint. The maximum change from baseline and the proportion of participants who experienced no disease worsening—for which worsening is defined as a PGA increase of >0.3 points from baseline—will be summarized by dose level.

PGI-S will be reported as the percentage of participants at each severity level at each timepoint. The change from baseline in PGI-S at Week 24 will be summarized as the proportion of participants who experienced improvement, no change, or worsening of severity.

6.9 Biomarker Analyses

Exploratory biomarker analyses will be presented graphically and descriptively, as appropriate, by dose level and sampling timepoint. They may include, but are not limited to, the following biomarkers:

The percent and absolute change in biomarkers at each sampling timepoint, using the Day 1 predose value as the baseline timepoint.

Relationships between change in PD biomarkers from baseline and selected PK variables, safety endpoints, and other biomarkers.

Example 7. Preliminary Results of Clinical Trial NCT05155345

7.1 Introduction

NCT05155345, summarized in Examples 1-6, "A Phase Ib, Multicenter, Open-Label, Dose-Escalation Study to Evaluate the Safety, Tolerability, Pharmacokinetics, and Pharmacodynamics of Subcutaneously Administered Mosunetuzumab to Participants With Systemic Lupus Erythematosus" is an on-going clinical trial designed to evaluate the safety, tolerability, pharmacokinetics, and pharmacodynamics of mosunetuzumab in participants with systemic lupus erythematosus (SLE). The study was designed to have non-randomized allocation, sequential assignment intervention, open label, with a primary purpose of treatment. Participants were administered mosunetuzumab subcutaneously, either a single dose, or a fractionated dose on Days 1 and 8.

The primary outcome measure is the percentage of participants with adverse events (AEs) (Time Frame: For a minimum of 12 months after mosunetuzumab dose), and the secondary outcome measures are:

Serum concentration of mosunetuzumab [Time Frame: Through Month 12]

Peripheral B-cell count [Time Frame: Through Month 12, then every 6 months thereafter]

Duration of B-cell depletion [Time Frame: Through Month 12, then every 6 months thereafter]

Change from baseline in anti-drug antibodies (ADAs) [Time Frame: Through Month 12]

7.2 Materials and Methods

A data cut from Sep. 26, 2022 is disclosed.

This is the first clinical study investigating subcutaneous mosunetuzumab in an autoimmune disease setting.

Eleven patients with active SLE (10 females and 1 male) were administered mosunetuzumab as follows:

1 patient received 1.6 mg dose (non-fractionated)

5 patients received 5 mg dose (non-fractionated)

3 patients received fractionated dosing on Day 1 (5 mg) and Day 8 (15 mg)

2 patients received fractionated dosing on Day 1 (5 mg) and Day 8 (45 mg)

7.3 Results

Efficacy Data

Two of three patients receiving fractionated dosing on Day 1 (5 mg) and Day 8 (15 mg) have demonstrated persistent peripheral B cell depletion for 90 days after initial 5 mg dosing, and 1 patient to date receiving fractionated dosing on Day 1 (5 mg) and Day 8 (45 mg) has demonstrated persistent peripheral B cell depletion for at least 30 days after initial 5 mg dosing (see FIG. 8, data unavailable to date for second participant in 5-45 cohort).

One patient to date receiving fractionated dosing on Day 1 (5 mg) and Day 8 (15 mg) was observed to have a reduction in anti-double stranded DNA (dsDNA) antibodies (IgG; FIG. 9). Of note, decreases in the titer of anti-dsDNA antibodies have been shown to correlate with improvements in disease activity in patients with lupus nephritis (Narayanan et al 2010; Yung and Chan 2015; Wang et al 2022).

Safety and Tolerability Data

To date, there have been no serious adverse events or dose-limiting toxicities (DLTs, defined as CTCAE Grade 3 or higher).

All adverse events have been Grade 1 or 2 (non-serious). There have been no clinically-relevant laboratory abnormalities or clinically-relevant electrocardiogram (ECG) changes.

Mosunetuzumab, in addition to B cell depletion, causes T cell margination, leading to a transient lymphocyte decrease termed lymphopenia or lymphocyte count decreased. This effect has been observed in all 11 patients after the first fraction of the dose (5 mg) and is generally well described for T-cell bispecific antibodies. Transient reduction in absolute lymphocyte count following the first mosunetuzumab administration was observed for all 11 patients, with return to baseline values within approximately 2 weeks (FIG. 10 shows data for the first 8 patients based on data cutoff date). Interestingly, for the patients receiving a fractionated dose, lymphocyte count decreases following the Day 8 dosing were either not observed or observed to a lesser extent compared to that following the first dosing (Day 1). Importantly, there were no associated clinical signs or symptoms related to these transient lymphocyte decreases, and study investigators have not considered these abnormal laboratory values as adverse events (Example 5.2.1 and Example 5.3.5.). This decision is based on the medical and scientific judgment of the investigators.

REFERENCES

Arons E, Suntum T, Stetler-Stevenson-Stetler M, et al. VH4-34+ hairy cell leukemia, a new variant with poor proognosis despite standard therapy. Blood 2009; 114: 4687-95.

Assouline S, Buccheri V, Delmer A, et al. Pharmacokinetics, safety, and efficacy of subcutaneous versus intravenous rituximab plus chemotherapy as treatment for chronic lymphocytic leukaemia (SAWYER): a Phase Ib, open-label, randomized controlled non-inferiority trial. Lancet Haematol 2016; 3:e128-338.

Atwell S, Ridgway J B, Wells J A, et al. Stable heterodimers from remodeling the domain interface of a homodimer using a phage display library. J Mol Biol 1997; 270:26-35.

Burness C B, McCormack P L Belimumab: in systemic lupus erythematosus Drugs 2011; 71:2435-44. Centers for Disease Control and Prevention Interpretation of hepatitis B serologic test results [resource on the Internet] Available from: cdc.gov/hepatitis/hbv/pdfs/serologicchartv8.pdf. Cited 10 May 2021.

Chen F, Teachey D T, Pequignot E et al. Measuring IL-6 and sIL-6R in serum from patients treated with tocilizumab and/or siltuximab following CAR-T-cell therapy. J Immunol Methods 2016; 434:1-8.

Carson K R, Evens A M, Richey E A, et al. Progressive multifocal leukoencephalopathy after rituximab therapy in HIV-negative patients: a report of 57 cases from the Research on Adverse Drug Events and Reports project Blood 2009; 113:4834-40. Cook R J, Gladman D D, Pericak D, et al. Prediction of short term mortality in systemic lupus erythematosus with time dependent measures of disease activity. J Rheumatol 2000; 27:1892-5.

Davila M L, Riviere I, Wang X, et al. Efficacy and toxicity management of 19-28z CAR T cell therapy in B cell acute lymphoblastic leukemia. Sci Transl Med 2014; 6:224ra25.

Dhote R, Simon J, Papo T, et al. Reactive hemophagocytic syndrome in adult systemic disease: report of twenty-six cases and literature review. Arthritis Rheum 2003; 49:633-9.

Doessegger L, Banholzer M L Clinical development methodology for infusion-related reactions with monoclonal antibodies. Clin Transl Immunol 2015; 4:e39.

Edelman G M, Cunningham B A, Gall W E, et al. The covalent structure of an entire gammaG immunoglobulin molecule Biochemistry 1969; 63:78-85.

Egbuniwe I U, Karagiannis S N, Nestle F O, et al. Revisiting the role of B cells in skin immune surveillance. Trends Immunol 2015; 36:102-11.

Fardet L, Galicier L, Lambotte O, et al. Development and validation of the HScore, a score for the diagnosis of reactive hemophagocytic syndrome. Arthritis Rheumatol 2014; 66:2613-20.

Fukaya S, Yasuda S, Hashimoto T, et al. Clinical features of haemophagocytic syndrome in patients with systemic autoimmune diseases: analysis of 30 cases. Rheumatology 2008; 47:1686-91.

Furie R, Cascino M D, Garg J P, et al. B cell-depletion and response in a randomized, controlled trial of obinutuzumab for proliferative lupus nephritis [abstract]. Lupus Sci Med 2020; 7:035.

Gladman D D, Ibanez D, Urowitz M B Systemic Lupus Erythematosus Disease Activity Index 2000. J Rheumatol 2002; 29:288-91.

Goldsmith S R, Rehman S S U, Shirai C L, et al. Resolution of secondary hemophagocytic lymphohistiocytosis after treatment with the JAK1/2 inhibitor ruxolitinib. Blood Adv 2019; 3:4131-5.

Gomez Mendez L M, Cascino M D, Garg J, et al. Peripheral blood B cell-depletion after rituximab and complete response in lupus nephritis. Clin J Am Soc Nephrol 2018; 13:1502-9.

Grupp S A, Kalos M, Barrett D, et al. Chimeric antigen receptor-modified T cells for acute lymphoid leukemia. N Engl J Med 2013; 368:1509-18.

Hashemi-Sadraei N, Vejpongsa P, Baljevic M, et al. Epstein-Barr virus-related hemophagocytic lymphohistiocytosis: hematologic emergency in the critical care setting. Case Rep Hematol 2015; 2015:491567.

Hejblum G, Lambotte O, Galicier L A web-based Delphi study for eliciting helpful criteria in the positive diagnosis of hemophagocytic syndrome in adult patients. PLoS One 2014; 9:e94024.

Henter J I, Home A C, Arico M, et al. HLH-2004: diagnostic and therapeutic guidelines for hemophagocytic lymphohistiocytosis. Pediatr Blood Cancer 2007; 48:124-31.

Hijazi Y, Klinger M, Schub A, et al. Blinatumomab exposure and pharmacodynamic response in patients with non-Hodgkin lymphoma (NHL) [abstract] J Clin Oncol 2013; 31(Suppl):abstract 3051.

Isenberg D A, McClure C, Farewell V, et al. Correlation of 9G4 idiotope with disease activity in patients systemic lupus erythematosus. Ann Rheum Dis. 1998; 57:566-70.

Jog N R, James J A Epstein Barr Virus and Autoimmune Responses in Systemic Lupus Erythematosus [published online ahead of print 3 Feb. 2021] Front Immunol. 2021; 11:623944 doi:10.3389/fimmu.2020.623944

Jordan M B, Allen C E, Weitzman S, et al. How I treat hemophagocytic lymphohistiocytosis. Blood 2011; 118: 4041-52.

Kabat E A, Wu T T, Perry H M, et al. Sequences of proteins of immunological interest. Fifth ed. NIH Publication No 91-3242; 1991.

Kasper I R, Apostolidis S A, Sharabi A, et al. Empowering regulatory T cells in autoimmunity. Trends Mol Med 2016; 22:784-97.

Katsuyama T, Tsokos G C, and Moulton V R Aberrant T cell signaling and subsets in systemic lupus erythematosus. Front Immunol 2018; 9:1088.

Kim J M, Kwok S K, Ju J H, et al. Reactive hemophagocytic syndrome in adult Korean patients with systemic lupus erythematosus: a case-control study and literature review. J Rheumatol 2012; 39:86-93.

Klinger M, Brandl C, Zugmaier G, et al. Immunopharmacologic response of patients with B-lineage acute lymphoblastic leukemia to continuous infusion of T cell-engaging CD19/CD3-bispecific BiTE antibody blinatumomab. Blood 2012; 119:6226-33.

Kochenderfer J N, Dudley M E, Feldman S A, et al. B cell-depletion and remissions of malignancy along with cytokine-associated toxicity in a clinical trial of anti-CD19 chimeric antigenreceptor-transduced T cells. Blood 2012; 119:2709-20.

Kochenderfer J N, Dudley M E, Kassim S H, et al. Chemotherapy-refractory diffuse large B-cell lymphoma and indolent B-cell malignancies can be effectively treated with autologous T cells expressing an anti-CD19 chimeric antigen receptor J Clin Oncol 2015; 33:540-9.

Koren E, Smith H W, Shores E, et al. Recommendations on risk-based strategies for detection and characterization of antibodies against biotechnology products. J Immunol Methods 2008; 333:1-9.

La Rosée P Treatment of hemophagocytic lymphohistiocytosis in adults. Hematology Am Soc Hematol Educ Program 2015; 2015:190-6.

La Rosée P, Home A, Hines M, et al. Recommendations for the management of hemophagocytic lymphohistiocytosis in adults. Blood 2019; 133:2465-77.

Lee D W, Gardner R, Porter D L, et al. Current concepts in the diagnosis and management of cytokine release syndrome. Blood 2014; 124:188-95.

Lee D W, Santomasso B D, Locke F L, et al. ASTCT consensus grading for cytokine release syndrome and neurologic toxicity associated with immune effector cells Biol Blood Marrow Transplant 2019; 25:625-38.

Levey A S. Stevens L A, Schmid C H, et al. A new equation to estimate glomerular filtration rate. Ann Intern Med 2009; 150:604-12.

Liu L MGD011, a humanized CD19□CD3 DART□ protein with enhanced pharmacokinetics properties, demonstrates potent T-cell mediated anti-tumor activity in preclinical models and durable B-cell depletion in cynomolgus monkeys following once-a-week dosing. Presented at the 2014 annual meeting of the American Society of Hematology; San Francisco, California; 6-9 December.

Lopez R, Davidson J E, Beeby M D, et al. Lupus disease activity and the risk of subsequent organ damage and mortality in a large lupus cohort. Rheumatology 2012; 51:491-8.

Maude S L, Frey N, Shaw P A, et al. Chimeric antigen receptor T cells for sustained remissions in leukemia. N Engl J Med 2014; 371:1507-17.

Matasar M J, Cheah C Y, Yoon D H, et al. Subcutaneous mosunetuzumab in relapsed or refractory B-cell lymphoma: promising safety and encouraging efficacy in dose escalation cohorts [abstract] Presented at the 2020 American Society of Hematology Annual Meeting 6 Dec. 2020: session 626.

Md Yusof M Y, Shaw D, El-Sherbiny Y M, et al. Predicting and managing primary and secondary non-response to rituximab using B-cell biomarkers in systemic lupus erythematosus. Ann Rheum Dis 2017; 76:1829-36.

Merad M, Martin J C Pathological inflammation in patients with COVID-19: a key role for monocytes and macrophages. Nat Rev Immunol 2020; 20:355-62.

Mueller S N, Zaid A, Carbone F R Tissue-resident T cells: dynamic players in skin immunity. Front Immunol 2014; 332.

Narayanan, K., Marwaha, V, Shanmuganandan, K, and Shankar, S. Correlation between Systemic Lupus Erythematosus Disease Activity Index, C3, C4 and Anti-dsDNA Antibodies. Med J Armed Forces India 2010; 66(2):102-107.

[NIH] National Institutes of Health Recombinant DNA Advisory Committee (RAC). Cytokine release syndrome after T cell immunotherapy. Bethesda, MD NIH videocast 9 Jun. 2015. Available at: videocast.nih.gov/summary.asp?Live=16420&bhcp=1 Accessed: 30 Jan. 2017.

Neelapu S S, Tummala S, Kebriaei P, et al. Chimeric antigen receptor T-cell therapy assessment and management of toxicities. Chimeric antigen receptor T-cell therapy □ assessment and management of toxicities. Nat Rev Clin Oncol 2018; 15:47-62.

Nossent J, Kiss E, Rozman B, et al. Disease activity and damage accrual during the early disease course in a multinational inception cohort of patients with systemic lupus erythematosus. Lupus 2010; 19:949-56.

Panelli M C, White R, Foster M, et al. Forecasting the cytokine storm following systemic interleukin (IL)-2 administration. J Transl Med 2004; 2:17.

Petri M, Genovese M, Engle E, et al. Definition, incidence, and clinical description of flare in systemic lupus erythematosus. A prospective cohort study. Arthritis Rheum 1991; 34:937-44.

Ramos-Casals M, Brito-Zerón P, Lopéz-Guillermo A, et al. Adult haemophagocytic syndrome. Lancet 2014; 383: 1503-16.

Reddy V, Cambridge G, Isenberg D A, et al. Internatlization of rituximab and the efficiency of B-cell-depletion in rheumatoid arthritis and systemc lupus erythematosus. Arthiritis Rheumatol 2015; 67:2046-55.

Reddy V, Klein C, Isenberg D A, et al. Obinutuzumab induces superior B-cell cytotoxicity to rituximab in rheumatoid arthritis and systemic lupus erythematosus patient samples. Rheumatology 2017; 56:1227-37.

Reusch U, Duell J, Ellwanger K, et al. A tetravalent bispecific TandAb (CD19/CD3), AFM11, efficient recruits T cells for the potent lysis of CD19☐ tumor cells. mAbs 2015; 7:584-604.

Riegler L L, Jones G P, Lee D W Current approaches in the grading and management of cytokine release syndrome after chimeric antigen receptor T-cell therapy. Ther Clin Risk Manag 2019; 15:323-35.

Rosenberg A, Worobec A A risk-based approach to immunogenicity concerns of therapeutic protein products: Part I: considering consequences of the immune response to a protein. Biopharm Int 2004a; 17:22-26.

Rosenberg A, Worobec A A risk-based approach to immunogenicity concerns of therapeutic protein products: Part II: considering host-specific and product-specific factors impacting immunogenicity. Biopharm Int 2004b; 17:34-42.

Rosenberg, A, Worobec A A risk-based approach to immunogenicity concerns of therapeutic protein products: Part III: effects of manufacturing changes in immunogenicity and the utility of animal immunogenicity studies. Biopharm Int 2005; 18:32-36.

Schram A M, Berliner N How I treat hemophagocytic lymphohistiocytosis in the adult patient. Blood 2015; 125:2908-14.

Sharabi A, Tsokos G C T cell metabolism: New insights in SLE pathogenesis and therapy. Nat Rev Rheumatol 2002; 16:100-12.

Singh R R, Yen E Y SLE mortality remains disproportionately high, despite improvements over the last decade. Lupus 2018; 2:1577-81.

Spiess C, Merchant M, Huang A, et al. Bispecific antibodies with natural architecture produced by co-culture of bacteria expressing two distinct half-antibodies. Nat Biotechnol 2013:31:753-8.

Sun L L, Ellerman D, Mathieu M et al. Anti-CD20/CD3 T cell-dependent bispecific antibody for the treatment of B cell malignancies. Sci Transl Med 2015; 7:1-10.

Teachey D T, Rheingold S R, Maude S L, et al. Cytokine release syndrome after blinatumomab treatment related to abnormal macrophage activation and ameliorated with cytokine-directed therapy Blood 2013:121:5154-7.

Thapa D R, Tonikian R, Sun C, et al. Longitudinal analysis of peripheral blood T-cell receptor diversity in patients with systemic lupus erythematosus by next-generation sequencing. Arthritis Res Ther 2015:17:132.

Vallurupalli M, Berliner N Emapalumab for the treatment of relapsed/refractory hemophagocytic lymphohistiocytosis. Blood 2019; 134:1783-6.

van Vollenhoven R F, Bieber M M, Powell M J, et al. VH4-34 encoded antibodies in systemic lupus erythematosus: a specific diagnostic marker tat correlates with clinical disease characteristics. J Rheumatol 1999; 26:1727-33.

Varghese B, Menon J, Rodriguez L et al. A novel CD20× CD3 bispecific fully human antibody induces potent antitumor effects against B cell lymphoma in mice. Blood 2014; 124:4501.

Viardot A, Goebeler M, Scheele J, et al. Treatment of patients with non-Hodgkin lymphoma (NHL) with CD19/CD3 bispecific antibody blinatumomab (MT103): Double-step dose increase to continuous infusion of 60 mcg/m2/d is tolerable and highly effective[abstract] Presented at the 2010 annual meeting of the American Society of Hematology:abstract 2880.

Viardot A, Goebeler M, Hess G, et al. Treatment of relapsed/refractory diffuse large B-cell lymphoma with the bispecific t-cell engager (BiTE®) antibody construct blinatumomab: primary analysis results from an open-label, Phase 2 Study [abstract] Presented at the 2014 annual meeting of the American Society of Hematology:abstract 4460.

Viardot A, Goebeler M E, Hess G, et al. Phase 2 study of the bispecific T-cell engager (BiTE) antibody blinatumomab in relapsed/refractory diffuse large B-cell lymphoma. Blood 2016; 127:1410-6.

Wang, Y., Xiao, S., Xia, Y. et al. The Therapeutic Strategies for SLE by Targeting Anti-dsDNA Antibodies. Clinic Rev Allerg Immunol 2022; 63, 152-165.

Wu B X, Song N-J, Riesenberg B P, et al. Development of molecular and pharmacological switches for chimeric antigen receptor-T cells. Exp Hematol Oncol 2019; 8:27.

Yap D Y H, Chan T M B cell abnormalities in systemic lupus erythematosus and lupus nephritis-role in pathogenesis and effect of immunosuppressive treatments. Int J Mol Sci 2019; 20:6231.

Yen E Y, Singh R R Lupus—An Unrecognized Leading Cause of Death in Young Women: Population-based Study Using Nationwide Death Certificates, 2000-2015. Arthritis Rheumatol 2018; 70:1251-5.

Yung S, Chan T M. Mechanisms of Kidney Injury in Lupus Nephritis—the Role of Anti-dsDNA Antibodies. Front Immunol. 2015 Sep. 15; 6:475.

Although the foregoing invention has been described in some detail by way of illustration and example for purposes of clarity of understanding, the descriptions and examples should not be construed as limiting the scope of the invention. The disclosures of all patent and scientific literature cited herein are expressly incorporated in their entirety by reference.

The invention claimed is:

1. A method of treating a patient, comprising administering to the patient an effective amount of mosunetuzumab, wherein:
  (a) the patient has systemic lupus erythematosus;
  (b) mosunetuzumab is administered according to a dosing regimen comprising at least a first dosing cycle of about 8 days, wherein the first dosing cycle comprises a first dose (C1D1) and a second dose (C1D2) of mosunetuzumab, wherein C1D1 is between about 1.6 mg to about 5 mg on day 1 of the cycle and the C1D2 is between about 15 mg to about 60 mg on day 8 of the cycle; and
  (c) mosunetuzumab is administered subcutaneously.

2. The method of claim 1, wherein C1D1 is 1.6 mg or 5 mg and C1D2 is 15 mg, 45 mg, or 60 mg.

3. The method of claim 1, wherein at least one symptom of SLE is reduced.

4. The method of claim 3, wherein the at least one reduced symptom of SLE is measured using a Patient Global Impression of Severity (PGI-S), a Physician Global Assessment (PGA), a decrease in titer of antinuclear antibody (ANA), a decrease in titer of anti-double stranded DNA (dsDNA) antibody (IgG) titer, an increase in complement C3 levels, or an increase in complement C4 levels, wherein the at least one reduced symptom comprises: (a) a change in response of at least one step on the PGI-S from a previous response, wherein the change is one change of from:
  (i) very severe to severe;
  (ii) severe to moderate;
  (iii) moderate to mild; or
  (iv) mild to none; or (b) a change in rating by a healthcare provider using the PGA, wherein the change is a decrease from a previous rating using the PGA, wherein the decrease from a previous rating using the PGA is >0.3 points from baseline.

5. The method of claim 1, further comprising administering to the patient a corticosteroid, cyclophosphamide, a B-cell-depleting therapy, or calcineurin inhibitor.

6. The method of claim 5, wherein the corticosteroid comprises hydrocortisone, cortisone acetate, prednisolone, dexamethasone, betamethasone, triamcinolone, beclometasone, methylprednisolone or prednisone; wherein the B-cell-depleting therapy comprises administering rituximab, ocrelizumab, ofatumumab, or obinutuzumab, or wherein the calcineurin inhibitor comprises ciclosporin, tacrolimus, or vocolosporin.

7. A method of treating a patient of a population of patients, comprising administering to the patient an effective amount of mosunetuzumab, wherein:
    (a) the population of patients has systemic lupus erythematosus;
    (b) mosunetuzumab is administered according to a dosing regimen comprising at least a first dosing cycle of about 8 days, wherein the first dosing cycle comprises a first dose (C1D1) and a second dose (C1D2) of mosunetuzumab, wherein C1D1 is between about 1.6 mg to about 5 mg on day 1 of the cycle and the C1D2 is between about 15 mg to about 60 mg on day 8 of the cycle; and
    (c) mosunetuzumab is administered subcutaneously.

8. The method of claim 7, wherein C1D1 is 1.6 mg or 5 mg, and C1D2 is 15 mg, 45 mg, or 60 mg.

9. The method of claim 7, wherein at least one symptom of SLE is reduced.

10. The method of claim 9, wherein the at least one reduced symptom of SLE is measured using a Patient Global Impression of Severity (PGI-S), a Physician Global Assessment (PGA), a decrease in titer of antinuclear antibody (ANA), a decrease in titer of anti-double stranded DNA (dsDNA) antibody (IgG) titer, an increase in complement C3 levels, or an increase in complement C4 levels, wherein the at least one reduced symptom comprises:
    (a) a change in response of at least one step on the PGI-S from a previous response, wherein the change is one change of from:
        (i) very severe to severe;
        (ii) severe to moderate;
        (iii) moderate to mild; or
        (iv) mild to none;
    or
    (b) a change in rating by a healthcare provider using the PGA, wherein the change is a decrease from a previous rating using the PGA, wherein the decrease from a previous rating using the PGA is ≥0.3 points from baseline.

11. The method of claim 7, further comprising administering to the patient a corticosteroid, cyclophosphamide, a B-cell-depleting therapy, or calcineurin inhibitor.

12. The method of claim 11, wherein the corticosteroid comprises hydrocortisone, cortisone acetate, prednisolone, dexamethasone, betamethasone, triamcinolone, beclometasone, methylprednisolone or prednisone; wherein the B-cell-depleting therapy comprises administering rituximab, ocrelizumab, ofatumumab, or obinutuzumab, or wherein the calcineurin inhibitor comprises ciclosporin, tacrolimus, or vocolosporin.

* * * * *

SEQUENCE LISTING

```
Sequence total quantity: 36
SEQ ID NO: 1            moltype = AA  length = 10
FEATURE                 Location/Qualifiers
REGION                  1..10
                        note = artificial sequence
source                  1..10
                        mol_type = protein
                        organism = synthetic construct
SEQUENCE: 1
GYTFTSYNMH                                                              10

SEQ ID NO: 2            moltype = AA  length = 17
FEATURE                 Location/Qualifiers
REGION                  1..17
                        note = artificial sequence
```

```
source                   1..17
                         mol_type = protein
                         organism = synthetic construct
SEQUENCE: 2
AIYPGNGDTS YNQKFKG                                                   17

SEQ ID NO: 3             moltype = AA   length = 13
FEATURE                  Location/Qualifiers
REGION                   1..13
                         note = artificial sequence
source                   1..13
                         mol_type = protein
                         organism = synthetic construct
SEQUENCE: 3
VVYYSNSYWY FDV                                                       13

SEQ ID NO: 4             moltype = AA   length = 10
FEATURE                  Location/Qualifiers
REGION                   1..10
                         note = artificial sequence
source                   1..10
                         mol_type = protein
                         organism = synthetic construct
SEQUENCE: 4
RASSSVSYMH                                                           10

SEQ ID NO: 5             moltype = AA   length = 7
FEATURE                  Location/Qualifiers
REGION                   1..7
                         note = artificial sequence
source                   1..7
                         mol_type = protein
                         organism = synthetic construct
SEQUENCE: 5
APSNLAS                                                               7

SEQ ID NO: 6             moltype = AA   length = 9
FEATURE                  Location/Qualifiers
REGION                   1..9
                         note = artificial sequence
source                   1..9
                         mol_type = protein
                         organism = synthetic construct
SEQUENCE: 6
QQWSFNPPT                                                             9

SEQ ID NO: 7             moltype = AA   length = 122
FEATURE                  Location/Qualifiers
REGION                   1..122
                         note = artificial sequence
source                   1..122
                         mol_type = protein
                         organism = synthetic construct
SEQUENCE: 7
EVQLVESGGG LVQPGGSLRL SCAASGYTFT SYNMHWVRQA PGKGLEWVGA IYPGNGDTSY     60
NQKFKGRFTI SVDKSKNTLY LQMNSLRAED TAVYYCARVV YYSNSYWYFD VWGQGTLVTV    120
SS                                                                  122

SEQ ID NO: 8             moltype = AA   length = 106
FEATURE                  Location/Qualifiers
REGION                   1..106
                         note = artificial sequence
source                   1..106
                         mol_type = protein
                         organism = synthetic construct
SEQUENCE: 8
DIQMTQSPSS LSASVGDRVT ITCRASSSVS YMHWYQQKPG KAPKPLIYAP SNLASGVPSR     60
FSGSGSGTDF TLTISSLQPE DFATYYCQQW SFNPPTFGQG TKVEIK                   106

SEQ ID NO: 9             moltype = AA   length = 5
FEATURE                  Location/Qualifiers
REGION                   1..5
                         note = artificial sequence
source                   1..5
                         mol_type = protein
                         organism = synthetic construct
SEQUENCE: 9
NYYIH                                                                 5
```

```
SEQ ID NO: 10               moltype = AA   length = 17
FEATURE                     Location/Qualifiers
REGION                      1..17
                            note = artificial sequence
source                      1..17
                            mol_type = protein
                            organism = synthetic construct
SEQUENCE: 10
WIYPGDGNTK YNEKFKG                                                      17

SEQ ID NO: 11               moltype = AA   length = 10
FEATURE                     Location/Qualifiers
REGION                      1..10
                            note = artificial sequence
source                      1..10
                            mol_type = protein
                            organism = synthetic construct
SEQUENCE: 11
DSYSNYYFDY                                                              10

SEQ ID NO: 12               moltype = AA   length = 17
FEATURE                     Location/Qualifiers
REGION                      1..17
                            note = artificial sequence
source                      1..17
                            mol_type = protein
                            organism = synthetic construct
SEQUENCE: 12
KSSQSLLNSR TRKNYLA                                                      17

SEQ ID NO: 13               moltype = AA   length = 7
FEATURE                     Location/Qualifiers
REGION                      1..7
                            note = artificial sequence
source                      1..7
                            mol_type = protein
                            organism = synthetic construct
SEQUENCE: 13
WASTRES                                                                 7

SEQ ID NO: 14               moltype = AA   length = 8
FEATURE                     Location/Qualifiers
REGION                      1..8
                            note = artificial sequence
source                      1..8
                            mol_type = protein
                            organism = synthetic construct
SEQUENCE: 14
TQSFILRT                                                                8

SEQ ID NO: 15               moltype = AA   length = 119
FEATURE                     Location/Qualifiers
REGION                      1..119
                            note = artificial sequence
source                      1..119
                            mol_type = protein
                            organism = synthetic construct
SEQUENCE: 15
EVQLVQSGAE VKKPGASVKV SCKASGYTFT NYYIHWVRQA PGQGLEWIGW IYPGDGNTKY        60
NEKFKGRATL TADTSTSTAY LELSSLRSED TAVYYCARDS YSNYYFDYWG QGTLVTVSS        119

SEQ ID NO: 16               moltype = AA   length = 112
FEATURE                     Location/Qualifiers
REGION                      1..112
                            note = artificial sequence
source                      1..112
                            mol_type = protein
                            organism = synthetic construct
SEQUENCE: 16
DIVMTQSPDS LAVSLGERAT INCKSSQSLL NSRTRKNYLA WYQQKPGQPP KLLIYWASTR        60
ESGVPDRFSG SGSGTDFTLT ISSLQAEDVA VYYCTQSFIL RTFGQGTKVE IK              112

SEQ ID NO: 17               moltype = AA   length = 25
FEATURE                     Location/Qualifiers
REGION                      1..25
                            note = artificial sequence
source                      1..25
                            mol_type = protein
                            organism = synthetic construct
```

```
SEQUENCE: 17
EVQLVESGGG LVQPGGSLRL SCAAS                                               25

SEQ ID NO: 18           moltype = AA  length = 14
FEATURE                 Location/Qualifiers
REGION                  1..14
                        note = artificial sequence
source                  1..14
                        mol_type = protein
                        organism = synthetic construct
SEQUENCE: 18
WVRQAPGKGL EWVG                                                           14

SEQ ID NO: 19           moltype = AA  length = 32
FEATURE                 Location/Qualifiers
REGION                  1..32
                        note = artificial sequence
source                  1..32
                        mol_type = protein
                        organism = synthetic construct
SEQUENCE: 19
RFTISVDKSK NTLYLQMNSL RAEDTAVYYC AR                                       32

SEQ ID NO: 20           moltype = AA  length = 11
FEATURE                 Location/Qualifiers
REGION                  1..11
                        note = artificial sequence
source                  1..11
                        mol_type = protein
                        organism = synthetic construct
SEQUENCE: 20
WGQGTLVTVS S                                                              11

SEQ ID NO: 21           moltype = AA  length = 23
FEATURE                 Location/Qualifiers
REGION                  1..23
                        note = artificial sequence
source                  1..23
                        mol_type = protein
                        organism = synthetic construct
SEQUENCE: 21
DIQMTQSPSS LSASVGDRVT ITC                                                 23

SEQ ID NO: 22           moltype = AA  length = 15
FEATURE                 Location/Qualifiers
REGION                  1..15
                        note = artificial sequence
source                  1..15
                        mol_type = protein
                        organism = synthetic construct
SEQUENCE: 22
WYQQKPGKAP KPLIY                                                          15

SEQ ID NO: 23           moltype = AA  length = 32
FEATURE                 Location/Qualifiers
REGION                  1..32
                        note = artificial sequence
source                  1..32
                        mol_type = protein
                        organism = synthetic construct
SEQUENCE: 23
GVPSRFSGSG SGTDFTLTIS SLQPEDFATY YC                                       32

SEQ ID NO: 24           moltype = AA  length = 10
FEATURE                 Location/Qualifiers
REGION                  1..10
                        note = artificial sequence
source                  1..10
                        mol_type = protein
                        organism = synthetic construct
SEQUENCE: 24
FGQGTKVEIK                                                                10

SEQ ID NO: 25           moltype = AA  length = 30
FEATURE                 Location/Qualifiers
REGION                  1..30
                        note = artificial sequence
```

```
                              -continued source                   1..30
                         mol_type = protein
                         organism = synthetic construct
SEQUENCE: 25
EVQLVQSGAE VKKPGASVKV SCKASGYTFT                                    30

SEQ ID NO: 26            moltype = AA  length = 14
FEATURE                  Location/Qualifiers
REGION                   1..14
                         note = artificial sequence
source                   1..14
                         mol_type = protein
                         organism = synthetic construct
SEQUENCE: 26
WVRQAPGQGL EWIG                                                     14

SEQ ID NO: 27            moltype = AA  length = 32
FEATURE                  Location/Qualifiers
REGION                   1..32
                         note = artificial sequence
source                   1..32
                         mol_type = protein
                         organism = synthetic construct
SEQUENCE: 27
RATLTADTST STAYLELSSL RSEDTAVYYC AR                                 32

SEQ ID NO: 28            moltype = AA  length = 11
FEATURE                  Location/Qualifiers
REGION                   1..11
                         note = artificial sequence
source                   1..11
                         mol_type = protein
                         organism = synthetic construct
SEQUENCE: 28
WGQGTLVTVS S                                                        11

SEQ ID NO: 29            moltype = AA  length = 23
FEATURE                  Location/Qualifiers
REGION                   1..23
                         note = artificial sequence
source                   1..23
                         mol_type = protein
                         organism = synthetic construct
SEQUENCE: 29
DIVMTQSPDS LAVSLGERAT INC                                           23

SEQ ID NO: 30            moltype = AA  length = 15
FEATURE                  Location/Qualifiers
REGION                   1..15
                         note = artificial sequence
source                   1..15
                         mol_type = protein
                         organism = synthetic construct
SEQUENCE: 30
WYQQKPGQPP KLLIY                                                    15

SEQ ID NO: 31            moltype = AA  length = 32
FEATURE                  Location/Qualifiers
REGION                   1..32
                         note = artificial sequence
source                   1..32
                         mol_type = protein
                         organism = synthetic construct
SEQUENCE: 31
GVPDRFSGSG SGTDFTLTIS SLQAEDVAVY YC                                 32

SEQ ID NO: 32            moltype = AA  length = 10
FEATURE                  Location/Qualifiers
REGION                   1..10
                         note = artificial sequence
source                   1..10
                         mol_type = protein
                         organism = synthetic construct
SEQUENCE: 32
FGQGTKVEIK                                                          10

SEQ ID NO: 33            moltype = AA  length = 452
FEATURE                  Location/Qualifiers
```

```
REGION          1..452
                note = artificial sequence
source          1..452
                mol_type = protein
                organism = synthetic construct
SEQUENCE: 33
EVQLVESGGG LVQPGGSLRL SCAASGYTFT SYNMHWVRQA PGKGLEWVGA IYPGNGDTSY   60
NQKFKGRFTI SVDKSKNTLY LQMNSLRAED TAVYYCARVV YYSNSYWYFD VWGQGTLVTV  120
SSASTKGPSV FPLAPSSKST SGGTAALGCL VKDYFPEPVT VSWNSGALTS GVHTFPAVLQ  180
SSGLYSLSSV VTVPSSSLGT QTYICNVNHK PSNTKVDKKV EPKSCDKTHT CPPCPAPELL  240
GGPSVFLFPP KPKDTLMISR TPEVTCVVVD VSHEDPEVKF NWYVDGVEVH NAKTKPREEQ  300
YGSTYRVVSV LTVLHQDWLN GKEYKCKVSN KALPAPIEKT ISKAKGQPRE PQVYTLPPSR  360
EEMTKNQVSL WCLVKGFYPS DIAVEWESNG QPENNYKTTP PVLDSDGSFF LYSKLTVDKS  420
RWQQGNVFSC SVMHEALHNH YTQKSLSLSP GK                               452

SEQ ID NO: 34   moltype = AA length = 213
FEATURE         Location/Qualifiers
REGION          1..213
                note = artificial sequence
source          1..213
                mol_type = protein
                organism = synthetic construct
SEQUENCE: 34
DIQMTQSPSS LSASVGDRVT ITCRASSSVS YMHWYQQKPG KAPKPLIYAP SNLASGVPSR   60
FSGSGSGTDF TLTISSLQPE DFATYYCQQW SFNPPTFGQG TKVEIKRTVA APSVFIFPPS  120
DEQLKSGTAS VVCLLNNFYP REAKVQWKVD NALQSGNSQE SVTEQDSKDS TYSLSSTLTL  180
SKADYEKHKV YACEVTHQGL SSPVTKSFNR GEC                              213

SEQ ID NO: 35   moltype = AA length = 449
FEATURE         Location/Qualifiers
REGION          1..449
                note = artificial sequence
source          1..449
                mol_type = protein
                organism = synthetic construct
SEQUENCE: 35
EVQLVQSGAE VKKPGASVKV SCKASGYTFT NYYIHWVRQA PGQGLEWIGW IYPGDGNTKY   60
NEKFKGRATL TADTSTSTAY LELSSLRSED TAVYYCARDS YSNYYFDYWG QGTLVTVSSA  120
STKGPSVFPL APSSKSTGGG TAALGCLVKD YFPEPVTVSW NSGALTSGVH TFPAVLQSSG  180
LYSLSSVVTV PSSSLGTQTY ICNVNHKPSN TKVDKKVEPK SCDKTHTCPP CPAPELLGGP  240
SVFLFPPKPK DTLMISRTPE VTCVVVDVSH EDPEVKFNWY VDGVEVHNAK TKPREEQYGS  300
TYRVVSVLTV LHQDWLNGKE YKCKVSNKAL PAPIEKTISK AKGQPREPQV YTLPPSREEM  360
TKNQVSLSCA VKGFYPSDIA VEWESNGQPE NNYKTTPPVL DSDGSFFLVS KLTVDKSRWQ  420
QGNVFSCSVM HEALHNHYTQ KSLSLSPGK                                   449

SEQ ID NO: 36   moltype = AA length = 219
FEATURE         Location/Qualifiers
REGION          1..219
                note = artificial sequence
source          1..219
                mol_type = protein
                organism = synthetic construct
SEQUENCE: 36
DIVMTQSPDS LAVSLGERAT INCKSSQSLL NSRTRKNYLA WYQQKPGQPP KLLIYWASTR   60
ESGVPDRFSG SGSGTDFTLT ISSLQAEDVA VYYCTQSFIL RTFGQGTKVE IKRTVAAPSV  120
FIFPPSDEQL KSGTASVVCL LNNFYPREAK VQWKVDNALQ SGNSQESVTE QDSKDSTYSL  180
SSTLTLSKAD YEKHKVYACE VTHQGLSSPV TKSFNRGEC                        219
```